United States Patent
Liu et al.

(10) Patent No.: US 10,020,856 B2
(45) Date of Patent: *Jul. 10, 2018

(54) METHOD AND APPARATUS FOR MEASURING AND FEEDING BACK CHANNEL INFORMATION

(71) Applicant: Huawei Technologies Co., Ltd., Shenzhen (CN)

(72) Inventors: Kunpeng Liu, Beijing (CN); Leiming Zhang, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,909

(22) Filed: Sep. 11, 2017

(65) Prior Publication Data

US 2017/0373734 A1    Dec. 28, 2017

Related U.S. Application Data

(63) Continuation of application No. 15/352,381, filed on Nov. 15, 2016, which is a continuation of application No. PCT/CN2014/077598, filed on May 15, 2014.

(51) Int. Cl.
*H04B 7/04*     (2017.01)
*H04B 7/0456*   (2017.01)
*H04B 7/06*     (2006.01)

(52) U.S. Cl.
CPC ............. *H04B 7/0456* (2013.01); *H04B 7/04* (2013.01); *H04B 7/0673* (2013.01)

(58) Field of Classification Search
CPC .. H03M 7/00; H04B 1/38; H04B 7/02; H04B 7/04; H04B 7/0456; H04B 7/06;
(Continued)

(56) References Cited

U.S. PATENT DOCUMENTS

2007/0149181 A1*  6/2007  Lin ..................... H04B 7/0417
                                                        455/415
2008/0037669 A1   2/2008  Pan et al.
(Continued)

FOREIGN PATENT DOCUMENTS

CN    101669299 A    3/2010
CN    102158263 A    8/2011
(Continued)

*Primary Examiner* — Shawkat M Ali
(74) *Attorney, Agent, or Firm* — Slater Matsil, LLP

(57) ABSTRACT

A method and an apparatus for measuring and feeding back channel information are disclosed. In an embodiment the method includes receiving, by a first network device, a reference signal and measuring the reference signal to obtain a measurement result. The method further includes selecting a first codebook from a first codebook set according to the measurement result, wherein the first codebook set comprises at least two first codebooks, a sub-vector $W_x$ of each first codebook is formed by a zero vector and a non-zero vector, wherein the vectors forming the $W_x$ correspond to different groups of antenna ports, and sending a codebook index to a second network device, wherein the codebook index corresponds to the first codebook selected from the first codebook set.

8 Claims, 9 Drawing Sheets

(58) Field of Classification Search
CPC .... H04B 7/0626; H04B 7/0639; H04B 15/00;
H04B 17/00; H04J 1/16; H04J 3/14;
H04J 11/00; H04L 1/00; H04L 1/02;
H04L 5/00; H04L 5/14; H04L 12/26;
H04L 25/03; H04L 25/49; H04L 27/00;
H04L 27/26; H04L 27/28; H04W 4/00;
H04W 24/08; H04W 24/10; H04W 40/00;
H04W 72/02; H04W 72/04; H04W
72/0406; H04W 72/10; H04W 88/08
USPC ........ 341/106; 370/210, 241, 248, 252, 328,
370/329, 334, 335; 375/140, 219, 259,
375/260, 267, 295, 296, 316, 349;
455/101; 704/238; 708/520, 607
See application file for complete search history.

(56) References Cited

U.S. PATENT DOCUMENTS

| | | | |
|---|---|---|---|
| 2008/0186212 A1* | 8/2008 | Clerckx | H04B 7/0456 |
| | | | 341/55 |
| 2009/0004986 A1 | 1/2009 | Park et al. | |
| 2009/0122857 A1* | 5/2009 | Li | H04B 7/0413 |
| | | | 375/239 |
| 2009/0128381 A1* | 5/2009 | Choi | H04L 1/06 |
| | | | 341/106 |
| 2010/0208838 A1* | 8/2010 | Lee | H04B 7/063 |
| | | | 375/267 |
| 2010/0220801 A1* | 9/2010 | Lee | H04B 7/0434 |
| | | | 375/267 |
| 2011/0274188 A1 | 11/2011 | Sayana et al. | |
| 2012/0039251 A1* | 2/2012 | Sayana | H04B 7/0639 |
| | | | 370/328 |
| 2012/0328031 A1 | 12/2012 | Pajukoski et al. | |
| 2013/0156075 A1* | 6/2013 | Shirani-Mehr | H04W 52/04 |
| | | | 375/219 |
| 2013/0315189 A1* | 11/2013 | Kim | H04L 1/0026 |
| | | | 370/329 |
| 2014/0098689 A1 | 4/2014 | Lee et al. | |
| 2014/0321569 A1 | 10/2014 | Kim | |
| 2014/0362938 A1* | 12/2014 | Krishnamurthy | H04B 7/0456 |
| | | | 375/267 |
| 2015/0358066 A1* | 12/2015 | Liu | H04B 7/0417 |
| | | | 375/267 |
| 2016/0006494 A1* | 1/2016 | Yang | H04L 25/0391 |
| | | | 370/329 |
| 2016/0119049 A1 | 4/2016 | Cui et al. | |

FOREIGN PATENT DOCUMENTS

| | | |
|---|---|---|
| JP | 2010526476 A | 7/2010 |
| WO | WO2008133582 A2 | 11/2008 |
| WO | 2015124627 A1 | 8/2015 |

* cited by examiner

Receive a reference signal, measure the reference signal to obtain a measurement result, and select a first codebook from a first codebook set according to the measurement result — 101.

Send a codebook index to a second network device, where the codebook index corresponds to the first codebook selected from the first codebook set — 102.

METHOD AND APPARATUS FOR MEASURING AND FEEDING BACK CHANNEL INFORMATION

CROSS-REFERENCE TO RELATED APPLICATIONS

This application is a continuation of U.S. application Ser. No. 15/352,381, filed on Nov. 15, 2016, which is a continuation of International Application No. PCT/CN2014/077598, filed on May 15, 2014. All of the afore-mentioned patent applications are hereby incorporated by reference in their entireties.

TECHNICAL FIELD

Embodiments of the present invention relate to the communications field, and in particular, to MIMO coding and decoding technologies in an LTE system.

BACKGROUND

The multiple input multiple output (MIMO) technology is extensively applied in wireless communications systems to increase system capacities and ensure cell coverage. For example, in a Long Term Evolution LTE) system, transmit diversity based on multiple antennas, open-loop or closed-loop spatial multiplexing, and multi-stream transmission based on a demodulation reference signal (DM-RS) are used in a downlink. Among them, the DM-RS based multi-stream transmission is a main transmission mode in an LTE-Advanced (LTE-A) system and later systems.

In a conventional cellular system, a beam at a transmit side of a base station can be adjusted only in a horizontal dimension. In a vertical dimension, however, a fixed downtilt is used for every user. Therefore, various beamforming or precoding technologies or the like are all based on channel information in the horizontal dimension. In practice, however, because a channel is three-dimensional (3D), the fixed downtilt method cannot always optimize a system throughput. Therefore, a beam adjustment in the vertical dimension is of great significance to system performance enhancement.

A conception of a 3D beamforming technology is mainly as follows: A 3D beamforming weighted vector at an active antenna side is adjusted according to 3D channel information estimated at a user side, so that a main lobe of a beam in a 3D space "aims at" a target user. In this way, received signal power is increased greatly, a signal to interference plus noise ratio is increased, and further, the throughput of the entire system is enhanced. Schematic diagrams of comparison between a dynamic downtilt in 3D beamforming and a fixed downtilt of a conventional antenna are shown in FIG. 1 and FIG. 2. An antenna port model with a fixed downtilt is shown in FIG. 1, where corresponding to conventional 2D MIMO, a fixed downtilt is used for all users. An antenna port model with a dynamic downtilt is shown in FIG. 2, where for each physical resource block (PRB), a base station may dynamically adjust a downtilt according to a location of a served user. The 3D beamforming technology needs to be based on an active antenna system. Compared with a conventional antenna, the active antenna AAS further provides a degree of freedom in a vertical direction. FIG. 3 shows a schematic diagram of AAS antennas. It can be seen that there are multiple antennas in the vertical direction of AAS antennas. Therefore, a beam can be formed in the vertical direction dynamically, and a degree of freedom of beamforming in the vertical direction is added. FIG. 4 shows a flowchart in which data is processed in baseband and radio frequency networks, and transmitted through an AAS antenna. In a baseband processing part, a data stream at each layer undergoes precoding processing, and then is mapped to NP ports. After undergoing inverse fast Fourier transform (IFFT) and parallel-to-serial conversion, a data stream on each port enters a drive network in a radio frequency part, and then is transmitted through an antenna. Each drive network is a 1-to-M drive network, that is, one port corresponds to M antenna elements. FIG. 5 shows a schematic diagram of downtilt grouping. In the example, there are eight antenna ports, and each port drives four antenna elements to form a downtilt. In addition, four antenna ports (ports 0 to 3) in a horizontal direction have a same weighted vector in drive networks, and all point to a downtilt 0; the other four antenna ports (ports 4 to 7) have a same weighted vector, and all point to a downtilt 1.

In the prior art, spatially multiplexed multi-stream data can be transmitted only in a plane with a fixed downtilt by using a horizontal beam, and characteristics of a vertical space cannot be used to multiplex multiple data streams.

SUMMARY

In view of this, embodiments of the present invention provide a method and an apparatus for measuring and feeding back channel information.

According to a first aspect, a method for measuring and feeding back channel information is provided, including: receiving, by a first network device, a reference signal, measuring the reference signal to obtain a measurement result, and selecting a first codebook from a first codebook set according to the measurement result; where the first codebook set includes at least two first codebooks, a sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x(1)$ and $W_x(2)$, a location of a non-zero vector in the $W_x(1)$ is the same as a location of a non-zero vector in the $W_x(2)$; and formation according to different structures is: for different sub-vectors $W_x(1)$ and $W_x(2)$, a location of a non-zero vector in the $W_x(1)$ is different from a location of a non-zero vector in the $W_x(2)$; and sending a codebook index to a second network device, where the codebook index corresponds to the first codebook selected from the first codebook set.

With reference to the first aspect, in a first possible implementation manner, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; 0 in $$\begin{bmatrix} V_a \\ 0 \end{bmatrix}$$

represents an n2---dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and 0 in $$\begin{bmatrix} 0 \\ V_b \end{bmatrix}$$

represents an n1-dimensional zero vector and corresponds to the first group of antenna ports.

With reference to the first aspect, in a second possible implementation manner, at least one first codebook meets a first condition, where the first condition is: a vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the first phase vector, and a phase part of a $K^{th}$ element in each sub-vector of the $\{V_m\}$ is a $K^{th}$ element of each corresponding first phase vector, where P, Q, and K are any positive integers; or a vector set formed by all second phase vectors and at least one CMP codebook in a Cubic Metric Preserving (CMP) cubic metric preserving codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers; or a vector set formed by all third phase vectors is a set formed by corresponding sub-vectors in a householder transform codebook, where $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

With reference to the first aspect, in a third possible implementation manner, at least one first codebook meets a second condition, where the second condition is: a vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector; or a vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers; or a vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

With reference to the first aspect, in a fourth possible implementation manner, at least one first codebook meets a third condition, where the third condition is: in all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$; where $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vectors $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector.

With reference to the first aspect, in a fifth possible implementation manner, the method includes: receiving at least one first configuration message, where each first configuration message is used to determine a sub-vector set of phase parts corresponding to one group of antenna ports, and a quantity of the at least one first configuration message is equal to a quantity of groups of the antenna ports; and/or receiving at least one second configuration message, where each second configuration message is used to determine a sub-vector set of amplitude parts corresponding to one group of antenna ports, and a quantity of the at least one second configuration message is equal to a quantity of groups of the antenna ports.

With reference to the first aspect, in a sixth possible implementation manner, the first configuration message is configured by the second network device by using higher layer signaling or dynamic signaling; and/or the second configuration message is configured by the second network device by using higher layer signaling or dynamic signaling.

With reference to the first aspect, in a seventh possible implementation manner, the first configuration message is obtained by the first network device by measuring the reference signal; and/or the second configuration message is obtained by the first network device by measuring the reference signal.

With reference to the first aspect, in an eighth possible implementation manner, the present invention provides different combinations in the first codebook matrix in different ranks.

With reference to the first aspect, in a ninth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vectors $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_k\}$ form a vector $V_k'$, vectors $V_k'$ corresponding to all sub-vectors $V_k$ in the $\{V_k\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\} \neq \{V_L'\}$ holds true.

With reference to the first aspect, in a tenth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\} \neq \{V_N'\}$ holds true.

With reference to the first aspect, in an eleventh possible implementation manner, at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_b$ of each second sub-vector $$\begin{bmatrix} 0 \\ V_b \end{bmatrix}$$

in the first codebook are unequal; or at least two elements in an amplitude vector in $V_a$ of each first sub-vector $$\begin{bmatrix} V_a \\ 0 \end{bmatrix}$$

in the first codebook are unequal, and all elements in an amplitude vector in $V_b$ of each second sub-vector $$\begin{bmatrix} 0 \\ V_b \end{bmatrix}$$

in the first codebook are equal; or all elements in an amplitude vector in $V_a$ of each first sub-vector $$\begin{bmatrix} V_a \\ 0 \end{bmatrix}$$

in the first codebook are equal, and at least two elements in an amplitude vector in $V_b$ of each second sub-vector $$\begin{bmatrix} 0 \\ V_b \end{bmatrix}$$

in the first codebook are unequal.

With reference to the first aspect, in a twelfth possible implementation manner, at least two amplitude vectors in a vector set formed by amplitude vectors in $V_a$ of all first sub-vectors $$\begin{bmatrix} V_a \\ 0 \end{bmatrix}$$

in the first codebook are different; or at least two amplitude vectors in a vector set formed by amplitude vectors in $V_b$ of all second sub-vectors $$\begin{bmatrix} 0 \\ V_b \end{bmatrix}$$

in the first codebook are different.

With reference to the first aspect, in a thirteenth possible implementation manner, the first network device is a terminal device UE.

With reference to the first aspect, in a fourteenth possible implementation manner, the second network device is a base station eNB.

According to a second aspect, a method for measuring and feeding back channel information is provided, including: sending a reference signal to a first network device, where the reference signal is used to notify the first network device to perform a measurement to obtain a measurement result; receiving a codebook index sent by the first network device, where the codebook index corresponds to a first codebook determined in the first codebook set by the first network device, and the codebook index is determined by the first network device according to the measurement result; where the first codebook set includes at least two first codebooks, a sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x(1)$ and $W_x(2)$, a location of a non-zero vector in the $W_x(1)$ is the same as a location of a non-zero vector in the $W_x(2)$; and formation according to different structures is: for different sub-vectors $W_x(1)$ and $W_x(2)$, a location of a non-zero vector in the $W_x(1)$ is different from a location of a non-zero vector in the $W_x(2)$; and determining, according to the codebook index, the first codebook determined in the first codebook set by the first network device.

With reference to the second aspect, in a first possible implementation manner, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; $0$ in $$\begin{bmatrix} V_a \\ 0 \end{bmatrix}$$

represents an n2-dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and $0$ in $$\begin{bmatrix} 0 \\ V_b \end{bmatrix}$$

represents an n1-dimensional zero vector and corresponds to the first group of antenna ports.

With reference to the second aspect, in a second possible implementation manner, at least one first codebook meets a first condition, where the first condition is: a vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the first phase vector, and a phase part of a $K^{th}$ element in each sub-vector of the $\{V_m\}$ is a $K^{th}$ element of each corresponding first phase vector, where P, Q, and K are any positive integers; or a vector set formed by all second phase vectors and at least one CMP codebook in a CMP codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers; or a vector set formed by all third phase vectors is a set formed by corresponding sub-vectors in a householder transform codebook, where $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

With reference to the second aspect, in a third possible implementation manner, at least one first codebook meets a second condition, where the second condition is: a vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector; or a vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers; or a vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

With reference to the second aspect, in a fourth possible implementation manner, at least one first codebook meets a third condition, where the third condition is: in all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$; where $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vectors $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector.

With reference to the second aspect, in a fifth possible implementation manner, the method includes: sending at least one first configuration message to the first network device, where each first configuration message is used to determine a sub-vector set of phase parts corresponding to one group of antenna ports, and a quantity of the at least one first configuration message is equal to a quantity of groups of the antenna ports; and/or sending at least one second configuration message to the first network device, where each second configuration message is used to determine a sub-vector set of amplitude parts corresponding to one group of antenna ports, and a quantity of the at least one second configuration message is equal to a quantity of groups of the antenna ports.

With reference to the second aspect, in a sixth possible implementation manner, the first configuration message is configured by a second network device by using higher layer signaling or dynamic signaling; and/or the second configuration message is configured by a second network device by using higher layer signaling or dynamic signaling.

With reference to the second aspect, in a seventh possible implementation manner, the reference signal is further used to indicate the first configuration message; and/or the reference signal is further used to indicate the second configuration message.

With reference to the second aspect, in an eighth possible implementation manner, the present invention provides different combinations in the first codebook matrix in different ranks.

With reference to the second aspect, in a ninth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vectors $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_k\}$ form a vector $V_k'$, vectors $V_k'$ corresponding to all sub-vectors $V_k$ in the $\{V_k\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\} \neq \{V_L'\}$ holds true.

With reference to the second aspect, in a tenth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\} \neq \{V_N'\}$ holds true.

With reference to the second aspect, in an eleventh possible implementation manner, at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_b$ of each second sub-vector $$\begin{bmatrix} 0 \\ V_b \end{bmatrix}$$

in the first codebook are unequal; or at least two elements in an amplitude vector in $V_a$ of each first sub-vector $$\begin{bmatrix} V_a \\ 0 \end{bmatrix}$$

in the first codebook are unequal, and all elements in an amplitude vector in $V_b$ of each second sub-vector $$\begin{bmatrix} 0 \\ V_b \end{bmatrix}$$

in the first codebook are equal; or all elements in an amplitude vector in $V_a$ of each first sub-vector $$\begin{bmatrix} V_a \\ 0 \end{bmatrix}$$

in the first codebook are equal, and at least two elements in an amplitude vector in $V_b$ of each second sub-vector $$\begin{bmatrix} 0 \\ V_b \end{bmatrix}$$

in the first codebook are unequal.

With reference to the second aspect, in a twelfth possible implementation manner, at least two amplitude vectors in a vector set formed by amplitude vectors in $V_a$ of all first sub-vectors $$\begin{bmatrix} V_a \\ 0 \end{bmatrix}$$

in the first codebook are different; or at least two amplitude vectors in a vector set formed by amplitude vectors in $V_b$ of all second sub-vectors $$\begin{bmatrix} 0 \\ V_b \end{bmatrix}$$

in the first codebook are different.

With reference to the second aspect, in a thirteenth possible implementation manner, the first network device is a terminal device UE.

With reference to the second aspect, in a fourteenth possible implementation manner, the second network device is a base station eNB.

According to a third aspect, an apparatus for measuring and feeding back channel information is provided, including: a first receiving unit, configured to receive a reference signal; a measurement unit, configured to measure the reference signal to obtain a measurement result; a selection unit, configured to select a first codebook from a first codebook set according to the measurement result; where the first codebook set includes at least two first codebooks, a sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x(1)$ and $W_x(2)$, a location of a non-zero vector in the $W_x(1)$ is the same as a location of a non-zero vector in the $W_x(2)$; and formation according to different structures is: for different sub-vectors $W_x(1)$ and $W_x(2)$, a location of a non-zero vector in the $W_x(1)$ is different from a location of a non-zero vector in the $W_x(2)$; and a sending unit, configured to send a codebook index to a second network device, where the codebook index corresponds to the first codebook selected from the first codebook set.

With reference to the third aspect, in a first possible implementation manner, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; 0 in $$\begin{bmatrix} V_a \\ 0 \end{bmatrix}$$

represents an n2-dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and 0 in $$\begin{bmatrix} 0 \\ V_b \end{bmatrix}$$

represents an n1-dimensional zero vector and corresponds to the first group of antenna ports.

With reference to the third aspect, in a second possible implementation manner, at least one first codebook meets a first condition, where the first condition is: a vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the first phase vector, and a phase part of a $K^{th}$ element in each sub-vector of the $\{V_m\}$ is a $K^{th}$ element of each corresponding first phase vector, where P, Q, and K are any positive integers; or a vector set formed by all second phase vectors and at least one CMP codebook in a CMP codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers; or a vector set formed by all third phase vectors is a set formed by corresponding sub-vectors in a householder transform codebook, where $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

With reference to the third aspect, in a third possible implementation manner, at least one first codebook meets a second condition, where the second condition is: a vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector; or a vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers; or a vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

With reference to the third aspect, in a fourth possible implementation manner, at least one first codebook meets a third condition, where the third condition is: in all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$; where $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vectors $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector.

With reference to the third aspect, in a fifth possible implementation manner, the apparatus includes: a second receiving unit, configured to receive at least one first configuration message, where each first configuration message is used to determine a sub-vector set of phase parts corresponding to one group of antenna ports, and a quantity of the at least one first configuration message is equal to a quantity of groups of the antenna ports; and/or a third receiving unit, configured to receive at least one second configuration message, where each second configuration message is used to determine a sub-vector set of amplitude parts corresponding to one group of antenna ports, and a quantity of the at least one second configuration message is equal to a quantity of groups of the antenna ports.

With reference to the third aspect, in a sixth possible implementation manner, the first configuration message is configured by the second network device by using higher layer signaling or dynamic signaling; and/or the second configuration message is configured by the second network device by using higher layer signaling or dynamic signaling.

With reference to the third aspect, in a seventh possible implementation manner, the apparatus includes: a first acquiring unit, configured to acquire the first configuration message according to the result that is obtained by the measurement unit by measuring the reference signal; and/or a second acquiring unit, configured to acquire the second configuration message according to the result that is obtained by the measurement unit by measuring the reference signal.

With reference to the third aspect, in an eighth possible implementation manner, the present invention provides different combinations in the first codebook matrix in different ranks.

With reference to the third aspect, in a ninth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vectors $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_k\}$ form a vector $V_k'$, vectors $V_k'$ corresponding to all sub-vectors $V_k$ in the $\{V_k\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\} \neq \{V_L'\}$ holds true.

With reference to the third aspect, in a tenth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\} \neq \{V_N'\}$ holds true.

With reference to the third aspect, in an eleventh possible implementation manner, at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_b$ of each second sub-vector $$\begin{bmatrix} 0 \\ V_b \end{bmatrix}$$

in the first codebook are unequal; or at least two elements in an amplitude vector in $V_a$ of each first sub-vector $$\begin{bmatrix} V_a \\ 0 \end{bmatrix}$$

in the first codebook are unequal, and all elements in an amplitude vector in $V_b$ of each second sub-vector $$\begin{bmatrix} 0 \\ V_b \end{bmatrix}$$

in the first codebook are equal; or all elements in an amplitude vector in $V_a$ of each first sub-vector $$\begin{bmatrix} V_a \\ 0 \end{bmatrix}$$

in the first codebook are equal, and at least two elements in an amplitude vector in $V_b$ of each second sub-vector $$\begin{bmatrix} 0 \\ V_b \end{bmatrix}$$

in the first codebook are unequal.

With reference to the third aspect, in a twelfth possible implementation manner, at least two amplitude vectors in a vector set formed by amplitude vectors in $V_a$ of all first sub-vectors $$\begin{bmatrix} V_a \\ 0 \end{bmatrix}$$

in the first codebook are different; or at least two amplitude vectors in a vector set formed by amplitude vectors in $V_b$ of all second sub-vectors $$\begin{bmatrix} 0 \\ V_b \end{bmatrix}$$

in the first codebook are different.

With reference to the third aspect, in a thirteenth possible implementation manner, the first network device is a terminal device UE.

With reference to the third aspect, in a fourteenth possible implementation manner, the second network device is a base station eNB.

According to a fourth aspect, a communications apparatus is provided, including: a first sending unit, configured to send a reference signal to a first network device, where the reference signal is used to notify the first network device to perform a measurement to obtain a measurement result; a receiving unit, configured to receive a codebook index sent by the first network device, where the codebook index corresponds to a first codebook determined in the first codebook set by the first network device, and the codebook index is determined by the first network device according to the measurement result; and a determining unit, configured to determine, according to the codebook index, the first codebook in the first codebook set; where the first codebook set includes at least two first codebooks, a sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x(1)$ and $W_x(2)$, a location of a non-zero vector in the $W_x(1)$ is the same as a location of a non-zero vector in the $W_x(2)$; and formation according to different structures is: for different sub-vectors $W_x(1)$ and $W_x(2)$, a location of a non-zero vector in the $W_x(1)$ is different from a location of a non-zero vector in the $W_x(2)$.

With reference to the fourth aspect, in a first possible implementation manner, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; $\mathbf{0}$ in $$\begin{bmatrix} V_a \\ 0 \end{bmatrix}$$

represents an n2---dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and $\mathbf{0}$ in $$\begin{bmatrix} 0 \\ V_b \end{bmatrix}$$

represents an n1-dimensional zero vector and corresponds to the first group of antenna ports.

With reference to the fourth aspect, in a second possible implementation manner, at least one first codebook meets a first condition, where the first condition is: a vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the first phase vector, and a phase part of a $K^{th}$ element in each sub-vector of the $\{V_m\}$ is a $K^{th}$ element of each corresponding first phase vector, where P, Q, and K are any positive integers; or a vector set formed by all second phase vectors and at least one CMP codebook in a CMP codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers; or a vector set formed by all third phase vectors is a set formed by corresponding sub-vectors in a householder transform codebook, where $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

With reference to the fourth aspect, in a third possible implementation manner, at least one first codebook meets a second condition, where the second condition is: a vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector; or a vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers; or a vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

With reference to the fourth aspect, in a fourth possible implementation manner, at least one first codebook meets a third condition, where the third condition is: in all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$; where $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vectors $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector.

With reference to the fourth aspect, in a fifth possible implementation manner, the apparatus includes: a second sending unit, configured to send at least one first configuration message to the first network device, where each first configuration message is used to determine a sub-vector set of phase parts corresponding to one group of antenna ports, and a quantity of the at least one first configuration message is equal to a quantity of groups of the antenna ports; and/or a third sending unit, configured to send at least one second configuration message to the first network device, where each second configuration message is used to determine a sub-vector set of amplitude parts corresponding to one group of antenna ports, and a quantity of the at least one second configuration message is equal to a quantity of groups of the antenna ports.

With reference to the fourth aspect, in a sixth possible implementation manner, the second sending unit sends the first configuration message by using higher layer signaling or dynamic signaling; and/or the third sending unit sends the second configuration message by using higher layer signaling or dynamic signaling.

With reference to the fourth aspect, in a seventh possible implementation manner, the reference signal is further used to indicate the at least one first configuration message, where each first configuration message is used to determine a sub-vector set of phase parts corresponding to one group of antenna ports, and a quantity of the at least one first configuration message is equal to a quantity of groups of the antenna ports; and/or the reference signal is further used to indicate the at least one second configuration message, where each second configuration message is used to determine a sub-vector set of amplitude parts corresponding to one group of antenna ports, and a quantity of the at least one second configuration message is equal to a quantity of groups of the antenna ports.

With reference to the fourth aspect, in an eighth possible implementation manner, the present invention provides different combinations in the first codebook matrix in different ranks.

With reference to the fourth aspect, in a ninth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vector $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_k\}$ form a vector $V_k'$, vectors $V_k'$ corresponding to all sub-vectors $V_k$ in the $\{V_k\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\} \neq \{V_L'\}$ holds true.

With reference to the fourth aspect, in a tenth possible implementation manner, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\} \neq \{V_N'\}$ holds true.

With reference to the fourth aspect, in an eleventh possible implementation manner, at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_b$ of each second sub-vector $$\begin{bmatrix} 0 \\ V_b \end{bmatrix}$$

in the first codebook are unequal; or at least two elements in an amplitude vector in $V_a$ of each first sub-vector $$\begin{bmatrix} V_a \\ 0 \end{bmatrix}$$

in the first codebook are unequal, and all elements in an amplitude vector in $V_b$ of each second sub-vector $$\begin{bmatrix} 0 \\ V_b \end{bmatrix}$$

in the first codebook are equal; or all elements in an amplitude vector in $V_a$ of each first sub-vector $$\begin{bmatrix} V_a \\ 0 \end{bmatrix}$$

in the first codebook are equal, and at least two elements in an amplitude vector in $V_b$ of each second sub-vector $$\begin{bmatrix} 0 \\ V_b \end{bmatrix}$$

in the first codebook are unequal.

With reference to the fourth aspect, in a twelfth possible implementation manner, at least two amplitude vectors in a vector set formed by amplitude vectors in $V_a$ of all first sub-vectors $$\begin{bmatrix} V_a \\ 0 \end{bmatrix}$$

in the first codebook are different; or at least two amplitude vectors in a vector set formed by amplitude vectors in $V_b$ of all second sub-vectors $$\begin{bmatrix} 0 \\ V_b \end{bmatrix}$$

in the first codebook are different.

With reference to the fourth aspect, in a thirteenth possible implementation manner, the first network device is a terminal device UE.

With reference to the fourth aspect, in a fourteenth possible implementation manner, the second network device is a base station eNB.

In the foregoing solutions, a codebook structure provided by the present invention may be configured independently according to transmit power of different groups of antenna ports, so that flexibility and MIMO performance are improved.

DETAILED DESCRIPTION OF ILLUSTRATIVE EMBODIMENTS

For convenience, in the present invention, Table 1 to Table 6 are presented repeatedly in the specification, and tables with a same number correspond to same table content.

Figure 1:
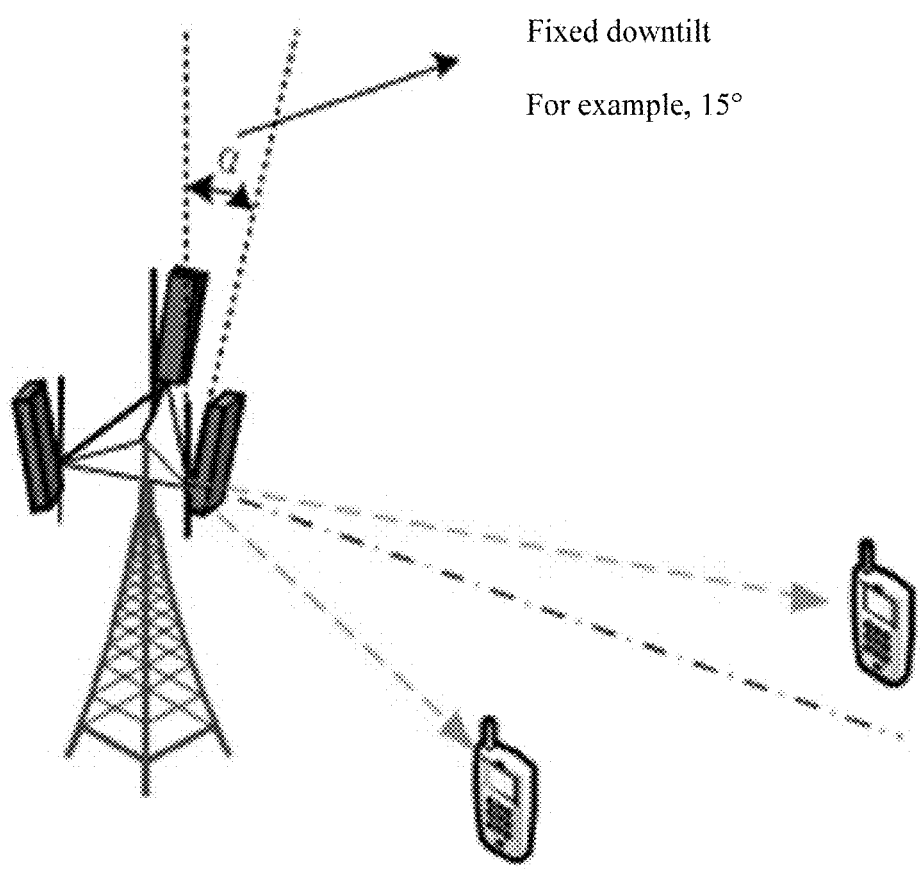
FIG. 1 is an architecture diagram of an antenna port model with a fixed downtilt.
Figure 2:
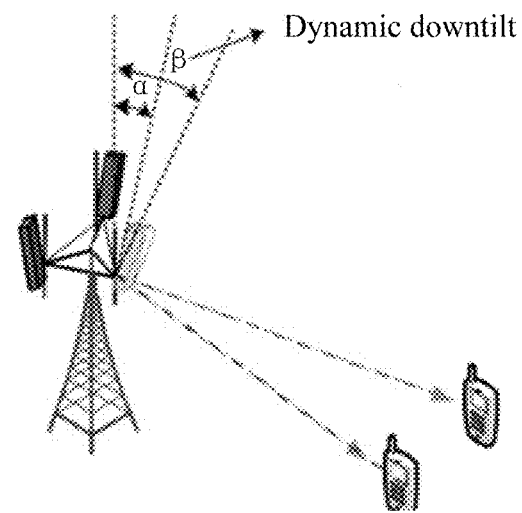
FIG. 2 is an architecture diagram of an antenna port model with a dynamic downtilt.
Figure 3:
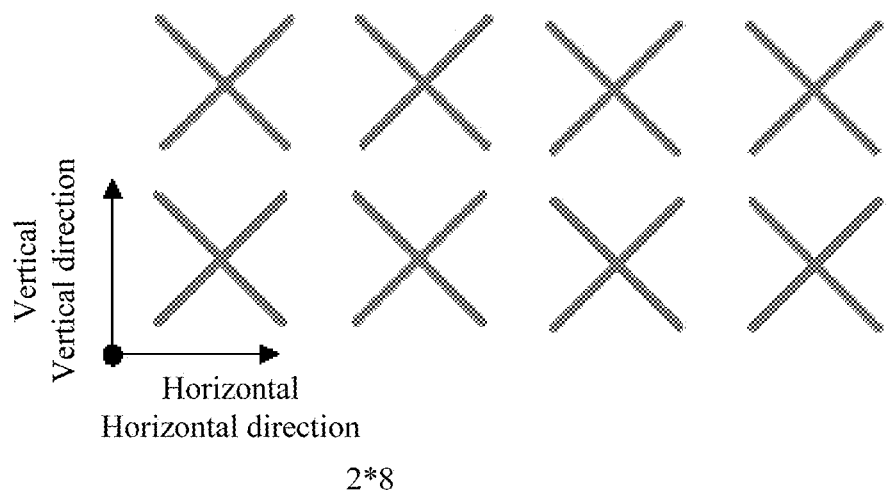
FIG. 3 is a schematic diagram of an active antenna system AAS.
Figure 4:
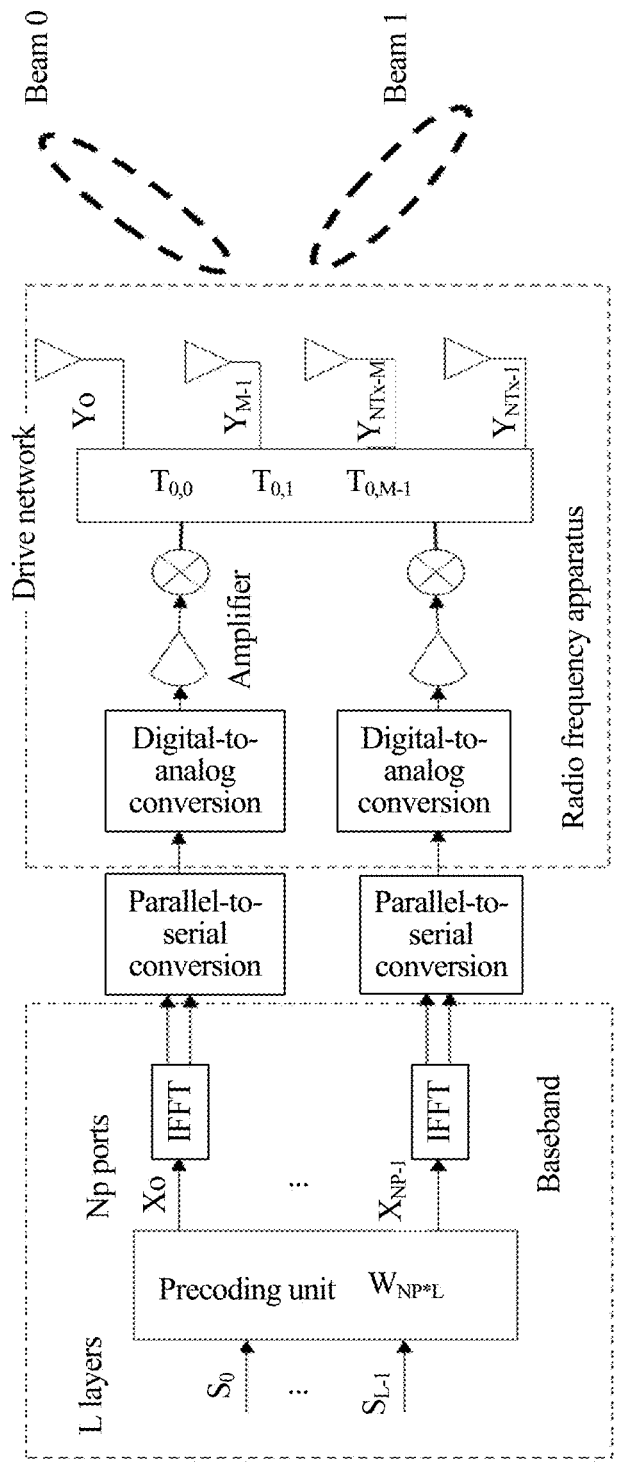
FIG. 4 is a flowchart in which data is processed in baseband and radio frequency networks, and transmitted through an AAS antenna.
Figures 5, 6:
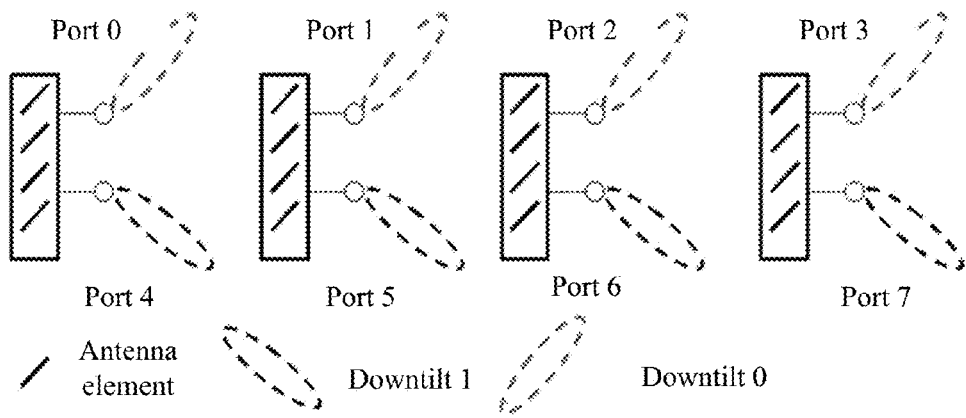
FIG. 5 is a schematic diagram of downtilt grouping.
FIG. 6 is a flowchart for implementing a method for measuring and feeding back channel information by a first network device according to the present invention.

FIG. 6 shows a flowchart of a method embodiment according to the present invention, which is specifically as follows:

Step 101: A first network device receives a reference signal, measures the reference signal to obtain a measurement result, and selects a first codebook from a first codebook set according to the measurement result.

The first codebook set includes at least two first codebooks. A sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x(1)$ and $W_x(2)$, a location of a non-zero vector in the $W_x(1)$ is the same as a location of a non-zero vector in the $W_x(2)$; and formation according to different structures is: for different sub-vectors $W_x(1)$ and $W_x(2)$, a location of a non-zero vector in the $W_x(1)$ is different from a location of a non-zero vector in the $W_x(2)$.

Step 102: the first network device send a codebook index to a second network device, where the codebook index corresponds to the first codebook selected from the first codebook set.

It should be understood that, in the present invention, a zero vector may be a zero element with a length of 1, and a non-zero vector may be a non-zero element with a length of 1. Generally, for a passive antenna, a downtilt in a vertical direction is fixed. Therefore, for multiple spatially multiplexed data streams, adjustments can be made to multiple horizontal beams only in a plane with a fixed downtilt in the vertical direction, and the multiple data streams cannot be multiplexed more freely in planes with multiple downtilts. In addition, if antenna ports are grouped according to different downtilts, a codebook structure provided by the present invention may be configured independently according to transmit power of different groups of antenna ports, so that flexibility and MIMO performance are improved.

In an embodiment of the present invention, when antenna ports are grouped according to tilts in the vertical direction, parameters of codebook vectors in a codebook may be configured independently according to different tilts, so that an objective of flexibly adapting to data transmission efficiency is achieved. In this embodiment, two tilts in the vertical direction are used as an example (this method is also applicable to more than two tilts). In each column in the first codebook, one group of antenna ports corresponds to a non-zero vector, and another group of antenna ports corresponds to a zero vector; or one group of antenna ports corresponds to a zero vector, and another group of antenna ports corresponds to a non-zero vector, where the non-zero vector refers to a vector in which at least one element is a non-zero element, and the zero vector refers to a vector in which all elements are zero elements. In the present invention, when first n1 elements in a vector included in a codebook correspond to one group of antenna ports, and last n2 elements correspond to another group of antenna ports, a structure of this vector is $$\begin{bmatrix} V_1 \\ V_2 \end{bmatrix},$$

where $V_1$ is n1-dimensional, and $V_2$ is n2-dimensional. In this case, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; 0 in $$\begin{bmatrix} V_a \\ 0 \end{bmatrix}$$

represents an n2-dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and 0 in $$\begin{bmatrix} 0 \\ V_b \end{bmatrix}$$

represents an n1-dimensional zero vector and corresponds to the first group of antenna ports. It should be understood that, the present invention is not limited to the case of grouping into only two groups. In an actual application, antenna ports are grouped into more groups according to other factors such as different downtilts or signal quality or the like. In a specific measurement process, codebooks in the first codebook set are traversed, so that a first codebook that best matches a transmission characteristic is determined and used for channel transmission.

It should be understood that, the structure of the sub-vector in the first codebook may be but is not limited to the foregoing first structure or the second structure. Optionally, locations of sub-vectors of the zero vector and the non-zero vector in the first codebook may be different. In an embodiment of the present invention, in a case of four antenna ports, elements in vectors in the first sub-vector $$\begin{bmatrix} V_a \\ 0 \end{bmatrix}$$

having the first structure are represented as $$\begin{bmatrix} V_a^0 \\ V_a^1 \\ 0 \\ 0 \end{bmatrix},$$

and elements in vectors in the second sub-vector $$\begin{bmatrix} 0 \\ V_b \end{bmatrix}$$

having the second structure are represented as $$\begin{bmatrix} 0 \\ 0 \\ V_b^0 \\ V_b^1 \end{bmatrix},$$

where $V_a^0$ and $V_a^1$ are elements in the vector $V_a$, and $V_b^0$ and $V_b^1$ are elements in the vector $V_b$. In another embodiment of the present invention, when the antenna ports are grouped into two groups, the first structure may be $$\begin{bmatrix} V_a^0 \\ 0 \\ V_a^1 \\ 0 \end{bmatrix},$$

and the second structure may be $$\begin{bmatrix} 0 \\ V_b^0 \\ 0 \\ V_b^1 \end{bmatrix}.$$

Likewise, when the antenna groups are grouped into two groups, in another embodiment of the present invention, the first structure may be $$\begin{bmatrix} V_a^0 \\ 0 \\ 0 \\ V_a^1 \end{bmatrix},$$

and the second structure may be $$\begin{bmatrix} 0 \\ V_b^0 \\ V_b^1 \\ 0 \end{bmatrix}.$$

Alternatively, the first codebook set includes at least one of the following four structures: a first structure $$\begin{bmatrix} V_a^0 \\ 0 \\ V_a^1 \\ 0 \end{bmatrix},$$

a second structure $$\begin{bmatrix} 0 \\ V_b^0 \\ 0 \\ V_b^1 \end{bmatrix},$$

a third structure $$\begin{bmatrix} V_a^0 \\ 0 \\ 0 \\ V_a^1 \end{bmatrix},$$

or a fourth structure $$\begin{bmatrix} 0 \\ V_b^0 \\ V_b^1 \\ 0 \end{bmatrix}.$$

$V_a^0$ and $V_a^1$ are elements in the vector $V_a$, and Va corresponds to one group of antenna ports. A correspondence is as follows: In the first structure, $V_a^0$ corresponds to a first antenna port, and $V_a^1$ corresponds to a third antenna port; in the second structure, $V_b^0$ corresponds to a second antenna port, and $V_b^1$ corresponds to a fourth antenna port; in the third structure, $V_a^0$ corresponds to the first antenna port, and $V_a^1$ corresponds to the fourth antenna port; in the fourth structure, $V_b^0$ corresponds to the second antenna port, and $V_b^1$ corresponds to the third antenna port, where $V_a^0$ and $V_a^1$ are elements in the vector $V_a$, and $V_b^0$ and $V_b^1$ are elements in the vector $V_b$.

When the antenna ports are grouped into three groups, the first codebook set includes at least one of a first structure $$\begin{bmatrix} V_a \\ 0 \\ 0 \end{bmatrix},$$

a second structure $$\begin{bmatrix} 0 \\ V_b \\ 0 \end{bmatrix},$$

a third structure $$\begin{bmatrix} 0 \\ 0 \\ V_c \end{bmatrix},$$

a fourth structure $$\begin{bmatrix} V_a \\ 0 \\ V_c \end{bmatrix},$$

a fifth structure $$\begin{bmatrix} V_a \\ V_b \\ 0 \end{bmatrix},$$

or a sixth structure $$\begin{bmatrix} 0 \\ V_b \\ V_c \end{bmatrix},$$

Vectors $V_a$, $V_b$, and $V_c$ each correspond to one group of antenna ports.

In an embodiment of the present invention, the present invention provides a combination of the first structure and the second structure corresponding to a value of the rank indicator.

Generally, an element in a non-zero vector included in the first codebook is in a form of a complex number. For a complex number $\alpha \cdot e^\beta$, $\alpha$ is referred to as an amplitude part, and is a real number, and $e^\beta$ is referred to as a phase part. In still another embodiment of the present invention, at least one first codebook meets a first condition. The present invention provides several definitions of the first condition that can be implemented. In the present invention, unless otherwise limited, P, Q, and K are any positive integers.

First definition of the first condition:

A vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the first phase vector, and a phase part of a $K^{th}$ element in each sub-vector of the $\{V_m\}$ is a $K^{th}$ element of each corresponding first phase vector, where P, Q, and K are any positive integers.

A general expression of the discrete Fourier transform matrix DFT matrix is:

$$M_{dft} = \frac{1}{\sqrt{N}} \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix}.$$

The phase matrix of the DFT matrix is:

$$M_{dft\_phase} = \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix}.$$

A value of N is an order in a case in which the DFT matrix is a square matrix. For example, in $$\begin{bmatrix} V_a \\ 0 \end{bmatrix},$$

if $V_a$ is four-dimensional, the order of the phase matrix of the DFT matrix is 4. In an embodiment, a value of $\omega$ may be $$\omega = e^{j\frac{2\pi}{N}}:$$

$$M_{dft\_phase\_4} = \begin{bmatrix} 1 & 1 & 1 & 1 \\ 1 & \omega & \omega^2 & \omega^3 \\ 1 & \omega^2 & \omega^4 & \omega^6 \\ 1 & \omega^3 & \omega^6 & \omega^9 \end{bmatrix}.$$

For example, when the value of $\omega$ is $$e^{j\frac{2\pi}{32}},$$

a form of a fourth-order DFT matrix $$M_{dft\_phase\_4\_e^{j\frac{2\pi}{32}}}$$

is:

$$M_{dft\_phase\_4\_e^{j\frac{2\pi}{32}}} = \begin{bmatrix} 1 & 1 & 1 & 1 \\ 1 & e^{j\frac{2\pi}{32}} & e^{2j\frac{2\pi}{32}} & e^{3j\frac{2\pi}{32}} \\ 1 & e^{2j\frac{2\pi}{32}} & e^{4j\frac{2\pi}{32}} & e^{6j\frac{2\pi}{32}} \\ 1 & e^{3j\frac{2\pi}{32}} & e^{6j\frac{2\pi}{32}} & e^{9j\frac{2\pi}{32}} \end{bmatrix}.$$

Correspondingly, the set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix} \right\}.$$

It should be understood that, in the present invention, the phase matrix of the DFT matrix is not necessarily a square matrix. More columns or rows may be selected according to an order. For example, the matrix may be:

$$M'_{dft\_phase\_4\_e^{j\frac{2\pi}{32}}} = \begin{bmatrix} 1 & 1 & 1 & 1 & 1 \\ 1 & e^{j\frac{2\pi}{32}} & e^{2j\frac{2\pi}{32}} & e^{3j\frac{2\pi}{32}} & e^{4j\frac{2\pi}{32}} \\ 1 & e^{2j\frac{2\pi}{32}} & e^{4j\frac{2\pi}{32}} & e^{6j\frac{2\pi}{32}} & e^{8j\frac{2\pi}{32}} \\ 1 & e^{3j\frac{2\pi}{32}} & e^{6j\frac{2\pi}{32}} & e^{9j\frac{2\pi}{32}} & e^{12j\frac{2\pi}{32}} \end{bmatrix}.$$

The set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix}, \begin{bmatrix} 1 \\ e^{4j\frac{2\pi}{32}} \\ e^{8j\frac{2\pi}{32}} \\ e^{12j\frac{2\pi}{32}} \end{bmatrix} \right\}.$$

It should be understood that, a quantity of rows or a quantity of columns selected from the DFT matrix is not limited in the present invention. It should be understood that, the quantity of rows should be at least the same as a value of $V_a$, and the quantity of columns should be at least the same as a quantity of first vectors in a codebook.

Second definition of the first condition:

A vector set formed by all second phase vectors and at least one CMP codebook in a CMP codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers, and the CMP codebook refers to a codebook in which only one layer in layers corresponding to each port is a non-zero element.

In all CMP codebooks, CMP codebooks in which column vectors are two-dimensional are:

TABLE 1

| Codebook index | Quantity of layers | |
|---|---|---|
| | $\upsilon = 1$ | $\upsilon = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

CMP codebooks in which column vectors are four-dimensional and a quantity of layers is 1 are:

TABLE 2

| Codebook index | Quantity of layers |
|---|---|
| | $\upsilon = 1$ |
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

CMP codebooks in which column vectors are four-dimensional and a quantity of layers is 2 are:

TABLE 3

| Codebook index | Quantity of layers |
|---|---|
| | $\upsilon = 2$ |
| 0-3 | $\frac{1}{2}\begin{bmatrix}1 & 0\\1 & 0\\0 & 1\\0 & -j\end{bmatrix}$ $\frac{1}{2}\begin{bmatrix}1 & 0\\1 & 0\\0 & 1\\0 & j\end{bmatrix}$ $\frac{1}{2}\begin{bmatrix}1 & 0\\-j & 0\\0 & 1\\0 & 1\end{bmatrix}$ $\frac{1}{2}\begin{bmatrix}1 & 0\\-j & 0\\0 & 1\\0 & -1\end{bmatrix}$ |
| 4-7 | $\frac{1}{2}\begin{bmatrix}1 & 0\\-1 & 0\\0 & 1\\0 & -j\end{bmatrix}$ $\frac{1}{2}\begin{bmatrix}1 & 0\\-1 & 0\\0 & 1\\0 & j\end{bmatrix}$ $\frac{1}{2}\begin{bmatrix}1 & 0\\j & 0\\0 & 1\\0 & 1\end{bmatrix}$ $\frac{1}{2}\begin{bmatrix}1 & 0\\j & 0\\0 & 1\\0 & -1\end{bmatrix}$ |
| 8-11 | $\frac{1}{2}\begin{bmatrix}1 & 0\\0 & 1\\1 & 0\\0 & 1\end{bmatrix}$ $\frac{1}{2}\begin{bmatrix}1 & 0\\0 & 1\\1 & 0\\0 & -1\end{bmatrix}$ $\frac{1}{2}\begin{bmatrix}1 & 0\\0 & 1\\-1 & 0\\0 & 1\end{bmatrix}$ $\frac{1}{2}\begin{bmatrix}1 & 0\\0 & 1\\-1 & 0\\0 & -1\end{bmatrix}$ |
| 12-15 | $\frac{1}{2}\begin{bmatrix}1 & 0\\0 & 1\\0 & 1\\1 & 0\end{bmatrix}$ $\frac{1}{2}\begin{bmatrix}1 & 0\\0 & 1\\0 & -1\\1 & 0\end{bmatrix}$ $\frac{1}{2}\begin{bmatrix}1 & 0\\0 & 1\\0 & 1\\-1 & 0\end{bmatrix}$ $\frac{1}{2}\begin{bmatrix}1 & 0\\0 & 1\\0 & -1\\-1 & 0\end{bmatrix}$ |

For example, when the index in Table 3 is 0, the subset of the set of corresponding column vectors in the phase matrix of the corresponding CMP codebook matrix is:

$$\left\{ \begin{bmatrix} e^0 \\ e^0 \\ 0 \\ 0 \end{bmatrix}, \begin{bmatrix} 0 \\ 0 \\ e^0 \\ e^{-j\frac{\pi}{2}} \end{bmatrix} \right\}.$$

CMP codebooks in which column vectors are four-dimensional and a quantity of layers is 3 are:

TABLE 4

| Codebook index | Quantity of layers $\upsilon = 3$ |
|---|---|
| 0-3 | $\frac{1}{2}\begin{bmatrix}1&0&0\\1&0&0\\0&1&0\\0&0&1\end{bmatrix}$ $\frac{1}{2}\begin{bmatrix}1&0&0\\-1&0&0\\0&1&0\\0&0&1\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ |
| 4-7 | $\frac{1}{2}\begin{bmatrix}1&0&0\\0&1&0\\0&0&1\\1&0&0\end{bmatrix}$ $\frac{1}{2}\begin{bmatrix}1&0&0\\0&1&0\\0&0&1\\-1&0&0\end{bmatrix}$ $\frac{1}{2}\begin{bmatrix}0&1&0\\1&0&0\\1&0&0\\0&0&1\end{bmatrix}$ $\frac{1}{2}\begin{bmatrix}0&1&0\\1&0&0\\-1&0&0\\0&0&1\end{bmatrix}$ |
| 8-11 | $\frac{1}{2}\begin{bmatrix}0&1&0\\1&0&0\\0&0&1\\1&0&0\end{bmatrix}$ $\frac{1}{2}\begin{bmatrix}0&1&0\\1&0&0\\0&0&1\\-1&0&0\end{bmatrix}$ $\frac{1}{2}\begin{bmatrix}0&1&0\\0&0&1\\1&0&0\\1&0&0\end{bmatrix}$ $\frac{1}{2}\begin{bmatrix}0&1&0\\0&0&1\\1&0&0\\-1&0&0\end{bmatrix}$ |

CMP codebooks in which column vectors are four-dimensional and a quantity of layers is 4 are:

TABLE 5

| Codebook index | Quantity of layers $\upsilon = 4$ |
|---|---|
| 0 | $\frac{1}{2}\begin{bmatrix}1&0&0&0\\0&1&0&0\\0&0&1&0\\0&0&0&1\end{bmatrix}$ |

Third definition of the first condition:

A vector set formed by all third phase vectors is a subset of a set formed by corresponding sub-vectors in a householder transform codebook, where a householder transform expression is $W_n = I - u_n u_n^H / u_n^H u_n$.

$V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

For example, the third phase vectors are a subset of a set formed by phase parts of $W_{index}^{\{\alpha_i\}}$ in a matrix corresponding to different quantities of layers and different codebook indexes in Table 6. The index corresponds to different codebook indexes. $\{\alpha_i\}$ corresponds to an integer set, and is used to indicate that different columns in $W_{index}^{\{\alpha_i\}}$ are selected as third phase vectors. In Table 6, $U_n$ is a corresponding $U_n$ in the householder transform, and I is a unit matrix.

It should be understood that, in the present invention, the phase vector of the $V_a$ is not limited only to cases or relationships shown in the first definition of the first condition, the second definition of the first condition, and the third definition of the first condition. The codebook may further be a codebook defined for two antennas, four antennas, or eight antennas in LTE.

TABLE 6

| Codebook index | $u_n$ | Quantity of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |

TABLE 6-continued

| Codebook index | $u_n$ | Quantity of layers $v$ | | | |
|---|---|---|---|---|---|
| | | 1 | 2 | 3 | 4 |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In still another embodiment of the present invention, at least one first codebook meets a second condition. The present invention provides several definitions of the second condition that can be implemented.

First definition of the second condition:

A vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a $p^{th}$ row and a $Q^{th}$ column in the phase matrix of the DFT matrix is a phase part of an element in a $P^{th}$ row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector.

Second definition of the second condition:

A vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers.

Third definition of the second condition:

A vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

It should be understood that, in the present invention, a value of the $V_b$ is not limited only to cases or relationships shown in the first definition of the second condition, the second definition of the second condition, and the third definition of the second condition. The present invention requests to protect correspondences according to the second condition: a relationship between the fourth phase vectors and different DFT matrices formed by different parameters, a relationship between the fifth phase vectors and the CMP codebook set, and a relationship between the sixth phase vectors and the householder codebook formed by different original vectors through householder transforms.

It should be understood that, due to independence, in one codebook, when the first codebook meets any definition of the first condition, a second codebook may meet any definition of the second condition. For example, in the first codebook, that the vector set formed by the first phase vectors is the subset of the set of corresponding column vectors in the phase matrix of the DFT matrix is met; in the second codebook, that the vector set formed by the fifth phase vectors is the subset of the set of corresponding column vectors in the phase matrix of the CMP codebook matrix, or any combination thereof is met.

In still another embodiment of the present invention, at least one first codebook meets a third condition.

In all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$. $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vectors $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector. In this embodiment, in a sub-vector included in each first codebook, an amplitude part of each element corresponds to power of an antenna port. In this embodiment, in a sub-vector included in each first codebook, amplitude vectors of each group of antenna ports are determined independently according to tilt characteristics of this group of antenna ports (tilts may be classified into electrical tilts and mechanical tilts; an electrical tilt means that weighted vectors of multiple antenna elements corresponding to one antenna port make the multiple antenna elements form a beam pointing to a tilt). For example, all tilts of the first group of antenna ports are 12 degrees, and all tilts of the second group of antenna ports are 3 degrees; it is assumed that a horizontal plane is 0 degrees and that those downward are positive tilts. In this case, energies received from the two groups of antenna ports by the first network device in a location are different. Therefore, independent control may be performed on amplitudes of codebooks of the two groups of antenna ports, so that reception performance is optimized.

Optionally, in step 101, the first codebook set is obtained before the first codebook is selected. In an embodiment of the present invention, the first codebook set may be pre-stored in the first network device, or delivered to the first network device by the second network device or another apparatus.

Optionally, at least one first configuration message is received, where each first configuration message is used to determine a sub-vector set of phase parts corresponding to one group of antenna ports, and a quantity of the at least one first configuration message is equal to a quantity of groups of the antenna ports; and/or at least one second configuration message is received, where each second configuration message is used to determine a sub-vector set of amplitude parts corresponding to one group of antenna ports, and a quantity of the at least one second configuration message is equal to a quantity of groups of the antenna ports. In an embodiment, the first configuration message is configured by the second network device by using higher layer signaling or dynamic signaling; and/or the second configuration message is configured by the second network device by using higher layer signaling or dynamic signaling. In another embodiment, the first configuration message is obtained by the first network device by measuring the reference signal; and/or the second configuration message is obtained by the first network device by measuring the reference signal.

In an embodiment, the present invention provides possible cases of a codebook set having the first structure and the second structure. It should be understood that, the first codebook that the present invention requests to protect may be but is not limited to the following structures:

1. the first codebook is one of the following matrices:

$$\begin{bmatrix} V_a(i) \\ 0 \end{bmatrix} \text{ or } \begin{bmatrix} 0 \\ V_a(i') \end{bmatrix},$$

where a value of a rank indicator is 1, a non-zero sub-vector represented by $V_a(x)$ is a sub-vector in the first vector set $\{V_m\}$ and has a sequence number x, a non-zero sub-vector represented by $V_b(y)$ is a sub-vector in the first vector set $\{V_n\}$ and has a sequence number y, $0<i\leq N_1$, and $0<i'\leq N_1$, where $N_1$ represents a quantity of sub-vectors in the $\{V_m\}$, and $N_1{'}$ represents a quantity of sub-vectors in the $\{V_n\}$; or 2. the first codebook is one of the following matrices:

$$\begin{bmatrix} V_a(i) & V_a(j) \\ 0 & 0 \end{bmatrix}, \begin{bmatrix} V_a(i) & 0 \\ 0 & V_b(i') \end{bmatrix}, \begin{bmatrix} 0 & V_a(i) \\ V_b(i') & 0 \end{bmatrix}, \text{ or } \begin{bmatrix} 0 & 0 \\ V_b(i') & V_b(j') \end{bmatrix},$$

where a value of a rank indicator is 2, $0<i\leq N_1$, $0<i'\leq N_1$, $0<j\leq N_1$, and $0<j'\leq N_1$; or 3. the first codebook is one of the following matrices:

$$\begin{bmatrix} V_a(i) & V_a(j) & V_a(k) \\ 0 & 0 & 0 \end{bmatrix}, \begin{bmatrix} V_a(i) & V_a(j) & 0 \\ 0 & 0 & V_b(i') \end{bmatrix}, \begin{bmatrix} V_a(i) & 0 & V_a(i) \\ 0 & V_b(i') & 0 \end{bmatrix},$$

$$\begin{bmatrix} V_a(i) & 0 & 0 \\ 0 & V_b(i') & V_b(j') \end{bmatrix}, \begin{bmatrix} 0 & V_a(i) & 0 \\ V_b(i') & 0 & V_b(j') \end{bmatrix}, \begin{bmatrix} 0 & V_a(i) & V_a(j) \\ V_b(i') & 0 & 0 \end{bmatrix},$$

$$\begin{bmatrix} 0 & 0 & V_a(i) \\ V_b(i') & V_b(j') & 0 \end{bmatrix}, \text{ or } \begin{bmatrix} 0 & 0 & 0 \\ V_b(i') & V_b(j') & V_b(k') \end{bmatrix},$$

where a value of a rank indicator is 3, $0<i\leq N_1$, $0<i'\leq N_1$, $0<j\leq N_1$, $0<j'\leq N_1$, $0<k\leq N_1$, and $0<k'\leq N_1$; or 4. the first codebook is one of the following matrices:

$$\begin{bmatrix} V_a(i) & V_a(j) & V_a(k) & V_a(l) \\ 0 & 0 & 0 & 0 \end{bmatrix}, \begin{bmatrix} V_a(i) & V_a(j) & V_a(k) & 0 \\ 0 & 0 & 0 & V_b(i') \end{bmatrix},$$

$$\begin{bmatrix} V_a(i) & V_a(j) & 0 & V_a(k) \\ 0 & 0 & V_b(i') & 0 \end{bmatrix}, \begin{bmatrix} V_a(i) & V_a(j) & 0 & 0 \\ 0 & 0 & V_b(i') & V_b(j') \end{bmatrix},$$

$$\begin{bmatrix} V_a(i) & 0 & V_a(j) & V_a(k) \\ 0 & V_b(i') & 0 & 0 \end{bmatrix}, \begin{bmatrix} V_a(i) & 0 & V_a(j) & 0 \\ 0 & V_b(i') & 0 & V_b(j') \end{bmatrix},$$

$$\begin{bmatrix} V_a(i) & 0 & 0 & V_a(j) \\ 0 & V_b(i') & V_b(j') & 0 \end{bmatrix}, \begin{bmatrix} V_a(i) & 0 & 0 & 0 \\ 0 & V_b(i') & V_b(j') & V_b(k') \end{bmatrix},$$

$$\begin{bmatrix} 0 & V_a(i) & V_a(j) & V_a(k) \\ V_b(i') & 0 & 0 & 0 \end{bmatrix}, \begin{bmatrix} 0 & V_a(i) & V_a(j) & 0 \\ V_b(i') & 0 & 0 & V_b(j') \end{bmatrix},$$

$$\begin{bmatrix} 0 & V_a(i) & 0 & V_a(j) \\ V_b(i') & 0 & V_b(j') & 0 \end{bmatrix}, \begin{bmatrix} 0 & V_a(i) & 0 & 0 \\ V_b(i') & 0 & V_b(j') & V_b(k') \end{bmatrix},$$

$$\begin{bmatrix} 0 & 0 & V_a(i) & V_a(j) \\ V_b(i') & V_b(j') & 0 & 0 \end{bmatrix}, \begin{bmatrix} 0 & 0 & V_a(i) & 0 \\ V_b(i') & V_b(j') & 0 & V_b(k') \end{bmatrix},$$

$$\begin{bmatrix} 0 & 0 & 0 & V_a(i) \\ V_b(i') & V_b(j') & V_b(k') & 0 \end{bmatrix}, \text{ or } \begin{bmatrix} 0 & 0 & 0 & 0 \\ V_b(i') & V_b(j') & V_b(k') & V_b(l') \end{bmatrix},$$

where a value of a rank indicator is 4, $0<i\leq N_1$, $0<i'\leq N_1$, $0<j\leq N_1$, $0<j'\leq N_1$, $0<k\leq N_1$, $0<k'\leq N_1$, $0<l\leq N_1$, and $0<l'\leq N_1$; or 5. the first codebook is one of the following matrices:

$$\begin{bmatrix} V_a(i) & V_a(j) & V_a(k) & V_a(l) & V_a(m) \\ 0 & 0 & 0 & 0 & 0 \end{bmatrix},$$

$$\begin{bmatrix} V_a(i) & V_a(j) & V_a(k) & 0 & V_a(l) \\ 0 & 0 & 0 & V_b(i') & 0 \end{bmatrix},$$

$$\begin{bmatrix} V_a(i) & V_a(j) & 0 & V_a(k) & V_a(l) \\ 0 & 0 & V_b(i') & 0 & 0 \end{bmatrix},$$

$$\begin{bmatrix} V_a(i) & V_a(j) & 0 & 0 & V_a(k) \\ 0 & 0 & V_b(i') & V_b(j') & 0 \end{bmatrix},$$

-continued $$\begin{bmatrix} V_a(i) & 0 & V_a(j) & V_a(k) & V_a(l) \\ 0 & V_b(i') & 0 & 0 & 0 \end{bmatrix},$$

$$\begin{bmatrix} V_a(i) & 0 & V_a(j) & 0 & V_a(k) \\ 0 & V_b(i') & 0 & V_b(j') & 0 \end{bmatrix},$$

$$\begin{bmatrix} V_a(i) & 0 & 0 & V_a(j) & V_a(k) \\ 0 & V_b(i') & V_b(j') & 0 & 0 \end{bmatrix},$$

$$\begin{bmatrix} V_a(i) & 0 & 0 & 0 & V_a(j) \\ 0 & V_b(i') & V_b(j') & V_b(k') & 0 \end{bmatrix},$$

$$\begin{bmatrix} 0 & V_a(i) & V_a(j) & V_a(k) & V_a(l) \\ V_b(i') & 0 & 0 & 0 & 0 \end{bmatrix},$$

$$\begin{bmatrix} 0 & V_a(i) & V_a(j) & 0 & V_a(k) \\ V_b(i') & 0 & 0 & V_b(j') & 0 \end{bmatrix},$$

$$\begin{bmatrix} 0 & V_a(i) & 0 & V_a(j) & V_a(k) \\ V_b(i') & 0 & V_b(j') & 0 & 0 \end{bmatrix},$$

$$\begin{bmatrix} 0 & V_a(i) & 0 & 0 & V_a(j) \\ V_b(i') & 0 & V_b(j') & V_b(k') & 0 \end{bmatrix},$$

$$\begin{bmatrix} 0 & 0 & V_a(i) & V_a(j) & V_a(k) \\ V_b(i') & V_b(j') & 0 & 0 & 0 \end{bmatrix},$$

$$\begin{bmatrix} 0 & 0 & V_a(i) & 0 & V_a(j) \\ V_b(i') & V_b(j') & 0 & V_b(k') & 0 \end{bmatrix},$$

$$\begin{bmatrix} 0 & 0 & 0 & V_a(1) & V_a(j) \\ V_b(i') & V_b(j') & V_b(k') & 0 & 0 \end{bmatrix},$$

$$\begin{bmatrix} 0 & 0 & 0 & 0 & V_a(1) \\ V_b(i') & V_b(j') & V_b(k') & V_b(l') & 0 \end{bmatrix},$$

$$\begin{bmatrix} V_a(i) & V_a(j) & V_a(k) & V_a(4) & 0 \\ 0 & 0 & 0 & 0 & V_b(i') \end{bmatrix},$$

$$\begin{bmatrix} V_a(i) & V_a(j) & V_a(k) & 0 & 0 \\ 0 & 0 & 0 & V_b(i') & V_b(j') \end{bmatrix},$$

$$\begin{bmatrix} V_a(i) & V_a(j) & 0 & V_a(k) & 0 \\ 0 & 0 & V_b(i') & 0 & V_b(j') \end{bmatrix},$$

$$\begin{bmatrix} V_a(i) & V_a(j) & 0 & 0 & 0 \\ 0 & 0 & V_b(i') & V_b(j') & V_b(k') \end{bmatrix},$$

$$\begin{bmatrix} V_a(i) & 0 & V_a(j) & V_a(k) & 0 \\ 0 & V_b(i') & 0 & 0 & V_b(j') \end{bmatrix},$$

$$\begin{bmatrix} V_a(i) & 0 & V_a(j) & 0 & 0 \\ 0 & V_b(i') & 0 & V_b(j') & V_b(k') \end{bmatrix},$$

$$\begin{bmatrix} V_a(i) & 0 & 0 & V_a(j) & 0 \\ 0 & V_b(i') & V_b(j') & 0 & V_b(k') \end{bmatrix},$$

$$\begin{bmatrix} V_a(i) & 0 & 0 & 0 & 0 \\ 0 & V_b(i') & V_b(j') & V_b(k') & V_b(l') \end{bmatrix},$$

$$\begin{bmatrix} 0 & V_a(i) & V_a(j) & V_a(k) & 0 \\ V_b(i') & 0 & 0 & 0 & V_b(j') \end{bmatrix},$$

$$\begin{bmatrix} 0 & V_a(i) & V_a(j) & 0 & 0 \\ V_b(i') & 0 & 0 & V_b(j') & V_b(k') \end{bmatrix},$$

$$\begin{bmatrix} 0 & V_a(i) & V_a(j) & 0 & 0 \\ V_b(i') & 0 & 0 & V_b(j') & V_b(k') \end{bmatrix},$$

$$\begin{bmatrix} 0 & V_a(i) & 0 & 0 & 0 \\ V_b(i') & 0 & V_b(j') & V_b(k') & V_b(l') \end{bmatrix},$$

$$\begin{bmatrix} 0 & 0 & V_a(i) & V_a(j) & 0 \\ V_b(i') & V_b(j') & 0 & 0 & V_b(k') \end{bmatrix},$$

$$\begin{bmatrix} 0 & 0 & V_a(i) & 0 & 0 \\ V_b(i') & V_b(j') & 0 & V_b(k') & V_b(l') \end{bmatrix},$$

$$\begin{bmatrix} 0 & 0 & V_a(i) & V_a(j) & 0 \\ V_b(i') & V_b(j') & 0 & 0 & V_b(k') \end{bmatrix},$$

$$\begin{bmatrix} 0 & 0 & 0 & V_a(1) & 0 \\ V_b(i') & V_b(j') & V_b(k') & 0 & V_b(l') \end{bmatrix}, \text{ or}$$

$$\begin{bmatrix} 0 & 0 & 0 & 0 & 0 \\ V_b(i') & V_b(j') & V_b(k') & V_b(l') & V_b(m') \end{bmatrix},$$

where a value of a rank indicator is 5, $0 < i \leq N_1$, $0 < i' \leq N_1$, $0 < j \leq N_1$, $0 < j' \leq N_1$, $0 < k \leq N_1$, $0 < k' \leq N_1$, $0 < l \leq N_1$, $0 < l' \leq N_1$, $0 < m \leq N_1$, and $0 < m' \leq N_1$; or 6. the first codebook is one of the following matrices:

$$\begin{bmatrix} V_a(i) & V_a(j) & V_a(k) & V_a(l) & V_a(m) & V_a(n) \\ 0 & 0 & 0 & 0 & 0 & 0 \end{bmatrix},$$

$$\begin{bmatrix} V_a(i) & V_a(j) & V_a(k) & 0 & V_a(l) & V_a(m) \\ 0 & 0 & 0 & V_b(i') & 0 & 0 \end{bmatrix},$$

$$\begin{bmatrix} V_a(i) & V_a(j) & 0 & V_a(k) & V_a(l) & V_a(m) \\ 0 & 0 & V_b(i') & 0 & 0 & 0 \end{bmatrix},$$

$$\begin{bmatrix} V_a(i) & V_a(j) & 0 & 0 & V_a(k) & V_a(l) \\ 0 & 0 & V_b(i') & V_b(j') & 0 & 0 \end{bmatrix},$$

$$\begin{bmatrix} V_a(i) & 0 & V_a(j) & V_a(k) & V_a(l) & V_a(m) \\ 0 & V_b(i') & 0 & 0 & 0 & 0 \end{bmatrix},$$

$$\begin{bmatrix} V_a(i) & 0 & V_a(j) & 0 & V_a(k) & V_a(l) \\ 0 & V_b(i') & 0 & V_b(j') & 0 & 0 \end{bmatrix},$$

$$\begin{bmatrix} V_a(i) & 0 & 0 & V_a(j) & V_a(k) & V_a(l) \\ 0 & V_b(i') & V_b(j') & 0 & 0 & 0 \end{bmatrix},$$

$$\begin{bmatrix} V_a(i) & 0 & 0 & 0 & V_a(j) & V_a(k) \\ 0 & V_b(i') & V_b(j') & V_b(k') & 0 & 0 \end{bmatrix},$$

$$\begin{bmatrix} 0 & V_a(i) & V_a(j) & V_a(k) & V_a(l) & V_a(m) \\ V_b(i') & 0 & 0 & 0 & 0 & 0 \end{bmatrix},$$

$$\begin{bmatrix} 0 & V_a(i) & V_a(j) & 0 & V_a(k) & V_a(l) \\ V_b(i') & 0 & 0 & V_b(j') & 0 & 0 \end{bmatrix},$$

$$\begin{bmatrix} 0 & V_a(i) & 0 & V_a(j) & V_a(k) & V_a(l) \\ V_b(i') & 0 & V_b(j') & 0 & 0 & 0 \end{bmatrix},$$

$$\begin{bmatrix} 0 & V_a(i) & 0 & 0 & V_a(j) & V_a(k) \\ V_b(i') & 0 & V_b(j') & V_b(k') & 0 & 0 \end{bmatrix},$$

$$\begin{bmatrix} 0 & 0 & V_a(i) & V_a(j) & V_a(k) & V_a(l) \\ V_b(i') & V_b(j') & 0 & 0 & 0 & 0 \end{bmatrix},$$

$$\begin{bmatrix} 0 & 0 & V_a(i) & 0 & V_a(j) & V_a(k) \\ V_b(i') & V_b(j') & 0 & V_b(k') & 0 & 0 \end{bmatrix},$$

$$\begin{bmatrix} 0 & 0 & 0 & V_a(i) & V_a(j) \\ V_b(i') & V_b(j') & V_b(k') & V_b(l') & 0 & 0 \end{bmatrix},$$

$$\begin{bmatrix} V_a(i) & V_a(j) & V_a(k) & V_a(l) & 0 & V_a(5) \\ 0 & 0 & 0 & 0 & V_b(i') & 0 \end{bmatrix},$$

$$\begin{bmatrix} V_a(i) & V_a(j) & V_a(k) & 0 & 0 & V_a(l) \\ 0 & 0 & 0 & V_b(i') & V_b(j') & 0 \end{bmatrix},$$

-continued $$\begin{bmatrix} V_a(i) & V_a(j) & 0 & V_a(k) & 0 & V_a(l) \\ 0 & 0 & V_b(i') & 0 & V_b(j') & 0 \end{bmatrix},$$

$$\begin{bmatrix} V_a(i) & V_a(j) & 0 & 0 & 0 & V_a(k) \\ 0 & 0 & V_b(i') & V_b(j') & V_b(k') & 0 \end{bmatrix},$$

$$\begin{bmatrix} V_a(i) & 0 & V_a(j) & V_a(k) & 0 & V_a(l) \\ 0 & V_b(i') & 0 & 0 & V_b(j') & 0 \end{bmatrix},$$

$$\begin{bmatrix} V_a(i) & 0 & V_a(j) & 0 & 0 & V_a(k) \\ 0 & V_b(i') & 0 & V_b(j') & V_b(k') & 0 \end{bmatrix},$$

$$\begin{bmatrix} V_a(i) & 0 & 0 & V_a(j) & 0 & V_a(k) \\ 0 & V_b(i') & V_b(j') & 0 & V_b(k') & 0 \end{bmatrix},$$

$$\begin{bmatrix} V_a(i) & 0 & 0 & 0 & 0 & V_a(j) \\ 0 & V_b(i') & V_b(j') & V_b(k') & V_b(l') & 0 \end{bmatrix},$$

$$\begin{bmatrix} 0 & V_a(i) & V_a(j) & V_a(k) & 0 & V_a(l) \\ V_b(i') & 0 & 0 & 0 & V_b(j') & 0 \end{bmatrix},$$

$$\begin{bmatrix} 0 & V_a(i) & V_a(j) & 0 & 0 & V_a(k) \\ V_b(i') & 0 & 0 & V_b(j') & V_b(k') & 0 \end{bmatrix},$$

$$\begin{bmatrix} 0 & V_a(i) & 0 & V_a(j) & 0 & V_a(k) \\ V_b(i') & 0 & V_b(j') & 0 & V_b(k') & 0 \end{bmatrix},$$

$$\begin{bmatrix} 0 & V_a(i) & 0 & 0 & 0 & V_a(j) \\ V_b(i') & 0 & V_b(j') & V_b(k') & V_b(l') & 0 \end{bmatrix},$$

$$\begin{bmatrix} 0 & 0 & V_a(i) & V_a(j) & 0 & V_a(k) \\ V_b(i') & V_b(j') & 0 & 0 & V_b(k') & 0 \end{bmatrix},$$

$$\begin{bmatrix} 0 & 0 & V_a(i) & 0 & 0 & V_a(j) \\ V_b(i') & V_b(j') & 0 & V_b(k') & V_b(l') & 0 \end{bmatrix},$$

$$\begin{bmatrix} 0 & 0 & 0 & V_a(1) & 0 & V_a(j) \\ V_b(i') & V_b(j') & V_b(k') & 0 & V_b(l') & 0 \end{bmatrix},$$

$$\begin{bmatrix} 0 & 0 & 0 & 0 & 0 & V_a(i) \\ V_b(i') & V_b(j') & V_b(k') & V_b(l') & V_b(m') & 0 \end{bmatrix},$$

$$\begin{bmatrix} V_a(i) & V_a(j) & V_a(k) & V_a(l) & V_a(m) & 0 \\ 0 & 0 & 0 & 0 & 0 & V_b(i') \end{bmatrix},$$

$$\begin{bmatrix} V_a(i) & V_a(j) & V_a(k) & 0 & V_a(l) & 0 \\ 0 & 0 & 0 & V_b(i') & 0 & V_b(j') \end{bmatrix},$$

$$\begin{bmatrix} V_a(i) & V_a(j) & 0 & V_a(k) & V_a(l) & 0 \\ 0 & 0 & V_b(i') & 0 & 0 & V_a(j) \end{bmatrix},$$

$$\begin{bmatrix} V_a(i) & V_a(j) & 0 & 0 & V_a(k) & 0 \\ 0 & 0 & V_b(i) & V_b(j) & 0 & V_a(k) \end{bmatrix},$$

$$\begin{bmatrix} V_a(i) & 0 & V_a(j) & V_a(k) & V_a(l) & 0 \\ 0 & V_b(i') & 0 & 0 & 0 & V_b(j') \end{bmatrix},$$

$$\begin{bmatrix} V_a(i) & 0 & V_a(j) & 0 & V_a(k) & 0 \\ 0 & V_b(i') & 0 & V_b(j') & 0 & V_b(k') \end{bmatrix},$$

$$\begin{bmatrix} V_a(i) & 0 & 0 & V_a(j) & V_a(k) & 0 \\ 0 & V_b(i') & V_a(j') & 0 & 0 & V_b(k') \end{bmatrix},$$

$$\begin{bmatrix} V_a(i) & 0 & 0 & 0 & V_a(j) & 0 \\ 0 & V_b(i') & V_b(j') & V_b(k') & 0 & V_b(l') \end{bmatrix},$$

$$\begin{bmatrix} 0 & V_a(i) & V_a(j) & V_a(k) & V_a(l) & 0 \\ V_b(i') & 0 & 0 & 0 & 0 & V_b(j') \end{bmatrix},$$

$$\begin{bmatrix} 0 & V_a(i) & V_a(j) & 0 & V_a(k) & 0 \\ V_b(i') & 0 & 0 & V_b(j') & 0 & V_b(k') \end{bmatrix},$$

$$\begin{bmatrix} 0 & V_a(i) & 0 & V_a(j) & V_a(k) & 0 \\ V_b(i') & 0 & V_b(j') & 0 & 0 & V_b(k') \end{bmatrix},$$

$$\begin{bmatrix} 0 & V_a(i) & 0 & 0 & V_a(j) & 0 \\ V_b(i') & 0 & V_b(j') & V_b(k') & 0 & V_b(l') \end{bmatrix},$$

$$\begin{bmatrix} 0 & 0 & V_a(i) & V_a(j) & V_a(k) & 0 \\ V_b(i') & V_b(j') & 0 & 0 & 0 & V_b(k') \end{bmatrix},$$

$$\begin{bmatrix} 0 & 0 & V_a(i) & 0 & V_a(j) & 0 \\ V_b(i') & V_b(j') & 0 & V_b(k') & 0 & V_b(l') \end{bmatrix},$$

$$\begin{bmatrix} 0 & 0 & 0 & V_a(i) & V_a(j) & 0 \\ V_b(i') & V_b(j') & V_b(k') & 0 & 0 & V_b(l') \end{bmatrix},$$

$$\begin{bmatrix} 0 & 0 & 0 & 0 & V_a(i) & 0 \\ V_b(i') & V_b(j') & V_b(k') & V_b(l') & 0 & V_b(m') \end{bmatrix},$$

$$\begin{bmatrix} V_a(i) & V_a(j) & V_a(k) & V_a(l) & 0 & 0 \\ 0 & 0 & 0 & 0 & V_b(i') & V_b(j') \end{bmatrix},$$

$$\begin{bmatrix} V_a(i) & V_a(j) & V_a(k) & 0 & 0 & 0 \\ 0 & 0 & 0 & V_b(i') & V_b(j') & V_b(k') \end{bmatrix},$$

$$\begin{bmatrix} V_a(i) & V_a(j) & 0 & V_a(k) & 0 & 0 \\ 0 & 0 & V_b(i') & 0 & V_b(j') & V_b(k') \end{bmatrix},$$

$$\begin{bmatrix} V_a(i) & V_a(j) & 0 & 0 & 0 & 0 \\ 0 & 0 & V_b(i') & V_b(j') & V_b(k') & V_b(l') \end{bmatrix},$$

$$\begin{bmatrix} V_a(i) & 0 & V_a(j) & V_a(k) & 0 & 0 \\ 0 & V_b(i') & 0 & 0 & V_b(j') & V_b(k') \end{bmatrix},$$

$$\begin{bmatrix} V_a(i) & 0 & V_a(j) & 0 & 0 & 0 \\ 0 & V_b(i') & 0 & V_b(j') & V_b(k') & V_b(l') \end{bmatrix},$$

$$\begin{bmatrix} V_a(i) & 0 & 0 & V_a(j) & 0 & 0 \\ 0 & V_b(i') & V_b(j') & 0 & V_b(k') & V_b(l') \end{bmatrix},$$

$$\begin{bmatrix} V_a(i) & 0 & 0 & 0 & 0 & 0 \\ 0 & V_b(i') & V_b(j') & V_b(k') & V_b(l') & V_b(m') \end{bmatrix},$$

$$\begin{bmatrix} 0 & V_a(i) & V_a(j) & V_a(k) & 0 & 0 \\ V_b(i') & 0 & 0 & 0 & V_b(j') & V_b(k') \end{bmatrix},$$

$$\begin{bmatrix} 0 & V_a(i) & V_a(j) & 0 & 0 & 0 \\ V_b(i') & 0 & 0 & V_b(j') & V_b(k') & V_b(l') \end{bmatrix},$$

$$\begin{bmatrix} 0 & V_a(i) & 0 & V_a(j) & 0 & 0 \\ V_b(i') & 0 & V_b(j') & 0 & V_b(k') & V_b(l') \end{bmatrix},$$

$$\begin{bmatrix} 0 & V_a(i) & 0 & 0 & 0 & 0 \\ V_b(i') & 0 & V_b(j') & V_b(k') & V_b(l') & V_b(m') \end{bmatrix},$$

$$\begin{bmatrix} 0 & 0 & V_a(i) & V_a(j) & 0 & 0 \\ V_b(i') & V_b(j') & 0 & 0 & V_b(k') & V_b(k') \end{bmatrix},$$

$$\begin{bmatrix} 0 & 0 & V_a(i) & 0 & 0 & 0 \\ V_b(i') & V_b(j') & 0 & V_b(k') & V_b(l') & V_b(m') \end{bmatrix},$$

$$\begin{bmatrix} 0 & 0 & 0 & V_a(i) & 0 & 0 \\ V_b(i') & V_b(j') & V_b(k') & 0 & V_b(l') & V_b(m') \end{bmatrix}, \text{ or}$$

$$\begin{bmatrix} 0 & 0 & 0 & 0 & 0 & 0 \\ V_b(i') & V_b(j') & V_b(k') & V_b(l') & V_b(m') & V_b(n') \end{bmatrix},$$

where a value of a rank indicator is 6, $0<i\le N_1$, $0<i'\le N_1$, $0<j\le N_1$, $0<j'\le N_1$, $0<k\le N_1$, $0<k'\le N_1$, $0<l\le N_1$, $0<l'\le N_1$, $0<m\le N_1$, $0<m'\le N_1$, $0<n\le N_1$, and $0<n'\le N_1$; or 7. the first codebook is one of the following matrices:

$$\begin{bmatrix} V_a(i) & V_a(j) & V_a(k) & V_a(l) & V_a(m) & V_a(n) & V_a(p) \\ 0 & 0 & 0 & 0 & 0 & 0 & 0 \end{bmatrix}$$

$$\begin{bmatrix} V_a(i) & V_a(j) & V_a(k) & 0 & V_a(l) & V_a(m) & V_a(n) \\ 0 & 0 & 0 & V_b(i') & 0 & 0 & 0 \end{bmatrix}$$

$$\begin{bmatrix} V_a(i) & V_a(j) & 0 & V_a(k) & V_a(l) & V_a(m) & V_a(n) \\ 0 & 0 & V_b(i') & 0 & 0 & 0 & 0 \end{bmatrix}$$

$$\begin{bmatrix} V_a(i) & V_a(j) & 0 & 0 & V_a(k) & V_a(l) & V_a(m) \\ 0 & 0 & V_b(i') & V_b(j') & 0 & 0 & 0 \end{bmatrix}$$

$$\begin{bmatrix} V_a(i) & 0 & V_a(j) & V_a(k) & V_a(l) & V_a(m) & V_a(n) \\ 0 & V_b(i') & 0 & 0 & 0 & 0 & 0 \end{bmatrix}$$

$$\begin{bmatrix} V_a(i) & 0 & V_a(j) & 0 & V_a(k) & V_a(l) & V_a(m) \\ 0 & V_b(i') & 0 & V_b(j') & 0 & 0 & 0 \end{bmatrix}$$

$$\begin{bmatrix} V_a(i) & 0 & 0 & V_a(j) & V_a(k) & V_a(l) & V_a(m) \\ 0 & V_b(i') & V_b(j') & 0 & 0 & 0 & 0 \end{bmatrix}$$

$$\begin{bmatrix} V_a(i) & 0 & 0 & 0 & V_a(j) & V_a(k) & V_a(l) \\ 0 & V_b(i') & V_b(j') & V_b(k') & 0 & 0 & 0 \end{bmatrix}$$

$$\begin{bmatrix} 0 & V_a(i) & V_a(j) & V_a(k) & V_a(l) & V_a(m) & V_a(n) \\ V_b(i') & 0 & 0 & 0 & 0 & 0 & 0 \end{bmatrix}$$

$$\begin{bmatrix} 0 & V_a(i) & V_a(j) & 0 & V_a(k) & V_a(l) & V_a(m) \\ V_b(i') & 0 & 0 & V_b(j') & 0 & 0 & 0 \end{bmatrix}$$

$$\begin{bmatrix} 0 & V_a(i) & 0 & V_a(j) & V_a(k) & V_a(l) & V_a(m) \\ V_b(i') & 0 & V_b(j') & 0 & 0 & 0 & 0 \end{bmatrix}$$

$$\begin{bmatrix} 0 & V_a(i) & 0 & 0 & V_a(j) & V_a(k) & V_a(l) \\ V_b(i') & 0 & V_b(j') & V_b(k') & 0 & 0 & 0 \end{bmatrix}$$

$$\begin{bmatrix} 0 & 0 & V_a(i) & V_a(j) & V_a(k) & V_a(l) & V_a(m) \\ V_b(i') & V_b(j') & 0 & 0 & 0 & 0 & 0 \end{bmatrix}$$

$$\begin{bmatrix} 0 & 0 & V_a(i) & 0 & V_a(j) & V_a(k) & V_a(l) \\ V_b(i') & V_b(j') & 0 & V_b(k') & 0 & 0 & 0 \end{bmatrix}$$

$$\begin{bmatrix} 0 & 0 & 0 & V_a(i) & V_a(j) & V_a(k) & V_a(l) \\ V_b(i') & V_b(j') & V_b(k') & 0 & 0 & 0 & 0 \end{bmatrix}$$

$$\begin{bmatrix} 0 & 0 & 0 & 0 & V_a(i) & V_a(j) & V_a(k) \\ V_b(i') & V_b(j') & V_b(k') & V_b(l') & 0 & 0 & 0 \end{bmatrix}$$

$$\begin{bmatrix} V_a(i) & V_a(j) & V_a(k) & V_a(l) & 0 & V_a(m) & V_a(n) \\ 0 & 0 & 0 & 0 & V_b(i') & 0 & 0 \end{bmatrix}$$

$$\begin{bmatrix} V_a(i) & V_a(j) & V_a(k) & 0 & 0 & V_a(l) & V_a(m) \\ 0 & 0 & 0 & V_b(i') & V_b(j') & 0 & 0 \end{bmatrix}$$

$$\begin{bmatrix} V_a(i) & V_a(j) & V_a(k) & 0 & 0 & V_a(l) & V_a(m) \\ 0 & 0 & V_b(i') & 0 & V_b(j') & 0 & 0 \end{bmatrix}$$

$$\begin{bmatrix} V_a(i) & V_a(j) & 0 & 0 & 0 & V_a(k) & V_a(l) \\ 0 & 0 & V_b(i') & V_b(j') & V_b(k') & 0 & 0 \end{bmatrix}$$

$$\begin{bmatrix} V_a(i) & 0 & V_a(j) & V_a(k) & 0 & V_a(l) & V_a(m) \\ 0 & V_b(i') & 0 & 0 & V_b(j') & 0 & 0 \end{bmatrix}$$

$$\begin{bmatrix} V_a(i) & 0 & V_a(j) & 0 & 0 & V_a(k) & V_a(l) \\ 0 & V_b(i') & 0 & V_b(j') & V_b(k') & 0 & 0 \end{bmatrix}$$

-continued $$\begin{bmatrix} V_a(i) & 0 & 0 & V_a(j) & 0 & V_a(k) & V_a(l) \\ 0 & V_b(i') & V_b(j') & 0 & V_b(k') & 0 & 0 \end{bmatrix}$$

$$\begin{bmatrix} V_a(i) & 0 & 0 & 0 & 0 & V_a(j) & V_a(k) \\ 0 & V_b(i') & V_b(j') & V_b(k') & V_b(l') & 0 & 0 \end{bmatrix}$$

$$\begin{bmatrix} 0 & V_a(i) & V_a(j) & V_a(k) & 0 & V_a(l) & V_a(m) \\ V_b(i') & 0 & 0 & 0 & V_b(j') & 0 & 0 \end{bmatrix}$$

$$\begin{bmatrix} 0 & V_a(i) & V_a(j) & 0 & 0 & V_a(k) & V_a(l) \\ V_b(i') & 0 & 0 & V_b(j') & V_b(k') & 0 & 0 \end{bmatrix}$$

$$\begin{bmatrix} 0 & V_a(i) & 0 & V_a(j) & 0 & V_a(k) & V_a(l) \\ V_b(i') & 0 & V_b(j') & 0 & V_b(k') & 0 & 0 \end{bmatrix}$$

$$\begin{bmatrix} 0 & V_a(i) & 0 & 0 & 0 & V_a(j) & V_a(k) \\ V_b(i') & 0 & V_b(j') & V_b(k') & V_b(l') & 0 & 0 \end{bmatrix}$$

$$\begin{bmatrix} 0 & 0 & V_a(i) & V_a(j) & 0 & V_a(k) & V_a(l) \\ V_b(i') & V_b(j') & 0 & 0 & V_b(k') & 0 & 0 \end{bmatrix}$$

$$\begin{bmatrix} 0 & 0 & V_a(i) & 0 & 0 & V_a(j) & V_a(k) \\ V_b(i') & V_b(j') & 0 & V_b(k') & V_b(l') & 0 & 0 \end{bmatrix}$$

$$\begin{bmatrix} 0 & 0 & 0 & V_a(i) & 0 & V_a(j) & V_a(k) \\ V_b(i') & V_b(j') & V_b(k') & 0 & V_b(l') & 0 & 0 \end{bmatrix}$$

$$\begin{bmatrix} 0 & 0 & 0 & 0 & 0 & V_a(i) & V_a(j) \\ V_b(i') & V_b(j') & V_b(k') & V_b(l') & V_b(m') & 0 & 0 \end{bmatrix}$$

$$\begin{bmatrix} V_a(i) & V_a(j) & V_a(k) & V_a(l) & V_a(m) & 0 & V_a(n) \\ 0 & 0 & 0 & 0 & 0 & V_b(i') & 0 \end{bmatrix}$$

$$\begin{bmatrix} V_a(i) & V_a(j) & V_a(k) & 0 & V_a(l) & 0 & V_a(m) \\ 0 & 0 & 0 & V_b(i') & 0 & V_b(j') & 0 \end{bmatrix}$$

$$\begin{bmatrix} V_a(i) & V_a(j) & 0 & V_a(k) & V_a(l) & 0 & V_a(m) \\ 0 & 0 & V_b(i') & 0 & 0 & V_b(j') & 0 \end{bmatrix}$$

$$\begin{bmatrix} V_a(i) & V_a(j) & 0 & 0 & V_a(k) & 0 & V_a(l) \\ 0 & 0 & V_b(i') & V_b(j') & 0 & V_b(j') & 0 \end{bmatrix}$$

$$\begin{bmatrix} V_a(i) & 0 & V_a(j) & V_a(k) & V_a(l) & 0 & V_a(m) \\ 0 & V_b(i') & 0 & 0 & 0 & V_b(j') & 0 \end{bmatrix}$$

$$\begin{bmatrix} V_a(i) & 0 & V_a(j) & V_a(k) & 0 & V_a(l) \\ 0 & V_b(i') & 0 & 0 & V_b(j') & 0 & V_b(k') & 0 \end{bmatrix}$$

$$\begin{bmatrix} V_a(i) & 0 & 0 & 0 & V_a(j) & 0 & V_a(k) \\ 0 & V_b(i') & V_b(j') & V_b(k') & 0 & V_b(l') & 0 \end{bmatrix}$$

$$\begin{bmatrix} 0 & V_a(i) & V_a(j) & V_a(k) & V_a(l) & 0 & V_a(m) \\ V_b(i') & 0 & 0 & 0 & 0 & V_b(j') & 0 \end{bmatrix}$$

$$\begin{bmatrix} 0 & V_a(i) & V_a(j) & 0 & V_a(k) & 0 & V_a(l) \\ V_b(i') & 0 & 0 & V_b(j') & 0 & V_b(k') & 0 \end{bmatrix}$$

$$\begin{bmatrix} 0 & V_a(i) & 0 & V_a(j) & V_a(k) & 0 & V_a(l) \\ V_b(i') & 0 & V_b(j') & 0 & 0 & V_b(k') & 0 \end{bmatrix}$$

$$\begin{bmatrix} 0 & V_a(i) & 0 & 0 & V_a(j) & 0 & V_a(k) \\ V_b(i') & 0 & V_b(j') & V_b(k') & 0 & V_b(l') & 0 \end{bmatrix}$$

$$\begin{bmatrix} 0 & 0 & V_a(i) & V_a(j) & V_a(k) & 0 & V_a(l) \\ V_b(i') & V_b(j') & 0 & 0 & 0 & V_b(k') & 0 \end{bmatrix}$$

$$\begin{bmatrix} 0 & 0 & V_a(i) & 0 & V_a(j) & 0 & V_a(l) \\ V_b(i') & V_b(j') & 0 & V_b(j') & 0 & V_b(k') & 0 \end{bmatrix}$$

$$\begin{bmatrix} 0 & 0 & 0 & V_a(i) & V_a(j) & 0 & V_a(k) \\ V_b(i') & V_b(j') & V_b(k') & 0 & 0 & V_b(l') & 0 \end{bmatrix}$$

$$\begin{bmatrix} 0 & 0 & V_a(i) & V_a(j) & V_a(k) & 0 & V_a(l) \\ V_b(i') & V_b(j') & 0 & 0 & 0 & V_b(k') & 0 \end{bmatrix}$$

$$\begin{bmatrix} 0 & 0 & V_a(i) & 0 & V_a(j) & 0 & V_a(k) \\ V_b(i') & V_b(j') & 0 & V_b(k') & 0 & V_b(l') & 0 \end{bmatrix}$$

$$\begin{bmatrix} 0 & 0 & 0 & V_a(i) & V_a(j) & 0 & V_a(k) \\ V_b(i') & V_b(j') & V_b(k') & 0 & 0 & V_b(l') & 0 \end{bmatrix}$$

$$\begin{bmatrix} 0 & 0 & 0 & 0 & V_a(i) & 0 & V_a(j) \\ V_b(i') & V_b(j') & V_b(k') & V_b(l') & 0 & V_b(m') & 0 \end{bmatrix}$$

$$\begin{bmatrix} V_a(i) & V_a(j) & V_a(k) & V_a(4) & 0 & 0 & V_a(m) \\ 0 & 0 & 0 & 0 & V_b(i') & V_b(j') & 0 \end{bmatrix}$$

$$\begin{bmatrix} V_a(i) & V_a(j) & V_a(k) & 0 & 0 & 0 & V_a(l) \\ 0 & 0 & 0 & V_b(i') & V_b(j') & V_b(k') & 0 \end{bmatrix}$$

$$\begin{bmatrix} V_a(i) & V_a(j) & 0 & V_a(k) & 0 & 0 & V_a(l) \\ 0 & 0 & V_b(i') & 0 & V_b(j') & V_b(k') & 0 \end{bmatrix}$$

$$\begin{bmatrix} V_a(i) & V_a(j) & 0 & 0 & 0 & 0 & V_a(k) \\ 0 & 0 & V_b(i') & V_b(j') & V_b(k') & V_b(l') & 0 \end{bmatrix}$$

$$\begin{bmatrix} V_a(i) & 0 & V_a(j) & V_a(k) & 0 & 0 & V_a(l) \\ 0 & V_b(i') & 0 & 0 & V_b(j') & V_b(k') & 0 \end{bmatrix}$$

$$\begin{bmatrix} V_a(i) & 0 & V_a(j) & 0 & 0 & 0 & V_a(k) \\ 0 & V_b(i') & 0 & V_b(j') & V_b(k') & V_b(l') & 0 \end{bmatrix}$$

$$\begin{bmatrix} V_a(i) & 0 & 0 & V_a(j) & 0 & 0 & V_a(k) \\ 0 & V_b(i') & V_b(j') & 0 & V_b(k') & V_b(l') & 0 \end{bmatrix}$$

$$\begin{bmatrix} V_a(i) & 0 & 0 & 0 & 0 & 0 & V_a(j) \\ 0 & V_b(i') & V_b(j') & V_b(k') & V_b(l') & V_b(m') & 0 \end{bmatrix}$$

$$\begin{bmatrix} 0 & V_a(i) & V_a(j) & V_a(k) & 0 & 0 & V_a(l) \\ V_b(i') & 0 & 0 & 0 & V_b(j') & V_b(k') & 0 \end{bmatrix}$$

$$\begin{bmatrix} 0 & V_a(i) & V_a(j) & 0 & 0 & 0 & V_a(k) \\ V_b(i') & 0 & 0 & V_b(j') & V_b(k') & V_b(l') & 0 \end{bmatrix}$$

$$\begin{bmatrix} 0 & V_a(i) & 0 & V_a(j) & 0 & 0 & V_a(k) \\ V_b(i') & 0 & V_b(j') & 0 & V_b(k') & V_b(l') & 0 \end{bmatrix}$$

$$\begin{bmatrix} 0 & V_a(i) & 0 & 0 & 0 & 0 & V_a(j) \\ V_b(i') & 0 & V_b(j') & V_b(k') & V_b(l') & V_b(m') & 0 \end{bmatrix}$$

$$\begin{bmatrix} 0 & 0 & V_a(i) & V_a(j) & 0 & 0 & V_a(k) \\ V_b(i') & V_b(j') & 0 & 0 & V_b(k') & V_b(l') & 0 \end{bmatrix}$$

$$\begin{bmatrix} 0 & 0 & V_a(i) & 0 & 0 & 0 & V_a(j) \\ V_b(i') & V_b(j') & 0 & V_b(k') & V_b(l') & V_b(m') & 0 \end{bmatrix}$$

$$\begin{bmatrix} 0 & 0 & 0 & V_a(i) & 0 & 0 & V_a(j) \\ V_b(i') & V_b(j') & V_b(k') & 0 & V_b(l') & V_b(m') & 0 \end{bmatrix}$$

$$\begin{bmatrix} 0 & 0 & 0 & 0 & 0 & 0 & V_a(j) \\ V_b(i') & V_b(j') & V_b(k') & V_b(l') & V_b(m') & V_b(n') & 0 \end{bmatrix}$$

$$\begin{bmatrix} V_a(i) & V_a(j) & V_a(k) & V_a(l) & V_a(m) & V_a(n) & 0 \\ 0 & 0 & 0 & 0 & 0 & 0 & V_b(i') \end{bmatrix}$$

$$\begin{bmatrix} V_a(i) & V_a(j) & V_a(k) & 0 & V_a(l) & V_a(m) & 0 \\ 0 & 0 & 0 & V_b(i') & 0 & 0 & V_b(j') \end{bmatrix}$$

$$\begin{bmatrix} V_a(i) & V_a(j) & 0 & V_a(k) & V_a(l) & V_a(m) & 0 \\ 0 & 0 & V_b(i') & 0 & 0 & 0 & V_b(j') \end{bmatrix}$$

$$\begin{bmatrix} V_a(i) & V_a(j) & 0 & 0 & V_a(k) & V_a(l) & 0 \\ 0 & 0 & V_b(i') & V_b(j') & 0 & 0 & V_b(k') \end{bmatrix}$$

$$\begin{bmatrix} V_a(i) & 0 & V_a(j) & V_a(k) & V_a(l) & V_a(m) & 0 \\ 0 & V_b(i') & 0 & 0 & 0 & 0 & V_b(j') \end{bmatrix}$$

$$\begin{bmatrix} V_a(i) & 0 & V_a(j) & 0 & V_a(k) & V_a(l) & 0 \\ 0 & V_b(i') & 0 & V_b(j') & 0 & 0 & V_b(k') \end{bmatrix}$$

$$\begin{bmatrix} V_a(i) & 0 & 0 & V_a(j) & V_a(k) & V_a(l) & 0 \\ 0 & V_b(i') & V_b(j') & 0 & 0 & 0 & V_b(k') \end{bmatrix}$$

$$\begin{bmatrix} V_a(i) & 0 & 0 & 0 & V_a(j) & V_a(k) & 0 \\ 0 & V_b(i') & V_b(j') & V_b(k') & 0 & 0 & V_b(l') \end{bmatrix}$$

$$\begin{bmatrix} 0 & V_a(i) & V_a(j) & V_a(k) & V_a(l) & V_a(m) & 0 \\ V_b(i') & 0 & 0 & 0 & 0 & 0 & V_b(j') \end{bmatrix}$$

$$\begin{bmatrix} 0 & V_a(i) & V_a(j) & 0 & V_a(k) & V_a(l) & 0 \\ V_b(i') & 0 & 0 & V_b(j') & 0 & 0 & V_b(k') \end{bmatrix}$$

$$\begin{bmatrix} 0 & V_a(i) & 0 & V_a(j) & V_a(k) & V_a(l) & 0 \\ V_b(i') & 0 & V_b(j') & 0 & 0 & 0 & V_b(k') \end{bmatrix}$$

$$\begin{bmatrix} 0 & V_a(i) & 0 & 0 & V_a(j) & V_a(k) & 0 \\ V_b(i') & 0 & V_b(j') & V_b(k') & 0 & 0 & V_b(l') \end{bmatrix}$$

$$\begin{bmatrix} 0 & 0 & V_a(i) & V_a(j) & V_a(k) & V_a(l) & 0 \\ V_b(i') & V_b(j') & 0 & 0 & 0 & 0 & V_b(k') \end{bmatrix}$$

$$\begin{bmatrix} 0 & 0 & V_a(i) & 0 & V_a(j) & V_a(k) & 0 \\ V_b(i') & V_b(j') & 0 & V_b(k') & 0 & 0 & V_b(l') \end{bmatrix}$$

$$\begin{bmatrix} 0 & 0 & 0 & V_a(i) & V_a(j) & V_a(k) & 0 \\ V_b(i') & V_b(j') & V_b(k') & 0 & 0 & 0 & V_b(l') \end{bmatrix}$$

$$\begin{bmatrix} 0 & 0 & 0 & 0 & V_a(i) & V_a(j) & 0 \\ V_b(i') & V_b(j') & V_b(k') & V_b(l') & 0 & 0 & V_b(m') \end{bmatrix}$$

$$\begin{bmatrix} V_a(i) & V_a(j) & V_a(k) & V_a(l) & V_a(m) & 0 & 0 \\ 0 & 0 & 0 & 0 & 0 & V_b(i') & V_b(j') \end{bmatrix}$$

$$\begin{bmatrix} V_a(i) & V_a(j) & V_a(k) & 0 & V_a(l) & 0 & 0 \\ 0 & 0 & 0 & V_b(i') & 0 & V_b(j') & V_b(k') \end{bmatrix}$$

$$\begin{bmatrix} V_a(i) & V_a(j) & 0 & 0 & V_a(k) & 0 & 0 \\ 0 & 0 & V_b(i') & V_b(j') & 0 & V_b(k') & V_b(l') \end{bmatrix}$$

$$\begin{bmatrix} V_a(i) & 0 & V_a(j) & V_a(k) & V_a(l) & 0 & 0 \\ 0 & V_b(i') & 0 & 0 & 0 & V_b(j') & V_b(k') \end{bmatrix}$$

$$\begin{bmatrix} V_a(i) & 0 & V_a(j) & 0 & V_a(k) & 0 & 0 \\ 0 & V_b(i') & 0 & V_b(j') & 0 & V_b(k') & V_b(l') \end{bmatrix}$$

$$\begin{bmatrix} V_a(i) & 0 & 0 & V_a(j) & V_a(k) & 0 & 0 \\ 0 & V_b(i') & V_b(j') & 0 & 0 & V_b(k') & V_b(l') \end{bmatrix}$$

$$\begin{bmatrix} V_a(i) & 0 & 0 & 0 & V_a(j) & 0 & 0 \\ 0 & V_b(i') & V_b(j') & V_b(k') & 0 & V_b(l') & V_b(m') \end{bmatrix}$$

$$\begin{bmatrix} 0 & V_a(i) & V_a(j) & V_a(k) & V_a(l) & 0 & 0 \\ V_b(i') & 0 & 0 & 0 & 0 & V_b(j') & V_b(k') \end{bmatrix}$$

$$\begin{bmatrix} 0 & V_a(i) & V_a(j) & 0 & V_a(k) & 0 & 0 \\ V_b(i') & 0 & 0 & V_b(j') & 0 & V_b(k') & V_b(l') \end{bmatrix}$$

$$\begin{bmatrix} 0 & V_a(i) & 0 & V_a(j) & V_a(k) & 0 & 0 \\ V_b(i') & 0 & V_b(j') & 0 & 0 & V_b(k') & V_b(l') \end{bmatrix}$$

$$\begin{bmatrix} 0 & V_a(i) & 0 & 0 & V_a(j) & 0 & 0 \\ V_b(i') & 0 & V_b(j') & V_b(k') & 0 & V_b(l') & V_b(m') \end{bmatrix}$$

$$\begin{bmatrix} 0 & 0 & V_a(i) & V_a(j) & V_a(k) & 0 & 0 \\ V_b(i') & V_b(j') & 0 & 0 & 0 & V_b(k') & V_b(l') \end{bmatrix}$$

$$\begin{bmatrix} 0 & 0 & V_a(i) & 0 & V_a(j) & 0 & 0 \\ V_b(i') & V_b(j') & 0 & V_b(k') & 0 & V_b(l') & V_b(m') \end{bmatrix}$$

$$\begin{bmatrix} 0 & 0 & 0 & V_a(i) & V_a(j) & 0 & 0 \\ V_b(i') & V_b(j') & V_b(k') & 0 & 0 & V_b(l') & V_b(m') \end{bmatrix}$$

$$\begin{bmatrix} 0 & V_a(i) & 0 & V_a(j) & 0 & V_a(k) & 0 \\ V_b(i') & 0 & V_b(j') & 0 & V_b(k') & 0 & V_b(l') \end{bmatrix}$$

-continued $$\begin{bmatrix} 0 & V_a(i) & 0 & 0 & 0 & V_a(j) & 0 \\ V_b(i') & 0 & V_b(j') & V_b(k') & V_b(l') & 0 & V_b(m') \end{bmatrix}$$

$$\begin{bmatrix} 0 & 0 & V_a(i) & V_a(j) & 0 & V_a(k) & 0 \\ V_b(i') & V_b(j') & 0 & 0 & V_b(k') & 0 & V_b(l') \end{bmatrix}$$

$$\begin{bmatrix} 0 & 0 & V_a(i) & 0 & 0 & V_a(j) & 0 \\ V_b(i') & V_b(j') & 0 & V_b(k') & V_b(l') & 0 & V_b(m') \end{bmatrix}$$

$$\begin{bmatrix} 0 & 0 & 0 & V_a(i) & 0 & V_a(j) & 0 \\ V_b(i') & V_b(j') & V_b(k') & 0 & V_b(l') & 0 & V_b(m') \end{bmatrix}$$

$$\begin{bmatrix} 0 & 0 & 0 & 0 & 0 & V_a(i) & 0 \\ V_b(i') & V_b(j') & V_b(k') & V_b(l') & V_b(m') & 0 & V_b(n') \end{bmatrix}$$

$$\begin{bmatrix} V_a(i) & V_a(j) & V_a(k) & V_a(l) & V_a(m) & 0 & 0 \\ 0 & 0 & 0 & 0 & 0 & V_b(i') & V_b(j') \end{bmatrix}$$

$$\begin{bmatrix} V_a(i) & V_a(j) & V_a(k) & V_a(l) & 0 & 0 & 0 \\ 0 & 0 & 0 & V_b(i') & 0 & V_b(j') & V_b(k') \end{bmatrix}$$

$$\begin{bmatrix} V_a(i) & V_a(j) & 0 & V_a(k) & V_a(l) & 0 & 0 \\ 0 & 0 & V_b(i') & 0 & 0 & V_b(j') & V_b(k') \end{bmatrix}$$

$$\begin{bmatrix} V_a(i) & V_a(j) & 0 & 0 & V_a(k) & 0 & 0 \\ 0 & 0 & V_b(i') & V_b(j') & 0 & V_b(k') & V_b(l') \end{bmatrix}$$

$$\begin{bmatrix} V_a(i) & 0 & V_a(j) & V_a(k) & V_a(l) & 0 & 0 \\ 0 & V_b(i') & 0 & 0 & 0 & V_b(j') & V_b(k') \end{bmatrix}$$

$$\begin{bmatrix} V_a(i) & 0 & V_a(j) & 0 & V_a(k) & 0 & 0 \\ 0 & V_b(i') & 0 & V_b(j') & 0 & V_b(k') & V_b(l') \end{bmatrix}$$

$$\begin{bmatrix} V_a(i) & 0 & 0 & V_a(j) & V_a(k) & 0 & 0 \\ 0 & V_b(i') & V_b(j') & 0 & 0 & V_b(k') & V_b(l') \end{bmatrix}$$

$$\begin{bmatrix} V_a(i) & 0 & 0 & 0 & V_a(j) & 0 & 0 \\ 0 & V_b(i') & V_b(j') & V_b(k') & 0 & V_b(l') & V_b(m') \end{bmatrix}$$

$$\begin{bmatrix} 0 & V_a(i) & V_a(j) & V_a(k) & V_a(l) & 0 & 0 \\ V_b(i') & 0 & 0 & 0 & 0 & V_b(j') & V_b(k') \end{bmatrix}$$

$$\begin{bmatrix} 0 & V_a(i) & V_a(j) & V_a(k) & 0 & 0 & 0 \\ V_b(i') & 0 & 0 & V_b(j') & 0 & V_b(k') & V_b(l') \end{bmatrix}$$

$$\begin{bmatrix} 0 & V_a(i) & 0 & V_a(j) & V_a(k) & 0 & 0 \\ V_b(i') & 0 & V_b(j') & 0 & 0 & V_b(k') & V_b(l') \end{bmatrix}$$

$$\begin{bmatrix} 0 & V_a(i) & 0 & 0 & V_a(j) & 0 & 0 \\ V_b(i') & 0 & V_b(j') & V_b(k') & 0 & V_b(l') & V_b(m') \end{bmatrix}$$

$$\begin{bmatrix} 0 & 0 & V_a(i) & V_a(j) & V_a(k) & 0 & 0 \\ V_b(i') & V_b(j') & 0 & 0 & 0 & V_b(k') & V_b(l') \end{bmatrix}$$

$$\begin{bmatrix} 0 & 0 & V_a(i) & 0 & V_a(j) & 0 & 0 \\ V_b(i') & V_b(j') & 0 & V_b(k') & 0 & V_b(l') & V_b(m') \end{bmatrix}$$

$$\begin{bmatrix} 0 & 0 & 0 & V_a(i) & 0 & 0 \\ V_b(i') & V_b(j') & V_b(k') & 0 & V_b(l') & V_b(m') & V_b(n') \end{bmatrix}$$

$$\begin{bmatrix} V_a(i) & V_a(j) & V_a(k) & V_a(l) & 0 & 0 & 0 \\ 0 & 0 & 0 & 0 & V_b(i') & V_b(j') & V_b(k') \end{bmatrix}$$

$$\begin{bmatrix} V_a(i) & V_a(j) & V_a(k) & 0 & 0 & 0 & 0 \\ 0 & 0 & 0 & V_b(i') & V_b(j') & V_b(k') & V_b(l') \end{bmatrix}$$

-continued $$\begin{bmatrix} V_a(i) & V_a(j) & 0 & V_a(k) & 0 & 0 & 0 \\ 0 & 0 & V_b(i') & 0 & V_b(j') & V_b(k') & V_b(l') \end{bmatrix}$$

$$\begin{bmatrix} V_a(i) & V_a(j) & 0 & 0 & 0 & 0 & 0 \\ 0 & 0 & V_b(i') & V_b(j') & V_b(k') & V_b(l') & V_b(m') \end{bmatrix}$$

$$\begin{bmatrix} V_a(i) & 0 & V_a(j) & V_a(k) & 0 & 0 & 0 \\ 0 & V_b(i') & 0 & 0 & V_b(j') & V_b(k') & V_b(l') \end{bmatrix}$$

$$\begin{bmatrix} V_a(i) & 0 & V_a(j) & 0 & 0 & 0 & 0 \\ 0 & V_b(i') & 0 & V_b(j') & V_b(k') & V_b(l') & V_b(m') \end{bmatrix}$$

$$\begin{bmatrix} V_a(i) & 0 & 0 & V_a(j) & 0 & 0 & 0 \\ 0 & V_b(i') & V_b(j') & 0 & V_b(k') & V_b(l') & V_b(m') \end{bmatrix}$$

$$\begin{bmatrix} V_a(i) & 0 & 0 & 0 & 0 & 0 & 0 \\ 0 & V_b(i') & V_b(j') & V_b(k') & V_b(l') & V_b(m') & V_b(n') \end{bmatrix}$$

$$\begin{bmatrix} 0 & V_a(i) & V_a(j) & V_a(k) & 0 & 0 & 0 \\ V_b(i') & 0 & 0 & 0 & V_b(j') & V_b(k') & V_b(l') \end{bmatrix}$$

$$\begin{bmatrix} 0 & V_a(i) & V_a(j) & 0 & 0 & 0 & 0 \\ V_b(i') & 0 & 0 & V_b(j') & V_b(k') & V_b(l') & V_b(m') \end{bmatrix}$$

$$\begin{bmatrix} 0 & V_a(i) & 0 & V_a(j) & 0 & 0 & 0 \\ V_b(i') & 0 & V_b(j') & 0 & V_b(k') & V_b(l') & V_b(m') \end{bmatrix}$$

$$\begin{bmatrix} 0 & V_a(i) & 0 & 0 & 0 & 0 & 0 \\ V_b(i') & 0 & V_b(j') & V_b(k') & V_b(l') & V_b(m') & V_b(n') \end{bmatrix}$$

$$\begin{bmatrix} 0 & 0 & V_a(i) & V_a(j) & 0 & 0 & 0 \\ V_b(i') & V_b(j') & 0 & 0 & V_b(k') & V_b(l') & V_b(m') \end{bmatrix}$$

$$\begin{bmatrix} 0 & 0 & V_a(i) & 0 & 0 & 0 & 0 \\ V_b(i') & V_b(j') & 0 & V_b(k') & V_b(l') & V_b(m') & V_b(n') \end{bmatrix},$$

Where a value of a rank indicator $$\begin{bmatrix} 0 & 0 & 0 & V_a(i) & 0 & 0 & 0 \\ V_b(i') & V_b(j') & V_b(k') & 0 & V_b(l') & V_b(m') & V_b(n') \end{bmatrix}$$

$$\begin{bmatrix} 0 & 0 & 0 & 0 & 0 & 0 & 0 \\ V_b(i') & V_b(j') & V_b(k') & V_b(l') & V_b(m') & V_b(n') & V_b(p') \end{bmatrix}$$

is 7, $0 < l \le N_1$, $0 < i' \le N_1$, $0 < j \le N_1$, $0 < j' \le N_1$, $0 < k \le N_1$, $0 < k' \le N_1$, $0 < l \le N_1$, $0 < l' \le N_1$, $0 < m \le N_1$, $0 < m' \le N_1$, $0 < n \le N_1$, $0 < n' \le N_1$, $0 < p \le N_1$, and $0 < p' \le N_1$; or 8. the first codebook is one of the following matrices:

$$\begin{bmatrix} V_a(i) & V_a(j) & V_a(k) & V_a(l) & V_a(m) & V_a(n) & V_a(p) & V_a(q) \\ 0 & 0 & 0 & 0 & 0 & 0 & 0 & 0 \end{bmatrix}$$

$$\begin{bmatrix} V_a(i) & V_a(j) & V_a(k) & 0 & V_a(l) & V_a(m) & V_a(n) & V_a(p) \\ 0 & 0 & 0 & V_b(i') & 0 & 0 & 0 & 0 \end{bmatrix}$$

$$\begin{bmatrix} V_a(i) & V_a(j) & 0 & V_a(k) & V_a(l) & V_a(m) & V_a(n) & V_a(p) \\ 0 & 0 & V_b(i') & 0 & 0 & 0 & 0 & 0 \end{bmatrix}$$

$$\begin{bmatrix} V_a(i) & V_a(j) & 0 & 0 & V_a(k) & V_a(l) & V_a(m) & V_a(n) \\ 0 & 0 & V_b(i') & V_b(j') & 0 & 0 & 0 & 0 \end{bmatrix}$$

$$\begin{bmatrix} V_a(i) & 0 & V_a(j) & V_a(k) & V_a(l) & V_a(m) & V_a(n) & V_a(p) \\ 0 & V_b(i') & 0 & 0 & 0 & 0 & 0 & 0 \end{bmatrix}$$

-continued $$\begin{bmatrix} V_a(i) & 0 & V_a(j) & 0 & V_a(k) & V_a(l) & V_a(m) & V_a(n) \\ 0 & V_b(i') & 0 & V_b(j') & 0 & 0 & 0 & 0 \end{bmatrix}$$

$$\begin{bmatrix} V_a(i) & 0 & 0 & V_a(j) & V_a(k) & V_a(l) & V_a(m) & V_a(n) \\ 0 & V_b(i') & V_b(2) & 0 & 0 & 0 & 0 & 0 \end{bmatrix}$$

$$\begin{bmatrix} V_a(i) & 0 & 0 & 0 & V_a(j) & V_a(k) & V_a(l) & V_a(m) \\ 0 & V_b(i') & V_b(j') & V_b(k') & 0 & 0 & 0 & 0 \end{bmatrix}$$

$$\begin{bmatrix} 0 & V_a(i) & V_a(j) & V_a(k) & V_a(l) & V_a(m) & V_a(n) & V_a(p) \\ V_b(i') & 0 & 0 & 0 & 0 & 0 & 0 & 0 \end{bmatrix}$$

$$\begin{bmatrix} 0 & V_a(i) & V_a(j) & 0 & V_a(k) & V_a(l) & V_a(m) & V_a(n) \\ V_b(i') & 0 & 0 & V_b(j') & 0 & 0 & 0 & 0 \end{bmatrix}$$

$$\begin{bmatrix} 0 & V_a(i) & 0 & V_a(j) & V_a(k) & V_a(l) & V_a(m) & V_a(n) \\ V_b(i') & 0 & V_b(2) & 0 & 0 & 0 & 0 & 0 \end{bmatrix}$$

$$\begin{bmatrix} 0 & V_a(i) & 0 & 0 & V_a(j) & V_a(k) & V_a(l) & V_a(m) \\ V_b(i') & 0 & V_b(j') & V_b(k') & 0 & 0 & 0 & 0 \end{bmatrix}$$

$$\begin{bmatrix} 0 & 0 & V_a(i) & V_a(j) & V_a(k) & V_a(l) & V_a(m) & V_a(n) \\ V_b(i') & V_b(j') & 0 & 0 & 0 & 0 & 0 & 0 \end{bmatrix}$$

$$\begin{bmatrix} 0 & 0 & V_a(i) & 0 & V_a(j) & V_a(k) & V_a(l) & V_a(m) \\ V_b(i') & V_b(j') & 0 & V_b(k') & 0 & 0 & 0 & 0 \end{bmatrix}$$

$$\begin{bmatrix} 0 & 0 & 0 & V_a(i) & V_a(j) & V_a(k) & V_a(l) & V_a(m) \\ V_b(i') & V_b(j') & V_b(k') & 0 & 0 & 0 & 0 & 0 \end{bmatrix}$$

$$\begin{bmatrix} 0 & 0 & 0 & 0 & V_a(i) & V_a(j) & V_a(k) & V_a(l) \\ V_b(i') & V_b(j') & V_b(k') & V_b(l') & 0 & 0 & 0 & 0 \end{bmatrix}$$

$$\begin{bmatrix} V_a(i) & V_a(j) & V_a(k) & V_a(l) & 0 & V_a(m) & V_a(n) & V_a(p) \\ 0 & 0 & 0 & 0 & V_b(i') & 0 & 0 & 0 \end{bmatrix}$$

$$\begin{bmatrix} V_a(i) & V_a(j) & V_a(k) & 0 & 0 & V_a(l) & V_a(m) & V_a(n) \\ 0 & 0 & 0 & V_b(i') & V_b(j') & 0 & 0 & 0 \end{bmatrix}$$

$$\begin{bmatrix} V_a(i) & V_a(j) & 0 & V_a(k) & 0 & V_a(l) & V_a(m) & V_a(n) \\ 0 & 0 & V_b(i') & 0 & V_b(j') & 0 & 0 & 0 \end{bmatrix}$$

$$\begin{bmatrix} V_a(i) & V_a(j) & 0 & 0 & 0 & V_a(k) & V_a(l) & V_a(m) \\ 0 & 0 & V_b(i') & V_b(j') & V_b(k') & 0 & 0 & 0 \end{bmatrix}$$

$$\begin{bmatrix} V_a(i) & 0 & V_a(j) & V_a(k) & 0 & V_a(l) & V_a(m) & V_a(n) \\ 0 & V_b(i') & 0 & 0 & V_b(j') & 0 & 0 & 0 \end{bmatrix}$$

$$\begin{bmatrix} V_a(i) & 0 & V_a(j) & 0 & 0 & V_a(k) & V_a(l) & V_a(m) \\ 0 & V_b(i') & 0 & V_b(j') & V_b(j') & 0 & 0 & 0 \end{bmatrix}$$

$$\begin{bmatrix} V_a(i) & 0 & 0 & V_a(j) & 0 & V_a(k) & V_a(l) & V_a(m) \\ 0 & V_b(i') & V_b(j') & 0 & V_b(k') & 0 & 0 & 0 \end{bmatrix}$$

$$\begin{bmatrix} V_a(i) & 0 & 0 & 0 & 0 & V_a(j) & V_a(k) & V_a(l) \\ 0 & V_b(i') & V_b(j') & V_b(k') & V_b(l') & 0 & 0 & 0 \end{bmatrix}$$

$$\begin{bmatrix} 0 & V_a(i) & V_a(j) & V_a(k) & 0 & V_a(l) & V_a(m) & V_a(n) \\ V_b(i') & 0 & 0 & 0 & V_b(j') & 0 & 0 & 0 \end{bmatrix}$$

$$\begin{bmatrix} 0 & V_a(i) & V_a(j) & 0 & 0 & V_a(k) & V_a(l) & V_a(m) \\ V_b(i') & 0 & 0 & V_b(j') & V_b(k') & 0 & 0 & 0 \end{bmatrix}$$

$$\begin{bmatrix} 0 & V_a(i) & 0 & V_a(j) & 0 & V_a(k) & V_a(l) & V_a(m) \\ V_b(i') & 0 & V_b(j') & 0 & V_b(k') & 0 & 0 & 0 \end{bmatrix}$$

$$\begin{bmatrix} 0 & V_a(i) & 0 & 0 & 0 & V_a(j) & V_a(k) & V_a(l) \\ V_b(i') & 0 & V_b(j') & V_b(k') & V_b(l') & 0 & 0 & 0 \end{bmatrix}$$

-continued $$\begin{bmatrix} 0 & 0 & V_a(i) & V_a(j) & 0 & V_a(k) & V_a(l) & V_a(m) \\ V_b(i') & V_b(j') & 0 & 0 & V_b(k') & 0 & 0 & 0 \end{bmatrix}$$

$$\begin{bmatrix} 0 & 0 & V_a(i) & 0 & 0 & V_a(j) & V_a(k) & V_a(l) \\ V_b(i') & V_b(j') & 0 & V_b(k') & V_b(l') & 0 & 0 & 0 \end{bmatrix}$$

$$\begin{bmatrix} 0 & 0 & 0 & V_a(i) & 0 & V_a(j) & V_a(k) & V_a(l) \\ V_b(i') & V_b(j') & V_b(k') & 0 & V_b(l') & 0 & 0 & 0 \end{bmatrix}$$

$$\begin{bmatrix} 0 & 0 & 0 & 0 & 0 & V_a(i) & V_a(j) & V_a(k) \\ V_b(i') & V_b(j') & V_b(k') & V_b(l') & V_b(m') & 0 & 0 & 0 \end{bmatrix}$$

$$\begin{bmatrix} V_a(i) & V_a(j) & V_a(k) & V_a(l) & V_a(m) & V_a(n) & V_a(p) & 0 \\ 0 & 0 & 0 & 0 & 0 & 0 & 0 & V_b(i') \end{bmatrix}$$

$$\begin{bmatrix} V_a(i) & V_a(j) & V_a(k) & 0 & V_a(l) & V_a(m) & V_a(n) & 0 \\ 0 & 0 & 0 & V_b(i') & 0 & 0 & 0 & V_b(j') \end{bmatrix}$$

$$\begin{bmatrix} V_a(i) & V_a(j) & 0 & V_a(k) & V_a(l) & V_a(m) & V_a(n) & 0 \\ 0 & 0 & V_b(i') & 0 & 0 & 0 & 0 & V_b(j') \end{bmatrix}$$

$$\begin{bmatrix} V_a(i) & V_a(j) & 0 & 0 & V_a(k) & V_a(l) & V_a(m) & 0 \\ 0 & 0 & V_b(i') & V_b(j') & 0 & 0 & 0 & V_b(k') \end{bmatrix}$$

$$\begin{bmatrix} V_a(i) & 0 & V_a(j) & V_a(k) & V_a(l) & V_a(m) & V_a(n) & 0 \\ 0 & V_b(i') & 0 & 0 & 0 & 0 & 0 & V_b(j') \end{bmatrix}$$

$$\begin{bmatrix} V_a(i) & 0 & V_a(j) & 0 & V_a(k) & V_a(l) & V_a(m) & 0 \\ 0 & V_b(i') & 0 & V_b(j') & 0 & 0 & 0 & V_b(k') \end{bmatrix}$$

$$\begin{bmatrix} V_a(i) & 0 & 0 & V_a(j) & V_a(k) & V_a(l) & V_a(m) & 0 \\ 0 & V_b(i') & V_b(j') & 0 & 0 & 0 & 0 & V_b(k') \end{bmatrix}$$

$$\begin{bmatrix} V_a(i) & 0 & 0 & 0 & V_a(j) & V_a(k) & V_a(l) & 0 \\ 0 & V_b(i') & V_b(j') & V_b(k') & 0 & 0 & 0 & V_b(l') \end{bmatrix}$$

$$\begin{bmatrix} 0 & V_a(i) & V_a(j) & V_a(k) & V_a(l) & V_a(m) & V_a(n) & 0 \\ V_b(i') & 0 & 0 & 0 & 0 & 0 & 0 & V_b(j') \end{bmatrix}$$

$$\begin{bmatrix} 0 & V_a(i) & V_a(j) & 0 & V_a(k) & V_a(l) & V_a(m) & 0 \\ V_b(i') & 0 & 0 & V_b(j') & 0 & 0 & 0 & V_b(k') \end{bmatrix}$$

$$\begin{bmatrix} 0 & V_a(i) & 0 & V_a(j) & V_a(k) & V_a(l) & V_a(m) & 0 \\ V_b(i') & 0 & V_b(j') & 0 & 0 & 0 & 0 & V_b(k') \end{bmatrix}$$

$$\begin{bmatrix} 0 & V_a(i) & 0 & V_a(j) & V_a(k) & V_a(l) & 0 \\ V_b(i') & 0 & V_b(j') & V_b(k') & 0 & 0 & 0 & V_b(l') \end{bmatrix}$$

$$\begin{bmatrix} 0 & 0 & V_a(i) & V_a(j) & V_a(k) & V_a(l) & V_a(m) & 0 \\ V_b(i') & V_b(j') & 0 & 0 & 0 & 0 & 0 & V_b(k') \end{bmatrix}$$

$$\begin{bmatrix} 0 & 0 & V_a(i) & V_a(j) & V_a(k) & V_a(l) & 0 \\ V_b(i') & V_b(j') & 0 & V_b(k') & 0 & 0 & 0 & V_b(l') \end{bmatrix}$$

$$\begin{bmatrix} 0 & 0 & 0 & V_a(i) & V_a(j) & V_a(k) & V_a(l) & 0 \\ V_b(i') & V_b(j') & V_b(k') & 0 & 0 & 0 & 0 & V_b(l') \end{bmatrix}$$

$$\begin{bmatrix} 0 & 0 & 0 & 0 & V_a(i) & V_a(j) & V_a(k) & 0 \\ V_b(i') & V_b(j') & V_b(k') & V_b(l') & 0 & 0 & 0 & V_b(m') \end{bmatrix}$$

$$\begin{bmatrix} V_a(i) & V_a(j) & V_a(k) & V_a(l) & 0 & V_a(m) & V_a(n) & 0 \\ 0 & 0 & 0 & 0 & V_b(i') & 0 & 0 & V_b(j') \end{bmatrix}$$

$$\begin{bmatrix} V_a(i) & V_a(j) & V_a(k) & 0 & 0 & V_a(l) & V_a(m) & 0 \\ 0 & 0 & 0 & V_b(i') & V_b(j') & 0 & 0 & V_b(k') \end{bmatrix}$$

$$\begin{bmatrix} V_a(i) & V_a(j) & 0 & V_a(k) & 0 & V_a(l) & V_a(m) & 0 \\ 0 & 0 & V_b(i') & 0 & V_b(j') & 0 & 0 & V_b(k') \end{bmatrix}$$

$$\begin{bmatrix} V_a(i) & V_a(j) & 0 & 0 & 0 & V_a(k) & V_a(l) & 0 \\ 0 & 0 & V_b(i') & V_b(j') & V_b(k') & 0 & 0 & V_b(l') \end{bmatrix}$$

$$\begin{bmatrix} V_a(i) & 0 & V_a(j) & V_a(k) & 0 & V_a(l) & V_a(m) & 0 \\ 0 & V_b(i') & 0 & 0 & V_b(j') & 0 & 0 & V_b(k') \end{bmatrix}$$

$$\begin{bmatrix} V_a(i) & 0 & V_a(j) & 0 & 0 & V_a(k) & V_a(l) & 0 \\ 0 & V_b(i') & 0 & V_b(j') & V_b(k') & 0 & 0 & V_b(l') \end{bmatrix}$$

$$\begin{bmatrix} V_a(i) & 0 & 0 & V_a(j) & 0 & V_a(k) & V_a(l) & 0 \\ 0 & V_b(i') & V_b(j') & 0 & V_b(k') & 0 & 0 & V_b(l') \end{bmatrix}$$

$$\begin{bmatrix} V_a(i) & 0 & 0 & 0 & 0 & V_a(j) & V_a(k) & 0 \\ 0 & V_b(i') & V_b(j') & V_b(k') & V_b(l') & 0 & 0 & V_b(m') \end{bmatrix}$$

$$\begin{bmatrix} 0 & V_a(i) & V_a(j) & V_a(k) & 0 & V_a(l) & V_a(k) & 0 \\ V_b(i') & 0 & 0 & 0 & V_b(j') & 0 & 0 & V_b(k') \end{bmatrix}$$

$$\begin{bmatrix} 0 & V_a(i) & V_a(j) & 0 & 0 & V_a(k) & V_a(l) & 0 \\ V_b(i') & 0 & 0 & V_b(j') & V_b(k') & 0 & 0 & V_b(l') \end{bmatrix}$$

$$\begin{bmatrix} 0 & V_a(i) & 0 & V_a(j) & 0 & V_a(k) & V_a(l) & 0 \\ V_b(i') & 0 & V_b(j') & 0 & V_b(k') & 0 & 0 & V_b(l') \end{bmatrix}$$

$$\begin{bmatrix} 0 & V_a(i) & 0 & 0 & 0 & V_a(j) & V_a(k) & 0 \\ V_b(i') & 0 & V_b(j') & V_b(k') & V_b(l') & 0 & 0 & V_b(m') \end{bmatrix}$$

$$\begin{bmatrix} 0 & 0 & V_a(i) & V_a(j) & 0 & V_a(k) & V_a(l) & 0 \\ V_b(i') & V_b(j') & 0 & 0 & V_b(k') & 0 & 0 & V_b(l') \end{bmatrix}$$

$$\begin{bmatrix} 0 & 0 & V_a(i) & 0 & 0 & V_a(j) & V_a(k) & 0 \\ V_b(i') & V_b(j') & 0 & V_b(k') & V_b(l') & 0 & 0 & V_b(m') \end{bmatrix}$$

$$\begin{bmatrix} 0 & 0 & 0 & V_a(i) & 0 & V_a(j) & V_a(k) & 0 \\ V_b(i') & V_b(j') & V_b(k') & 0 & V_b(l') & 0 & 0 & V_b(m') \end{bmatrix}$$

$$\begin{bmatrix} 0 & 0 & 0 & 0 & 0 & V_a(i) & V_a(j) & 0 \\ V_b(i') & V_b(j') & V_b(k') & V_b(l') & V_b(m') & 0 & 0 & V_b(n') \end{bmatrix}$$

$$\begin{bmatrix} V_a(i) & V_a(j) & V_a(k) & V_a(l) & V_a(m) & 0 & V_a(n) & V_a(p) \\ 0 & 0 & 0 & 0 & 0 & V_b(i') & 0 & 0 \end{bmatrix}$$

$$\begin{bmatrix} V_a(i) & V_a(j) & V_a(k) & 0 & V_a(l) & 0 & V_a(m) & V_a(n) \\ 0 & 0 & 0 & V_b(i') & 0 & V_b(j') & 0 & 0 \end{bmatrix}$$

$$\begin{bmatrix} V_a(i) & V_a(j) & 0 & V_a(k) & V_a(l) & 0 & V_a(m) & V_a(n) \\ 0 & 0 & V_b(i') & 0 & 0 & V_b(j') & 0 & 0 \end{bmatrix}$$

$$\begin{bmatrix} V_a(i) & V_a(j) & 0 & 0 & V_a(k) & 0 & V_a(l) & V_a(m) \\ 0 & 0 & V_b(i') & V_b(j') & 0 & V_b(k') & 0 & 0 \end{bmatrix}$$

$$\begin{bmatrix} V_a(i) & 0 & V_a(j) & V_a(k) & V_a(l) & 0 & V_a(m) & V_a(n) \\ 0 & V_b(i') & 0 & 0 & 0 & V_b(j') & 0 & 0 \end{bmatrix}$$

$$\begin{bmatrix} V_a(i) & 0 & V_a(j) & 0 & V_a(k) & 0 & V_a(l) & V_a(m) \\ 0 & V_b(i') & 0 & V_b(j') & 0 & V_b(k') & 0 & 0 \end{bmatrix}$$

$$\begin{bmatrix} V_a(i) & 0 & V_a(j) & 0 & V_a(k) & 0 & V_a(l) & V_a(m) \\ 0 & V_b(i') & V_b(j') & 0 & 0 & V_b(k') & 0 & 0 \end{bmatrix}$$

$$\begin{bmatrix} V_a(i) & 0 & 0 & 0 & V_a(j) & 0 & V_a(k) & V_a(l) \\ 0 & V_b(i') & V_b(j') & V_b(k') & 0 & V_b(l') & 0 & 0 \end{bmatrix}$$

$$\begin{bmatrix} 0 & V_a(i) & V_a(j) & V_a(k) & V_a(l) & 0 & V_a(m) & V_a(n) \\ V_b(i') & 0 & 0 & 0 & 0 & V_b(j') & 0 & 0 \end{bmatrix}$$

$$\begin{bmatrix} 0 & V_a(i) & V_a(j) & 0 & V_a(k) & 0 & V_a(l) & V_a(m) \\ V_b(i') & 0 & 0 & V_b(j') & 0 & V_b(k') & 0 & 0 \end{bmatrix}$$

$$\begin{bmatrix} 0 & V_a(i) & 0 & V_a(j) & V_a(k) & 0 & V_a(l) & V_a(m) \\ V_b(i') & 0 & V_b(j') & 0 & 0 & V_b(k') & 0 & 0 \end{bmatrix}$$

$$\begin{bmatrix} 0 & V_a(i) & 0 & V_a(j) & V_a(k) & 0 & V_a(l) & 0 \\ V_b(i') & 0 & V_b(j') & 0 & 0 & V_b(k') & 0 & 0 \end{bmatrix}$$

$$\begin{bmatrix} 0 & V_a(i) & 0 & V_a(j) & 0 & V_a(k) & V_a(l) & 0 \\ V_b(i') & 0 & V_b(j') & V_b(k') & 0 & V_b(l') & 0 & 0 \end{bmatrix}$$

$$\begin{bmatrix} 0 & 0 & V_a(i) & V_a(j) & V_a(k) & 0 & V_a(l) & V_a(m) \\ V_b(i') & V_b(j') & 0 & 0 & 0 & V_b(k') & 0 & 0 \end{bmatrix}$$

$$\begin{bmatrix} 0 & 0 & V_a(i) & V_a(j) & 0 & V_a(k) & V_a(l) & 0 \\ V_b(i') & V_b(j') & 0 & V_b(k') & 0 & V_b(l') & 0 & 0 \end{bmatrix}$$

$$\begin{bmatrix} 0 & 0 & 0 & 0 & V_a(i) & 0 & V_a(j) & V_a(k) \\ V_b(i') & V_b(j') & V_b(k') & V_b(l') & 0 & V_b(m') & 0 & 0 \end{bmatrix}$$

$$\begin{bmatrix} V_a(i) & V_a(j) & V_a(k) & V_a(l) & 0 & 0 & V_a(m) & V_a(n) \\ 0 & 0 & 0 & 0 & V_b(i') & V_b(j') & 0 & 0 \end{bmatrix}$$

$$\begin{bmatrix} V_a(i) & V_a(j) & V_a(k) & 0 & 0 & 0 & V_a(l) & V_a(m) \\ 0 & 0 & 0 & V_b(i') & V_b(j') & V_b(k') & 0 & 0 \end{bmatrix}$$

$$\begin{bmatrix} V_a(i) & V_a(j) & 0 & V_a(k) & 0 & 0 & V_a(l) & V_a(m) \\ 0 & 0 & V_b(i') & 0 & V_b(j') & V_b(k') & 0 & 0 \end{bmatrix}$$

$$\begin{bmatrix} V_a(i) & V_a(j) & 0 & 0 & 0 & 0 & V_a(k) & V_a(l) \\ 0 & 0 & V_b(i') & V_b(j') & V_b(k') & V_b(l') & 0 & 0 \end{bmatrix}$$

$$\begin{bmatrix} V_a(i) & 0 & V_a(j) & V_a(k) & 0 & 0 & V_a(l) & V_a(m) \\ 0 & V_b(i') & 0 & 0 & V_b(j') & V_b(k') & 0 & 0 \end{bmatrix}$$

$$\begin{bmatrix} V_a(i) & 0 & V_a(j) & 0 & 0 & 0 & V_a(k) & V_a(l) \\ 0 & V_b(i') & 0 & V_b(j') & V_b(k') & V_b(l') & 0 & 0 \end{bmatrix}$$

$$\begin{bmatrix} V_a(i) & 0 & 0 & V_a(j) & 0 & 0 & V_a(k) & V_a(l) \\ 0 & V_b(i') & V_b(j') & 0 & V_b(k') & V_b(l') & 0 & 0 \end{bmatrix}$$

$$\begin{bmatrix} V_a(i) & 0 & 0 & 0 & 0 & 0 & V_a(j) & V_a(k) \\ 0 & V_b(i') & V_b(j') & V_b(k') & V_b(l') & V_b(m') & 0 & 0 \end{bmatrix}$$

$$\begin{bmatrix} 0 & V_a(i) & V_a(j) & V_a(k) & 0 & 0 & V_a(l) & V_a(m) \\ V_b(i') & 0 & 0 & 0 & V_b(j') & V_b(k') & 0 & 0 \end{bmatrix}$$

$$\begin{bmatrix} 0 & V_a(i) & V_a(j) & 0 & 0 & 0 & V_a(k) & V_a(l) \\ V_b(i') & 0 & 0 & V_b(j') & V_b(k') & V_b(l') & 0 & 0 \end{bmatrix}$$

$$\begin{bmatrix} 0 & V_a(i) & 0 & V_a(j) & 0 & 0 & V_a(k) & V_a(l) \\ V_b(i') & 0 & V_b(j') & 0 & V_b(k') & V_b(l') & 0 & 0 \end{bmatrix}$$

$$\begin{bmatrix} 0 & V_a(i) & 0 & 0 & 0 & 0 & V_a(j) & V_a(k) \\ V_b(i') & 0 & V_b(j') & V_b(k') & V_b(l') & V_b(m') & 0 & 0 \end{bmatrix}$$

$$\begin{bmatrix} 0 & 0 & V_a(i) & V_a(j) & 0 & 0 & V_a(k) & V_a(l) \\ V_b(i') & V_b(j') & 0 & 0 & V_b(k') & V_b(l') & 0 & 0 \end{bmatrix}$$

$$\begin{bmatrix} 0 & 0 & V_a(i) & 0 & 0 & 0 & V_a(j) & V_a(k) \\ V_b(i') & V_b(j') & 0 & V_b(k') & V_b(l') & V_b(m') & 0 & 0 \end{bmatrix}$$

$$\begin{bmatrix} 0 & 0 & 0 & V_a(i) & 0 & 0 & V_a(j) & V_a(k) \\ V_b(i') & V_b(j') & V_b(k') & 0 & V_b(l') & V_b(m') & 0 & 0 \end{bmatrix}$$

$$\begin{bmatrix} 0 & 0 & 0 & 0 & 0 & 0 & V_a(i) & V_a(j) \\ V_b(i') & V_b(j') & V_b(k') & V_b(l') & V_b(m') & V_b(k') & 0 & 0 \end{bmatrix}$$

$$\begin{bmatrix} V_a(i) & V_a(j) & V_a(k) & V_a(l) & V_a(m) & 0 & V_a(n) & 0 \\ 0 & 0 & 0 & 0 & 0 & V_b(i) & 0 & V_b(j) \end{bmatrix}$$

$$\begin{bmatrix} V_a(i) & V_a(j) & V_a(k) & 0 & V_a(l) & 0 & V_a(m) & 0 \\ 0 & 0 & 0 & V_b(i') & 0 & V_b(j') & 0 & V_b(k') \end{bmatrix}$$

$$\begin{bmatrix} V_a(i) & V_a(j) & 0 & V_a(k) & V_a(l) & 0 & V_a(m) & 0 \\ 0 & 0 & V_b(i') & 0 & 0 & V_b(j') & 0 & V_b(k') \end{bmatrix}$$

$$\begin{bmatrix} V_a(i) & V_a(j) & 0 & 0 & V_a(k) & 0 & V_a(l) & 0 \\ 0 & 0 & V_b(i') & V_b(j') & 0 & V_b(k') & 0 & V_b(l') \end{bmatrix}$$

$$\begin{bmatrix} V_a(i) & 0 & V_a(j) & V_a(k) & 0 & V_a(l) & 0 & 0 \\ 0 & V_b(i') & 0 & 0 & 0 & V_b(j') & 0 & V_b(k') \end{bmatrix}$$

$$\begin{bmatrix} V_a(i) & 0 & V_a(j) & 0 & V_a(k) & 0 & V_a(l) & 0 \\ 0 & V_b(i') & 0 & V_b(j') & 0 & V_b(k') & 0 & V_b(l') \end{bmatrix}$$

$$\begin{bmatrix} V_a(i) & 0 & 0 & V_a(j) & V_a(k) & 0 & V_a(l) & 0 \\ 0 & V_b(i') & V_b(j') & 0 & 0 & V_b(k') & 0 & V_b(l') \end{bmatrix}$$

$$\begin{bmatrix} V_a(i) & 0 & 0 & 0 & V_a(j) & 0 & V_a(k) & 0 \\ 0 & V_b(i') & V_b(j') & V_b(k') & 0 & V_b(l') & 0 & V_b(m') \end{bmatrix}$$

$$\begin{bmatrix} 0 & V_a(i) & V_a(j) & V_a(k) & V_a(l) & 0 & V_a(m) & 0 \\ V_b(i') & 0 & 0 & 0 & 0 & V_b(j') & 0 & V_b(k') \end{bmatrix}$$

$$\begin{bmatrix} 0 & V_a(i) & V_a(j) & 0 & V_a(k) & 0 & V_a(l) & 0 \\ V_b(i') & 0 & 0 & V_b(j') & 0 & V_b(k') & 0 & V_b(l') \end{bmatrix}$$

$$\begin{bmatrix} 0 & V_a(i) & 0 & V_a(j) & 0 & V_a(k) & 0 & V_a(l) \\ V_b(i') & V_b(j') & 0 & 0 & 0 & V_b(l') & 0 & V_b(m') \end{bmatrix}$$

$$\begin{bmatrix} 0 & V_a(i) & 0 & 0 & V_a(j) & 0 & V_a(k) & 0 \\ V_b(i') & 0 & V_b(j') & V_b(k') & 0 & V_b(l') & 0 & V_b(m') \end{bmatrix}$$

$$\begin{bmatrix} 0 & 0 & V_a(i) & V_a(j) & V_a(k) & 0 & V_a(l) & 0 \\ V_b(i') & V_b(j') & 0 & 0 & 0 & V_b(k') & 0 & V_b(l') \end{bmatrix}$$

$$\begin{bmatrix} 0 & 0 & V_a(i) & 0 & V_a(j) & 0 & V_a(k) & 0 \\ V_b(i') & V_b(j') & 0 & V_b(k') & 0 & V_b(l') & 0 & V_b(m') \end{bmatrix}$$

$$\begin{bmatrix} 0 & 0 & 0 & V_a(i) & V_a(j) & 0 & V_a(k) & 0 \\ V_b(i') & V_b(j') & V_b(k') & 0 & 0 & V_b(l') & 0 & V_b(m') \end{bmatrix}$$

$$\begin{bmatrix} 0 & 0 & 0 & 0 & V_a(i) & 0 & V_a(j) & 0 \\ V_b(i') & V_b(j') & V_b(k') & V_b(l') & 0 & V_b(m') & 0 & V_b(n') \end{bmatrix}$$

$$\begin{bmatrix} V_a(i) & V_a(j) & V_a(k) & V_a(l) & 0 & 0 & V_a(m) & 0 \\ 0 & 0 & 0 & 0 & V_b(i') & V_b(j') & 0 & V_b(k') \end{bmatrix}$$

$$\begin{bmatrix} V_a(i) & V_a(j) & V_a(k) & 0 & 0 & 0 & V_a(l) & 0 \\ 0 & 0 & 0 & V_b(i') & V_b(j') & V_b(k') & 0 & V_b(m') \end{bmatrix}$$

$$\begin{bmatrix} V_a(i) & V_a(j) & 0 & V_a(k) & 0 & 0 & V_a(l) & 0 \\ 0 & 0 & V_b(i') & 0 & V_b(j') & V_b(k') & 0 & V_b(l') \end{bmatrix}$$

$$\begin{bmatrix} V_a(i) & V_a(j) & 0 & 0 & 0 & 0 & V_a(k) & 0 \\ 0 & 0 & V_b(i') & V_b(j') & V_b(k') & V_b(l') & 0 & V_b(m') \end{bmatrix}$$

$$\begin{bmatrix} V_a(i) & 0 & V_a(j) & V_a(k) & 0 & 0 & V_a(l) & 0 \\ 0 & V_b(i') & 0 & 0 & V_b(j') & V_b(k') & 0 & V_b(l') \end{bmatrix}$$

$$\begin{bmatrix} V_a(i) & 0 & V_a(j) & 0 & 0 & 0 & V_a(k) & 0 \\ 0 & V_b(i') & 0 & V_b(j') & V_b(k') & V_b(l') & 0 & V_b(m') \end{bmatrix}$$

$$\begin{bmatrix} V_a(i) & 0 & 0 & V_a(j) & 0 & 0 & V_a(k) & 0 \\ 0 & V_b(i') & V_b(j') & 0 & V_b(k') & V_b(l') & 0 & V_b(m') \end{bmatrix}$$

$$\begin{bmatrix} V_a(i) & 0 & 0 & 0 & 0 & 0 & V_a(j) & 0 \\ 0 & V_b(i') & V_b(j') & V_b(k') & V_b(l') & V_b(m') & 0 & V_b(n') \end{bmatrix}$$

$$\begin{bmatrix} 0 & V_a(i) & V_a(j) & V_a(k) & 0 & 0 & V_a(l) & 0 \\ V_b(i') & 0 & 0 & 0 & V_b(j') & V_b(k') & 0 & V_b(l') \end{bmatrix}$$

$$\begin{bmatrix} 0 & V_a(i) & V_a(j) & 0 & 0 & 0 & V_a(k) & 0 \\ V_b(i') & 0 & 0 & V_b(j') & V_b(k') & V_b(l') & 0 & V_b(m') \end{bmatrix}$$

$$\begin{bmatrix} 0 & V_a(i) & 0 & V_a(j) & 0 & 0 & V_a(k) & 0 \\ V_b(i') & 0 & V_b(j') & 0 & V_b(k') & V_b(l') & 0 & V_b(m') \end{bmatrix}$$

$$\begin{bmatrix} 0 & V_a(i) & 0 & 0 & 0 & 0 & V_a(j) & 0 \\ V_b(i') & 0 & V_b(j') & V_b(k') & V_b(l') & V_b(m') & 0 & V_b(n') \end{bmatrix}$$

$$\begin{bmatrix} 0 & 0 & V_a(i) & V_a(j) & 0 & 0 & V_a(k) & 0 \\ V_b(i') & V_b(j') & 0 & 0 & V_b(k') & V_b(l') & 0 & V_b(m') \end{bmatrix}$$

$$\begin{bmatrix} 0 & 0 & V_a(i) & 0 & 0 & 0 & V_a(j) & 0 \\ V_b(i') & V_b(j') & 0 & V_b(k') & V_b(l') & V_b(m') & 0 & V_b(n') \end{bmatrix}$$

$$\begin{bmatrix} 0 & 0 & 0 & V_a(i) & 0 & 0 & V_a(j) & 0 \\ V_b(i') & V_b(j') & V_b(k') & 0 & V_b(l') & V_b(m') & 0 & V_b(n') \end{bmatrix}$$

$$\begin{bmatrix} 0 & 0 & 0 & 0 & 0 & 0 & V_a(i) & 0 \\ V_b(i') & V_b(j') & V_b(k') & V_b(l') & V_b(m') & V_b(n') & 0 & V_b(p') \end{bmatrix}$$

$$\begin{bmatrix} V_a(i) & V_a(j) & V_a(k) & V_a(l) & V_a(m) & V_a(n) & 0 & V_a(p) \\ 0 & 0 & 0 & 0 & 0 & 0 & V_b(i') & 0 \end{bmatrix}$$

$$\begin{bmatrix} V_a(i) & V_a(j) & V_a(k) & 0 & V_a(l) & V_a(m) & 0 & V_a(n) \\ 0 & 0 & 0 & V_b(i') & 0 & 0 & V_b(j') & 0 \end{bmatrix}$$

$$\begin{bmatrix} V_a(i) & V_a(j) & V_a(k) & V_a(l) & V_a(m) & 0 & 0 & V_a(n) \\ 0 & 0 & V_b(i') & 0 & 0 & 0 & V_b(j') & 0 \end{bmatrix}$$

$$\begin{bmatrix} V_a(i) & V_a(j) & 0 & 0 & V_a(k) & V_a(l) & 0 & V_a(m) \\ 0 & 0 & V_b(i') & V_b(j') & 0 & 0 & V_b(k') & 0 \end{bmatrix}$$

$$\begin{bmatrix} V_a(i) & 0 & V_a(j) & V_a(k) & V_a(l) & V_a(m) & 0 & V_a(n) \\ 0 & V_b(i') & 0 & 0 & 0 & 0 & V_b(j') & 0 \end{bmatrix}$$

$$\begin{bmatrix} V_a(i) & 0 & V_a(j) & 0 & V_a(k) & V_a(l) & 0 & V_a(m) \\ 0 & V_b(i') & 0 & V_b(j') & 0 & 0 & V_b(k') & 0 \end{bmatrix}$$

$$\begin{bmatrix} V_a(i) & 0 & 0 & V_a(j) & V_a(k) & V_a(l) & 0 & V_a(m) \\ 0 & V_b(i') & V_b(j') & 0 & 0 & 0 & V_b(k') & 0 \end{bmatrix}$$

$$\begin{bmatrix} V_a(i) & 0 & 0 & 0 & V_a(j) & V_a(k) & 0 & V_a(l) \\ 0 & V_b(i') & V_b(j') & V_b(k') & 0 & 0 & V_b(l') & 0 \end{bmatrix}$$

$$\begin{bmatrix} 0 & V_a(i) & V_a(j) & V_a(k) & V_a(l) & V_a(m) & 0 & V_a(n) \\ V_b(i') & 0 & 0 & 0 & 0 & 0 & V_b(j') & 0 \end{bmatrix}$$

$$\begin{bmatrix} 0 & V_a(i) & 0 & V_a(j) & V_a(k) & V_a(l) & 0 & V_a(m) \\ V_b(i') & 0 & V_b(j') & 0 & 0 & 0 & V_b(k') & 0 \end{bmatrix}$$

$$\begin{bmatrix} 0 & V_a(i) & 0 & 0 & V_a(j) & V_a(k) & 0 & V_a(l) \\ V_b(i') & 0 & V_b(j') & V_b(k') & 0 & 0 & V_b(l') & 0 \end{bmatrix}$$

$$\begin{bmatrix} 0 & 0 & V_a(i) & V_a(j) & V_a(k) & V_a(l) & 0 & V_a(m) \\ V_b(i') & V_b(j') & 0 & 0 & 0 & 0 & V_b(k') & 0 \end{bmatrix}$$

$$\begin{bmatrix} 0 & 0 & V_a(i) & 0 & V_a(j) & V_a(k) & 0 & V_a(l) \\ V_b(i') & V_b(j') & 0 & V_b(k') & 0 & 0 & V_b(l') & 0 \end{bmatrix}$$

$$\begin{bmatrix} 0 & 0 & 0 & V_a(i) & V_a(j) & V_a(k) & 0 & V_a(l) \\ V_b(i') & V_b(j') & V_b(k') & 0 & 0 & 0 & V_b(l') & 0 \end{bmatrix}$$

$$\begin{bmatrix} 0 & 0 & 0 & 0 & V_a(i) & V_a(j) & 0 & V_a(k) \\ V_b(i') & V_b(j') & V_b(k') & V_b(l') & 0 & 0 & V_b(m') & 0 \end{bmatrix}$$

$$\begin{bmatrix} V_a(i) & V_a(j) & V_a(k) & V_a(l) & 0 & V_a(m) & 0 & V_a(n) \\ 0 & 0 & 0 & 0 & V_b(i') & 0 & V_b(j') & 0 \end{bmatrix}$$

$$\begin{bmatrix} V_a(i) & V_a(j) & V_a(k) & 0 & 0 & V_a(l) & 0 & V_a(m) \\ 0 & 0 & 0 & V_b(i') & V_b(j') & 0 & V_b(k') & 0 \end{bmatrix}$$

$$\begin{bmatrix} V_a(i) & V_a(j) & 0 & V_a(k) & 0 & V_a(l) & 0 & V_a(m) \\ 0 & 0 & V_b(i') & 0 & V_b(j') & 0 & V_b(k') & 0 \end{bmatrix}$$

$$\begin{bmatrix} V_a(i) & V_a(j) & 0 & 0 & 0 & V_a(k) & 0 & V_a(l) \\ 0 & 0 & V_b(i') & V_b(j') & V_b(k') & 0 & V_b(l') & 0 \end{bmatrix}$$

$$\begin{bmatrix} V_a(i) & 0 & V_a(j) & V_a(k) & 0 & V_a(l) & 0 & V_a(m) \\ 0 & V_b(i') & 0 & 0 & V_b(j') & 0 & V_b(k') & 0 \end{bmatrix}$$

$$\begin{bmatrix} V_a(i) & 0 & V_a(j) & 0 & 0 & V_a(k) & 0 & V_a(l) \\ 0 & V_b(i') & 0 & V_b(j') & V_b(k') & 0 & V_b(l') & 0 \end{bmatrix}$$

$$\begin{bmatrix} V_a(i) & 0 & 0 & V_a(j) & 0 & V_a(k) & 0 & V_a(l) \\ 0 & V_b(i') & V_b(j') & 0 & V_b(k') & 0 & V_b(l') & 0 \end{bmatrix}$$

$$\begin{bmatrix} V_a(i) & 0 & 0 & 0 & 0 & V_a(j) & 0 & V_a(k) \\ 0 & V_b(i') & V_b(j') & V_b(k') & V_b(l') & 0 & V_b(m') & 0 \end{bmatrix}$$

$$\begin{bmatrix} 0 & V_a(i) & V_a(j) & V_a(k) & 0 & V_a(l) & 0 & V_a(m) \\ V_b(i') & 0 & 0 & 0 & V_b(j') & 0 & V_b(k') & 0 \end{bmatrix}$$

$$\begin{bmatrix} 0 & V_a(i) & V_a(j) & 0 & 0 & V_a(k) & 0 & V_a(l) \\ V_b(i') & 0 & 0 & V_b(j') & V_b(k') & 0 & V_b(l') & 0 \end{bmatrix}$$

$$\begin{bmatrix} 0 & V_a(i) & 0 & V_a(j) & 0 & V_a(k) & 0 & V_a(l) \\ V_b(i') & 0 & V_b(j') & 0 & V_b(k') & 0 & V_b(l') & 0 \end{bmatrix}$$

$$\begin{bmatrix} 0 & V_a(i) & 0 & 0 & 0 & V_a(j) & 0 & V_a(k) \\ V_b(i') & 0 & V_b(j') & V_b(k') & V_b(l') & 0 & V_b(m') & 0 \end{bmatrix}$$

$$\begin{bmatrix} 0 & 0 & V_a(i) & V_a(j) & 0 & V_a(k) & 0 & V_a(l) \\ V_b(i') & V_b(j') & 0 & 0 & V_b(k') & 0 & V_b(l') & 0 \end{bmatrix}$$

$$\begin{bmatrix} 0 & 0 & V_a(i) & 0 & 0 & V_a(j) & 0 & V_a(k) \\ V_b(i') & V_b(j') & 0 & V_b(k') & V_b(l') & 0 & V_b(m') & 0 \end{bmatrix}$$

$$\begin{bmatrix} 0 & 0 & 0 & V_a(i) & 0 & V_a(j) & 0 & V_a(k) \\ V_b(i') & V_b(j') & V_b(k') & 0 & V_b(l') & 0 & V_b(m') & 0 \end{bmatrix}$$

$$\begin{bmatrix} 0 & 0 & 0 & 0 & 0 & V_a(i) & 0 & V_a(j) \\ V_b(i') & V_b(j') & V_b(k') & V_b(l') & V_b(m') & 0 & V_b(n') & 0 \end{bmatrix}$$

$$\begin{bmatrix} V_a(i) & V_a(j) & V_a(k) & V_a(l) & V_a(m) & V_a(n) & 0 & 0 \\ 0 & 0 & 0 & 0 & 0 & 0 & V_b(i') & V_b(j') \end{bmatrix}$$

$$\begin{bmatrix} V_a(i) & V_a(j) & V_a(k) & 0 & V_a(l) & V_a(m) & 0 & 0 \\ 0 & 0 & 0 & V_b(i') & 0 & 0 & V_b(j') & V_b(k') \end{bmatrix}$$

$$\begin{bmatrix} V_a(i) & V_a(j) & 0 & V_a(k) & V_a(l) & V_a(m) & 0 & 0 \\ 0 & 0 & V_b(i') & 0 & 0 & 0 & V_b(j') & V_b(k') \end{bmatrix}$$

$$\begin{bmatrix} V_a(i) & V_a(j) & 0 & 0 & V_a(k) & V_a(l) & 0 & 0 \\ 0 & 0 & V_b(i') & V_b(j') & 0 & 0 & V_b(k') & V_b(l') \end{bmatrix}$$

$$\begin{bmatrix} V_a(i) & 0 & V_a(j) & V_a(k) & V_a(l) & V_a(m) & 0 & 0 \\ 0 & V_b(i') & 0 & 0 & 0 & 0 & V_b(j') & V_b(k') \end{bmatrix}$$

$$\begin{bmatrix} V_a(i) & 0 & V_a(j) & 0 & V_a(k) & V_a(l) & 0 & 0 \\ 0 & V_b(i') & 0 & V_b(j') & 0 & 0 & V_b(k') & V_b(l') \end{bmatrix}$$

$$\begin{bmatrix} V_a(i) & 0 & 0 & V_a(j) & V_a(k) & V_a(l) & 0 & 0 \\ 0 & V_b(i') & V_b(j') & 0 & 0 & 0 & V_b(k') & V_b(l') \end{bmatrix}$$

$$\begin{bmatrix} V_a(i) & 0 & 0 & 0 & V_a(j) & V_a(k) & 0 & 0 \\ 0 & V_b(i') & V_b(j') & V_b(k') & 0 & 0 & V_b(l') & V_b(m') \end{bmatrix}$$

$$\begin{bmatrix} 0 & V_a(i) & V_a(j) & V_a(k) & V_a(l) & V_a(m) & 0 & 0 \\ V_b(i') & 0 & 0 & 0 & 0 & 0 & V_b(j') & V_b(k') \end{bmatrix}$$

$$\begin{bmatrix} 0 & V_a(i) & V_a(j) & 0 & V_a(k) & V_a(l) & 0 & 0 \\ V_b(i') & 0 & 0 & V_b(j') & 0 & 0 & V_b(k') & V_b(l') \end{bmatrix}$$

$$\begin{bmatrix} 0 & V_a(i) & 0 & V_a(j) & V_a(k) & V_a(l) & 0 & 0 \\ V_b(i') & 0 & V_b(j') & 0 & 0 & 0 & V_b(k') & V_b(l') \end{bmatrix}$$

$$\begin{bmatrix} 0 & V_a(i) & 0 & 0 & V_a(j) & V_a(k) & 0 & 0 \\ V_b(i') & 0 & V_b(j') & V_b(k') & 0 & 0 & V_b(l') & V_b(m') \end{bmatrix}$$

$$\begin{bmatrix} 0 & 0 & V_a(i) & V_a(j) & V_a(k) & V_a(l) & 0 & 0 \\ V_b(i') & V_b(j') & 0 & 0 & 0 & 0 & V_b(k') & V_b(l') \end{bmatrix}$$

$$\begin{bmatrix} 0 & 0 & V_a(i) & 0 & V_a(j) & V_a(k) & 0 & 0 \\ V_b(i') & V_b(j') & 0 & V_b(k') & 0 & 0 & V_b(l') & V_b(m') \end{bmatrix}$$

$$\begin{bmatrix} 0 & 0 & 0 & V_a(i) & V_a(j) & V_a(k) & 0 & 0 \\ V_b(i') & V_b(j') & V_b(k') & 0 & 0 & 0 & V_b(l') & V_b(m') \end{bmatrix}$$

$$\begin{bmatrix} 0 & V_a(i) & 0 & 0 & 0 & V_a(j) & 0 & 0 \\ V_b(i') & 0 & V_b(j') & V_b(k') & V_b(l') & 0 & V_b(m') & V_b(n') \end{bmatrix}$$

$$\begin{bmatrix} 0 & 0 & V_a(i) & V_a(j) & V_a(k) & 0 & 0 & 0 \\ V_b(i') & V_b(j') & 0 & 0 & 0 & V_b(k') & V_b(l') & V_b(m') \end{bmatrix}$$

$$\begin{bmatrix} 0 & 0 & V_a(i) & 0 & V_a(j) & 0 & 0 \\ V_b(i') & V_b(j') & 0 & V_b(k') & V_b(l') & 0 & V_b(m') & V_b(n') \end{bmatrix}$$

$$\begin{bmatrix} 0 & 0 & 0 & V_a(i) & 0 & V_a(j) & 0 & 0 \\ V_b(i') & V_b(j') & V_b(k') & 0 & V_b(l') & 0 & V_b(m') & V_b(n') \end{bmatrix}$$

$$\begin{bmatrix} 0 & 0 & 0 & 0 & 0 & V_a(i) & 0 & 0 \\ V_b(i') & V_b(j') & V_b(k') & V_b(l') & V_b(m') & 0 & V_b(n') & V_b(p') \end{bmatrix}$$

$$\begin{bmatrix} V_a(i) & V_a(j) & V_a(k) & V_a(l) & V_a(m) & 0 & 0 & V_a(n) \\ 0 & 0 & 0 & 0 & 0 & V_b(i') & V_b(j') & 0 \end{bmatrix}$$

$$\begin{bmatrix} V_a(i) & V_a(j) & V_a(k) & 0 & V_a(l) & 0 & 0 & V_a(m) \\ 0 & 0 & 0 & V_b(i') & 0 & V_b(j') & V_b(k') & 0 \end{bmatrix}$$

$$\begin{bmatrix} V_a(i) & V_a(j) & 0 & V_a(k) & V_a(l) & 0 & 0 & V_a(m) \\ 0 & 0 & V_b(i') & 0 & 0 & V_b(j') & V_b(k') & 0 \end{bmatrix}$$

$$\begin{bmatrix} V_a(i) & V_a(j) & 0 & 0 & V_a(k) & 0 & 0 & V_a(l) \\ 0 & 0 & V_b(i') & V_b(j') & 0 & V_b(k') & V_b(l') & 0 \end{bmatrix}$$

$$\begin{bmatrix} V_a(i) & 0 & V_a(j) & V_a(k) & V_a(l) & 0 & 0 & V_a(m) \\ 0 & V_b(i') & 0 & 0 & 0 & V_b(j') & V_b(k') & 0 \end{bmatrix}$$

$$\begin{bmatrix} V_a(i) & 0 & V_a(j) & 0 & V_a(k) & 0 & 0 & V_a(l) \\ 0 & V_b(i') & 0 & V_b(j') & 0 & V_b(k') & V_b(l') & 0 \end{bmatrix}$$

$$\begin{bmatrix} V_a(i) & 0 & 0 & V_a(j) & V_a(k) & 0 & 0 & V_a(l) \\ 0 & V_b(i') & V_b(j') & 0 & 0 & V_b(k') & V_b(l') & 0 \end{bmatrix}$$

$$\begin{bmatrix} V_a(i) & 0 & 0 & 0 & V_a(j) & 0 & 0 & V_a(k) \\ 0 & V_b(i') & V_b(j') & V_b(k') & 0 & V_b(l') & V_b(m') & 0 \end{bmatrix}$$

$$\begin{bmatrix} 0 & V_a(i) & V_a(j) & V_a(k) & V_a(l) & 0 & 0 & V_a(m) \\ V_b(i') & 0 & 0 & 0 & 0 & V_b(j') & V_b(k') & 0 \end{bmatrix}$$

$$\begin{bmatrix} 0 & V_a(i) & 0 & V_a(j) & V_a(k) & 0 & 0 & V_a(l) \\ V_b(i') & 0 & V_b(j') & 0 & 0 & V_b(k') & V_b(l') & 0 \end{bmatrix}$$

$$\begin{bmatrix} 0 & V_a(i) & 0 & V_a(j) & 0 & 0 & V_a(k) \\ V_b(i') & 0 & V_b(j') & 0 & V_b(k') & 0 & V_b(l') & 0 \end{bmatrix}$$

$$\begin{bmatrix} 0 & 0 & V_a(i) & V_a(j) & V_a(k) & 0 & 0 & V_a(l) \\ V_b(i') & V_b(j') & 0 & 0 & 0 & V_b(k') & V_b(l') & 0 \end{bmatrix}$$

$$\begin{bmatrix} 0 & 0 & V_a(i) & V_a(j) & 0 & 0 & V_a(k) \\ V_b(i') & V_b(j') & 0 & V_b(k') & 0 & V_b(l') & V_b(m') & 0 \end{bmatrix}$$

$$\begin{bmatrix} 0 & 0 & 0 & V_a(i) & V_a(j) & 0 & 0 & V_a(k) \\ V_b(i') & V_b(j') & V_b(k') & 0 & 0 & V_b(l') & V_b(m') & 0 \end{bmatrix}$$

$$\begin{bmatrix} 0 & 0 & 0 & 0 & V_a(i) & 0 & 0 & V_a(j) \\ V_b(i') & V_b(j') & V_b(k') & V_b(l') & 0 & V_b(m') & V_b(n') & 0 \end{bmatrix}$$

$$\begin{bmatrix} V_a(i) & V_a(j) & V_a(k) & V_a(l) & 0 & 0 & 0 & V_a(m) \\ 0 & 0 & 0 & 0 & V_b(i') & V_b(j') & V_b(k') & 0 \end{bmatrix}$$

$$\begin{bmatrix} V_a(i) & V_a(j) & V_a(k) & 0 & 0 & 0 & V_a(l) \\ 0 & 0 & 0 & V_b(i') & V_b(j') & V_b(k') & 0 & V_b(l') \end{bmatrix}$$

$$\begin{bmatrix} V_a(i) & V_a(j) & 0 & V_a(k) & 0 & 0 & 0 & V_a(l) \\ 0 & 0 & V_b(i') & 0 & V_b(j') & V_b(k') & V_b(l') & 0 \end{bmatrix}$$

$$\begin{bmatrix} V_a(i) & V_a(j) & 0 & 0 & 0 & 0 & 0 & V_a(k) \\ 0 & 0 & V_b(i') & V_b(j') & V_b(k') & V_b(l') & V_b(m') & 0 \end{bmatrix}$$

$$\begin{bmatrix} V_a(i) & 0 & V_a(j) & V_a(k) & 0 & 0 & 0 & V_a(l) \\ 0 & V_b(i') & 0 & 0 & V_b(j') & V_b(k') & V_b(l') & 0 \end{bmatrix}$$

$$\begin{bmatrix} V_a(i) & 0 & V_a(j) & V_a(k) & 0 & 0 & 0 & V_a(l) \\ 0 & V_b(i') & 0 & V_b(j') & 0 & 0 & V_b(k') & V_b(l') \end{bmatrix}$$

$$\begin{bmatrix} V_a(i) & 0 & V_a(j) & 0 & V_a(k) & 0 & 0 & V_a(l) \\ 0 & V_b(i') & 0 & 0 & V_b(j') & V_b(k') & V_b(l') & 0 \end{bmatrix}$$

$$\begin{bmatrix} V_a(i) & 0 & V_a(j) & 0 & 0 & 0 & 0 & V_a(k) \\ 0 & V_b(i') & 0 & V_b(j') & V_b(k') & V_b(l') & V_b(m') & 0 \end{bmatrix}$$

$$\begin{bmatrix} V_a(i) & 0 & 0 & 0 & 0 & 0 & 0 & V_a(j) \\ 0 & V_b(i') & V_b(j') & V_b(k') & V_b(l') & V_b(m') & V_b(n') & 0 \end{bmatrix}$$

$$\begin{bmatrix} 0 & V_a(i) & V_a(j) & V_a(k) & 0 & 0 & 0 & V_a(l) \\ V_b(i') & 0 & 0 & 0 & V_b(j') & V_b(k') & V_b(l') & 0 \end{bmatrix}$$

$$\begin{bmatrix} 0 & V_a(i) & 0 & 0 & 0 & 0 & 0 & V_a(k) \\ V_b(i') & 0 & V_b(j') & V_b(k') & V_b(l') & V_b(m') & 0 \end{bmatrix}$$

$$\begin{bmatrix} 0 & 0 & V_a(i) & V_a(j) & 0 & 0 & 0 & V_a(k) \\ V_b(i') & V_b(j') & 0 & 0 & V_b(k') & V_b(l') & V_b(m') & 0 \end{bmatrix}$$

$$\begin{bmatrix} 0 & 0 & V_a(i) & 0 & 0 & 0 & 0 & V_a(j) \\ V_b(i') & V_b(j') & 0 & V_b(k') & V_b(l') & V_b(m') & V_b(n') & 0 \end{bmatrix}$$

$$\begin{bmatrix} 0 & 0 & 0 & V_a(i) & 0 & 0 & 0 & V_a(j) \\ V_b(i') & V_b(j') & V_b(k') & 0 & V_b(l') & V_b(m') & V_b(n') & 0 \end{bmatrix}$$

$$\begin{bmatrix} 0 & 0 & 0 & 0 & 0 & 0 & 0 & V_a(i) \\ V_b(i') & V_b(j') & V_b(k') & V_b(l') & V_b(m') & V_b(n') & V_b(p') & 0 \end{bmatrix}$$

$$\begin{bmatrix} V_a(i) & V_a(j) & V_a(k) & V_a(l) & V_a(m) & 0 & 0 & 0 \\ 0 & 0 & 0 & 0 & 0 & V_b(i') & V_b(j') & V_b(k') \end{bmatrix}$$

$$\begin{bmatrix} V_a(i) & V_a(j) & V_a(k) & 0 & V_a(l) & 0 & 0 & 0 \\ 0 & 0 & 0 & V_b(i') & 0 & V_b(j') & V_b(k') & V_b(l') \end{bmatrix}$$

$$\begin{bmatrix} V_a(i) & V_a(j) & 0 & V_a(k) & V_a(l) & 0 & 0 & 0 \\ 0 & 0 & V_b(i') & 0 & 0 & V_b(j') & V_b(k') & V_b(l') \end{bmatrix}$$

$$\begin{bmatrix} V_a(i) & V_a(j) & 0 & V_a(k) & 0 & 0 & 0 & 0 \\ 0 & 0 & V_b(i') & 0 & V_b(j') & V_b(k') & V_b(l') & V_b(m') \end{bmatrix}$$

$$\begin{bmatrix} V_a(i) & 0 & V_a(j) & V_a(k) & V_a(l) & 0 & 0 & 0 \\ 0 & V_b(i') & 0 & 0 & 0 & V_b(j') & V_b(k') & V_b(l') \end{bmatrix}$$

$$\begin{bmatrix} V_a(i) & 0 & V_a(j) & V_a(k) & 0 & 0 & 0 & 0 \\ 0 & V_b(i') & 0 & 0 & V_b(j') & V_b(k') & V_b(l') & V_b(m') \end{bmatrix}$$

$$\begin{bmatrix} V_a(i) & 0 & V_a(j) & 0 & V_a(k) & 0 & 0 & 0 \\ 0 & V_b(i') & 0 & V_b(j') & 0 & V_b(k') & V_b(l') & V_b(m') \end{bmatrix}$$

$$\begin{bmatrix} V_a(i) & 0 & 0 & V_a(j) & V_a(k) & 0 & 0 & 0 \\ 0 & V_b(i') & V_b(j') & 0 & 0 & V_b(k') & V_b(l') & V_b(m') \end{bmatrix}$$

$$\begin{bmatrix} V_a(i) & 0 & 0 & V_a(j) & 0 & 0 & 0 & 0 \\ 0 & V_b(i') & V_b(j') & 0 & V_b(k') & V_b(l') & V_b(m') & V_b(n') \end{bmatrix}$$

$$\begin{bmatrix} 0 & V_a(i) & V_a(j) & V_a(k) & V_a(l) & 0 & 0 & 0 \\ V_b(i') & 0 & 0 & 0 & 0 & V_b(j') & V_b(k') & V_b(l') \end{bmatrix}$$

$$\begin{bmatrix} 0 & V_a(i) & 0 & 0 & V_a(k) & 0 & 0 & 0 \\ V_b(i') & 0 & 0 & V_b(j') & 0 & V_b(k') & V_b(l') & V_b(m') \end{bmatrix}$$

$$\begin{bmatrix} 0 & V_a(i) & 0 & V_a(j) & V_a(k) & 0 & 0 & 0 \\ V_b(i') & 0 & V_b(j') & 0 & 0 & V_b(k') & V_b(l') & V_b(m') \end{bmatrix}$$

-continued $$\begin{bmatrix} 0 & V_a(i) & 0 & 0 & V_a(j) & 0 & 0 & 0 \\ V_b(i') & 0 & V_b(j') & V_b(k') & 0 & V_b(l') & V_b(m') & V_b(n') \end{bmatrix}$$

$$\begin{bmatrix} 0 & 0 & V_a(i) & V_a(j) & V_a(k) & 0 & 0 & 0 \\ V_b(i') & V_b(j') & 0 & 0 & 0 & V_b(k') & V_b(l') & V_b(m') \end{bmatrix}$$

$$\begin{bmatrix} 0 & 0 & V_a(i) & 0 & V_a(j) & 0 & 0 & 0 \\ V_b(i') & V_b(j') & 0 & V_b(k') & 0 & V_b(l') & V_b(m') & V_b(n') \end{bmatrix}$$

$$\begin{bmatrix} 0 & 0 & 0 & V_a(i) & V_a(j) & 0 & 0 & 0 \\ V_b(i') & V_b(j') & V_b(k') & 0 & 0 & V_b(l') & V_b(m') & V_b(n') \end{bmatrix}$$

$$\begin{bmatrix} 0 & 0 & 0 & 0 & V_a(i) & 0 & 0 & 0 \\ V_b(i') & V_b(j') & V_b(k') & V_b(l') & 0 & V_b(m') & V_b(n') & V_b(p') \end{bmatrix}$$

$$\begin{bmatrix} V_a(i) & V_a(j) & V_a(k) & V_a(l) & 0 & 0 & 0 & 0 \\ 0 & 0 & 0 & 0 & V_b(i') & V_b(j') & V_b(k') & V_b(l') \end{bmatrix}$$

$$\begin{bmatrix} V_a(i) & V_a(j) & V_a(k) & 0 & 0 & 0 & 0 & 0 \\ 0 & 0 & 0 & V_b(i') & V_b(j') & V_b(k') & V_b(l') & V_b(m') \end{bmatrix}$$

$$\begin{bmatrix} V_a(i) & V_a(j) & 0 & V_a(k) & 0 & 0 & 0 & 0 \\ 0 & 0 & V_b(i') & 0 & V_b(j') & V_b(k') & V_b(l') & V_b(m') \end{bmatrix}$$

$$\begin{bmatrix} V_a(i) & V_a(j) & 0 & 0 & 0 & 0 & 0 & 0 \\ 0 & 0 & V_b(i') & V_b(j') & V_b(k') & V_b(l') & V_b(m') & V_b(n') \end{bmatrix}$$

$$\begin{bmatrix} V_a(i) & 0 & V_a(j) & V_a(k) & 0 & 0 & 0 & 0 \\ 0 & V_b(i') & 0 & 0 & V_b(j') & V_b(k') & V_b(l') & V_b(m') \end{bmatrix}$$

$$\begin{bmatrix} V_a(i) & 0 & V_a(j) & 0 & 0 & 0 & 0 & 0 \\ 0 & V_b(i') & 0 & V_b(j') & V_b(k') & V_b(l') & V_b(m') & V_b(n') \end{bmatrix}$$

$$\begin{bmatrix} V_a(i) & 0 & 0 & V_a(j) & 0 & 0 & 0 & 0 \\ 0 & V_b(i') & V_b(j') & 0 & V_b(k') & V_b(l') & V_b(m') & V_b(n') \end{bmatrix}$$

$$\begin{bmatrix} V_a(i) & 0 & 0 & 0 & 0 & 0 & 0 & 0 \\ 0 & V_b(i') & V_b(j') & V_b(k') & V_b(l') & V_b(m') & V_b(n') & V_b(p') \end{bmatrix}$$

$$\begin{bmatrix} 0 & V_a(i) & V_a(j) & V_a(k) & 0 & 0 & 0 & 0 \\ V_b(i') & 0 & 0 & 0 & V_b(j') & V_b(k') & V_b(l') & V_b(m') \end{bmatrix}$$

$$\begin{bmatrix} 0 & V_a(i) & V_a(j) & 0 & 0 & 0 & 0 & 0 \\ V_b(i') & 0 & 0 & V_b(j') & V_b(k') & V_b(l') & V_b(m') & V_b(n') \end{bmatrix}$$

$$\begin{bmatrix} 0 & V_a(i) & 0 & V_a(j) & 0 & 0 & 0 & 0 \\ V_b(i') & 0 & V_b(j') & 0 & V_b(k') & V_b(l') & V_b(m') & V_b(n') \end{bmatrix}$$

$$\begin{bmatrix} 0 & V_a(i) & 0 & 0 & 0 & 0 & 0 & 0 \\ V_b(i') & 0 & V_b(j') & V_b(k') & V_b(l') & V_b(m') & V_b(n') & V_b(p') \end{bmatrix}$$

$$\begin{bmatrix} 0 & 0 & V_a(i) & V_a(j) & 0 & 0 & 0 & 0 \\ V_b(i') & V_b(j') & 0 & 0 & V_b(k') & V_b(l') & V_b(m') & V_b(n') \end{bmatrix}$$

$$\begin{bmatrix} 0 & 0 & V_a(i) & 0 & 0 & 0 & 0 & 0 \\ V_b(i') & V_b(j') & 0 & V_b(k') & V_b(l') & V_b(m') & V_b(n') & V_b(p') \end{bmatrix}$$

$$\begin{bmatrix} 0 & 0 & 0 & V_a(i) & 0 & 0 & 0 & 0 \\ V_b(i') & V_b(j') & V_b(k') & 0 & V_b(l') & V_b(m') & V_b(n') & V_b(p') \end{bmatrix}$$

$$\begin{bmatrix} 0 & 0 & 0 & 0 & 0 & 0 & 0 & 0 \\ V_b(i') & V_b(j') & V_b(k') & V_b(l') & V_b(m') & V_b(n') & V_b(p') & V_b(q') \end{bmatrix},$$

where a value of a rank indicator is 8, $0<i\leq N_1$, $0<i'\leq N_1$, $0<j\leq N_1$, $0<j'\leq N_1$, $0<k\leq N_1$, $0<k'\leq N_1$, $0<l\leq N_1$, $0<l'\leq N_1$, $0<m\leq N_1$, $0<m'\leq N_1$, $0<n\leq N_1$, $0<n'\leq N_1$, $0<p\leq N_1$, $0<p'\leq N_1$, $0<q\leq N_1$, and $0<q'\leq N_1$, where: for parameters of i, j, k, l, m, n, p, q, and the like, every two of the sub-vectors corresponding to the $V_a$ parts are unequal, and for parameters of i', j', k', l', m', n', p', q', and the like, every two of the sub-vectors corresponding to the $V_b$ parts are unequal.

It should be understood that, in the illustrated possible forms of the first codebook included in the first codebook set, i, j, k, l, m, n, p, and q are only for distinguishing different codebook vectors. Further, in an embodiment of the present invention, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vectors $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_K\}$ form a vector $V_k'$, vectors $V_k'$ corresponding to all sub-vectors $V_k$ in the $\{V_K\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\}\neq\{V_L'\}$ holds true. According to concepts of sets, when a quantity of dimensions of the $\{V_k'\}$ and a quantity of dimensions of the $\{V_L'\}$ are unequal, $\{V_k'\}\neq\{V_L'\}$ holds true; when a quantity of dimensions of the $\{V_k'\}$ and a quantity of dimensions of the $\{V_L'\}$ are equal, but a quantity of sub-vectors included in the $\{V_k'\}$ and a quantity of sub-vectors included in the $\{V_L'\}$ are unequal, $\{V_k'\}\neq\{V_L'\}$ holds true; or when a quantity of dimensions of the $\{V_k'\}$ and a quantity of dimensions of the $\{V_L'\}$ are equal, and a quantity of sub-vectors included in the $\{V_k'\}$ and a quantity of sub-vectors included in the $\{V_L'\}$ are equal, but the sub-vectors included in the $\{V_k'\}$ are different from the sub-vectors included in the $\{V_L'\}$, $\{V_k'\}\neq\{V_L'\}$ also holds true.

In another embodiment of the present invention, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\}\neq\{V_N'\}$ holds true.

According to concepts of sets, when a quantity of dimensions of the $\{V_M'\}$ and a quantity of dimensions of the $\{V_N'\}$ are unequal, $\{V_M'\}\neq\{V_N'\}$ holds true; when a quantity of dimensions of the $\{V_M'\}$ and a quantity of dimensions of the $\{V_N'\}$ are equal, but a quantity of sub-vectors included in the $\{V_M'\}$ and a quantity of sub-vectors included in the $\{V_N'\}$ are unequal, $\{V_M'\}\neq\{V_N'\}$ holds true; or when a quantity of dimensions of the $\{V_M'\}$ and a quantity of dimensions of the $\{V_N'\}$ are equal, and a quantity of sub-vectors included in the $\{V_M'\}$ and a quantity of sub-vectors included in the $\{V_N'\}$ are equal, but the sub-vectors included in the $\{V_M'\}$ are different from the sub-vectors included in the $\{V_N'\}$, $\{V_M'\}\{V_N'\}$ also holds true.

In the foregoing embodiment, with the first codebook that makes the $\{V_K'\}\neq\{V_L'\}$ and/or $\{V_M'\}\neq\{V_N'\}$ relation hold true, flexible configurations of the first structure and the second structure are implemented, and a codebook is better matched with a channel.

The following provides relationships of amplitude vectors respectively corresponding to $$\begin{bmatrix} V_a \\ 0 \end{bmatrix} \text{ and } \begin{bmatrix} 0 \\ V_b \end{bmatrix}.$$

A first relationship of amplitude vectors, a second relationship of amplitude vectors, and a third relationship of amplitude vectors each provide a configuration mode of a relationship between elements included in each sub-vector. The third relationship of amplitude vectors and a fourth relationship of amplitude vectors provide relationships between different codebook vectors in a codebook. The second network device may configure different amplitude vectors according to channel conditions, so that transmission efficiency is higher. The definitions of amplitude vectors are already described, and are not further described herein.

For example, a codebook $M_2$ in a codebook set is:

$$\begin{bmatrix} a_1 e^{jw_1} & 0 & b_1 e^{j\theta_1} & c_1 e^{j\gamma_1} & 0 \\ a_2 e^{jw_2} & 0 & b_2 e^{j\theta_2} & c_2 e^{j\gamma_2} & 0 \\ a_3 e^{jw_3} & 0 & b_3 e^{j\theta_3} & c_3 e^{j\gamma_3} & 0 \\ a_4 e^{jw_4} & 0 & b_4 e^{j\theta_4} & c_4 e^{j\gamma_4} & 0 \\ 0 & d_1 e^{j\alpha_1} & 0 & 0 & g_1 e^{j\beta_1} \\ 0 & d_2 e^{j\alpha_2} & 0 & 0 & g_2 e^{j\beta_2} \end{bmatrix}.$$

If $M_2$ meets the first relationship of amplitude vectors: at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_b$ of each second sub-vector $$\begin{bmatrix} 0 \\ V_b \end{bmatrix}$$

in the first codebook are unequal, at least two values in $a_1$, $a_2$, $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_2$.

If $M_2$ meets the second relationship of amplitude vectors: at least two elements in an amplitude vector in $V_a$ of each first sub-vector $$\begin{bmatrix} V_a \\ 0 \end{bmatrix}$$

in the first codebook are unequal, and all elements in an amplitude vector in $V_b$ of each second sub-vector $$\begin{bmatrix} 0 \\ V_b \end{bmatrix}$$

in the first codebook are equal, at least two values in $a_1$, $a_2$, $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_4$.

If $M_2$ meets the third relationship of amplitude vectors: all elements in an amplitude vector in $V_a$ of each first sub-vector $$\begin{bmatrix} V_a \\ 0 \end{bmatrix}$$

in the first codebook are equal, and at least two elements in an amplitude vector in $V_b$ of each second sub-vector $$\begin{bmatrix} 0 \\ V_b \end{bmatrix}$$

in the first codebook are unequal, $a_1=a_2=a_3=a_4$; $b_1=b_2=b_3=b_4$; $c_1=c_2=c_3=c_4$; $d_1\neq d_2$; and $g_1\neq g_2$.

If $M_2$ meets the fourth relationship of amplitude vectors: at least two amplitude vectors in a vector set formed by amplitude vectors in $V_a$ of all first sub-vector $$\begin{bmatrix} V_a \\ 0 \end{bmatrix}$$

in the first codebook are different, amplitude vectors in $V_a$ of all corresponding first sub-vectors $$\begin{bmatrix} V_a \\ 0 \end{bmatrix}$$

in $M_2$ are $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{and } \begin{bmatrix} c_1 \\ c_2 \\ c_3 \\ c_4 \end{bmatrix},$$

where at least two vectors of $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{and } \begin{bmatrix} c_1 \\ c_2 \\ c_3 \\ c_4 \end{bmatrix}$$

are different.

A fifth relationship of amplitude vectors is: at least two amplitude vectors in a vector set formed by amplitude vectors in $V_b$ of all second sub-vectors $$\begin{bmatrix} 0 \\ V_b \end{bmatrix}$$

in the first codebook are different.

In this case, amplitude vectors in $V_b$ of all corresponding second sub-vectors $$\begin{bmatrix} 0 \\ V_b \end{bmatrix}$$

in $M_2$ are $$\begin{bmatrix} d_1 \\ d_2 \end{bmatrix} \text{ and } \begin{bmatrix} g_1 \\ g_2 \end{bmatrix},$$

where $$\begin{bmatrix} d_1 \\ d_2 \end{bmatrix} \text{ and } \begin{bmatrix} g_1 \\ g_2 \end{bmatrix}$$

are unequal.

In the present invention, the amplitude vector in the $V_a$ refers to a vector formed by the amplitude parts of the $V_a$, and the amplitude vector in the $V_b$ refers to a vector formed by the amplitude parts of the $V_b$. For example, if the $V_a$ part is $$\begin{bmatrix} \frac{1}{\sqrt{20}} \\ \frac{2}{\sqrt{20}} e^{4j\frac{2\pi}{32}} \\ \frac{3}{\sqrt{20}} e^{8j\frac{2\pi}{32}} \\ \frac{4}{\sqrt{20}} e^{12j\frac{2\pi}{32}} \end{bmatrix},$$

the amplitude vector in the $V_a$ is:

$$\begin{bmatrix} \frac{1}{\sqrt{20}} \\ \frac{2}{\sqrt{20}} \\ \frac{3}{\sqrt{20}} \\ \frac{4}{\sqrt{20}} \end{bmatrix};$$

if the $V_b$ part is $$\begin{bmatrix} \frac{1}{\sqrt{20}} \\ \frac{2}{\sqrt{20}} e^{4j\frac{2\pi}{32}} \\ \frac{3}{\sqrt{20}} e^{8j\frac{2\pi}{32}} \\ \frac{4}{\sqrt{20}} e^{12j\frac{2\pi}{32}} \end{bmatrix},$$

the amplitude vector in the $V_b$ is:

$$\begin{bmatrix} \frac{1}{\sqrt{20}} \\ \frac{2}{\sqrt{20}} \\ \frac{3}{\sqrt{20}} \\ \frac{4}{\sqrt{20}} \end{bmatrix}.$$

Figure 7:
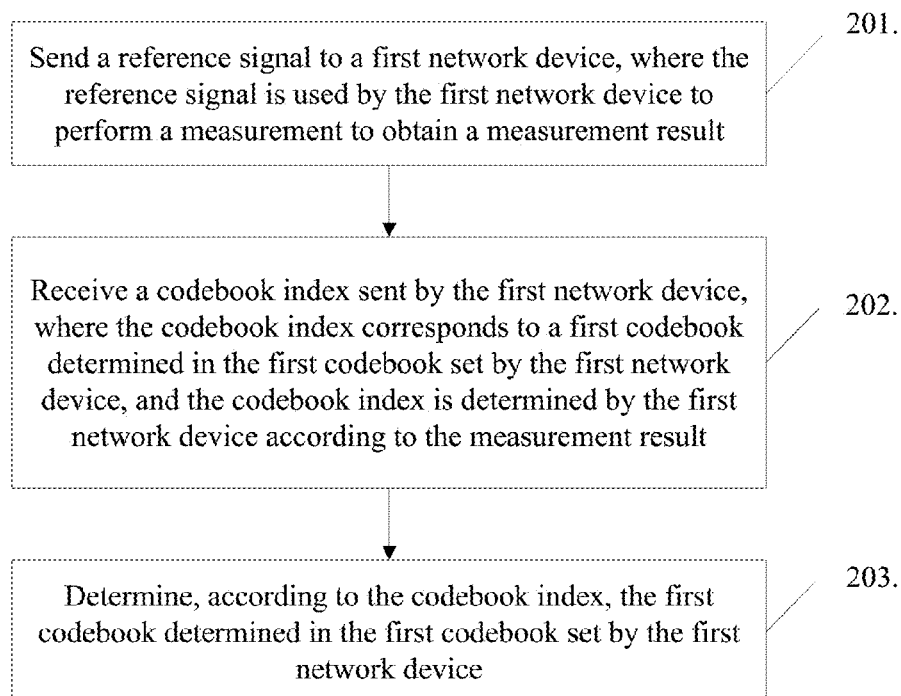
FIG. 7 is a flowchart for implementing a method for measuring and feeding back channel information by a second network device according to the present invention.

FIG. 7 shows a flowchart of a method embodiment according to the present invention, which is specifically as follows:

Step 201: Send a reference signal to a first network device, where the reference signal is used by the first network device to perform a measurement to obtain a measurement result.

Step 202: Receive a codebook index sent by the first network device, where the codebook index corresponds to a first codebook determined in the first codebook set by the first network device, and the codebook index is determined by the first network device according to the measurement result.

Step 203: Determine, according to the codebook index, the first codebook determined in the first codebook set by the first network device.

The first codebook set includes at least two first codebooks. A sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x$ (1) and $W_x$ (2), a location of a non-zero vector in the $W_x$ (1) is the same as a location of a non-zero vector in the $W_x$ (2); and formation according to different structures is: for different sub-vectors $W_x$ (1) and $W_x$ (2), a location of a non-zero vector in the $W_x$ (1) is different from a location of a non-zero vector in the $W_x$ (2).

It should be understood that, in the present invention, a zero vector may be a zero element with a length of 1, and a non-zero vector may be a non-zero element with a length of 1 Generally, for a passive antenna, a downtilt in a vertical direction is fixed. Therefore, for multiple spatially multiplexed data streams, adjustments can be made to multiple horizontal beams only in a plane with a fixed downtilt in the vertical direction, and the multiple data streams cannot be multiplexed more freely in planes with multiple downtilts. In addition, if antenna ports are grouped according to different downtilts, a codebook structure provided by the present invention may be configured independently according to transmit power of different groups of antenna ports, so that flexibility and MIMO performance are improved.

In an embodiment of the present invention, when antenna ports are grouped according to tilts in the vertical direction, parameters of codebook vectors in a codebook may be configured independently according to different tilts, so that an objective of flexibly adapting to data transmission efficiency is achieved. In this embodiment, two tilts in the vertical direction are used as an example (this method is also applicable to more than two tilts). In each column in the first codebook, one group of antenna ports corresponds to a non-zero vector, and another group of antenna ports corresponds to a zero vector; or one group of antenna ports corresponds to a zero vector, and another group of antenna ports corresponds to a non-zero vector, where the non-zero vector refers to a vector in which at least one element is a non-zero element, and the zero vector refers to a vector in which all elements are zero elements. In the present invention, when first n1 elements in a vector included in a codebook correspond to one group of antenna ports, and last n2 elements correspond to another group of antenna ports, a structure of this vector is $$\begin{bmatrix} V_1 \\ V_2 \end{bmatrix},$$

where $V_1$ is n1-dimensional, and $V_2$ is n2-dimensional. In this case, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; 0 in $$\begin{bmatrix} V_a \\ 0 \end{bmatrix}$$

represents an n2-dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and 0 in $$\begin{bmatrix} 0 \\ V_b \end{bmatrix}$$

represents an n1-dimensional zero vector and corresponds to the first group of antenna ports. It should be understood that, the present invention is not limited to the case of grouping into only two groups. In an actual application, antenna ports are grouped into more groups according to other factors such as different downtilts or signal quality or the like. In a specific measurement process, codebooks in the first codebook set are traversed, so that a first codebook that best matches a transmission characteristic is determined and used for channel transmission.

It should be understood that, the structure of the sub-vector in the first codebook may be but is not limited to the foregoing first structure or the second structure. Optionally, locations of sub-vectors of the zero vector and the non-zero vector in the first codebook may be different. In an embodiment of the present invention, in a case of four antenna ports, elements in vectors in the first sub-vector $$\begin{bmatrix} V_a \\ 0 \end{bmatrix}$$

having the first structure are represented as $$\begin{bmatrix} V_a^0 \\ V_a^1 \\ 0 \\ 0 \end{bmatrix},$$

and elements in vectors in the second sub-vector $$\begin{bmatrix} 0 \\ V_b \end{bmatrix}$$

having the second structure are represented as $$\begin{bmatrix} 0 \\ 0 \\ V_b^0 \\ V_b^1 \end{bmatrix},$$

where $V_a^0$ and $V_a^1$ are elements in the vector $V_a$, and $V_b^0$ and $V_b^1$ are elements in the vector $V_b$. In another embodiment of the present invention, when the antenna ports are grouped into two groups, the first structure may be $$\begin{bmatrix} V_a^0 \\ 0 \\ V_a^1 \\ 0 \end{bmatrix},$$

and the second structure may be $$\begin{bmatrix} 0 \\ V_b^0 \\ 0 \\ V_b^1 \end{bmatrix}.$$

Likewise, when the antenna groups are grouped into two groups, in another embodiment of the present invention, the first structure may be $$\begin{bmatrix} V_a^0 \\ 0 \\ 0 \\ V_a^1 \end{bmatrix},$$

and the second structure may be $$\begin{bmatrix} 0 \\ V_b^0 \\ V_b^1 \\ 0 \end{bmatrix}.$$

Alternatively, the first codebook set includes at least one of the following four structures: a first structure $$\begin{bmatrix} V_a^0 \\ 0 \\ V_a^1 \\ 0 \end{bmatrix},$$

a second structure $$\begin{bmatrix} 0 \\ V_b^0 \\ 0 \\ V_b^1 \end{bmatrix},$$

a third structure $$\begin{bmatrix} V_a^0 \\ 0 \\ 0 \\ V_a^1 \end{bmatrix},$$

or a fourth structure $$\begin{bmatrix} 0 \\ V_b^0 \\ V_b^1 \\ 0 \end{bmatrix}.$$

$V_a^0$ and $V_a^1$ are elements in the vector $V_a$, and Va corresponds to one group of antenna ports. A correspondence is as follows: In the first structure, $V_a^0$ corresponds to a first antenna port, and $V_a^1$ corresponds to a third antenna port; in the second structure, $V_b^0$ corresponds to a second antenna port, and $V_b^1$ corresponds to a fourth antenna port; in the third structure, $V_a^0$ corresponds to the first antenna port, and $V_a^1$ corresponds to the fourth antenna port; in the fourth structure, $V_b^0$ corresponds to the second antenna port, and $V_b^1$ corresponds to the third antenna port, where $V_a^0$ and $V_a^1$ are elements in the vector $V_a$, and $V_b^0$ and $V_b^1$ are elements in the vector $V_b$.

When the antenna ports are grouped into three groups, the first codebook set includes at least one of a first structure $$\begin{bmatrix} V_a \\ 0 \\ 0 \end{bmatrix},$$

a second structure $$\begin{bmatrix} 0 \\ V_b \\ 0 \end{bmatrix},$$

a third structure $$\begin{bmatrix} 0 \\ 0 \\ V_c \end{bmatrix},$$

a fourth structure $$\begin{bmatrix} V_a \\ 0 \\ V_c \end{bmatrix},$$

a fifth structure $$\begin{bmatrix} V_a \\ V_b \\ 0 \end{bmatrix},$$

or a sixth structure $$\begin{bmatrix} 0 \\ V_b \\ V_c \end{bmatrix}.$$

Vectors $V_a$, $V_b$, and $V_c$ each correspond to one group of antenna ports.

In an embodiment of the present invention, the present invention provides a combination of the first structure and the second structure corresponding to a value of the rank indicator.

Generally, an element in a non-zero vector included in the first codebook is in a form of a complex number. For a complex number $\alpha \cdot e^\beta$, $\alpha$ is referred to as an amplitude part, and is a real number, and $e^\beta$ is referred to as a phase part. In still another embodiment of the present invention, at least one first codebook meets a first condition. The present invention provides several definitions of the first condition that can be implemented. In the present invention, unless otherwise limited, P, Q, and K are any positive integers.

First definition of the first condition:

A vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_n\}$ form the first phase vector, and a phase part of a $K^{th}$ element in each sub-vector of the $\{V_m\}$ is a $K^{th}$ element of each corresponding first phase vector, where P, Q, and K are any positive integers.

A general expression of the discrete Fourier transform matrix DFT matrix is:

$$M_{dft} = \frac{1}{\sqrt{N}} \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix}.$$

The phase matrix of the DFT matrix is:

$$M_{dft\_phase} = \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix}.$$

A value of N is an order in a case in which the DFT matrix is a square matrix. For example, in $$\begin{bmatrix} V_a \\ 0 \end{bmatrix},$$

if $V_a$ is four-dimensional, the order of the phase matrix of the DFT matrix is 4. In an embodiment, a value of $\omega$ may be $$\omega = e^{j\frac{2\pi}{N}}:$$

$$M_{dft\_phase\_4} = \begin{bmatrix} 1 & 1 & 1 & 1 \\ 1 & \omega & \omega^2 & \omega^3 \\ 1 & \omega^2 & \omega^4 & \omega^6 \\ 1 & \omega^3 & \omega^6 & \omega^9 \end{bmatrix}.$$

For example, when the value of $\omega$ is $$e^{j\frac{2\pi}{32}},$$

a form of a fourth-order DFT matrix $$M_{dft\_phase\_4\_e^{j\frac{2\pi}{32}}}$$

is:

$$M_{dft\_phase\_4\_e^{j\frac{2\pi}{32}}} = \begin{bmatrix} 1 & 1 & 1 & 1 \\ 1 & e^{j\frac{2\pi}{32}} & e^{2j\frac{2\pi}{32}} & e^{3j\frac{2\pi}{32}} \\ 1 & e^{2j\frac{2\pi}{32}} & e^{4j\frac{2\pi}{32}} & e^{6j\frac{2\pi}{32}} \\ 1 & e^{3j\frac{2\pi}{32}} & e^{6j\frac{2\pi}{32}} & e^{9j\frac{2\pi}{32}} \end{bmatrix}.$$

Correspondingly, the set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix} \right\}.$$

It should be understood that, in the present invention, the phase matrix of the DFT matrix is not necessarily a square matrix. More columns or rows may be selected according to an order. For example, the matrix may be:

$$M'_{dft\_phase\_4\_e^{j\frac{2\pi}{32}}} = \begin{bmatrix} 1 & 1 & 1 & 1 & 1 \\ 1 & e^{j\frac{2\pi}{32}} & e^{2j\frac{2\pi}{32}} & e^{3j\frac{2\pi}{32}} & e^{4j\frac{2\pi}{32}} \\ 1 & e^{2j\frac{2\pi}{32}} & e^{4j\frac{2\pi}{32}} & e^{6j\frac{2\pi}{32}} & e^{8j\frac{2\pi}{32}} \\ 1 & e^{3j\frac{2\pi}{32}} & e^{6j\frac{2\pi}{32}} & e^{9j\frac{2\pi}{32}} & e^{12j\frac{2\pi}{32}} \end{bmatrix}.$$

The set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix}, \begin{bmatrix} 1 \\ e^{4j\frac{2\pi}{32}} \\ e^{8j\frac{2\pi}{32}} \\ e^{12j\frac{2\pi}{32}} \end{bmatrix} \right\}.$$

It should be understood that, a quantity of rows or a quantity of columns selected from the DFT matrix is not limited in the present invention. It should be understood that, the quantity of rows should be at least the same as a value of $V_a$, and the quantity of columns should be at least the same as a quantity of first vectors in a codebook.

Second definition of the first condition:

A vector set formed by all second phase vectors and at least one CMP codebook in a CMP codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers, and the CMP codebook refers to a codebook in which only one layer in layers corresponding to each port is a non-zero element.

In all CMP codebooks, CMP codebooks in which column vectors are two-dimensional are:

TABLE 1

| Codebook index | Quantity of layers | |
|---|---|---|
| | $\upsilon = 1$ | $\upsilon = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

CMP codebooks in which column vectors are four-dimensional and a quantity of layers is 1 are:

TABLE 2

| Codebook index | Quantity of layers |
|---|---|
| | $\upsilon = 1$ |
| 0-7 | $\frac{1}{2}\begin{bmatrix}1\\1\\1\\-1\end{bmatrix} \frac{1}{2}\begin{bmatrix}1\\1\\j\\j\end{bmatrix} \frac{1}{2}\begin{bmatrix}1\\1\\-1\\1\end{bmatrix} \frac{1}{2}\begin{bmatrix}1\\1\\-j\\-j\end{bmatrix} \frac{1}{2}\begin{bmatrix}1\\j\\1\\j\end{bmatrix} \frac{1}{2}\begin{bmatrix}1\\j\\j\\1\end{bmatrix} \frac{1}{2}\begin{bmatrix}1\\j\\-1\\-j\end{bmatrix} \frac{1}{2}\begin{bmatrix}1\\j\\-j\\-1\end{bmatrix}$ |

TABLE 2-continued

| Codebook index | Quantity of layers $\upsilon = 1$ |
|---|---|
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

CMP codebook in which column vectors are four-dimensional and a quantity of layer is 2 are:

TABLE 3

| Codebook index | Quantity of layers $\upsilon = 2$ |
|---|---|
| 0-3 | $\frac{1}{2}\begin{bmatrix}1 & 0\\1 & 0\\0 & 1\\0 & -j\end{bmatrix}$ $\frac{1}{2}\begin{bmatrix}1 & 0\\1 & 0\\0 & 1\\0 & j\end{bmatrix}$ $\frac{1}{2}\begin{bmatrix}1 & 0\\-j & 0\\0 & 1\\0 & 1\end{bmatrix}$ $\frac{1}{2}\begin{bmatrix}1 & 0\\-j & 0\\0 & 1\\0 & -1\end{bmatrix}$ |
| 4-7 | $\frac{1}{2}\begin{bmatrix}1 & 0\\-1 & 0\\0 & 1\\0 & -j\end{bmatrix}$ $\frac{1}{2}\begin{bmatrix}1 & 0\\-1 & 0\\0 & 1\\0 & j\end{bmatrix}$ $\frac{1}{2}\begin{bmatrix}1 & 0\\j & 0\\0 & 1\\0 & 1\end{bmatrix}$ $\frac{1}{2}\begin{bmatrix}1 & 0\\j & 0\\0 & 1\\0 & -1\end{bmatrix}$ |
| 8-11 | $\frac{1}{2}\begin{bmatrix}1 & 0\\0 & 1\\1 & 0\\0 & 1\end{bmatrix}$ $\frac{1}{2}\begin{bmatrix}1 & 0\\0 & 1\\1 & 0\\0 & -1\end{bmatrix}$ $\frac{1}{2}\begin{bmatrix}1 & 0\\0 & 1\\-1 & 0\\0 & 1\end{bmatrix}$ $\frac{1}{2}\begin{bmatrix}1 & 0\\0 & 1\\-1 & 0\\0 & -1\end{bmatrix}$ |
| 12-15 | $\frac{1}{2}\begin{bmatrix}1 & 0\\0 & 1\\0 & 1\\1 & 0\end{bmatrix}$ $\frac{1}{2}\begin{bmatrix}1 & 0\\0 & 1\\0 & -1\\1 & 0\end{bmatrix}$ $\frac{1}{2}\begin{bmatrix}1 & 0\\0 & 1\\0 & 1\\-1 & 0\end{bmatrix}$ $\frac{1}{2}\begin{bmatrix}1 & 0\\0 & 1\\0 & -1\\-1 & 0\end{bmatrix}$ |

For example, when the index in Table 3 is 0, the subset of the set of corresponding column vectors in the phase matrix of the corresponding CMP codebook matrix is:

$$\left\{ \begin{bmatrix} e^0 \\ e^0 \\ 0 \\ 0 \end{bmatrix}, \begin{bmatrix} 0 \\ 0 \\ e^0 \\ e^{-j\frac{\pi}{2}} \end{bmatrix} \right\}.$$

CMP codebooks in which column vectors are four-dimensional and a quantity of layers is 3 are:

TABLE 4

| Codebook index | Quantity of layers $\upsilon = 3$ |
|---|---|
| 0-3 | $\frac{1}{2}\begin{bmatrix}1 & 0 & 0\\1 & 0 & 0\\0 & 1 & 0\\0 & 0 & 1\end{bmatrix}$ $\frac{1}{2}\begin{bmatrix}1 & 0 & 0\\-1 & 0 & 0\\0 & 1 & 0\\0 & 0 & 1\end{bmatrix}$ $\frac{1}{2}\begin{bmatrix}1 & 0 & 0\\0 & 1 & 0\\1 & 0 & 0\\0 & 0 & 1\end{bmatrix}$ $\frac{1}{2}\begin{bmatrix}1 & 0 & 0\\0 & 1 & 0\\-1 & 0 & 0\\0 & 0 & 1\end{bmatrix}$ |
| 4-7 | $\frac{1}{2}\begin{bmatrix}1 & 0 & 0\\0 & 1 & 0\\0 & 0 & 1\\1 & 0 & 0\end{bmatrix}$ $\frac{1}{2}\begin{bmatrix}1 & 0 & 0\\0 & 1 & 0\\0 & 0 & 1\\-1 & 0 & 0\end{bmatrix}$ $\frac{1}{2}\begin{bmatrix}0 & 1 & 0\\1 & 0 & 0\\1 & 0 & 0\\0 & 0 & 1\end{bmatrix}$ $\frac{1}{2}\begin{bmatrix}0 & 1 & 0\\1 & 0 & 0\\-1 & 0 & 0\\0 & 0 & 1\end{bmatrix}$ |
| 8-11 | $\frac{1}{2}\begin{bmatrix}0 & 1 & 0\\1 & 0 & 0\\0 & 0 & 1\\1 & 0 & 0\end{bmatrix}$ $\frac{1}{2}\begin{bmatrix}0 & 1 & 0\\1 & 0 & 0\\0 & 0 & 1\\-1 & 0 & 0\end{bmatrix}$ $\frac{1}{2}\begin{bmatrix}0 & 1 & 0\\0 & 0 & 1\\1 & 0 & 0\\1 & 0 & 0\end{bmatrix}$ $\frac{1}{2}\begin{bmatrix}0 & 1 & 0\\0 & 0 & 1\\1 & 0 & 0\\-1 & 0 & 0\end{bmatrix}$ |

CMP codebooks in which column vectors are four-dimensional and a quantity of layers is 4 are:

TABLE 5

| Codebook index | Quantity of layers $v = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Third definition of the first condition:

A vector set formed by all third phase vectors is a subset of a set formed by corresponding sub-vectors in a householder transform codebook, where a householder transform expression is $W_n = I - u_n u_n^H / u_n^H u_n$.

$V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

For example, the third phase vectors are a subset of a set formed by phase parts of $W_{index}^{\{\alpha_i\}}$ in a matrix corresponding to different quantities of layers and different codebook indexes in Table 6. The index corresponds to different codebook indexes. $\{\alpha_i\}$ corresponds to an integer set, and is used to indicate that different columns in $W_{index}^{\{\alpha_i\}}$ are selected as third phase vectors. In Table 6, $U_n$ is a corresponding $U_n$ in the householder transform, and I is a unit matrix.

It should be understood that, in the present invention, a value of the $V_a$ is not limited only to cases or relationships shown in the first definition of the first condition, the second definition of the first condition, and the third definition of the first condition. The codebook may further be a codebook defined for two antennas, four antennas, or eight antennas in LTE.

In still another embodiment of the present invention, at least one first codebook meets a second condition. The present invention provides several definitions of the second condition that can be implemented.

First definition of the second condition:

A vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector.

Second definition of the second condition:

A vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers.

TABLE 6

| Codebook index | $u_n$ | Quantity of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Third definition of the second condition:

A vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

It should be understood that, in the present invention, a value of the $V_b$ is not limited only to cases or relationships shown in the first definition of the second condition, the second definition of the second condition, and the third definition of the second condition. The present invention requests to protect correspondences according to the second condition: a relationship between the fourth phase vectors and different DFT matrices formed by different parameters, a relationship between the fifth phase vectors and the CMP codebook set, and a relationship between the sixth phase vectors and the householder codebook formed by different original vectors through householder transforms.

It should be understood that, due to independence, in one codebook, when the first codebook meets any definition of the first condition, a second codebook may meet any definition of the second condition. For example, in the first codebook, that the vector set formed by the first phase vectors is the subset of the set of corresponding column vectors in the phase matrix of the DFT matrix is met; in the second codebook, that the vector set formed by the fifth phase vectors is the subset of the set of corresponding column vectors in the phase matrix of the CMP codebook matrix, or any combination thereof is met.

In still another embodiment of the present invention, at least one first codebook meets a third condition.

In all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$. $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vectors $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector. In this embodiment, in a sub-vector included in each first codebook, an amplitude part of each element corresponds to power of an antenna port. In this embodiment, in a sub-vector included in each first codebook, amplitude vectors of each group of antenna ports are determined independently according to tilt characteristics of this group of antenna ports (tilts may be classified into electrical tilts and mechanical tilts; an electrical tilt means that weighted vectors of multiple antenna elements corresponding to one antenna port make the multiple antenna elements form a beam pointing to a tilt). For example, all tilts of the first group of antenna ports are 12 degrees, and all tilts of the second group of antenna ports are 3 degrees; it is assumed that a horizontal plane is 0 degrees and that those downward are positive tilts. In this case, energies received from the two groups of antenna ports by the first network device in a location are different. Therefore, independent control may be performed on amplitudes of codebooks of the two groups of antenna ports, so that reception performance is optimized.

Optionally, in step 202, the first codebook set is obtained before the first codebook is selected. In an embodiment of the present invention, the first codebook set may be pre-stored in the first network device, or delivered to the first network device by a second network device or another apparatus.

Optionally, at least one first configuration message is sent to the first network device, where each first configuration message is used to determine a sub-vector set of phase parts corresponding to one group of antenna ports, and a quantity of the at least one first configuration message is equal to a quantity of groups of the antenna ports; and/or at least one second configuration message is sent to the first network device, where each second configuration message is used to determine a sub-vector set of amplitude parts corresponding to one group of antenna ports, and a quantity of the at least one second configuration message is equal to a quantity of groups of the antenna ports. The reference signal is further used to indicate the first configuration message; and/or the reference signal is further used to indicate the second configuration message, so that the first network device acquires the first configuration message and or the second configuration message according to the reference signal.

In an embodiment, the first configuration message is configured by the second network device by using higher layer signaling or dynamic signaling; and/or the second configuration message is configured by the second network device by using higher layer signaling or dynamic signaling.

In an embodiment, the present invention provides possible cases of a codebook set having the first structure and the second structure. It should be understood that, the first codebook that the present invention requests to protect may be but is not limited to the following structures:

1. the first codebook is one of the following matrices:

$$\begin{bmatrix} V_a(i) \\ 0 \end{bmatrix} \text{ or } \begin{bmatrix} 0 \\ V_b(i') \end{bmatrix},$$

where a value of a rank indicator is 1, a non-zero sub-vector represented by $V_a(x)$ is a sub-vector in the first vector set $\{V_m\}$ and has a sequence number x, a non-zero sub-vector represented by $V_b(y)$ is a sub-vector in the first vector set $\{V_n\}$ and has a sequence number y, $0 < i \leq N_1$, and $0 < i' \leq N_1$, where $N_1$ represents a quantity of sub-vectors in the $\{V_m\}$, and $N_1'$ represents a quantity of sub-vectors in the $\{V_n\}$; or 2. the first codebook is one of the following matrices:

$$\begin{bmatrix} V_a(i) & V_a(j) \\ 0 & 0 \end{bmatrix}, \begin{bmatrix} V_a(i) & 0 \\ 0 & V_b(i') \end{bmatrix}, \begin{bmatrix} 0 & V_a(i) \\ V_b(i') & 0 \end{bmatrix}, \text{ or } \begin{bmatrix} 0 & 0 \\ V_b(i') & V_b(j') \end{bmatrix},$$

where a value of a rank indicator is 2, $0<i \le N_1$, $0<i' \le N_1'$, $0<j \le N_1$, and $0<j' \le N_1'$; or 3. the first codebook is one of the following matrices:

$$\begin{bmatrix} V_a(i) & V_a(j) & V_a(k) \\ 0 & 0 & 0 \end{bmatrix}, \begin{bmatrix} V_a(i) & V_a(j) & 0 \\ 0 & 0 & V_b(i') \end{bmatrix}, \begin{bmatrix} V_a(i) & 0 & V_a(j) \\ 0 & V_b(i') & 0 \end{bmatrix},$$

$$\begin{bmatrix} V_a(i) & 0 & 0 \\ 0 & V_b(i') & V_b(j') \end{bmatrix}, \begin{bmatrix} 0 & V_a(i) & 0 \\ V_b(i') & 0 & V_b(j') \end{bmatrix}, \begin{bmatrix} 0 & V_a(i) & V_a(j) \\ V_b(i') & 0 & 0 \end{bmatrix},$$

$$\begin{bmatrix} 0 & 0 & V_a(i) \\ V_b(i') & V_b(j') & 0 \end{bmatrix}, \text{ or } \begin{bmatrix} 0 & 0 & 0 \\ V_b(i') & V_b(j') & V_b(k') \end{bmatrix},$$

where a value of a rank indicator is 3, $0<i \le N_1$, $0<i' \le N_1'$, $0<j \le N_1$, $0<j' \le N_1'$, $0<k \le N_1$, and $0<k' \le N_1'$; or 4. the first codebook is one of the following matrices:

$$\begin{bmatrix} V_a(i) & V_a(j) & V_a(k) & V_a(l) \\ 0 & 0 & 0 & 0 \end{bmatrix}, \begin{bmatrix} V_a(i) & V_a(j) & V_a(k) & 0 \\ 0 & 0 & 0 & V_b(i') \end{bmatrix},$$

$$\begin{bmatrix} V_a(i) & V_a(j) & 0 & V_a(k) \\ 0 & 0 & V_b(i') & 0 \end{bmatrix}, \begin{bmatrix} V_a(i) & V_a(j) & 0 & 0 \\ 0 & 0 & V_b(i') & V_b(j') \end{bmatrix},$$

$$\begin{bmatrix} V_a(i) & 0 & V_a(j) & V_a(k) \\ 0 & V_b(i') & 0 & 0 \end{bmatrix}, \begin{bmatrix} V_a(i) & 0 & V_a(j) & 0 \\ 0 & V_b(i') & 0 & V_b(j') \end{bmatrix},$$

$$\begin{bmatrix} V_a(i) & 0 & 0 & V_a(j) \\ 0 & V_b(i') & V_b(j') & 0 \end{bmatrix}, \begin{bmatrix} V_a(i) & 0 & 0 & 0 \\ 0 & V_b(i') & V_b(j') & V_b(k') \end{bmatrix},$$

$$\begin{bmatrix} 0 & V_a(i) & V_a(j) & V_a(k) \\ V_b(i') & 0 & 0 & 0 \end{bmatrix}, \begin{bmatrix} 0 & V_a(i) & V_a(j) & 0 \\ V_b(i') & 0 & 0 & V_b(j') \end{bmatrix},$$

$$\begin{bmatrix} 0 & V_a(i) & 0 & V_a(j) \\ V_b(i') & 0 & V_b(j') & 0 \end{bmatrix}, \begin{bmatrix} 0 & V_a(i) & 0 & 0 \\ V_b(i') & 0 & V_b(j') & V_b(k') \end{bmatrix},$$

$$\begin{bmatrix} 0 & 0 & V_a(i) & V_a(j) \\ V_b(i') & V_b(j') & 0 & 0 \end{bmatrix}, \begin{bmatrix} 0 & 0 & V_a(i) & 0 \\ V_b(i') & V_b(j') & 0 & V_b(k') \end{bmatrix},$$

$$\begin{bmatrix} 0 & 0 & 0 & V_a(i) \\ V_b(i') & V_b(j') & V_b(k') & 0 \end{bmatrix}, \text{ or } \begin{bmatrix} 0 & 0 & 0 & 0 \\ V_b(i') & V_b(j') & V_b(k') & V_b(l') \end{bmatrix},$$

where a value of a rank indicator is 4, $0<i \le N_1$, $0<i' \le N_1'$, $0<j \le N_1$, $0<j' \le N_1'$, $0<k \le N_1$, $0<k' \le N_1'$, $0<l \le N_1$, and $0<l' \le N_1'$; or 5. the first codebook is one of the following matrices:

$$\begin{bmatrix} V_a(i) & V_a(j) & V_a(k) & V_a(l) & V_a(m) \\ 0 & 0 & 0 & 0 & 0 \end{bmatrix},$$

$$\begin{bmatrix} V_a(i) & V_a(j) & V_a(k) & 0 & V_a(l) \\ 0 & 0 & 0 & V_b(i') & 0 \end{bmatrix},$$

$$\begin{bmatrix} V_a(i) & V_a(j) & 0 & V_a(k) & V_a(l) \\ 0 & 0 & V_b(i') & 0 & 0 \end{bmatrix},$$

$$\begin{bmatrix} V_a(i) & V_a(j) & 0 & 0 & V_a(k) \\ 0 & 0 & V_b(i') & V_b(j') & 0 \end{bmatrix},$$

-continued $$\begin{bmatrix} V_a(i) & 0 & V_a(j) & V_a(k) & V_a(l) \\ 0 & V_b(i') & 0 & 0 & 0 \end{bmatrix},$$

$$\begin{bmatrix} V_a(i) & 0 & V_a(j) & 0 & V_a(l) \\ 0 & V_b(i') & 0 & V_b(j') & 0 \end{bmatrix},$$

$$\begin{bmatrix} V_a(i) & 0 & 0 & V_a(j) & V_a(k) \\ 0 & V_b(i') & V_b(j') & 0 & 0 \end{bmatrix},$$

$$\begin{bmatrix} V_a(i) & 0 & 0 & 0 & V_a(j) \\ 0 & V_b(i') & V_b(j') & V_b(k') & 0 \end{bmatrix},$$

$$\begin{bmatrix} 0 & V_a(i) & V_a(j) & V_a(k) & V_a(l) \\ V_b(i') & 0 & 0 & 0 & 0 \end{bmatrix},$$

$$\begin{bmatrix} 0 & V_a(i) & V_a(j) & 0 & V_a(k) \\ V_b(i') & 0 & 0 & V_b(j') & 0 \end{bmatrix},$$

$$\begin{bmatrix} 0 & V_a(i) & 0 & V_a(j) & V_a(k) \\ V_b(i') & 0 & V_b(j') & 0 & 0 \end{bmatrix},$$

$$\begin{bmatrix} 0 & V_a(i) & 0 & 0 & V_a(j) \\ V_b(i') & 0 & V_b(j') & V_b(k') & 0 \end{bmatrix},$$

$$\begin{bmatrix} 0 & 0 & V_a(i) & V_a(j) & V_a(k) \\ V_b(i') & V_b(j') & 0 & 0 & 0 \end{bmatrix},$$

$$\begin{bmatrix} 0 & 0 & V_a(i) & 0 & V_a(j) \\ V_b(i') & V_b(j') & 0 & V_b(k') & 0 \end{bmatrix},$$

$$\begin{bmatrix} 0 & 0 & 0 & V_a(1) & V_a(j) \\ V_b(i') & V_b(j') & V_b(k') & 0 & 0 \end{bmatrix},$$

$$\begin{bmatrix} 0 & 0 & 0 & 0 & V_a(1) \\ V_b(i') & V_b(j') & V_b(k') & V_b(l') & 0 \end{bmatrix},$$

$$\begin{bmatrix} V_a(i) & V_a(j) & V_a(k) & V_a(4) & 0 \\ 0 & 0 & 0 & 0 & V_b(i') \end{bmatrix},$$

$$\begin{bmatrix} V_a(i) & V_a(j) & V_a(k) & 0 & 0 \\ 0 & 0 & 0 & V_b(i') & V_b(j') \end{bmatrix},$$

$$\begin{bmatrix} V_a(i) & V_a(j) & 0 & V_a(k) & 0 \\ 0 & 0 & V_b(i') & 0 & V_b(j') \end{bmatrix},$$

$$\begin{bmatrix} V_a(i) & V_a(j) & 0 & 0 & 0 \\ 0 & 0 & V_b(i') & V_b(j') & V_b(k') \end{bmatrix},$$

$$\begin{bmatrix} V_a(i) & 0 & V_a(j) & V_a(k) & 0 \\ 0 & V_b(i') & 0 & 0 & V_b(j') \end{bmatrix},$$

$$\begin{bmatrix} V_a(i) & 0 & V_a(j) & 0 & 0 \\ 0 & V_b(i') & 0 & V_b(j') & V_b(k') \end{bmatrix},$$

$$\begin{bmatrix} V_a(i) & 0 & 0 & V_a(j) & 0 \\ 0 & V_b(i') & V_b(j') & 0 & V_b(k') \end{bmatrix},$$

$$\begin{bmatrix} V_a(i) & 0 & 0 & V_a(j) & 0 \\ 0 & V_b(i') & 0 & V_b(j') & V_b(k') \end{bmatrix},$$

$$\begin{bmatrix} V_a(i) & 0 & 0 & 0 & 0 \\ 0 & V_b(i') & V_b(j') & V_b(k') & V_b(l') \end{bmatrix},$$

$$\begin{bmatrix} 0 & V_a(i) & V_a(j) & V_a(k) & 0 \\ V_b(i') & 0 & 0 & 0 & V_b(j') \end{bmatrix},$$

$$\begin{bmatrix} 0 & V_a(i) & V_a(j) & 0 & 0 \\ V_b(i') & 0 & 0 & V_b(j') & V_b(k') \end{bmatrix},$$

$$\begin{bmatrix} 0 & V_a(i) & V_a(j) & 0 & 0 \\ V_b(i') & 0 & V_b(j') & 0 & V_b(k') \end{bmatrix},$$

-continued $$\begin{bmatrix} 0 & V_a(i) & 0 & 0 & 0 \\ V_b(i') & 0 & V_b(j') & V_b(k') & V_b(l') \end{bmatrix},$$

$$\begin{bmatrix} 0 & 0 & V_a(i) & V_a(j) & 0 \\ V_b(i') & V_b(j') & 0 & 0 & V_b(k') \end{bmatrix},$$

$$\begin{bmatrix} 0 & 0 & V_a(i) & 0 & 0 \\ V_b(i') & V_b(j') & 0 & V_b(k') & V_b(l') \end{bmatrix},$$

$$\begin{bmatrix} 0 & 0 & 0 & V_a(1) & 0 \\ V_b(i') & V_b(j') & V_b(k') & 0 & V_b(l) \end{bmatrix}, \text{ or}$$

$$\begin{bmatrix} 0 & 0 & 0 & 0 & 0 \\ V_b(i') & V_b(j') & V_b(k') & V_b(l') & V_b(m') \end{bmatrix},$$

where a value of a rank indicator is 5, $0<i\leq N_1$, $0<i'\leq N_1$, $0<j\leq N_1$, $0<j'\leq N_1$, $0<k\leq N_1$, $0<k'\leq N_1$, $0<l\leq N_1$, $0<l'\leq N_1$, $0<m\leq N_1$, and $0<m'\leq N_1$; or 6. the first codebook is one of the following matrices:

$$\begin{bmatrix} V_a(i) & V_a(j) & V_a(k) & V_a(l) & V_a(m) & V_a(n) \\ 0 & 0 & 0 & 0 & 0 & 0 \end{bmatrix},$$

$$\begin{bmatrix} V_a(i) & V_a(j) & V_a(k) & 0 & V_a(l) & V_a(m) \\ 0 & 0 & 0 & V_b(i') & 0 & 0 \end{bmatrix},$$

$$\begin{bmatrix} V_a(i) & V_a(j) & 0 & V_a(k) & V_a(l) & V_a(m) \\ 0 & 0 & V_b(i') & 0 & 0 & 0 \end{bmatrix},$$

$$\begin{bmatrix} V_a(i) & V_a(j) & 0 & 0 & V_a(k) & V_a(l) \\ 0 & 0 & V_b(i') & V_b(j') & 0 & 0 \end{bmatrix},$$

$$\begin{bmatrix} V_a(i) & 0 & V_a(j) & V_a(k) & V_a(l) & V_a(m) \\ 0 & V_b(i') & 0 & 0 & 0 & 0 \end{bmatrix},$$

$$\begin{bmatrix} V_a(i) & 0 & V_a(j) & 0 & V_a(k) & V_a(l) \\ 0 & V_b(i') & 0 & V_b(j') & 0 & 0 \end{bmatrix},$$

$$\begin{bmatrix} V_a(i) & 0 & 0 & V_a(j) & V_a(k) & V_a(l) \\ 0 & V_b(i') & V_b(j') & 0 & 0 & 0 \end{bmatrix},$$

$$\begin{bmatrix} V_a(i) & 0 & 0 & 0 & V_a(j) & V_a(k) \\ 0 & V_b(i') & V_b(j') & V_b(k') & 0 & 0 \end{bmatrix},$$

$$\begin{bmatrix} 0 & V_a(i) & V_a(j) & V_a(k) & V_a(l) & V_a(m) \\ V_b(i') & 0 & 0 & 0 & 0 & 0 \end{bmatrix},$$

$$\begin{bmatrix} 0 & V_a(i) & V_a(j) & 0 & V_a(k) & V_a(l) \\ V_b(i') & 0 & 0 & V_b(j') & 0 & 0 \end{bmatrix},$$

$$\begin{bmatrix} 0 & V_a(i) & 0 & V_a(j) & V_a(k) & V_a(l) \\ V_b(i') & 0 & V_b(j') & 0 & 0 & 0 \end{bmatrix},$$

$$\begin{bmatrix} 0 & V_a(i) & 0 & 0 & V_a(j) & V_a(k) \\ V_b(i') & 0 & V_b(j') & V_b(k') & 0 & 0 \end{bmatrix},$$

$$\begin{bmatrix} 0 & 0 & V_a(i) & V_a(j) & V_a(k) & V_a(l) \\ V_b(i') & V_b(j') & 0 & 0 & 0 & 0 \end{bmatrix},$$

$$\begin{bmatrix} 0 & 0 & V_a(i) & 0 & V_a(j) & V_a(k) \\ V_b(i') & V_b(j') & 0 & V_b(k') & 0 & 0 \end{bmatrix},$$

$$\begin{bmatrix} 0 & 0 & 0 & V_a(i) & V_a(j) & V_a(k) \\ V_b(i') & V_b(j') & V_b(k') & 0 & 0 & 0 \end{bmatrix},$$

$$\begin{bmatrix} 0 & 0 & 0 & 0 & V_a(i) & V_a(j) \\ V_b(i') & V_b(j') & V_b(k') & V_b(l') & 0 & 0 \end{bmatrix},$$

-continued $$\begin{bmatrix} V_a(i) & V_a(j) & V_a(k) & V_a(l) & 0 & V_a(5) \\ 0 & 0 & 0 & 0 & V_b(i') & 0 \end{bmatrix},$$

$$\begin{bmatrix} V_a(i) & V_a(j) & V_a(k) & 0 & 0 & V_a(l) \\ 0 & 0 & 0 & V_b(i') & V_b(j') & 0 \end{bmatrix},$$

$$\begin{bmatrix} V_a(i) & V_a(j) & 0 & V_a(k) & 0 & V_a(l) \\ 0 & 0 & V_b(i') & 0 & V_b(j') & 0 \end{bmatrix},$$

$$\begin{bmatrix} V_a(i) & V_a(j) & 0 & 0 & 0 & V_a(k) \\ 0 & 0 & V_b(i') & V_b(j') & V_b(k') & 0 \end{bmatrix},$$

$$\begin{bmatrix} V_a(i) & 0 & V_a(j) & V_a(k) & 0 & V_a(l) \\ 0 & V_b(i') & 0 & 0 & V_b(j') & 0 \end{bmatrix},$$

$$\begin{bmatrix} V_a(i) & 0 & V_a(j) & 0 & 0 & V_a(k) \\ 0 & V_b(i') & 0 & V_b(j') & V_b(k') & 0 \end{bmatrix},$$

$$\begin{bmatrix} V_a(i) & 0 & 0 & V_a(j) & 0 & V_a(k) \\ 0 & V_b(i') & V_b(j') & 0 & V_b(k') & 0 \end{bmatrix},$$

$$\begin{bmatrix} V_a(i) & 0 & 0 & 0 & 0 & V_a(j) \\ 0 & V_b(i') & V_b(j') & V_b(k') & V_b(l') & 0 \end{bmatrix},$$

$$\begin{bmatrix} 0 & V_a(i) & V_a(j) & V_a(k) & 0 & V_a(l) \\ V_b(i') & 0 & 0 & 0 & V_b(j') & 0 \end{bmatrix},$$

$$\begin{bmatrix} 0 & V_a(i) & V_a(j) & 0 & 0 & V_a(k) \\ V_b(i') & 0 & 0 & V_b(j') & V_b(k') & 0 \end{bmatrix},$$

$$\begin{bmatrix} 0 & V_a(i) & 0 & V_a(j) & 0 & V_a(k) \\ V_b(i') & 0 & V_b(j') & 0 & V_b(k') & 0 \end{bmatrix},$$

$$\begin{bmatrix} 0 & V_a(i) & 0 & 0 & 0 & V_a(j) \\ V_b(i') & 0 & V_b(j') & V_b(k') & V_b(l') & 0 \end{bmatrix},$$

$$\begin{bmatrix} 0 & 0 & V_a(i) & 0 & 0 & V_a(j) \\ V_b(i') & V_b(j') & 0 & V_b(k') & V_b(l') & 0 \end{bmatrix},$$

$$\begin{bmatrix} 0 & 0 & 0 & V_a(1) & 0 & V_a(j) \\ V_b(i') & V_b(j') & V_b(k') & 0 & V_b(l') & 0 \end{bmatrix},$$

$$\begin{bmatrix} 0 & 0 & 0 & 0 & 0 & V_a(i) \\ V_b(i') & V_b(j') & V_b(k') & V_b(l') & V_b(m') & 0 \end{bmatrix},$$

$$\begin{bmatrix} V_a(i) & V_a(j) & V_a(k) & V_a(l) & V_a(m) & 0 \\ 0 & 0 & 0 & 0 & 0 & V_b(i') \end{bmatrix},$$

$$\begin{bmatrix} V_a(i) & V_a(j) & V_a(k) & 0 & V_a(l) & 0 \\ 0 & 0 & 0 & V_b(i') & 0 & V_b(j') \end{bmatrix},$$

$$\begin{bmatrix} V_a(i) & V_a(j) & 0 & V_a(k) & V_a(l) & 0 \\ 0 & 0 & V_b(i') & 0 & 0 & V_b(j) \end{bmatrix},$$

$$\begin{bmatrix} V_a(i) & V_a(j) & 0 & V_a(k) & 0 & 0 \\ 0 & 0 & V_b(i) & V_b(j) & 0 & V_b(k) \end{bmatrix},$$

$$\begin{bmatrix} V_a(i) & 0 & V_a(j) & V_a(k) & V_a(l) & 0 \\ 0 & V_b(i') & 0 & 0 & 0 & V_b(j') \end{bmatrix},$$

$$\begin{bmatrix} V_a(i) & 0 & V_a(j) & V_a(k) & 0 & 0 \\ 0 & V_b(i') & 0 & V_b(j') & 0 & V_b(k') \end{bmatrix},$$

$$\begin{bmatrix} V_a(i) & 0 & 0 & V_a(j) & V_a(k) & 0 \\ 0 & V_b(i') & V_b(j') & 0 & 0 & V_b(k') \end{bmatrix},$$

$$\begin{bmatrix} V_a(i) & 0 & 0 & 0 & V_a(j) & 0 \\ 0 & V_b(i') & V_b(j') & V_b(k') & 0 & V_b(l') \end{bmatrix},$$

$$\begin{bmatrix} 0 & V_a(i) & V_a(j) & V_a(k) & V_a(l) & 0 \\ V_b(i') & 0 & 0 & 0 & 0 & V_b(j') \end{bmatrix},$$

$$\begin{bmatrix} 0 & V_a(i) & V_a(j) & 0 & V_a(k) & 0 \\ V_b(i') & 0 & 0 & V_b(j') & 0 & V_b(k') \end{bmatrix},$$

$$\begin{bmatrix} 0 & V_a(i) & 0 & V_a(j) & V_a(k) & 0 \\ V_b(i') & 0 & V_b(j') & 0 & 0 & V_b(k') \end{bmatrix},$$

$$\begin{bmatrix} 0 & V_a(i) & 0 & 0 & V_a(j) & 0 \\ V_b(i') & 0 & V_b(j') & V_b(k') & 0 & V_b(l') \end{bmatrix},$$

$$\begin{bmatrix} 0 & 0 & V_a(i) & V_a(j) & V_a(k) & 0 \\ V_b(i') & V_b(j') & 0 & 0 & 0 & V_b(k') \end{bmatrix},$$

$$\begin{bmatrix} 0 & 0 & V_a(i) & 0 & V_a(j) & 0 \\ V_b(i') & V_b(j') & 0 & V_b(k') & 0 & V_b(l') \end{bmatrix},$$

$$\begin{bmatrix} 0 & 0 & 0 & V_a(i) & V_a(j) & 0 \\ V_b(i') & V_b(j') & V_b(k') & 0 & 0 & V_b(l') \end{bmatrix},$$

$$\begin{bmatrix} 0 & 0 & 0 & 0 & V_a(i) & 0 \\ V_b(i') & V_b(j') & V_b(k') & V_b(l') & 0 & V_b(m') \end{bmatrix},$$

$$\begin{bmatrix} V_a(i) & V_a(j) & V_a(k) & V_a(l) & 0 & 0 \\ 0 & 0 & 0 & 0 & V_b(i') & V_b(j') \end{bmatrix},$$

$$\begin{bmatrix} V_a(i) & V_a(j) & V_a(k) & 0 & 0 & 0 \\ 0 & 0 & 0 & V_b(i') & V_b(j') & V_b(k') \end{bmatrix},$$

$$\begin{bmatrix} V_a(i) & V_a(j) & 0 & V_a(k) & 0 & 0 \\ 0 & 0 & V_b(i') & 0 & V_b(j') & V_b(k') \end{bmatrix},$$

$$\begin{bmatrix} V_a(i) & V_a(j) & 0 & 0 & 0 & 0 \\ 0 & 0 & V_b(i') & V_b(j') & V_b(k') & V_b(l') \end{bmatrix},$$

$$\begin{bmatrix} V_a(i) & 0 & V_a(j) & V_a(k) & 0 & 0 \\ 0 & V_b(i') & 0 & 0 & V_b(j') & V_b(k') \end{bmatrix},$$

$$\begin{bmatrix} V_a(i) & 0 & V_a(j) & 0 & 0 & 0 \\ 0 & V_b(i') & 0 & V_b(j') & V_b(k') & V_b(l') \end{bmatrix},$$

$$\begin{bmatrix} V_a(i) & 0 & 0 & V_a(j) & 0 & 0 \\ 0 & V_b(i') & V_b(j') & 0 & V_b(k') & V_b(l') \end{bmatrix},$$

$$\begin{bmatrix} V_a(i) & 0 & 0 & 0 & 0 & 0 \\ 0 & V_b(i') & V_b(j') & V_b(k') & V_b(l') & V_b(m') \end{bmatrix},$$

$$\begin{bmatrix} 0 & V_a(i) & V_a(j) & V_a(k) & 0 & 0 \\ V_b(i') & 0 & 0 & 0 & V_b(j') & V_b(k') \end{bmatrix},$$

$$\begin{bmatrix} 0 & V_a(i) & V_a(j) & 0 & 0 & 0 \\ V_b(i') & 0 & 0 & V_b(j') & V_b(k') & V_b(l') \end{bmatrix},$$

$$\begin{bmatrix} 0 & V_a(i) & 0 & V_a(j) & 0 & 0 \\ V_b(i') & 0 & V_b(j') & 0 & V_b(k') & V_b(l') \end{bmatrix},$$

$$\begin{bmatrix} 0 & V_a(i) & 0 & 0 & 0 & 0 \\ V_b(i') & 0 & V_b(j') & V_b(k') & V_b(l') & V_b(m') \end{bmatrix},$$

$$\begin{bmatrix} 0 & 0 & V_a(i) & V_a(j) & 0 & 0 \\ V_b(i') & V_b(j') & 0 & 0 & V_b(k') & V_b(l') \end{bmatrix},$$

$$\begin{bmatrix} 0 & 0 & V_a(i) & 0 & 0 & 0 \\ V_b(i') & V_b(j') & 0 & V_b(k') & V_b(l') & V_b(m') \end{bmatrix},$$

$$\begin{bmatrix} 0 & 0 & 0 & V_a(i) & 0 & 0 \\ V_b(i') & V_b(j') & V_b(k') & 0 & V_b(l') & V_b(m') \end{bmatrix},$$

or $$\begin{bmatrix} 0 & 0 & 0 & 0 & 0 & 0 \\ V_b(i') & V_b(j') & V_b(k') & V_b(l') & V_b(m') & V_b(n') \end{bmatrix},$$

where a value of a rank indicator is 6, $0 < i \leq N_1$, $0 < i' \leq N_1$, $0 < j \leq N_1$, $0 < j' \leq N_1$, $0 < k \leq N_1$, $0 < k' \leq N_1$, $0 < l \leq N_1$, $0 < l' \leq N_1$, $0 < m \leq N_1$, $0 < m' \leq N_1$, $0 < n \leq N_1$, and $0 < n' \leq N_1$; or 7. the first codebook is one of the following matrices:

$$\begin{bmatrix} V_a(i) & V_a(j) & V_a(k) & V_a(l) & V_a(m) & V_a(n) & V_a(p) \\ 0 & 0 & 0 & 0 & 0 & 0 & 0 \end{bmatrix}$$

$$\begin{bmatrix} V_a(i) & V_a(j) & V_a(k) & 0 & V_a(l) & V_a(m) & V_a(n) \\ 0 & 0 & 0 & V_b(i') & 0 & 0 & 0 \end{bmatrix}$$

$$\begin{bmatrix} V_a(i) & V_a(j) & 0 & V_a(k) & V_a(l) & V_a(m) & V_a(n) \\ 0 & 0 & V_b(i') & 0 & 0 & 0 & 0 \end{bmatrix}$$

$$\begin{bmatrix} V_a(i) & V_a(j) & 0 & 0 & V_a(k) & V_a(l) & V_a(m) \\ 0 & 0 & V_b(i') & V_b(j') & 0 & 0 & 0 \end{bmatrix}$$

$$\begin{bmatrix} V_a(i) & 0 & V_a(j) & V_a(k) & V_a(l) & V_a(m) & V_a(n) \\ 0 & V_b(i') & 0 & 0 & 0 & 0 & 0 \end{bmatrix}$$

$$\begin{bmatrix} V_a(i) & 0 & V_a(j) & 0 & V_a(k) & V_a(l) & V_a(m) \\ 0 & V_b(i') & 0 & V_b(j') & 0 & 0 & 0 \end{bmatrix}$$

$$\begin{bmatrix} V_a(i) & 0 & 0 & V_a(j) & V_a(k) & V_a(l) & V_a(m) \\ 0 & V_b(i') & V_b(j') & 0 & 0 & 0 & 0 \end{bmatrix}$$

$$\begin{bmatrix} V_a(i) & 0 & 0 & 0 & V_a(j) & V_a(k) & V_a(l) \\ 0 & V_b(i') & V_b(j') & V_b(k') & 0 & 0 & 0 \end{bmatrix}$$

$$\begin{bmatrix} 0 & V_a(i) & V_a(j) & V_a(k) & V_a(l) & V_a(m) & V_a(n) \\ V_b(i') & 0 & 0 & 0 & 0 & 0 & 0 \end{bmatrix}$$

$$\begin{bmatrix} 0 & V_a(i) & V_a(j) & 0 & V_a(k) & V_a(l) & V_a(m) \\ V_b(i') & 0 & 0 & V_b(j') & 0 & 0 & 0 \end{bmatrix}$$

$$\begin{bmatrix} 0 & V_a(i) & 0 & V_a(j) & V_a(k) & V_a(l) & V_a(m) \\ V_b(i') & 0 & V_b(j') & 0 & 0 & 0 & 0 \end{bmatrix}$$

$$\begin{bmatrix} 0 & V_a(i) & 0 & 0 & V_a(j) & V_a(k) & V_a(l) \\ V_b(i') & 0 & V_b(j') & V_b(k') & 0 & 0 & 0 \end{bmatrix}$$

$$\begin{bmatrix} 0 & 0 & V_a(i) & V_a(j) & V_a(k) & V_a(l) & V_a(m) \\ V_b(i') & V_b(j') & 0 & 0 & 0 & 0 & 0 \end{bmatrix}$$

$$\begin{bmatrix} 0 & 0 & V_a(i) & V_a(j) & V_a(k) & V_a(l) \\ V_b(i') & V_b(j') & 0 & V_b(k') & 0 & 0 & 0 \end{bmatrix}$$

$$\begin{bmatrix} 0 & 0 & 0 & V_a(i) & V_a(j) & V_a(k) & V_a(l) \\ V_b(i') & V_b(j') & V_b(k') & 0 & 0 & 0 & 0 \end{bmatrix}$$

$$\begin{bmatrix} 0 & 0 & 0 & 0 & V_a(i) & V_a(j) & V_a(k) \\ V_b(i') & V_b(j') & V_b(k') & V_b(l') & 0 & 0 & 0 \end{bmatrix}$$

$$\begin{bmatrix} V_a(i) & V_a(j) & V_a(k) & V_a(l) & 0 & V_a(m) & V_a(n) \\ 0 & 0 & 0 & 0 & V_b(i') & 0 & 0 \end{bmatrix}$$

$$\begin{bmatrix} V_a(i) & V_a(j) & V_a(k) & 0 & 0 & V_a(l) & V_a(m) \\ 0 & 0 & 0 & V_b(i') & V_b(j') & 0 & 0 \end{bmatrix}$$

$$\begin{bmatrix} V_a(i) & V_a(j) & 0 & V_a(k) & 0 & V_a(l) & V_a(m) \\ 0 & 0 & V_b(i') & 0 & V_b(j') & 0 & 0 \end{bmatrix}$$

-continued $$\begin{bmatrix} V_a(i) & V_a(j) & 0 & 0 & 0 & V_a(k) & V_a(l) \\ 0 & 0 & V_b(i') & V_b(j') & V_b(k') & 0 & 0 \end{bmatrix}$$

$$\begin{bmatrix} V_a(i) & 0 & V_a(j) & V_a(k) & 0 & V_a(l) & V_a(m) \\ 0 & V_b(i') & 0 & 0 & V_b(j') & 0 & 0 \end{bmatrix}$$

$$\begin{bmatrix} V_a(i) & 0 & V_a(j) & 0 & 0 & V_a(k) & V_a(l) \\ 0 & V_b(i') & 0 & V_a(j) & V_b(k') & 0 & 0 \end{bmatrix}$$

$$\begin{bmatrix} V_a(i) & 0 & 0 & V_a(j) & 0 & V_a(k) & V_a(l) \\ 0 & V_b(i') & V_b(j') & 0 & V_b(k') & 0 & 0 \end{bmatrix}$$

$$\begin{bmatrix} V_a(i) & 0 & 0 & 0 & 0 & V_a(j) & V_a(k) \\ 0 & V_b(i') & V_b(j') & V_b(k') & V_b(l') & 0 & 0 \end{bmatrix}$$

$$\begin{bmatrix} 0 & V_a(i) & V_a(j) & V_a(k) & 0 & V_a(l) & V_a(m) \\ V_b(i') & 0 & 0 & 0 & V_b(j') & 0 & 0 \end{bmatrix}$$

$$\begin{bmatrix} 0 & V_a(i) & V_a(j) & 0 & 0 & V_a(k) & V_a(l) \\ V_b(i') & 0 & 0 & V_b(j') & V_b(k') & 0 & 0 \end{bmatrix}$$

$$\begin{bmatrix} 0 & V_a(i) & 0 & V_a(j) & 0 & V_a(k) & V_a(l) \\ V_b(i') & 0 & V_b(j') & 0 & V_b(k') & 0 & 0 \end{bmatrix}$$

$$\begin{bmatrix} 0 & V_a(i) & 0 & 0 & 0 & V_a(j) & V_a(k) \\ V_b(i') & 0 & V_b(j') & V_b(k') & V_b(l') & 0 & 0 \end{bmatrix}$$

$$\begin{bmatrix} 0 & 0 & V_a(i) & V_a(j) & 0 & V_a(k) & V_a(l) \\ V_b(i') & V_b(j') & 0 & 0 & V_b(k') & 0 & 0 \end{bmatrix}$$

$$\begin{bmatrix} 0 & 0 & V_a(i) & 0 & 0 & V_a(j) & V_a(k) \\ V_b(i') & V_b(j') & 0 & V_b(k') & V_b(l') & 0 & 0 \end{bmatrix}$$

$$\begin{bmatrix} 0 & 0 & 0 & V_a(i) & 0 & V_a(j) & V_a(k) \\ V_b(i') & V_b(j') & V_b(k') & 0 & V_b(l') & 0 & 0 \end{bmatrix}$$

$$\begin{bmatrix} 0 & 0 & 0 & 0 & 0 & V_a(i) & V_a(j) \\ V_b(i') & V_b(j') & V_b(k') & V_b(l') & V_b(m') & 0 & 0 \end{bmatrix}$$

$$\begin{bmatrix} V_a(i) & V_a(j) & V_a(k) & V_a(l) & V_a(m) & 0 & V_a(n) \\ 0 & 0 & 0 & 0 & 0 & V_b(i') & 0 \end{bmatrix}$$

$$\begin{bmatrix} V_a(i) & V_a(j) & V_a(k) & 0 & V_a(l) & 0 & V_a(m) \\ 0 & 0 & 0 & V_b(i') & 0 & V_b(j') & 0 \end{bmatrix}$$

$$\begin{bmatrix} V_a(i) & V_a(j) & 0 & V_a(k) & V_a(l) & 0 & V_a(m) \\ 0 & 0 & V_b(i') & 0 & 0 & V_b(j') & 0 \end{bmatrix}$$

$$\begin{bmatrix} V_a(i) & V_a(j) & 0 & 0 & V_a(k) & 0 & V_a(l) \\ 0 & 0 & V_b(i') & V_b(j') & 0 & V_b(k') & 0 \end{bmatrix}$$

$$\begin{bmatrix} V_a(i) & 0 & V_a(j) & V_a(k) & V_a(l) & 0 & V_a(m) \\ 0 & V_b(i') & 0 & 0 & 0 & V_b(j') & 0 \end{bmatrix}$$

$$\begin{bmatrix} V_a(i) & 0 & V_a(j) & 0 & V_a(k) & 0 & V_a(l) \\ 0 & V_b(i') & 0 & V_b(j') & 0 & V_b(k') & 0 \end{bmatrix}$$

$$\begin{bmatrix} V_a(i) & 0 & 0 & V_a(j) & V_a(k) & 0 & V_a(l) \\ 0 & V_b(i') & V_b(j') & 0 & 0 & V_b(k') & 0 \end{bmatrix}$$

$$\begin{bmatrix} V_a(i) & 0 & 0 & 0 & V_a(j) & 0 & V_a(k) \\ 0 & V_b(i') & V_b(j') & V_b(k') & 0 & V_b(l') & 0 \end{bmatrix}$$

$$\begin{bmatrix} 0 & V_a(i) & V_a(j) & V_a(k) & V_a(l) & 0 & V_a(m) \\ V_b(i') & 0 & 0 & 0 & 0 & V_b(j') & 0 \end{bmatrix}$$

$$\begin{bmatrix} 0 & V_a(i) & V_a(j) & 0 & V_a(k) & 0 & V_a(l) \\ V_b(i') & 0 & 0 & V_b(j') & 0 & V_b(k') & 0 \end{bmatrix}$$

$$\begin{bmatrix} 0 & V_a(i) & 0 & V_a(j) & V_a(k) & 0 & V_a(l) \\ V_b(i') & 0 & V_b(j') & 0 & 0 & V_b(k') & 0 \end{bmatrix}$$

$$\begin{bmatrix} 0 & V_a(i) & 0 & V_a(j) & V_a(k) & 0 & V_a(l) \\ V_b(i') & 0 & V_b(j') & 0 & 0 & V_b(k') & 0 \end{bmatrix}$$

$$\begin{bmatrix} 0 & 0 & V_a(i) & V_a(j) & V_a(k) & 0 & V_a(l) \\ V_b(i') & V_b(j') & 0 & 0 & 0 & V_b(k') & 0 \end{bmatrix}$$

$$\begin{bmatrix} 0 & 0 & V_a(i) & V_a(j) & V_a(k) & 0 & V_a(l) \\ V_b(i) & V_b(j') & V_b(k') & 0 & V_b(l') & 0 \end{bmatrix}$$

$$\begin{bmatrix} 0 & 0 & 0 & V_a(i) & V_a(j) & 0 & V_a(k) \\ V_b(i') & V_b(j') & V_b(k') & 0 & 0 & V_b(l') & 0 \end{bmatrix}$$

$$\begin{bmatrix} 0 & 0 & 0 & 0 & V_a(i) & 0 & V_a(j) \\ V_b(i') & V_b(j') & V_b(k') & V_b(l') & 0 & V_b(m') & 0 \end{bmatrix}$$

$$\begin{bmatrix} V_a(i) & V_a(j) & V_a(k) & V_a(4) & 0 & 0 & V_a(m) \\ 0 & 0 & 0 & 0 & V_b(i') & V_b(j') & 0 \end{bmatrix}$$

$$\begin{bmatrix} V_a(i) & V_a(j) & V_a(k) & 0 & 0 & 0 & V_a(l) \\ 0 & 0 & 0 & V_b(i') & V_b(j') & V_b(k') & 0 \end{bmatrix}$$

$$\begin{bmatrix} V_a(i) & V_a(j) & 0 & V_a(k) & 0 & 0 & V_a(l) \\ 0 & 0 & V_b(i') & 0 & V_b(j') & V_b(k') & 0 \end{bmatrix}$$

$$\begin{bmatrix} V_a(i) & V_a(j) & 0 & 0 & 0 & 0 & V_a(k) \\ 0 & 0 & V_b(i') & V_b(j') & V_b(k') & V_b(l') & 0 \end{bmatrix}$$

$$\begin{bmatrix} V_a(i) & 0 & V_a(j) & V_a(k) & 0 & 0 & V_a(l) \\ 0 & V_b(i') & 0 & 0 & V_b(j') & V_b(k') & 0 \end{bmatrix}$$

$$\begin{bmatrix} V_a(i) & 0 & V_a(j) & 0 & 0 & 0 & V_a(k) \\ 0 & V_b(i') & 0 & V_b(j') & V_b(k') & V_b(l') & 0 \end{bmatrix}$$

$$\begin{bmatrix} V_a(i) & 0 & 0 & V_a(j) & 0 & 0 & V_a(k) \\ 0 & V_b(i') & V_b(j') & 0 & V_b(k') & V_b(l') & 0 \end{bmatrix}$$

$$\begin{bmatrix} V_a(i) & 0 & 0 & 0 & 0 & 0 & V_a(j) \\ 0 & V_b(i') & V_b(j') & V_b(k') & V_b(l') & V_b(m') & 0 \end{bmatrix}$$

$$\begin{bmatrix} 0 & V_a(i) & V_a(j) & V_a(k) & 0 & 0 & V_a(l) \\ V_b(i') & 0 & 0 & 0 & V_b(j') & V_b(k') & 0 \end{bmatrix}$$

$$\begin{bmatrix} 0 & V_a(i) & V_a(j) & 0 & 0 & 0 & V_a(k) \\ V_b(i') & 0 & 0 & V_b(j') & V_b(k') & V_b(l') & 0 \end{bmatrix}$$

$$\begin{bmatrix} 0 & V_a(i) & 0 & V_a(j) & 0 & 0 & V_a(k) \\ V_b(i') & 0 & V_b(j') & 0 & V_b(k') & V_b(l') & 0 \end{bmatrix}$$

$$\begin{bmatrix} 0 & V_a(i) & 0 & 0 & 0 & 0 & V_a(j) \\ V_b(i') & 0 & V_b(j') & V_b(k') & V_b(l') & V_b(m') & 0 \end{bmatrix}$$

$$\begin{bmatrix} 0 & 0 & V_a(i) & V_a(j) & 0 & 0 & V_a(k) \\ V_b(i') & V_b(j') & 0 & 0 & V_b(k') & V_b(l') & 0 \end{bmatrix}$$

$$\begin{bmatrix} 0 & 0 & V_a(i) & 0 & 0 & 0 & V_a(j) \\ V_b(i') & V_b(j') & 0 & V_b(k') & V_b(l') & V_b(m') & 0 \end{bmatrix}$$

$$\begin{bmatrix} 0 & 0 & 0 & V_a(i) & 0 & 0 & V_a(j) \\ V_b(i') & V_b(j') & V_b(k') & 0 & V_b(l') & V_b(m') & 0 \end{bmatrix}$$

$$\begin{bmatrix} 0 & 0 & 0 & 0 & 0 & 0 & V_a(j) \\ V_b(i') & V_b(j') & V_b(k') & V_b(l') & V_b(m') & V_b(n') & 0 \end{bmatrix}$$

$$\begin{bmatrix} V_a(i) & V_a(j) & V_a(k) & V_a(l) & V_a(m) & V_a(n) & 0 \\ 0 & 0 & 0 & 0 & 0 & 0 & V_b(i') \end{bmatrix}$$

-continued $$\begin{bmatrix} V_a(i) & V_a(j) & V_a(k) & 0 & V_a(l) & V_a(m) & 0 \\ 0 & 0 & 0 & V_b(i') & 0 & 0 & V_b(j') \end{bmatrix}$$

$$\begin{bmatrix} V_a(i) & V_a(j) & 0 & V_a(k) & V_a(l) & V_a(m) & 0 \\ 0 & 0 & V_b(i') & 0 & 0 & 0 & V_b(j') \end{bmatrix}$$

$$\begin{bmatrix} V_a(i) & V_a(j) & 0 & 0 & V_a(k) & V_a(l) & 0 \\ 0 & 0 & V_b(i') & V_b(j') & 0 & 0 & V_b(k') \end{bmatrix}$$

$$\begin{bmatrix} V_a(i) & 0 & V_a(j) & V_a(k) & V_a(l) & V_a(m) & 0 \\ 0 & V_b(i') & 0 & 0 & 0 & 0 & V_b(j') \end{bmatrix}$$

$$\begin{bmatrix} V_a(i) & 0 & V_a(j) & 0 & V_a(k) & V_a(l) & 0 \\ 0 & V_b(i') & 0 & V_b(j') & 0 & 0 & V_b(k') \end{bmatrix}$$

$$\begin{bmatrix} V_a(i) & 0 & 0 & V_a(j) & V_a(k) & V_a(l) & 0 \\ 0 & V_b(i') & V_b(j') & 0 & 0 & 0 & V_b(k') \end{bmatrix}$$

$$\begin{bmatrix} V_a(i) & 0 & 0 & 0 & V_a(j) & V_a(k) & 0 \\ 0 & V_b(i') & V_b(j') & V_b(k') & 0 & 0 & V_b(l') \end{bmatrix}$$

$$\begin{bmatrix} 0 & V_a(i) & V_a(j) & V_a(k) & V_a(l) & V_a(m) & 0 \\ V_b(i') & 0 & 0 & 0 & 0 & 0 & V_b(j') \end{bmatrix}$$

$$\begin{bmatrix} 0 & V_a(i) & V_a(j) & 0 & V_a(k) & V_a(l) & 0 \\ V_b(i') & 0 & 0 & V_b(j') & 0 & 0 & V_b(k') \end{bmatrix}$$

$$\begin{bmatrix} 0 & V_a(i) & 0 & V_a(j) & V_a(k) & V_a(l) & 0 \\ V_b(i') & 0 & V_b(j') & 0 & 0 & 0 & V_b(k') \end{bmatrix}$$

$$\begin{bmatrix} 0 & V_a(i) & 0 & 0 & V_a(j) & V_a(k) & 0 \\ V_b(i') & 0 & V_b(j') & V_b(k') & 0 & 0 & V_b(l') \end{bmatrix}$$

$$\begin{bmatrix} 0 & 0 & V_a(i) & V_a(j) & V_a(k) & V_a(l) & 0 \\ V_b(i') & V_b(j') & 0 & 0 & 0 & 0 & V_b(k') \end{bmatrix}$$

$$\begin{bmatrix} 0 & 0 & V_a(i) & 0 & V_a(j) & V_a(k) & 0 \\ V_b(i') & V_b(j') & 0 & V_b(k') & 0 & 0 & V_b(l') \end{bmatrix}$$

$$\begin{bmatrix} 0 & 0 & 0 & V_a(i) & V_a(j) & V_a(k) & 0 \\ V_b(i') & V_b(j') & V_b(k') & 0 & 0 & 0 & V_b(l') \end{bmatrix}$$

$$\begin{bmatrix} 0 & 0 & 0 & 0 & V_a(i) & V_a(j) & 0 \\ V_b(i') & V_b(j') & V_b(k') & V_b(l') & 0 & 0 & V_b(m') \end{bmatrix}$$

$$\begin{bmatrix} V_a(i) & V_a(j) & V_a(k) & V_a(l) & 0 & V_a(m) & 0 \\ 0 & 0 & 0 & 0 & V_b(i') & 0 & V_b(j') \end{bmatrix}$$

$$\begin{bmatrix} V_a(i) & V_a(j) & V_a(k) & 0 & 0 & V_a(l) & 0 \\ 0 & 0 & 0 & V_b(i') & V_b(j') & 0 & V_b(k') \end{bmatrix}$$

$$\begin{bmatrix} V_a(i) & V_a(j) & 0 & V_a(k) & 0 & V_a(l) & 0 \\ 0 & 0 & V_b(i') & 0 & V_b(j') & 0 & V_b(k') \end{bmatrix}$$

$$\begin{bmatrix} V_a(i) & V_a(j) & 0 & 0 & 0 & V_a(k) & 0 \\ 0 & 0 & V_b(i') & V_b(j') & V_b(k') & 0 & V_b(l') \end{bmatrix}$$

$$\begin{bmatrix} V_a(i) & 0 & V_a(j) & V_a(k) & 0 & V_a(l) & 0 \\ 0 & V_b(i') & 0 & 0 & V_b(j') & 0 & V_b(k') \end{bmatrix}$$

$$\begin{bmatrix} V_a(i) & 0 & V_a(j) & 0 & 0 & V_a(k) & 0 \\ 0 & V_b(i') & 0 & V_b(j') & V_b(k') & 0 & V_b(l') \end{bmatrix}$$

$$\begin{bmatrix} V_a(i) & 0 & 0 & V_a(j) & 0 & V_a(k) & 0 \\ 0 & V_b(i') & V_b(j') & 0 & V_b(k') & 0 & V_b(l') \end{bmatrix}$$

$$\begin{bmatrix} V_a(i) & 0 & 0 & 0 & 0 & V_a(j) & 0 \\ 0 & V_b(i') & V_b(j') & V_b(k') & V_b(l') & 0 & V_b(m') \end{bmatrix}$$

$$\begin{bmatrix} 0 & V_a(i) & V_a(j) & V_a(k) & 0 & V_a(l) & 0 \\ V_b(i') & 0 & 0 & 0 & V_b(j') & 0 & V_b(k') \end{bmatrix}$$

-continued $$\begin{bmatrix} 0 & V_a(i) & V_a(j) & 0 & 0 & V_a(k) & 0 \\ V_b(i') & 0 & 0 & V_b(j') & V_b(k') & 0 & V_b(l') \end{bmatrix}$$

$$\begin{bmatrix} 0 & V_a(i) & 0 & V_a(j) & 0 & V_a(k) & 0 \\ V_b(i') & 0 & V_b(j') & 0 & V_b(k') & 0 & V_b(l') \end{bmatrix}$$

$$\begin{bmatrix} 0 & V_a(i) & 0 & 0 & 0 & V_a(j) & 0 \\ V_b(i') & 0 & V_b(j') & V_b(k') & V_b(l') & 0 & V_b(m') \end{bmatrix}$$

$$\begin{bmatrix} 0 & 0 & V_a(i) & V_a(j) & 0 & V_a(k) & 0 \\ V_b(i') & V_b(j') & 0 & 0 & V_b(k') & 0 & V_b(l') \end{bmatrix}$$

$$\begin{bmatrix} 0 & 0 & V_a(i) & 0 & 0 & V_a(j) & 0 \\ V_b(i') & V_b(j') & 0 & V_b(k') & V_b(l') & 0 & V_b(m') \end{bmatrix}$$

$$\begin{bmatrix} 0 & 0 & 0 & V_a(i) & 0 & V_a(j) & 0 \\ V_b(i') & V_b(j') & V_b(k') & 0 & V_b(l') & 0 & V_b(m') \end{bmatrix}$$

$$\begin{bmatrix} 0 & 0 & 0 & 0 & 0 & V_a(i) & 0 \\ V_b(i') & V_b(j') & V_b(k') & V_b(l') & V_b(m') & 0 & V_b(n') \end{bmatrix}$$

$$\begin{bmatrix} V_a(i) & V_a(j) & V_a(k) & V_a(l) & V_a(m) & 0 & 0 \\ 0 & 0 & 0 & 0 & 0 & V_b(i') & V_b(j') \end{bmatrix}$$

$$\begin{bmatrix} V_a(i) & V_a(j) & V_a(k) & 0 & V_a(l) & 0 & 0 \\ 0 & 0 & 0 & V_b(i') & 0 & V_b(j') & V_b(k') \end{bmatrix}$$

$$\begin{bmatrix} V_a(i) & V_a(j) & 0 & V_a(k) & V_a(l) & 0 & 0 \\ 0 & 0 & V_b(i') & 0 & 0 & V_b(j') & V_b(k') \end{bmatrix}$$

$$\begin{bmatrix} V_a(i) & V_a(j) & 0 & V_a(k) & V_a(l) & 0 & 0 \\ 0 & 0 & V_b(i') & 0 & 0 & V_b(j') & V_b(k') \end{bmatrix}$$

$$\begin{bmatrix} V_a(i) & 0 & V_a(j) & V_a(k) & V_a(l) & 0 & 0 \\ 0 & V_b(i') & 0 & 0 & 0 & V_b(j') & V_b(k') \end{bmatrix}$$

$$\begin{bmatrix} V_a(i) & 0 & V_a(j) & V_a(k) & V_a(l) & 0 & 0 \\ 0 & V_b(i') & 0 & 0 & 0 & V_b(j') & V_b(k') \end{bmatrix}$$

$$\begin{bmatrix} V_a(i) & 0 & 0 & V_a(j) & V_a(k) & 0 & 0 \\ 0 & V_b(i') & V_b(j') & 0 & 0 & V_b(k') & V_b(l') \end{bmatrix}$$

$$\begin{bmatrix} V_a(i) & 0 & 0 & 0 & V_a(j) & 0 & 0 \\ 0 & V_b(i') & V_b(j') & V_b(k') & 0 & V_b(l') & V_b(m') \end{bmatrix}$$

$$\begin{bmatrix} 0 & V_a(i) & V_a(j) & V_a(k) & V_a(l) & 0 & 0 \\ V_b(i') & 0 & 0 & 0 & 0 & V_b(j') & V_b(k') \end{bmatrix}$$

$$\begin{bmatrix} 0 & V_a(i) & 0 & V_a(j) & V_a(k) & 0 & 0 \\ V_b(i') & 0 & V_b(j') & 0 & 0 & V_b(k') & V_b(l') \end{bmatrix}$$

$$\begin{bmatrix} 0 & V_a(i) & 0 & V_a(j) & V_a(k) & 0 & 0 \\ V_b(i') & 0 & V_b(j') & 0 & 0 & V_b(k') & V_b(l') \end{bmatrix}$$

$$\begin{bmatrix} 0 & V_a(i) & 0 & 0 & V_a(j) & 0 & 0 \\ V_b(i') & 0 & V_b(j') & V_b(k') & 0 & V_b(l') & V_b(m') \end{bmatrix}$$

$$\begin{bmatrix} 0 & 0 & V_a(i) & V_a(j) & V_a(k) & 0 & 0 \\ V_b(i') & V_b(j') & 0 & 0 & 0 & V_b(k') & V_b(l') \end{bmatrix}$$

$$\begin{bmatrix} 0 & 0 & V_a(i) & 0 & V_a(j) & 0 & 0 \\ V_b(i') & V_b(j') & 0 & V_b(k') & 0 & V_b(l') & V_b(m') \end{bmatrix}$$

$$\begin{bmatrix} 0 & 0 & 0 & V_a(i) & V_a(j) & 0 & 0 \\ V_b(i') & V_b(j') & V_b(k') & 0 & 0 & V_b(l') & V_b(m') \end{bmatrix}$$

$$\begin{bmatrix} 0 & 0 & 0 & 0 & V_a(i) & 0 & 0 \\ V_b(i') & V_b(j') & V_b(k') & V_b(l') & 0 & V_b(m') & V_b(n') \end{bmatrix}$$

$$\begin{bmatrix} V_a(i) & V_a(j) & V_a(k) & V_a(l) & 0 & 0 & 0 \\ 0 & 0 & 0 & 0 & V_b(i') & V_b(j') & V_b(k') \end{bmatrix}$$

$$\begin{bmatrix} V_a(i) & V_a(j) & V_a(k) & 0 & 0 & 0 & 0 \\ 0 & 0 & 0 & V_b(i') & V_b(j') & V_b(k') & V_b(l') \end{bmatrix}$$

$$\begin{bmatrix} V_a(i) & V_a(j) & 0 & V_a(k) & 0 & 0 & 0 \\ 0 & 0 & V_b(i') & 0 & V_b(j') & V_b(k') & V_b(l') \end{bmatrix}$$

$$\begin{bmatrix} V_a(i) & V_a(j) & 0 & 0 & 0 & 0 & 0 \\ 0 & 0 & V_b(i') & V_b(j') & V_b(k') & V_b(l') & V_b(m') \end{bmatrix}$$

$$\begin{bmatrix} V_a(i) & 0 & V_a(j) & V_a(k) & 0 & 0 & 0 \\ 0 & V_b(i') & 0 & 0 & V_b(j') & V_b(k') & V_b(l') \end{bmatrix}$$

$$\begin{bmatrix} V_a(i) & 0 & V_a(j) & 0 & 0 & 0 & 0 \\ 0 & V_b(i') & 0 & V_b(j') & V_b(k') & V_b(l') & V_b(m') \end{bmatrix}$$

$$\begin{bmatrix} V_a(i) & 0 & 0 & V_a(j) & 0 & 0 & 0 \\ 0 & V_b(i') & V_b(j') & 0 & V_b(k') & V_b(l') & V_b(m') \end{bmatrix}$$

$$\begin{bmatrix} V_a(i) & 0 & 0 & 0 & 0 & 0 & 0 \\ 0 & V_b(i') & V_b(j') & V_b(k') & V_b(l') & V_b(m') & V_b(n') \end{bmatrix}$$

$$\begin{bmatrix} 0 & V_a(i) & V_a(j) & V_a(k) & 0 & 0 & 0 \\ V_b(i') & 0 & 0 & 0 & V_b(j') & V_b(k') & V_b(l') \end{bmatrix}$$

$$\begin{bmatrix} 0 & V_a(i) & V_a(j) & 0 & 0 & 0 & 0 \\ V_b(i') & 0 & 0 & V_b(j') & V_b(k') & V_b(l') & V_b(m') \end{bmatrix}$$

$$\begin{bmatrix} 0 & V_a(i) & 0 & V_a(j) & 0 & 0 & 0 \\ V_b(i') & 0 & V_b(j') & 0 & V_b(k') & V_b(l') & V_b(m') \end{bmatrix}$$

$$\begin{bmatrix} 0 & V_a(i) & 0 & 0 & 0 & 0 & 0 \\ V_b(i') & 0 & V_b(j') & V_b(k') & V_b(l') & V_b(m') & V_b(n') \end{bmatrix}$$

$$\begin{bmatrix} 0 & 0 & V_a(i) & V_a(j) & 0 & 0 & 0 \\ V_b(i') & V_b(j') & 0 & 0 & V_b(k') & V_b(l') & V_b(m') \end{bmatrix}$$

$$\begin{bmatrix} 0 & 0 & V_a(i) & 0 & 0 & 0 & 0 \\ V_b(i') & V_b(j') & 0 & V_b(k') & V_b(l') & V_b(m') & V_b(n') \end{bmatrix},$$

where a value of a rank indicator $$\begin{bmatrix} 0 & 0 & 0 & V_a(i) & 0 & 0 & 0 \\ V_b(i') & V_b(j') & V_b(k') & 0 & V_b(l') & V_b(m') & V_b(n') \end{bmatrix}$$

$$\begin{bmatrix} 0 & 0 & 0 & 0 & 0 & 0 & 0 \\ V_b(i') & V_b(j') & V_b(k') & V_b(l') & V_b(m') & V_b(n') & V_b(p') \end{bmatrix}$$

is 7, $0<i \leq N_1$, $0<i' \leq N_1$, $0<j \leq N_1$, $0<j' \leq N_1$, $0<k \leq N_1$, $0<k' \leq N_1$, $0<l \leq N_1$, $0<l' \leq N_1$, $0<m \leq N_1$, $0<m' \leq N_1$, $0<n \leq N_1$, $0<n' \leq N_1$, $0<p \leq N_1$, and $0<p' \leq N_1$; or 8. the first codebook is one of the following matrices:

$$\begin{bmatrix} V_a(i) & V_a(j) & V_a(k) & V_a(l) & V_a(m) & V_a(n) & V_a(p) & V_a(q) \\ 0 & 0 & 0 & 0 & 0 & 0 & 0 & 0 \end{bmatrix}$$

$$\begin{bmatrix} V_a(i) & V_a(j) & V_a(k) & 0 & V_a(l) & V_a(m) & V_a(n) & V_a(p) \\ 0 & 0 & 0 & V_b(i') & 0 & 0 & 0 & 0 \end{bmatrix}$$

$$\begin{bmatrix} V_a(i) & V_a(j) & 0 & V_a(k) & V_a(l) & V_a(m) & V_a(n) & V_a(p) \\ 0 & 0 & V_b(i') & 0 & 0 & 0 & 0 & 0 \end{bmatrix}$$

$$\begin{bmatrix} V_a(i) & V_a(j) & 0 & 0 & V_a(k) & V_a(l) & V_a(m) & V_a(n) \\ 0 & 0 & V_b(i') & V_b(j') & 0 & 0 & 0 & 0 \end{bmatrix}$$

$$\begin{bmatrix} V_a(i) & 0 & V_a(j) & V_a(k) & V_a(l) & V_a(m) & V_a(n) & V_a(p) \\ 0 & V_b(i') & 0 & 0 & 0 & 0 & 0 & 0 \end{bmatrix}$$

$$\begin{bmatrix} V_a(i) & 0 & V_a(j) & 0 & V_a(k) & V_a(l) & V_a(m) & V_a(n) \\ 0 & V_b(i') & 0 & V_b(j') & 0 & 0 & 0 & 0 \end{bmatrix}$$

$$\begin{bmatrix} V_a(i) & 0 & 0 & V_a(j) & V_a(k) & V_a(l) & V_a(m) & V_a(n) \\ 0 & V_b(i') & V_b(2) & 0 & 0 & 0 & 0 & 0 \end{bmatrix}$$

$$\begin{bmatrix} V_a(i) & 0 & 0 & 0 & V_a(j) & V_a(k) & V_a(l) & V_a(m) \\ 0 & V_b(i') & V_b(j') & V_b(k') & 0 & 0 & 0 & 0 \end{bmatrix}$$

$$\begin{bmatrix} 0 & V_a(i) & V_a(j) & V_a(k) & V_a(l) & V_a(m) & V_a(n) & V_a(p) \\ V_b(i') & 0 & 0 & 0 & 0 & 0 & 0 & 0 \end{bmatrix}$$

$$\begin{bmatrix} 0 & V_a(i) & V_a(j) & 0 & V_a(k) & V_a(l) & V_a(m) & V_a(n) \\ V_b(i') & 0 & 0 & V_b(j') & 0 & 0 & 0 & 0 \end{bmatrix}$$

$$\begin{bmatrix} 0 & V_a(i) & 0 & V_a(j) & V_a(k) & V_a(l) & V_a(m) & V_a(n) \\ V_b(i') & 0 & V_b(2) & 0 & 0 & 0 & 0 & 0 \end{bmatrix}$$

$$\begin{bmatrix} 0 & V_a(i) & 0 & 0 & V_a(j) & V_a(k) & V_a(l) & V_a(m) \\ V_b(i') & 0 & V_b(j') & V_b(k') & 0 & 0 & 0 & 0 \end{bmatrix}$$

$$\begin{bmatrix} 0 & 0 & V_a(i) & V_a(j) & V_a(k) & V_a(l) & V_a(m) & V_a(n) \\ V_b(i') & V_b(j') & 0 & 0 & 0 & 0 & 0 & 0 \end{bmatrix}$$

$$\begin{bmatrix} 0 & 0 & V_a(i) & 0 & V_a(j) & V_a(k) & V_a(l) & V_a(m) \\ V_b(i') & V_b(j') & 0 & V_b(k') & 0 & 0 & 0 & 0 \end{bmatrix}$$

$$\begin{bmatrix} 0 & 0 & 0 & V_a(i) & V_a(j) & V_a(k) & V_a(l) & V_a(m) \\ V_b(i') & V_b(j') & V_b(k') & 0 & 0 & 0 & 0 & 0 \end{bmatrix}$$

$$\begin{bmatrix} 0 & 0 & 0 & 0 & V_a(i) & V_a(j) & V_a(k) & V_a(l) \\ V_b(i') & V_b(j') & V_b(k') & V_b(l') & 0 & 0 & 0 & 0 \end{bmatrix}$$

$$\begin{bmatrix} V_a(i) & V_a(j) & V_a(k) & V_a(l) & 0 & V_a(m) & V_a(n) & V_a(p) \\ 0 & 0 & 0 & 0 & V_b(i') & 0 & 0 & 0 \end{bmatrix}$$

$$\begin{bmatrix} V_a(i) & V_a(j) & V_a(k) & 0 & 0 & V_a(l) & V_a(m) & V_a(n) \\ 0 & 0 & 0 & V_b(i') & V_b(j') & 0 & 0 & 0 \end{bmatrix}$$

$$\begin{bmatrix} V_a(i) & V_a(j) & 0 & V_a(k) & 0 & V_a(l) & V_a(m) & V_a(n) \\ 0 & 0 & V_b(i') & 0 & V_b(j') & 0 & 0 & 0 \end{bmatrix}$$

$$\begin{bmatrix} V_a(i) & V_a(j) & 0 & 0 & 0 & V_a(k) & V_a(l) & V_a(m) \\ 0 & 0 & V_b(i') & V_b(j') & V_b(k') & 0 & 0 & 0 \end{bmatrix}$$

$$\begin{bmatrix} V_a(i) & 0 & V_a(j) & V_a(k) & 0 & V_a(l) & V_a(m) & V_a(n) \\ 0 & V_b(i') & 0 & 0 & V_b(j') & 0 & 0 & 0 \end{bmatrix}$$

$$\begin{bmatrix} V_a(i) & 0 & V_a(j) & 0 & 0 & V_a(k) & V_a(l) & V_a(m) \\ 0 & V_b(i') & 0 & V_b(j') & V_b(k') & 0 & 0 & 0 \end{bmatrix}$$

$$\begin{bmatrix} V_a(i) & 0 & 0 & V_a(j) & 0 & V_a(k) & V_a(l) & V_a(m) \\ 0 & V_b(i') & V_b(j') & 0 & V_b(k') & 0 & 0 & 0 \end{bmatrix}$$

$$\begin{bmatrix} V_a(i) & 0 & 0 & 0 & 0 & V_a(j) & V_a(k) & V_a(l) \\ 0 & V_b(i') & V_b(j') & V_b(k') & V_b(l') & 0 & 0 & 0 \end{bmatrix}$$

$$\begin{bmatrix} 0 & V_a(i) & V_a(j) & V_a(k) & 0 & V_a(l) & V_a(m) & V_a(n) \\ V_b(i') & 0 & 0 & 0 & V_b(j') & 0 & 0 & 0 \end{bmatrix}$$

$$\begin{bmatrix} 0 & V_a(i) & V_a(j) & 0 & 0 & V_a(k) & V_a(l) & V_a(m) \\ V_b(i') & 0 & 0 & V_b(j') & V_b(k') & 0 & 0 & 0 \end{bmatrix}$$

$$\begin{bmatrix} 0 & V_a(i) & 0 & V_a(j) & 0 & V_a(k) & V_a(l) & V_a(m) \\ V_b(i') & 0 & V_b(j') & 0 & V_b(k') & 0 & 0 & 0 \end{bmatrix}$$

$$\begin{bmatrix} 0 & V_a(i) & 0 & 0 & 0 & V_a(j) & V_a(k) & V_a(l) \\ V_b(i') & 0 & V_b(j') & V_b(k') & V_b(l') & 0 & 0 & 0 \end{bmatrix}$$

$$\begin{bmatrix} 0 & V_a(i) & V_a(j) & V_a(k) & 0 & V_a(l) & V_a(m) & V_a(n) \\ V_b(i') & 0 & 0 & 0 & V_b(j') & 0 & 0 & 0 \end{bmatrix}$$

$$\begin{bmatrix} 0 & V_a(i) & V_a(j) & 0 & 0 & V_a(k) & V_a(l) & V_a(m) \\ V_b(i') & 0 & 0 & V_b(j') & V_b(k') & 0 & 0 & 0 \end{bmatrix}$$

$$\begin{bmatrix} 0 & V_a(i) & 0 & V_a(j) & 0 & V_a(k) & V_a(l) & V_a(m) \\ V_b(i') & 0 & V_b(j') & 0 & V_b(k') & 0 & 0 & 0 \end{bmatrix}$$

$$\begin{bmatrix} 0 & V_a(i) & 0 & 0 & 0 & V_a(j) & V_a(k) & V_a(l) \\ V_b(i') & 0 & V_b(j') & V_b(k') & V_b(l') & 0 & 0 & 0 \end{bmatrix}$$

-continued $$\begin{bmatrix} 0 & 0 & V_a(i) & V_a(j) & 0 & V_a(k) & V_a(l) & V_a(m) \\ V_b(i') & V_b(j') & 0 & 0 & V_b(k') & 0 & 0 & 0 \end{bmatrix}$$

$$\begin{bmatrix} 0 & 0 & V_a(i) & 0 & 0 & V_a(j) & V_a(k) & V_a(l) \\ V_b(i') & V_b(j') & 0 & V_b(k') & V_b(l') & 0 & 0 & 0 \end{bmatrix}$$

$$\begin{bmatrix} 0 & 0 & 0 & V_a(i) & 0 & V_a(j) & V_a(k) & V_a(l) \\ V_b(i') & V_b(j') & V_b(k') & 0 & V_b(l') & 0 & 0 & 0 \end{bmatrix}$$

$$\begin{bmatrix} 0 & 0 & 0 & 0 & 0 & V_a(i) & V_a(j) & V_a(k) \\ V_b(i') & V_b(j') & V_b(k') & V_b(l') & V_b(m') & 0 & 0 & 0 \end{bmatrix}$$

$$\begin{bmatrix} V_a(i) & V_a(j) & V_a(k) & V_a(l) & V_a(m) & V_a(n) & V_a(p) & 0 \\ 0 & 0 & 0 & 0 & 0 & 0 & 0 & V_b(i') \end{bmatrix}$$

$$\begin{bmatrix} V_a(i) & V_a(j) & V_a(k) & 0 & V_a(l) & V_a(m) & V_a(n) & 0 \\ 0 & 0 & 0 & V_b(i') & 0 & 0 & 0 & V_b(j') \end{bmatrix}$$

$$\begin{bmatrix} V_a(i) & V_a(j) & 0 & V_a(k) & V_a(l) & V_a(m) & V_a(n) & 0 \\ 0 & 0 & V_b(i') & 0 & 0 & 0 & 0 & V_b(j') \end{bmatrix}$$

$$\begin{bmatrix} V_a(i) & V_a(j) & 0 & 0 & V_a(k) & V_a(l) & V_a(m) & 0 \\ 0 & 0 & V_b(i') & V_b(j') & 0 & 0 & 0 & V_b(k') \end{bmatrix}$$

$$\begin{bmatrix} V_a(i) & 0 & V_a(j) & V_a(k) & V_a(l) & V_a(m) & V_a(n) & 0 \\ 0 & V_b(i') & 0 & 0 & 0 & 0 & 0 & V_b(j') \end{bmatrix}$$

$$\begin{bmatrix} V_a(i) & 0 & V_a(j) & 0 & V_a(k) & V_a(l) & V_a(m) & 0 \\ 0 & V_b(i') & 0 & V_b(j') & 0 & 0 & 0 & V_b(k') \end{bmatrix}$$

$$\begin{bmatrix} V_a(i) & 0 & 0 & V_a(j) & V_a(k) & V_a(l) & V_a(m) & 0 \\ 0 & V_b(i') & V_b(j') & 0 & 0 & 0 & 0 & V_b(k') \end{bmatrix}$$

$$\begin{bmatrix} V_a(i) & 0 & 0 & 0 & V_a(j) & V_a(k) & V_a(l) & 0 \\ 0 & V_b(i') & V_b(j') & V_b(k') & 0 & 0 & 0 & V_b(l') \end{bmatrix}$$

$$\begin{bmatrix} 0 & V_a(i) & V_a(j) & V_a(k) & V_a(l) & V_a(m) & V_a(n) & 0 \\ V_b(i') & 0 & 0 & 0 & 0 & 0 & 0 & V_b(j') \end{bmatrix}$$

$$\begin{bmatrix} 0 & V_a(i) & V_a(j) & 0 & V_a(k) & V_a(l) & V_a(m) & 0 \\ V_b(i') & 0 & 0 & V_b(j') & 0 & 0 & 0 & V_b(k') \end{bmatrix}$$

$$\begin{bmatrix} 0 & V_a(i) & 0 & V_a(j) & V_a(k) & V_a(l) & V_a(m) & 0 \\ V_b(i') & 0 & V_b(j') & 0 & 0 & 0 & 0 & V_b(k') \end{bmatrix}$$

$$\begin{bmatrix} 0 & V_a(i) & 0 & 0 & V_a(j) & V_a(k) & V_a(l) & 0 \\ V_b(i') & 0 & V_b(j') & V_b(k') & 0 & 0 & 0 & V_b(l') \end{bmatrix}$$

$$\begin{bmatrix} 0 & 0 & V_a(i) & V_a(j) & V_a(k) & V_a(l) & V_a(m) & 0 \\ V_b(i') & V_b(j') & 0 & 0 & 0 & 0 & 0 & V_b(k') \end{bmatrix}$$

$$\begin{bmatrix} 0 & 0 & V_a(i) & 0 & V_a(j) & V_a(k) & V_a(l) & 0 \\ V_b(i') & V_b(j') & 0 & V_b(k') & 0 & 0 & 0 & V_b(l') \end{bmatrix}$$

$$\begin{bmatrix} 0 & 0 & 0 & V_a(i) & V_a(j) & V_a(k) & V_a(l) & 0 \\ V_b(i') & V_b(j') & V_b(k') & 0 & 0 & 0 & 0 & V_b(l') \end{bmatrix}$$

$$\begin{bmatrix} 0 & 0 & 0 & 0 & V_a(i) & V_a(j) & V_a(k) & 0 \\ V_b(i') & V_b(j') & V_b(k') & V_b(l') & 0 & 0 & 0 & V_b(m') \end{bmatrix}$$

$$\begin{bmatrix} V_a(i) & V_a(j) & V_a(k) & V_a(l) & 0 & V_a(m) & V_a(n) & 0 \\ 0 & 0 & 0 & 0 & V_b(i') & 0 & 0 & V_b(j') \end{bmatrix}$$

$$\begin{bmatrix} V_a(i) & V_a(j) & V_a(k) & 0 & 0 & V_a(l) & V_a(m) & 0 \\ 0 & 0 & 0 & V_b(i') & V_b(j') & 0 & 0 & V_b(k') \end{bmatrix}$$

$$\begin{bmatrix} V_a(i) & V_a(j) & 0 & V_a(k) & 0 & V_a(l) & V_a(m) & 0 \\ 0 & 0 & V_b(i') & 0 & V_b(j') & 0 & 0 & V_b(k') \end{bmatrix}$$

-continued $$\begin{bmatrix} V_a(i) & V_a(j) & 0 & 0 & 0 & V_a(k) & V_a(l) & 0 \\ 0 & 0 & V_b(i') & V_b(j') & V_b(k') & 0 & 0 & V_b(l') \end{bmatrix}$$

$$\begin{bmatrix} V_a(i) & 0 & 0 & V_a(j) & 0 & V_a(k) & V_a(l) & 0 \\ 0 & V_b(i') & V_b(j') & 0 & V_b(k') & 0 & 0 & V_b(l') \end{bmatrix}$$

$$\begin{bmatrix} V_a(i) & 0 & 0 & 0 & 0 & V_a(j) & V_a(k) & 0 \\ 0 & V_b(i') & V_b(j') & V_b(k') & V_b(l') & 0 & 0 & V_b(m') \end{bmatrix}$$

$$\begin{bmatrix} 0 & V_a(i) & V_a(j) & V_a(k) & 0 & V_a(l) & V_a(m) & 0 \\ V_b(i') & 0 & 0 & 0 & V_b(j') & 0 & 0 & V_b(k') \end{bmatrix}$$

$$\begin{bmatrix} 0 & V_a(i) & V_a(j) & 0 & 0 & V_a(k) & V_a(l) & 0 \\ V_b(i') & 0 & 0 & V_b(j') & V_b(k') & 0 & 0 & V_b(l') \end{bmatrix}$$

$$\begin{bmatrix} 0 & V_a(i) & 0 & V_a(j) & 0 & V_a(k) & V_a(l) & 0 \\ V_b(i') & 0 & V_b(j') & 0 & V_b(k') & 0 & 0 & V_b(l') \end{bmatrix}$$

$$\begin{bmatrix} 0 & V_a(i) & 0 & 0 & 0 & V_a(j) & V_a(k) & 0 \\ V_b(i') & 0 & V_b(j') & V_b(k') & V_b(l') & 0 & 0 & V_b(m') \end{bmatrix}$$

$$\begin{bmatrix} 0 & 0 & V_a(i) & V_a(j) & 0 & V_a(k) & V_a(l) & 0 \\ V_b(i') & V_b(j') & 0 & 0 & V_b(k') & 0 & 0 & V_b(l') \end{bmatrix}$$

$$\begin{bmatrix} 0 & 0 & V_a(i) & 0 & 0 & V_a(j) & V_a(k) & 0 \\ V_b(i') & V_b(j') & 0 & V_b(k') & V_b(l') & 0 & 0 & V_b(m') \end{bmatrix}$$

$$\begin{bmatrix} 0 & 0 & 0 & V_a(i) & 0 & V_a(j) & V_a(k) & 0 \\ V_b(i') & V_b(j') & V_b(k') & 0 & V_b(l') & 0 & 0 & V_b(m') \end{bmatrix}$$

$$\begin{bmatrix} 0 & 0 & 0 & 0 & 0 & V_a(i) & V_a(j) & 0 \\ V_b(i') & V_b(j') & V_b(k') & V_b(l') & V_b(m') & 0 & 0 & V_b(n') \end{bmatrix}$$

$$\begin{bmatrix} V_a(i) & V_a(j) & V_a(k) & V_a(l) & V_a(m) & 0 & V_a(n) & V_a(p) \\ 0 & 0 & 0 & 0 & 0 & V_b(i') & 0 & 0 \end{bmatrix}$$

$$\begin{bmatrix} V_a(i) & V_a(j) & V_a(k) & 0 & V_a(l) & 0 & V_a(m) & V_a(n) \\ 0 & 0 & 0 & V_b(i') & 0 & V_b(j') & 0 & 0 \end{bmatrix}$$

$$\begin{bmatrix} V_a(i) & V_a(j) & 0 & V_a(k) & 0 & V_a(l) & V_a(m) \\ 0 & 0 & V_b(i') & V_b(j') & 0 & V_b(k') & 0 & 0 \end{bmatrix}$$

$$\begin{bmatrix} V_a(i) & 0 & V_a(j) & V_a(k) & V_a(l) & 0 & V_a(m) & V_a(n) \\ 0 & V_b(i') & 0 & 0 & 0 & V_b(j') & 0 & 0 \end{bmatrix}$$

$$\begin{bmatrix} V_a(i) & 0 & V_a(j) & V_a(k) & 0 & V_a(l) & V_a(m) \\ 0 & V_b(i') & 0 & 0 & V_b(j') & 0 & V_b(k') & 0 \end{bmatrix}$$

$$\begin{bmatrix} V_a(i) & 0 & V_a(j) & 0 & V_a(k) & 0 & V_a(l) & V_a(m) \\ 0 & V_b(i') & 0 & V_b(j') & 0 & V_b(k') & 0 & 0 \end{bmatrix}$$

$$\begin{bmatrix} V_a(i) & 0 & 0 & 0 & V_a(j) & 0 & V_a(k) & V_a(l) \\ 0 & V_b(i') & V_b(j') & V_b(k') & 0 & V_b(l') & 0 & 0 \end{bmatrix}$$

$$\begin{bmatrix} 0 & V_a(i) & V_a(j) & V_a(k) & V_a(l) & 0 & V_a(m) & V_a(n) \\ V_b(i') & 0 & 0 & 0 & 0 & V_b(j') & 0 & 0 \end{bmatrix}$$

$$\begin{bmatrix} 0 & V_a(i) & V_a(j) & 0 & V_a(k) & 0 & V_a(l) & V_a(m) \\ V_b(i') & 0 & 0 & V_b(j') & 0 & V_b(k') & 0 & 0 \end{bmatrix}$$

$$\begin{bmatrix} 0 & V_a(i) & 0 & V_a(j) & 0 & V_a(k) & V_a(l) \\ V_b(i') & 0 & V_b(j') & 0 & V_b(k') & V_b(l') & 0 & 0 \end{bmatrix}$$

$$\begin{bmatrix} 0 & 0 & V_a(i) & V_a(j) & V_a(k) & 0 & V_a(l) & V_a(m) \\ V_b(i') & V_b(j') & 0 & 0 & 0 & V_b(k') & 0 & 0 \end{bmatrix}$$

$$\begin{bmatrix} 0 & 0 & V_a(i) & 0 & V_a(j) & 0 & V_a(k) & V_a(l) \\ V_b(i') & V_b(j') & 0 & V_b(k') & 0 & V_b(l') & 0 & 0 \end{bmatrix}$$

$$\begin{bmatrix} 0 & 0 & 0 & V_a(i) & V_a(j) & 0 & V_a(k) & V_a(l) \\ V_b(i') & V_b(j') & V_b(k') & 0 & 0 & V_b(l') & 0 & 0 \end{bmatrix}$$

$$\begin{bmatrix} 0 & 0 & 0 & 0 & V_a(i) & 0 & V_a(j) & V_a(k) \\ V_b(i') & V_b(j') & V_b(k') & V_b(l') & 0 & V_b(m') & 0 & 0 \end{bmatrix}$$

$$\begin{bmatrix} V_a(i) & V_a(j) & V_a(k) & V_a(l) & 0 & 0 & V_a(m) & V_a(n) \\ 0 & 0 & 0 & 0 & V_b(i') & V_b(j') & 0 & 0 \end{bmatrix}$$

$$\begin{bmatrix} V_a(i) & V_a(j) & V_a(k) & 0 & 0 & 0 & V_a(l) & V_a(m) \\ 0 & 0 & 0 & V_b(i') & V_b(j') & V_b(k') & 0 & 0 \end{bmatrix}$$

$$\begin{bmatrix} V_a(i) & V_a(j) & 0 & V_a(k) & 0 & 0 & V_a(l) & V_a(m) \\ 0 & 0 & V_b(i') & 0 & V_b(j') & V_b(k') & 0 & 0 \end{bmatrix}$$

$$\begin{bmatrix} V_a(i) & V_a(j) & 0 & 0 & 0 & 0 & V_a(k) & V_a(l) \\ 0 & 0 & V_b(i') & V_b(j') & V_b(k') & V_b(l') & 0 & 0 \end{bmatrix}$$

$$\begin{bmatrix} V_a(i) & 0 & V_a(j) & V_a(k) & 0 & 0 & V_a(l) & V_a(m) \\ 0 & V_b(i') & 0 & 0 & V_b(j') & V_b(k') & 0 & 0 \end{bmatrix}$$

$$\begin{bmatrix} V_a(i) & 0 & V_a(j) & 0 & 0 & 0 & V_a(k) & V_a(l) \\ 0 & V_b(i') & 0 & V_b(j') & V_b(k') & V_b(l') & 0 & 0 \end{bmatrix}$$

$$\begin{bmatrix} V_a(i) & 0 & 0 & V_a(j) & 0 & 0 & V_a(k) & V_a(l) \\ 0 & V_b(i') & V_b(j') & 0 & V_b(k') & V_b(l') & 0 & 0 \end{bmatrix}$$

$$\begin{bmatrix} V_a(i) & 0 & 0 & 0 & 0 & 0 & V_a(j) & V_a(k) \\ 0 & V_b(i') & V_b(j') & V_b(k') & V_b(l') & V_b(m') & 0 & 0 \end{bmatrix}$$

$$\begin{bmatrix} 0 & V_a(i) & V_a(j) & V_a(k) & 0 & 0 & V_a(l) & V_a(m) \\ V_b(i') & 0 & 0 & 0 & V_b(j') & V_b(k') & 0 & 0 \end{bmatrix}$$

$$\begin{bmatrix} 0 & V_a(i) & V_a(j) & 0 & 0 & 0 & V_a(k) & V_a(l) \\ V_b(i') & 0 & 0 & V_b(j') & V_b(k') & V_b(l') & 0 & 0 \end{bmatrix}$$

$$\begin{bmatrix} 0 & V_a(i) & 0 & V_a(j) & 0 & 0 & V_a(k) & V_a(l) \\ V_b(i') & 0 & V_b(j') & 0 & V_b(k') & V_b(l') & 0 & 0 \end{bmatrix}$$

$$\begin{bmatrix} 0 & V_a(i) & 0 & 0 & 0 & 0 & V_a(j) & V_a(k) \\ V_b(i') & 0 & V_b(j') & V_b(k') & V_b(l') & V_b(m') & 0 & 0 \end{bmatrix}$$

$$\begin{bmatrix} 0 & 0 & V_a(i) & V_a(j) & 0 & 0 & V_a(k) & V_a(l) \\ V_b(i') & V_b(j') & 0 & 0 & V_b(k') & V_b(l') & 0 & 0 \end{bmatrix}$$

$$\begin{bmatrix} 0 & 0 & V_a(i) & 0 & 0 & 0 & V_a(j) & V_a(k) \\ V_b(i') & V_b(j') & 0 & V_b(k') & V_b(l') & V_b(m') & 0 & 0 \end{bmatrix}$$

$$\begin{bmatrix} 0 & 0 & 0 & V_a(i) & 0 & 0 & V_a(j) & V_a(k) \\ V_b(i') & V_b(j') & V_b(k') & 0 & V_b(l') & V_b(m') & 0 & 0 \end{bmatrix}$$

$$\begin{bmatrix} 0 & 0 & 0 & 0 & 0 & 0 & V_a(i) & V_a(j) \\ V_b(i') & V_b(j') & V_b(k') & V_b(l') & V_b(m') & V_b(k') & 0 & 0 \end{bmatrix}$$

$$\begin{bmatrix} V_a(i) & V_a(j) & V_a(k) & V_a(l) & V_a(m) & 0 & V_a(n) & 0 \\ 0 & 0 & 0 & 0 & 0 & V_b(i) & 0 & V_b(j) \end{bmatrix}$$

$$\begin{bmatrix} V_a(i) & V_a(j) & V_a(k) & 0 & V_a(l) & 0 & V_a(m) & 0 \\ 0 & 0 & 0 & V_b(i') & 0 & V_b(j') & 0 & V_b(k') \end{bmatrix}$$

$$\begin{bmatrix} V_a(i) & V_a(j) & 0 & V_a(k) & V_a(l) & 0 & V_a(m) & 0 \\ 0 & 0 & V_b(i') & 0 & 0 & V_b(j') & 0 & V_b(k') \end{bmatrix}$$

$$\begin{bmatrix} V_a(i) & V_a(j) & 0 & 0 & V_a(k) & 0 & V_a(l) & 0 \\ 0 & 0 & V_b(i') & V_b(j') & 0 & V_b(k') & 0 & V_b(l') \end{bmatrix}$$

$$\begin{bmatrix} V_a(i) & 0 & V_a(j) & V_a(k) & V_a(l) & 0 & V_a(m) & 0 \\ 0 & V_b(i') & 0 & 0 & 0 & V_b(j') & 0 & V_b(k') \end{bmatrix}$$

$$\begin{bmatrix} V_a(i) & 0 & V_a(j) & 0 & V_a(k) & 0 & V_a(l) & 0 \\ 0 & V_b(i') & 0 & V_b(j') & 0 & V_b(k') & 0 & V_b(l') \end{bmatrix}$$

$$\begin{bmatrix} V_a(i) & 0 & 0 & V_a(j) & V_a(k) & 0 & V_a(l) & 0 \\ 0 & V_b(i') & V_b(j') & 0 & 0 & V_b(k') & 0 & V_b(l') \end{bmatrix}$$

$$\begin{bmatrix} V_a(i) & 0 & 0 & 0 & V_a(j) & 0 & V_a(k) & 0 \\ 0 & V_b(i') & V_b(j') & V_b(k') & 0 & V_b(l') & 0 & V_b(m') \end{bmatrix}$$

$$\begin{bmatrix} 0 & V_a(i) & V_a(j) & V_a(k) & V_a(l) & 0 & V_a(m) & 0 \\ V_b(i') & 0 & 0 & 0 & 0 & V_b(j') & 0 & V_b(k') \end{bmatrix}$$

$$\begin{bmatrix} 0 & V_a(i) & 0 & V_a(j) & V_a(k) & 0 & V_a(l) & 0 \\ V_b(i') & 0 & V_b(j') & 0 & 0 & V_b(k') & 0 & V_b(m') \end{bmatrix}$$

$$\begin{bmatrix} 0 & V_a(i) & 0 & 0 & V_a(j) & 0 & V_a(k) & 0 \\ V_b(i') & 0 & V_b(j') & V_b(k') & 0 & V_b(l') & 0 & V_b(m') \end{bmatrix}$$

$$\begin{bmatrix} 0 & 0 & V_a(i) & V_a(j) & V_a(k) & 0 & V_a(l) & 0 \\ V_b(i') & V_b(j') & 0 & 0 & 0 & V_b(k') & 0 & V_b(l') \end{bmatrix}$$

$$\begin{bmatrix} 0 & 0 & V_a(i) & 0 & 0 & 0 & V_a(j) & 0 \\ V_b(i') & V_b(j') & V_b(k') & V_b(l') & 0 & V_b(m') & 0 & V_b(n') \end{bmatrix}$$

$$\begin{bmatrix} V_a(i) & V_a(j) & V_a(k) & V_a(l) & 0 & 0 & V_a(m) & 0 \\ 0 & 0 & 0 & 0 & V_b(i') & V_b(j') & 0 & V_b(k') \end{bmatrix}$$

$$\begin{bmatrix} V_a(i) & V_a(j) & V_a(k) & 0 & 0 & 0 & V_a(l) & 0 \\ 0 & 0 & 0 & V_b(i') & V_b(j') & V_b(l') & 0 & V_b(m') \end{bmatrix}$$

$$\begin{bmatrix} V_a(i) & V_a(j) & 0 & V_a(k) & 0 & 0 & V_a(l) & 0 \\ 0 & 0 & V_b(i') & 0 & V_b(j') & V_b(k') & 0 & V_b(l') \end{bmatrix}$$

$$\begin{bmatrix} V_a(i) & V_a(j) & 0 & 0 & 0 & 0 & V_a(k) & 0 \\ 0 & 0 & V_b(i') & V_b(j') & V_b(k') & V_b(l') & 0 & V_b(m') \end{bmatrix}$$

$$\begin{bmatrix} V_a(i) & 0 & V_a(j) & V_a(k) & 0 & 0 & V_a(l) & 0 \\ 0 & V_b(i') & 0 & 0 & V_b(j') & V_b(k') & 0 & V_b(l') \end{bmatrix}$$

$$\begin{bmatrix} V_a(i) & 0 & V_a(j) & 0 & 0 & 0 & V_a(k) & 0 \\ 0 & V_b(i') & 0 & V_b(j') & V_b(k') & V_b(l') & 0 & V_b(m') \end{bmatrix}$$

$$\begin{bmatrix} V_a(i) & 0 & 0 & V_a(j) & 0 & 0 & V_a(k) & 0 \\ 0 & V_b(i') & V_b(h') & 0 & V_b(k') & V_b(l') & 0 & V_b(m') \end{bmatrix}$$

$$\begin{bmatrix} V_a(i) & 0 & 0 & 0 & 0 & 0 & V_a(j) & 0 \\ 0 & V_b(i') & V_b(j') & V_b(k') & V_b(l') & V_b(m') & 0 & V_b(n') \end{bmatrix}$$

$$\begin{bmatrix} 0 & V_a(i) & V_a(j) & V_a(k) & 0 & 0 & V_a(l) & 0 \\ V_b(i') & 0 & 0 & 0 & V_b(j') & V_b(k') & 0 & V_b(l') \end{bmatrix}$$

$$\begin{bmatrix} 0 & V_a(i) & V_a(j) & 0 & 0 & 0 & V_a(k) & 0 \\ V_b(i') & 0 & 0 & V_b(j') & V_b(k') & V_b(l') & 0 & V_b(m') \end{bmatrix}$$

$$\begin{bmatrix} 0 & V_a(i) & 0 & V_a(j) & 0 & 0 & V_a(k) & 0 \\ V_b(i') & 0 & V_b(j') & 0 & V_b(k') & V_b(l') & 0 & V_b(m') \end{bmatrix}$$

-continued $$\begin{bmatrix} 0 & V_a(i) & 0 & 0 & 0 & 0 & V_a(j) & 0 \\ V_b(i') & 0 & V_b(j') & V_b(k') & V_b(l') & V_b(m') & 0 & V_b(n') \end{bmatrix}$$

$$\begin{bmatrix} 0 & 0 & V_a(i) & V_a(j) & 0 & 0 & V_a(k) & 0 \\ V_b(i') & V_b(j') & 0 & 0 & V_b(k') & V_b(l') & 0 & V_b(m') \end{bmatrix}$$

$$\begin{bmatrix} 0 & 0 & V_a(i) & 0 & 0 & 0 & V_a(j) & 0 \\ V_b(i') & V_b(j') & 0 & V_b(k') & V_b(l') & V_b(m') & 0 & V_b(n') \end{bmatrix}$$

$$\begin{bmatrix} 0 & 0 & 0 & V_a(i) & 0 & 0 & V_a(j) & 0 \\ V_b(i') & V_b(j') & 0 & 0 & V_b(k') & V_b(l') & 0 & V_b(m') \end{bmatrix}$$ wait $$\begin{bmatrix} 0 & 0 & 0 & V_a(i) & 0 & 0 & V_a(j) & 0 \\ V_b(i') & V_b(j') & 0 & V_b(k') & 0 & V_b(l') & 0 & V_b(m') \end{bmatrix}$$

$$\begin{bmatrix} 0 & 0 & 0 & 0 & 0 & 0 & V_a(i) & 0 \\ V_b(i') & V_b(j') & V_b(k') & V_b(l') & V_b(m') & V_b(n') & 0 & V_b(p') \end{bmatrix}$$

$$\begin{bmatrix} V_a(i) & V_a(j) & V_a(k) & V_a(l) & V_a(m) & V_a(n) & 0 & V_a(p) \\ 0 & 0 & 0 & 0 & 0 & 0 & V_b(i') & 0 \end{bmatrix}$$

$$\begin{bmatrix} V_a(i) & V_a(j) & V_a(k) & 0 & V_a(l) & V_a(m) & 0 & V_a(n) \\ 0 & 0 & 0 & V_b(i') & 0 & 0 & V_b(j') & 0 \end{bmatrix}$$

$$\begin{bmatrix} V_a(i) & V_a(j) & 0 & V_a(k) & V_a(l) & V_a(m) & 0 & V_a(n) \\ 0 & 0 & V_b(i') & 0 & 0 & 0 & V_b(j') & 0 \end{bmatrix}$$

$$\begin{bmatrix} V_a(i) & V_a(j) & 0 & 0 & V_a(k) & V_a(l) & 0 & V_a(m) \\ 0 & 0 & V_b(i') & V_b(j') & 0 & 0 & V_b(k') & 0 \end{bmatrix}$$

$$\begin{bmatrix} V_a(i) & 0 & V_a(j) & V_a(k) & V_a(l) & V_a(m) & 0 & V_a(n) \\ 0 & V_b(i') & 0 & 0 & 0 & 0 & V_b(j') & 0 \end{bmatrix}$$

$$\begin{bmatrix} V_a(i) & 0 & V_a(j) & 0 & V_a(k) & V_a(l) & 0 & V_a(m) \\ 0 & V_b(i') & 0 & V_b(j') & 0 & 0 & V_b(k') & 0 \end{bmatrix}$$

$$\begin{bmatrix} V_a(i) & 0 & 0 & V_a(j) & V_a(k) & V_a(l) & 0 & V_a(m) \\ 0 & V_b(i') & V_b(j') & 0 & 0 & 0 & V_b(k') & 0 \end{bmatrix}$$

$$\begin{bmatrix} V_a(i) & 0 & 0 & 0 & V_a(j) & V_a(k) & 0 & V_a(l) \\ 0 & V_b(i') & V_b(j') & V_b(k') & 0 & 0 & V_b(l') & 0 \end{bmatrix}$$

$$\begin{bmatrix} 0 & V_a(i) & V_a(j) & V_a(k) & V_a(l) & V_a(m) & 0 & V_a(n) \\ V_b(i') & 0 & 0 & 0 & 0 & 0 & V_b(j') & 0 \end{bmatrix}$$

$$\begin{bmatrix} 0 & V_a(i) & V_a(j) & 0 & V_a(k) & V_a(l) & 0 & V_a(m) \\ V_b(i') & 0 & 0 & V_b(j') & 0 & 0 & V_b(k') & 0 \end{bmatrix}$$

$$\begin{bmatrix} 0 & V_a(i) & 0 & V_a(j) & V_a(k) & V_a(l) & 0 & V_a(m) \\ V_b(i') & 0 & V_b(j') & 0 & 0 & 0 & V_b(k') & 0 \end{bmatrix}$$

$$\begin{bmatrix} 0 & V_a(i) & 0 & 0 & V_a(j) & V_a(k) & 0 & V_a(l) \\ V_b(i') & 0 & V_b(j') & V_b(k') & 0 & 0 & V_b(l') & 0 \end{bmatrix}$$

$$\begin{bmatrix} 0 & 0 & V_a(i) & V_a(j) & V_a(k) & V_a(l) & 0 & V_a(m) \\ V_b(i') & V_b(j') & 0 & 0 & 0 & 0 & V_b(k') & 0 \end{bmatrix}$$

$$\begin{bmatrix} 0 & 0 & V_a(i) & 0 & V_a(j) & V_a(k) & 0 & V_a(l) \\ V_b(i') & V_b(j') & 0 & V_b(k') & 0 & 0 & V_b(l') & 0 \end{bmatrix}$$

$$\begin{bmatrix} 0 & 0 & 0 & V_a(i) & V_a(j) & V_a(k) & 0 & V_a(l) \\ V_b(i') & V_b(j') & V_b(k') & 0 & 0 & 0 & V_b(l') & 0 \end{bmatrix}$$

$$\begin{bmatrix} 0 & 0 & 0 & 0 & V_a(i) & V_a(j) & 0 & V_a(k) \\ V_b(i') & V_b(j') & V_b(k') & V_b(l') & 0 & 0 & V_b(m') & 0 \end{bmatrix}$$

$$\begin{bmatrix} V_a(i) & V_a(j) & V_a(k) & V_a(l) & 0 & V_a(m) & 0 & V_a(n) \\ 0 & 0 & 0 & 0 & V_b(i') & 0 & V_b(j') & 0 \end{bmatrix}$$

$$\begin{bmatrix} V_a(i) & V_a(j) & V_a(k) & 0 & V_a(l) & V_a(m) & 0 & 0 \\ 0 & 0 & 0 & V_b(i') & 0 & 0 & V_b(j') & V_b(k') \end{bmatrix}$$

-continued $$\begin{bmatrix} V_a(i) & V_a(j) & 0 & V_a(k) & 0 & V_a(l) & 0 & V_a(m) \\ 0 & 0 & V_b(i') & 0 & V_b(j') & 0 & V_b(k') & 0 \end{bmatrix}$$

$$\begin{bmatrix} V_a(i) & V_a(j) & 0 & 0 & 0 & V_a(k) & 0 & V_a(l) \\ 0 & 0 & V_b(i') & V_b(j') & 0 & 0 & V_b(k') & 0 \end{bmatrix}$$

$$\begin{bmatrix} V_a(i) & 0 & V_a(k) & V_a(l) & 0 & V_a(l) & 0 & V_a(m) \\ 0 & V_b(i') & 0 & 0 & V_b(j') & 0 & V_b(k') & 0 \end{bmatrix}$$

$$\begin{bmatrix} V_a(i) & 0 & V_a(j) & 0 & 0 & V_a(k) & 0 & V_a(l) \\ 0 & V_b(i') & 0 & V_b(j') & V_b(k') & 0 & V_b(l') & 0 \end{bmatrix}$$

$$\begin{bmatrix} V_a(i) & 0 & 0 & V_a(j) & 0 & V_a(k) & 0 & V_a(l) \\ 0 & V_b(i') & V_b(j') & 0 & V_b(k') & 0 & V_b(l') & 0 \end{bmatrix}$$

$$\begin{bmatrix} V_a(i) & 0 & 0 & 0 & V_a(j) & 0 & V_a(k) \\ 0 & V_b(i') & V_b(j') & V_b(k') & V_b(l') & 0 & V_b(m') & 0 \end{bmatrix}$$

$$\begin{bmatrix} 0 & V_a(i) & V_a(j) & V_a(k) & 0 & V_a(l) & 0 & V_a(m) \\ V_b(i') & 0 & 0 & 0 & V_b(j') & 0 & V_b(k') & 0 \end{bmatrix}$$

$$\begin{bmatrix} 0 & V_a(i) & V_a(j) & 0 & 0 & V_a(k) & 0 & V_a(l) \\ V_b(i') & 0 & 0 & V_b(j') & V_b(k') & 0 & V_b(l') & 0 \end{bmatrix}$$

$$\begin{bmatrix} 0 & V_a(i) & 0 & V_a(j) & 0 & V_a(k) & 0 & V_a(l) \\ V_b(i') & 0 & V_b(j') & 0 & V_b(k') & 0 & V_b(l') & 0 \end{bmatrix}$$

$$\begin{bmatrix} 0 & V_a(i) & 0 & 0 & 0 & V_a(j) & 0 & V_a(k) \\ V_b(i') & 0 & V_b(j') & V_b(k') & V_b(l') & 0 & V_b(m') & 0 \end{bmatrix}$$

$$\begin{bmatrix} 0 & 0 & V_a(i) & V_a(j) & 0 & V_a(k) & 0 & V_a(l) \\ V_b(i') & V_b(j') & 0 & 0 & V_b(k') & 0 & V_b(l') & 0 \end{bmatrix}$$

$$\begin{bmatrix} 0 & 0 & V_a(i) & 0 & V_a(j) & 0 & V_a(k) \\ V_b(i') & V_b(j') & 0 & V_b(k') & V_b(l') & 0 & V_b(m') & 0 \end{bmatrix}$$

$$\begin{bmatrix} 0 & 0 & 0 & V_a(i) & 0 & V_a(j) & 0 & V_a(k) \\ V_b(i') & V_b(j') & V_b(k') & 0 & V_b(l') & 0 & V_b(m') & 0 \end{bmatrix}$$

$$\begin{bmatrix} 0 & 0 & 0 & 0 & 0 & V_a(i) & 0 & V_a(j) \\ V_b(i') & V_b(j') & V_b(k') & V_b(l') & V_b(m') & 0 & V_b(n') & 0 \end{bmatrix}$$

$$\begin{bmatrix} V_a(i) & V_a(j) & V_a(k) & V_a(l) & V_a(m) & V_a(n) & 0 & 0 \\ 0 & 0 & 0 & 0 & 0 & 0 & V_b(i') & V_b(j') \end{bmatrix}$$

$$\begin{bmatrix} V_a(i) & V_a(j) & V_a(k) & 0 & V_a(l) & V_a(m) & 0 & 0 \\ 0 & 0 & 0 & V_b(i') & 0 & 0 & V_b(j') & V_b(k') \end{bmatrix}$$

$$\begin{bmatrix} V_a(i) & V_a(j) & 0 & V_a(k) & V_a(l) & V_a(m) & 0 & 0 \\ 0 & 0 & V_b(i') & 0 & 0 & 0 & V_b(j') & V_b(k') \end{bmatrix}$$

$$\begin{bmatrix} V_a(i) & V_a(j) & 0 & 0 & V_a(k) & V_a(l) & 0 & 0 \\ 0 & 0 & V_b(i') & V_b(j') & 0 & 0 & V_b(k') & V_b(l') \end{bmatrix}$$

$$\begin{bmatrix} V_a(i) & 0 & V_a(j) & V_a(k) & V_a(l) & V_a(m) & 0 & 0 \\ 0 & V_b(i') & 0 & 0 & 0 & 0 & V_b(j') & V_b(k') \end{bmatrix}$$

$$\begin{bmatrix} V_a(i) & 0 & V_a(j) & 0 & V_a(k) & V_a(l) & 0 & 0 \\ 0 & V_b(i') & 0 & V_b(j') & 0 & 0 & V_b(k') & V_b(l') \end{bmatrix}$$

$$\begin{bmatrix} V_a(i) & 0 & 0 & V_a(j) & V_a(k) & V_a(l) & 0 & 0 \\ 0 & V_b(i') & V_b(j') & 0 & 0 & 0 & V_b(k') & V_b(l') \end{bmatrix}$$

$$\begin{bmatrix} V_a(i) & 0 & 0 & 0 & V_a(j) & V_a(k) & 0 & 0 \\ 0 & V_b(i') & V_b(j') & V_b(k') & 0 & 0 & V_b(l') & V_b(m') \end{bmatrix}$$

$$\begin{bmatrix} 0 & V_a(i) & V_a(j) & V_a(k) & V_a(l) & V_a(m) & 0 & 0 \\ V_b(i') & 0 & 0 & 0 & 0 & 0 & V_b(j') & V_b(k') \end{bmatrix}$$

$$\begin{bmatrix} 0 & V_a(i) & V_a(j) & 0 & V_a(k) & V_a(l) & 0 & 0 \\ V_b(i') & 0 & 0 & V_b(j') & 0 & 0 & V_b(k') & V_b(l') \end{bmatrix}$$

$$\begin{bmatrix} 0 & V_a(i) & 0 & V_a(j) & V_a(k) & V_a(l) & 0 & 0 \\ V_b(i') & 0 & V_b(j') & 0 & 0 & 0 & V_b(k') & V_b(l') \end{bmatrix}$$

$$\begin{bmatrix} 0 & V_a(i) & 0 & 0 & V_a(j) & V_a(k) & 0 & 0 \\ V_b(i') & 0 & V_b(j') & V_b(k') & 0 & 0 & V_b(l') & V_b(m') \end{bmatrix}$$

$$\begin{bmatrix} 0 & 0 & V_a(i) & V_a(j) & V_a(k) & V_a(l) & 0 & 0 \\ V_b(i') & V_b(j') & 0 & 0 & 0 & 0 & V_b(k') & V_b(l') \end{bmatrix}$$

$$\begin{bmatrix} 0 & 0 & V_a(i) & 0 & V_a(j) & V_a(k) & 0 & 0 \\ V_b(i') & V_b(j') & 0 & 0 & 0 & 0 & V_b(l') & V_b(m') \end{bmatrix}$$

$$\begin{bmatrix} 0 & 0 & 0 & V_a(i) & V_a(j) & V_a(k) & 0 & 0 \\ V_b(i') & V_b(j') & V_b(k') & 0 & 0 & 0 & V_b(l') & V_b(m') \end{bmatrix}$$

$$\begin{bmatrix} 0 & 0 & 0 & V_a(i) & V_a(j) & 0 & 0 & 0 \\ V_b(i') & V_b(j') & V_b(k') & V_b(l') & 0 & 0 & V_b(m') & V_b(n') \end{bmatrix}$$

$$\begin{bmatrix} V_a(i) & V_a(j) & V_a(k) & V_a(l) & 0 & V_a(m) & 0 & 0 \\ 0 & 0 & 0 & 0 & V_b(i') & 0 & V_b(j') & V_b(k') \end{bmatrix}$$

$$\begin{bmatrix} V_a(i) & V_a(j) & V_a(k) & 0 & 0 & V_a(l) & 0 & 0 \\ 0 & 0 & 0 & V_b(i') & V_b(j') & 0 & V_b(k') & V_b(l') \end{bmatrix}$$

$$\begin{bmatrix} V_a(i) & V_a(j) & 0 & V_a(k) & 0 & V_a(l) & 0 & 0 \\ 0 & 0 & V_b(i') & 0 & V_b(j') & 0 & V_b(k') & V_b(l') \end{bmatrix}$$

$$\begin{bmatrix} V_a(i) & V_a(j) & 0 & 0 & 0 & V_a(k) & 0 & 0 \\ 0 & 0 & V_b(i') & V_b(j') & 0 & 0 & V_b(l') & V_b(m') \end{bmatrix}$$

$$\begin{bmatrix} V_a(i) & 0 & V_a(j) & V_a(k) & 0 & V_a(l) & 0 & 0 \\ 0 & V_b(i') & 0 & 0 & V_b(j') & 0 & V_b(k') & V_b(l') \end{bmatrix}$$

$$\begin{bmatrix} V_a(i) & 0 & V_a(j) & 0 & 0 & V_a(k) & 0 & 0 \\ 0 & V_b(i') & 0 & V_b(j') & V_b(k') & 0 & V_b(l') & V_b(m') \end{bmatrix}$$

$$\begin{bmatrix} V_a(i) & 0 & 0 & V_a(j) & 0 & V_a(k) & 0 & 0 \\ 0 & V_b(i') & V_b(j') & 0 & 0 & 0 & V_b(l') & V_b(m') \end{bmatrix}$$

$$\begin{bmatrix} V_a(i) & 0 & 0 & 0 & 0 & V_a(j) & 0 & 0 \\ 0 & V_b(i') & V_b(j') & V_b(k') & V_b(l') & 0 & V_b(m') & V_b(n') \end{bmatrix}$$

$$\begin{bmatrix} 0 & V_a(i) & V_a(j) & V_a(k) & 0 & V_a(l) & 0 & 0 \\ V_b(i') & 0 & 0 & 0 & V_b(j') & 0 & V_b(k') & V_b(l') \end{bmatrix}$$

$$\begin{bmatrix} 0 & V_a(i) & V_a(j) & 0 & 0 & V_a(k) & 0 & 0 \\ V_b(i') & 0 & 0 & V_b(j') & V_b(k') & 0 & V_b(l') & V_b(m') \end{bmatrix}$$

$$\begin{bmatrix} 0 & V_a(i) & 0 & V_a(j) & 0 & V_a(k) & 0 & 0 \\ V_b(i') & 0 & V_b(j') & 0 & V_b(k') & 0 & V_b(l') & V_b(m') \end{bmatrix}$$

$$\begin{bmatrix} 0 & V_a(i) & 0 & 0 & V_a(j) & 0 & 0 & 0 \\ V_b(i') & 0 & V_b(j') & V_b(k') & 0 & V_b(l') & 0 & V_b(n') \end{bmatrix}$$

$$\begin{bmatrix} 0 & 0 & V_a(i) & V_a(j) & V_a(k) & 0 & 0 & 0 \\ V_b(i') & V_b(j') & 0 & 0 & 0 & V_b(l') & 0 & V_b(m') \end{bmatrix}$$

$$\begin{bmatrix} 0 & 0 & V_a(i) & V_a(j) & 0 & V_a(k) & 0 & 0 \\ V_b(i') & V_b(j') & 0 & 0 & V_b(k') & 0 & V_b(l') & V_b(m') \end{bmatrix}$$

$$\begin{bmatrix} 0 & 0 & V_a(i) & 0 & V_a(j) & 0 & 0 & 0 \\ V_b(i') & V_b(j') & 0 & V_b(k') & 0 & V_b(l') & 0 & V_b(m') \end{bmatrix}$$

$$\begin{bmatrix} 0 & 0 & 0 & 0 & 0 & V_a(i) & 0 & 0 \\ V_b(i') & V_b(j') & V_b(k') & V_b(l') & V_b(m') & 0 & V_b(n') & V_b(p') \end{bmatrix}$$

$$\begin{bmatrix} V_a(i) & V_a(j) & V_a(k) & V_a(l) & V_a(m) & 0 & 0 & V_a(n) \\ 0 & 0 & 0 & 0 & 0 & V_b(i') & V_b(j') & 0 \end{bmatrix}$$

$$\begin{bmatrix} V_a(i) & V_a(j) & V_a(k) & 0 & V_a(l) & 0 & 0 & V_a(m) \\ 0 & 0 & 0 & V_b(i') & 0 & V_b(j') & V_b(k') & 0 \end{bmatrix}$$

$$\begin{bmatrix} V_a(i) & V_a(j) & 0 & V_a(k) & V_a(l) & 0 & 0 & V_a(m) \\ 0 & 0 & V_b(i') & 0 & 0 & V_b(j') & V_b(k') & 0 \end{bmatrix}$$

$$\begin{bmatrix} V_a(i) & V_a(j) & 0 & 0 & V_a(k) & 0 & 0 & V_a(l) \\ 0 & 0 & V_b(i') & V_b(j') & 0 & V_b(k') & V_b(l') & 0 \end{bmatrix}$$

$$\begin{bmatrix} V_a(i) & 0 & V_a(j) & V_a(k) & V_a(l) & 0 & 0 & V_a(m) \\ 0 & V_b(i') & 0 & 0 & 0 & V_b(j') & V_b(k') & 0 \end{bmatrix}$$

$$\begin{bmatrix} V_a(i) & 0 & V_a(j) & 0 & V_a(k) & 0 & 0 & V_a(l) \\ 0 & V_b(i') & 0 & V_b(j') & 0 & V_b(k') & V_b(l') & 0 \end{bmatrix}$$

$$\begin{bmatrix} V_a(i) & 0 & 0 & V_a(j) & V_a(k) & 0 & 0 & V_a(l) \\ 0 & V_b(i') & V_b(j') & 0 & 0 & V_b(k') & V_b(l') & 0 \end{bmatrix}$$

$$\begin{bmatrix} V_a(i) & 0 & 0 & 0 & V_a(j) & 0 & 0 & V_a(k) \\ 0 & V_b(i') & V_b(j') & V_b(k') & 0 & V_b(l') & V_b(m') & 0 \end{bmatrix}$$

$$\begin{bmatrix} 0 & V_a(i) & 0 & 0 & V_a(j) & V_a(k) & 0 & V_a(m) \\ V_b(i') & 0 & 0 & 0 & 0 & V_b(j') & V_b(k') & 0 \end{bmatrix}$$

$$\begin{bmatrix} 0 & V_a(i) & V_a(j) & 0 & V_a(k) & 0 & 0 & V_a(l) \\ V_b(i') & 0 & 0 & V_b(j') & 0 & V_b(k') & V_b(l') & 0 \end{bmatrix}$$

$$\begin{bmatrix} 0 & V_a(i) & 0 & V_a(j) & V_a(k) & 0 & 0 & V_a(l) \\ V_b(i') & 0 & V_b(j') & 0 & 0 & V_b(k') & V_b(l') & 0 \end{bmatrix}$$

$$\begin{bmatrix} 0 & 0 & V_a(i) & V_a(j) & V_a(k) & 0 & 0 & V_a(l) \\ V_b(i') & V_b(j') & 0 & 0 & 0 & V_b(k') & V_b(l') & 0 \end{bmatrix}$$

$$\begin{bmatrix} 0 & 0 & 0 & V_a(i) & V_a(j) & 0 & 0 & V_a(k) \\ V_b(i') & V_b(j') & V_b(k') & 0 & 0 & V_b(l') & V_b(m') & 0 \end{bmatrix}$$

$$\begin{bmatrix} 0 & 0 & 0 & 0 & V_a(i) & 0 & 0 & V_a(j) \\ V_b(i') & V_b(j') & V_b(k') & V_b(l') & 0 & V_b(m') & V_b(n') & 0 \end{bmatrix}$$

$$\begin{bmatrix} V_a(i) & V_a(j) & V_a(k) & V_a(l) & 0 & 0 & 0 & V_a(m) \\ 0 & 0 & 0 & 0 & V_b(i') & V_bj(j') & V_b(k') & 0 \end{bmatrix}$$

$$\begin{bmatrix} V_a(i) & V_a(j) & V_a(k) & 0 & 0 & 0 & 0 & V_a(l) \\ 0 & 0 & 0 & V_b(i') & V_b(j') & V_b(k') & V_b(l') & 0 \end{bmatrix}$$

$$\begin{bmatrix} V_a(i) & V_a(j) & 0 & V_a(k) & 0 & 0 & 0 & V_a(l) \\ 0 & 0 & V_b(i') & 0 & V_b(j') & V_b(k') & V_b(l') & 0 \end{bmatrix}$$

$$\begin{bmatrix} V_a(i) & V_a(j) & 0 & 0 & 0 & 0 & 0 & V_a(k) \\ 0 & 0 & V_b(i') & V_b(j') & V_b(k') & V_b(l') & V_b(m') & 0 \end{bmatrix}$$

$$\begin{bmatrix} V_a(i) & 0 & V_a(j) & V_a(k) & 0 & 0 & 0 & V_a(l) \\ 0 & V_b(i') & 0 & 0 & V_b(j') & V_b(k') & V_b(l') & 0 \end{bmatrix}$$

$$\begin{bmatrix} V_a(i) & 0 & V_a(j) & 0 & 0 & 0 & 0 & V_a(k) \\ 0 & V_b(i') & 0 & V_b(j') & V_b(k') & V_b(l') & V_b(m') & 0 \end{bmatrix}$$

$$\begin{bmatrix} V_a(i) & 0 & 0 & V_a(j) & 0 & 0 & 0 & V_a(k) \\ 0 & V_b(i') & V_b(j') & 0 & V_b(k') & V_b(l') & V_b(m') & 0 \end{bmatrix}$$

$$\begin{bmatrix} V_a(i) & 0 & 0 & 0 & 0 & 0 & 0 & V_a(j) \\ 0 & V_b(i') & V_b(j') & V_b(k') & V_b(l') & V_b(m') & V_b(n') & 0 \end{bmatrix}$$

$$\begin{bmatrix} 0 & V_a(i) & V_a(j) & V_a(k) & 0 & 0 & 0 & V_a(l) \\ V_b(i') & 0 & 0 & 0 & V_b(j') & V_b(k') & V_b(l') & 0 \end{bmatrix}$$

-continued $$\begin{bmatrix} 0 & V_a(i) & V_a(j) & 0 & 0 & 0 & 0 & V_a(k) \\ V_b(i') & 0 & 0 & V_b(j') & V_b(k') & V_b(l') & V_b(m') & 0 \end{bmatrix}$$

$$\begin{bmatrix} 0 & V_a(i) & 0 & V_a(j) & 0 & 0 & 0 & V_a(k) \\ V_b(i') & 0 & V_b(j') & 0 & V_b(k') & V_b(l') & V_b(m') & 0 \end{bmatrix}$$

$$\begin{bmatrix} 0 & V_a(i) & 0 & 0 & 0 & 0 & 0 & V_a(j) \\ V_b(i') & 0 & V_b(j') & V_b(k') & V_b(l') & V_b(m') & V_b(n') & 0 \end{bmatrix}$$

$$\begin{bmatrix} 0 & 0 & V_a(i) & V_a(j) & 0 & 0 & 0 & V_a(k) \\ V_b(i') & V_b(j') & 0 & 0 & V_b(k') & V_b(l') & V_b(m') & 0 \end{bmatrix}$$

$$\begin{bmatrix} 0 & 0 & V_a(i) & 0 & 0 & 0 & 0 & V_a(j) \\ V_b(i') & V_b(j') & 0 & V_b(k') & V_b(l') & V_b(m') & V_b(n') & 0 \end{bmatrix}$$

$$\begin{bmatrix} 0 & 0 & 0 & V_a(i) & 0 & 0 & 0 & V_a(j) \\ V_b(i') & V_b(j') & V_b(k') & 0 & V_b(l') & V_b(m') & V_b(n') & 0 \end{bmatrix}$$

$$\begin{bmatrix} 0 & 0 & 0 & 0 & 0 & 0 & 0 & V_a(i) \\ V_b(i') & V_b(j') & V_b(k') & V_b(l') & V_b(m') & V_b(n') & V_b(p') & 0 \end{bmatrix}$$

$$\begin{bmatrix} V_a(i) & V_a(j) & V_a(k) & V_a(l) & V_a(m) & 0 & 0 & 0 \\ 0 & 0 & 0 & 0 & 0 & V_b(i') & V_b(j') & V_b(k') \end{bmatrix}$$

$$\begin{bmatrix} V_a(i) & V_a(j) & V_a(k) & 0 & V_a(l) & 0 & 0 & 0 \\ 0 & 0 & 0 & V_b(i') & 0 & V_b(j') & V_b(k') & V_b(l') \end{bmatrix}$$

$$\begin{bmatrix} V_a(i) & V_a(j) & 0 & V_a(k) & V_a(l) & 0 & 0 & 0 \\ 0 & 0 & V_b(i') & 0 & 0 & V_b(j') & V_b(k') & V_b(l') \end{bmatrix}$$

$$\begin{bmatrix} V_a(i) & V_a(j) & 0 & 0 & V_a(k) & 0 & 0 & 0 \\ 0 & 0 & V_b(i') & V_b(j') & 0 & V_b(k') & V_b(l') & V_b(m') \end{bmatrix}$$

$$\begin{bmatrix} V_a(i) & 0 & V_a(j) & V_a(k) & V_a(l) & 0 & 0 & 0 \\ 0 & V_b(i') & 0 & 0 & 0 & V_b(j') & V_b(k') & V_b(l') \end{bmatrix}$$

$$\begin{bmatrix} V_a(i) & 0 & V_a(j) & 0 & V_a(k) & 0 & 0 & 0 \\ 0 & V_b(i') & 0 & V_b(j') & 0 & V_b(k') & V_b(l') & V_b(m') \end{bmatrix}$$

$$\begin{bmatrix} V_a(i) & 0 & 0 & V_a(j) & V_a(k) & 0 & 0 & 0 \\ 0 & V_b(i') & V_b(j') & 0 & 0 & V_b(k') & V_b(l') & V_b(m') \end{bmatrix}$$

$$\begin{bmatrix} V_a(i) & 0 & 0 & 0 & V_a(j) & 0 & 0 & 0 \\ 0 & V_b(i') & V_b(j') & V_b(k') & 0 & V_b(l') & V_b(m') & V_b(n') \end{bmatrix}$$

$$\begin{bmatrix} 0 & V_a(i) & V_a(j) & V_a(k) & V_a(l) & 0 & 0 & 0 \\ V_b(i') & 0 & 0 & 0 & 0 & V_b(j') & V_b(k') & V_b(l') \end{bmatrix}$$

$$\begin{bmatrix} 0 & V_a(i) & V_a(j) & 0 & V_a(k) & 0 & 0 & 0 \\ V_b(i') & 0 & 0 & V_b(j') & 0 & V_b(k') & V_b(l') & V_b(m') \end{bmatrix}$$

$$\begin{bmatrix} 0 & V_a(i) & 0 & V_a(j) & V_a(k) & 0 & 0 & 0 \\ V_b(i') & 0 & V_b(j') & 0 & 0 & V_b(k') & V_b(l') & V_b(m') \end{bmatrix}$$

$$\begin{bmatrix} 0 & V_a(i) & 0 & 0 & V_a(j) & 0 & 0 & 0 \\ V_b(i') & 0 & V_b(j') & V_b(k') & 0 & V_b(l') & V_b(m') & V_b(n') \end{bmatrix}$$

$$\begin{bmatrix} 0 & 0 & V_a(i) & V_a(j) & V_a(k) & 0 & 0 & 0 \\ V_b(i') & V_b(j') & 0 & 0 & 0 & V_b(k') & V_b(l') & V_b(m') \end{bmatrix}$$

$$\begin{bmatrix} 0 & 0 & V_a(i) & 0 & V_a(j) & 0 & 0 & 0 \\ V_b(i') & V_b(j') & 0 & V_b(k') & 0 & V_b(l') & V_b(m') & V_b(n') \end{bmatrix}$$

$$\begin{bmatrix} 0 & 0 & 0 & V_a(i) & V_a(j) & 0 & 0 & 0 \\ V_b(i') & V_b(j') & V_b(k') & 0 & 0 & V_b(l') & V_b(m') & V_b(n') \end{bmatrix}$$

$$\begin{bmatrix} 0 & 0 & 0 & 0 & V_a(i) & 0 & 0 & 0 \\ V_b(i') & V_b(j') & V_b(k') & V_b(l') & 0 & V_b(m') & V_b(n') & V_b(p') \end{bmatrix}$$

-continued $$\begin{bmatrix} V_a(i) & V_a(j) & V_a(k) & V_a(l) & 0 & 0 & 0 & 0 \\ 0 & 0 & 0 & 0 & V_b(i') & V_b(j') & V_b(k') & V_b(l') \end{bmatrix}$$

$$\begin{bmatrix} V_a(i) & V_a(j) & V_a(k) & 0 & 0 & 0 & 0 & 0 \\ 0 & 0 & 0 & V_b(i') & V_b(j') & V_b(k') & V_b(l') & V_b(m') \end{bmatrix}$$

$$\begin{bmatrix} V_a(i) & V_a(j) & 0 & V_a(k) & 0 & 0 & 0 & 0 \\ 0 & 0 & V_b(i') & 0 & V_b(j') & V_b(k') & V_b(l') & V_b(m') \end{bmatrix}$$

$$\begin{bmatrix} V_a(i) & V_a(j) & 0 & 0 & 0 & 0 & 0 & 0 \\ 0 & 0 & V_b(i') & V_b(j') & V_b(k') & V_b(l') & V_b(m') & V_b(n') \end{bmatrix}$$

$$\begin{bmatrix} V_a(i) & 0 & V_a(j) & V_a(k) & 0 & 0 & 0 & 0 \\ 0 & V_b(i') & 0 & 0 & V_b(j') & V_b(k') & V_b(l') & V_b(m') \end{bmatrix}$$

$$\begin{bmatrix} V_a(i) & 0 & V_a(j) & 0 & 0 & 0 & 0 & 0 \\ 0 & V_b(i') & 0 & V_b(j') & V_b(k') & V_b(l') & V_b(m') & V_b(n') \end{bmatrix}$$

$$\begin{bmatrix} V_a(i) & 0 & 0 & V_a(j) & 0 & 0 & 0 & 0 \\ 0 & V_b(i') & V_b(j') & 0 & V_b(k') & V_b(l') & V_b(m') & V_b(n') \end{bmatrix}$$

$$\begin{bmatrix} V_a(i) & 0 & 0 & 0 & 0 & 0 & 0 & 0 \\ 0 & V_b(i') & V_b(j') & V_b(k') & V_b(l') & V_b(m') & V_b(n') & V_b(p') \end{bmatrix}$$

$$\begin{bmatrix} 0 & V_a(i) & V_a(j) & V_a(k) & 0 & 0 & 0 & 0 \\ V_b(i') & 0 & 0 & 0 & V_b(j') & V_b(k') & V_b(l') & V_b(m') \end{bmatrix}$$

$$\begin{bmatrix} 0 & V_a(i) & V_a(j) & 0 & 0 & 0 & 0 & 0 \\ V_b(i') & 0 & 0 & V_b(j') & V_b(k') & V_b(l') & V_b(m') & V_b(n') \end{bmatrix}$$

$$\begin{bmatrix} 0 & V_a(i) & 0 & V_a(j) & 0 & 0 & 0 & 0 \\ V_b(i') & 0 & V_b(j') & 0 & V_b(k') & V_b(l') & V_b(m') & V_b(n') \end{bmatrix}$$

$$\begin{bmatrix} 0 & V_a(i) & 0 & 0 & 0 & 0 & 0 & 0 \\ V_b(i') & 0 & V_b(j') & V_b(k') & V_b(l') & V_b(m') & V_b(n') & V_b(p') \end{bmatrix}$$

$$\begin{bmatrix} 0 & 0 & V_a(i) & V_a(j) & 0 & 0 & 0 & 0 \\ V_b(i') & V_b(j') & 0 & 0 & V_b(k') & V_b(l') & V_b(m') & V_b(n') \end{bmatrix}$$

$$\begin{bmatrix} 0 & 0 & V_a(i) & 0 & 0 & 0 & 0 & 0 \\ V_b(i') & V_b(j') & 0 & V_b(k') & V_b(l') & V_b(m') & V_b(n') & V_b(p') \end{bmatrix}$$

$$\begin{bmatrix} 0 & 0 & 0 & V_a(i) & 0 & 0 & 0 & 0 \\ V_b(i') & V_b(j') & V_b(k') & 0 & V_b(l') & V_b(m') & V_b(n') & V_b(p') \end{bmatrix},$$

$$\begin{bmatrix} 0 & 0 & 0 & 0 & 0 & 0 & 0 & 0 \\ V_b(i') & V_b(j') & V_b(k') & V_b(l') & V_b(m') & V_b(n') & V_b(p') & V_b(q') \end{bmatrix}$$

where a value of a rank indicator is 8, $0<i\leq N_1$, $0<i'\leq N_1$, $0<j\leq N_1$, $0$ $0<j'\leq N_1$, $0<k\leq N_1$, $0<k'\leq N_1$, $0<l\leq N_1$, $0<l'\leq N_1$, $0<m\leq N_1$, $0<m'\leq N_1$, $0<n\leq N_1$, $0<n'\leq N_1$, $0<p\leq N_1$, $0<p'\leq N_1$, $0<q\leq N_1$, and $0<q'\leq N_1$, where for parameters of i, j, k, l, m, n, p, q, and the like, every two of the sub-vectors corresponding to the $V_a$ parts are unequal, and for parameters of i', j', k', l', m', n', p', q', and the like, every two of the sub-vectors corresponding to the $V_b$ parts are unequal.

It should be understood that, in the illustrated possible forms of the first codebook included in the first codebook set, i, j, k, l, m, n, p, and q are only for distinguishing different codebook vectors.

Further, in an embodiment of the present invention, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vectors $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_k\}$ form a vector $V_k'$, vectors $V_k'$ corresponding to all sub-vectors $V_k$ in the $\{V_k\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\} \neq \{V_L'\}$ holds true. According to concepts of sets, when a quantity of dimensions of the $\{V_k'\}$ and a quantity of dimensions of the $\{V_L'\}$ are unequal, $\{V_k'\} \neq \{V_L'\}$ holds true; when a quantity of dimensions of the $\{V_k'\}$ and a quantity of dimensions of the $\{V_L'\}$ are equal, but a quantity of sub-vectors included in the $\{V_k'\}$ and a quantity of sub-vectors included in the $\{V_L'\}$ are unequal, $\{V_k'\} \neq \{V_L'\}$ holds true; or when a quantity of dimensions of the $\{V_k'\}$ and a quantity of dimensions of the $\{V_L'\}$ are equal, and a quantity of sub-vectors included in the $\{V_k'\}$ and a quantity of sub-vectors included in the $\{V_L'\}$ are equal, but the sub-vectors included in the $\{V_k'\}$ are different from the sub-vectors included in the $\{V_L'\}$, $\{V_k'\} \neq \{V_L'\}$ also holds true.

In another embodiment of the resent invention, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\} \neq \{V_N'\}$ holds true. According to concepts of sets, when a quantity of dimensions of the $\{V_M'\}$ and a quantity of dimensions of the $\{V_N'\}$ are unequal, $\{V_M'\} \neq \{V_N'\}$ holds true; when a quantity of dimensions of the $\{V_M'\}$ and a quantity of dimensions of the $\{V_N'\}$ are equal, but a quantity of sub-vectors included in the $\{V_M'\}$ and a quantity of sub-vectors included in the $\{V_N'\}$ are unequal, $\{V_M'\} \neq \{V_N'\}$ holds true; or when a quantity of dimensions of the $\{V_M'\}$ and a quantity of dimensions of the $\{V_N'\}$ are equal, and a quantity of sub-vectors included in the $\{V_M'\}$ and a quantity of sub-vectors included in the $\{V_N'\}$ are equal, but the sub-vectors included in the $\{V_M'\}$ are different from the sub-vectors included in the $\{V_N'\}$, $\{V_M'\} \neq \{V_N'\}$ also holds true.

In the foregoing embodiment, with the first codebook that makes the $\{V_k'\} \neq \{V_L'\}$ and/or $\{V_M'\} \neq \{V_N'\}$ relation hold true, flexible configurations of the first structure and the second structure are implemented, and a codebook is better matched with a channel.

The following provides relationships of amplitude vectors respectively corresponding to $$\begin{bmatrix} V_a \\ 0 \end{bmatrix} \text{ and } \begin{bmatrix} 0 \\ V_b \end{bmatrix}.$$

A first relationship of amplitude vectors, a second relationship of amplitude vectors, and a third relationship of amplitude vectors each provide a configuration mode of a relationship between elements included in each sub-vector. The third relationship of amplitude vectors and a fourth relationship of amplitude vectors provide relationships between different codebook vectors in a codebook. The second network device may configure different amplitude vectors according to channel conditions, so that transmission efficiency is higher. The definitions of amplitude vectors are already described, and are not further described herein.

For example, a codebook $M_2$ in a codebook set is:

$$\begin{bmatrix} a_1 e^{jw_1} & 0 & b_1 e^{j\theta_1} & c_1 e^{j\gamma_1} & 0 \\ a_2 e^{jw_2} & 0 & b_2 e^{j\theta_2} & c_2 e^{j\gamma_2} & 0 \\ a_3 e^{jw_3} & 0 & b_3 e^{j\theta_3} & c_3 e^{j\gamma_3} & 0 \\ a_4 e^{jw_4} & 0 & b_4 e^{j\theta_4} & c_4 e^{j\gamma_4} & 0 \\ 0 & d_1 e^{j\alpha_1} & 0 & 0 & g_1 e^{j\beta_1} \\ 0 & d_2 e^{j\alpha_2} & 0 & 0 & g_2 e^{j\beta_2} \end{bmatrix}.$$

If $M_2$ meets the first relationship of amplitude vectors:
at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_a$ of each second sub-vector $$\begin{bmatrix} 0 \\ V_b \end{bmatrix}$$

in the first codebook are unequal, at least two values in $a_1$, $a_2$ $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_2$.

If $M_2$ meets the second relationship of amplitude vectors:
at least two elements in an amplitude vector in $V_a$ of each first sub-vector $$\begin{bmatrix} V_a \\ 0 \end{bmatrix}$$

in the first codebook are unequal, and all elements in an amplitude vector in $V_b$ of each second sub-vector $$\begin{bmatrix} 0 \\ V_b \end{bmatrix}$$

in the first codebook are equal, at least two values in $a_1$, $a_2$, $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_4$.

If $M_2$ meets the third relationship of amplitude vectors: all elements in an amplitude vector in $V_a$ of each first sub-vector $$\begin{bmatrix} V_a \\ 0 \end{bmatrix}$$

in the first codebook are equal, and at least two elements in an amplitude vector in $V_a$ of each second sub-vector $$\begin{bmatrix} 0 \\ V_b \end{bmatrix}$$

in the first codebook are unequal, $a_1 = a_2 = a_3 = a_4$; $b_1 = b_2 = b_3 = b_4$; $c_1 = c_2 = c_3 = c_4$; $d_1 \neq d_2$; and $g_1 \neq g_2$.

If $M_2$ meets the fourth relationship of amplitude vectors: at least two amplitude vectors in a vector set formed by amplitude vectors in $V_a$ of all first sub-vectors $$\begin{bmatrix} V_a \\ 0 \end{bmatrix}$$

in the first codebook are different, amplitude vectors in $V_a$ of all corresponding first sub-vectors $$\begin{bmatrix} V_a \\ 0 \end{bmatrix}$$

in $M_2$ are $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{ and } \begin{bmatrix} c_1 \\ c_2 \\ c_3 \\ c_4 \end{bmatrix},$$

where at least two vectors of $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{ and } \begin{bmatrix} c_1 \\ c_2 \\ c_3 \\ c_4 \end{bmatrix}$$

are different.

A fifth relationship of amplitude vectors is: at least two amplitude vectors in a vector set formed by amplitude vectors in $V_b$ of all second sub-vectors $$\begin{bmatrix} 0 \\ V_b \end{bmatrix}$$

in the first codebook are different.

In this case, amplitude vectors in $V_b$ of all corresponding second sub-vectors $$\begin{bmatrix} 0 \\ V_b \end{bmatrix}$$

in $M_2$ are $$\begin{bmatrix} d_1 \\ d_2 \end{bmatrix} \text{ and } \begin{bmatrix} g_1 \\ g_2 \end{bmatrix},$$

where $$\begin{bmatrix} d_1 \\ d_2 \end{bmatrix} \text{ and } \begin{bmatrix} g_1 \\ g_2 \end{bmatrix}$$

are unequal.

Figure 8:
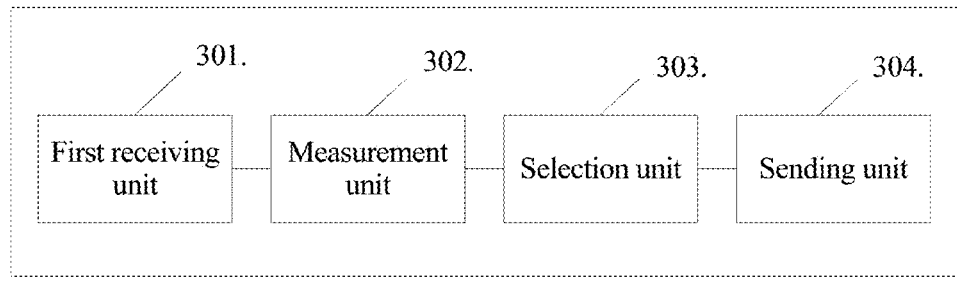
FIG. 8 is a first schematic structural diagram of a network device for implementing a method for measuring and feeding back channel information according to the present invention.

FIG. 8 shows an embodiment of a first network-side apparatus according to the present invention, where the first network-side apparatus includes: a receiver 301, configured to receive a reference signal; a measurement unit 302, configured to measure the reference signal to obtain a measurement result; a selection unit 303, configured to select a first codebook from a first codebook set according to the measurement result; where the first codebook set includes at least two first codebooks, a sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x$ (1) and $W_x$ (2), a location of a non-zero vector in the $W_x$ (1) is the same as a location of a non-zero vector in the $W_x$ (2); and formation according to different structures is: for different sub-vectors $W_x$ (1) and $W_x$ (2), a location of a non-zero vector in the $W_x$ (1) is different from a location of a non-zero vector in the $W_x$ (2); and a sending unit 304, configured to send a codebook index to a second network device, where the codebook index corresponds the first codebook selected from the first codebook set.

Further, the codebook index is used to indicate the first codebook used by the second network device in a coding and/or decoding process.

It should be understood that, in the present invention, a zero vector may be a zero element with a length of 1, and a non-zero vector may be a non-zero element with a length of 1. Generally, for a passive antenna, a downtilt in a vertical direction is fixed. Therefore, for multiple spatially multiplexed data streams, adjustments can be made to multiple horizontal beams only in a plane with a fixed downtilt in the vertical direction, and the multiple data streams cannot be multiplexed more freely in planes with multiple downtilts. In addition, if antenna ports are grouped according to different downtilts, a codebook structure provided by the present invention may be configured independently according to transmit power of different groups of antenna ports, so that flexibility and MIMO performance are improved.

In an embodiment of the present invention, when antenna ports are grouped according to tilts in the vertical direction, parameters of codebook vectors in a codebook may be configured independently according to different tilts, so that an objective of flexibly adapting to data transmission efficiency is achieved. In this embodiment, two tilts in the vertical direction are used as an example (this method is also applicable to more than two tilts). In each column in the first codebook, one group of antenna ports corresponds to a non-zero vector, and another group of antenna ports corresponds to a zero vector; or one group of antenna ports corresponds to a zero vector, and another group of antenna ports corresponds to a non-zero vector, where the non-zero vector refers to a vector in which at least one element is a non-zero element, and the zero vector refers to a vector in which all elements are zero elements. In the present invention, when first n1 elements in a vector included in a codebook correspond to one group of antenna ports, and last n2 elements correspond to another group of antenna ports, a structure of this vector is $$\begin{bmatrix} V_1 \\ V_2 \end{bmatrix},$$

where $V_1$ is n1-dimensional, and $V_2$ is n2-dimensional. In this case, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; 0 in $$\begin{bmatrix} V_a \\ 0 \end{bmatrix}$$

represents an n2-dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and 0 in $$\begin{bmatrix} 0 \\ V_b \end{bmatrix}$$

represents an n1-dimensional zero vector and corresponds to the first group of antenna ports. It should be understood that, the present invention is not limited to the case of grouping into only two groups. In an actual application, antenna ports are grouped into more groups according to other factors such as different downtilts or signal quality or the like. In a specific measurement process, codebooks in the first codebook set are traversed, so that a first codebook that best matches a transmission characteristic is determined and used for channel transmission.

It should be understood that, the structure of the sub-vector in the first codebook may be but is not limited to the foregoing first structure or the second structure. Optionally, locations of sub-vectors of the zero vector and the non-zero vector in the first codebook may be different. In an embodiment of the present invention, in a case of four antenna ports, elements in vectors in the first sub-vector $$\begin{bmatrix} V_a \\ 0 \end{bmatrix}$$

having the first structure are represented as $$\begin{bmatrix} V_a^0 \\ V_a^1 \\ 0 \\ 0 \end{bmatrix},$$

and elements in vectors in the second sub-vector $$\begin{bmatrix} 0 \\ V_b \end{bmatrix}$$

having the second structure are represented as $$\begin{bmatrix} 0 \\ 0 \\ V_b^0 \\ V_b^1 \end{bmatrix},$$

where $V_a^0$ and $V_a^1$ are elements in the vector $V_a$, and $V_b^0$ and $V_b^1$ are elements in the vector $V_b$. In another embodiment of the present invention, when the antenna ports are grouped into two groups, the first structure may be $$\begin{bmatrix} V_a^0 \\ 0 \\ V_a^1 \\ 0 \end{bmatrix},$$

and the second structure may be $$\begin{bmatrix} 0 \\ V_b^0 \\ 0 \\ V_b^1 \end{bmatrix}.$$

Likewise, when the antenna groups are grouped into two groups, in another embodiment of the present invention, the first structure may be $$\begin{bmatrix} V_a^0 \\ 0 \\ 0 \\ V_a^1 \end{bmatrix},$$

and the second structure may be $$\begin{bmatrix} 0 \\ V_b^0 \\ V_b^1 \\ 0 \end{bmatrix}.$$

Alternatively, the first codebook set includes at least one of the following four structures: a first structure $$\begin{bmatrix} V_a^0 \\ 0 \\ V_a^1 \\ 0 \end{bmatrix},$$

a second structure $$\begin{bmatrix} 0 \\ V_b^0 \\ 0 \\ V_b^1 \end{bmatrix},$$

a third structure $$\begin{bmatrix} V_a^0 \\ 0 \\ 0 \\ V_a^1 \end{bmatrix},$$

or a fourth structure $$\begin{bmatrix} 0 \\ V_b^0 \\ V_b^1 \\ 0 \end{bmatrix}.$$

$V_a^0$ and $V_a^1$ are elements in the vector $V_a$, and $V_a$ corresponds to one group of antenna ports. A correspondence is as follows: In the first structure, $V_a^0$ corresponds to a first antenna port, and $V_a^1$ corresponds to a third antenna port; in the second structure, $V_b^0$ corresponds to a second antenna port, and $V_b^1$ corresponds to a fourth antenna port; in the third structure, $V_a^0$ corresponds to the first antenna port, and $V_a^1$ corresponds to the fourth antenna port; in the fourth structure, $V_b^0$ corresponds to the second antenna port, and $V_b^1$ corresponds to the third antenna port, where $V_a^0$ and $V_a^1$ are elements in the vector $V_a$, and $V_b^0$ and $V_b^1$ are elements in the vector $V_b$.

When the antenna ports are grouped into three groups, the first codebook set includes at least one of a first structure $$\begin{bmatrix} V_a \\ 0 \\ 0 \end{bmatrix},$$

a second structure $$\begin{bmatrix} 0 \\ V_b \\ 0 \end{bmatrix},$$

a third structure $$\begin{bmatrix} 0 \\ 0 \\ V_c \end{bmatrix},$$

a fourth structure $$\begin{bmatrix} V_a \\ 0 \\ V_c \end{bmatrix},$$

fifth structure $$\begin{bmatrix} V_a \\ V_b \\ 0 \end{bmatrix},$$

or a sixth structure $$\begin{bmatrix} 0 \\ V_b \\ V_c \end{bmatrix}.$$

Vectors $V_a$, $V_b$, and $V_c$ each correspond to one group of antenna ports.

In an embodiment of the present invention, the present invention provides a combination of the first structure and the second structure corresponding to a value of the rank indicator.

Generally, an element in a non-zero vector included in the first codebook is in a form of a complex number. For a complex number $\alpha \cdot e^\beta$, $\alpha$ is referred to as an amplitude part, and is a real number, and $e^\beta$ is referred to as a phase part. In still another embodiment of the present invention, at least one first codebook meets a first condition. The present invention provides several definitions of the first condition that can be implemented. In the present invention, unless otherwise limited, P, Q, and K are any positive integers.

First definition of the first condition:

A vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the first phase vector, and a phase part of a $K^{th}$ element in each sub-vector of the $\{V_m\}$ is a $K^{th}$ element of each corresponding first phase vector, where P, Q, and K are any positive integers.

A general expression of the discrete Fourier transform matrix DFT matrix is:

$$M_{dft} = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & & \vdots \\ 1 & \omega^{N-1} & \omega^{2(N-1)} & \omega^{3(N-1)} & \cdots & \omega^{(N-1)(N-1)} \end{bmatrix}.$$

The phase matrix of the DFT matrix is:

$$M_{dft\_phase} = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & & \vdots \\ 1 & \omega^{N-1} & \omega^{2(N-1)} & \omega^{3(N-1)} & \cdots & \omega^{(N-1)(N-1)} \end{bmatrix}.$$

A value of N is an order in a case in which the DFT matrix is a square matrix. For example, in $$\begin{bmatrix} V_a \\ 0 \end{bmatrix},$$

if $V_a$ is four-dimensional, the order of the phase matrix of the DFT matrix is 4. In an embodiment, a value of $\omega$ may be $$\omega = e^{j\frac{2\pi}{N}}:$$

$$M_{dft\_phase\_4} = \begin{bmatrix} 1 & 1 & 1 & 1 \\ 1 & \omega & \omega^2 & \omega^3 \\ 1 & \omega^2 & \omega^4 & \omega^6 \\ 1 & \omega^3 & \omega^6 & \omega^9 \end{bmatrix}.$$

For example, when the value of $\omega$ is $$e^{j\frac{2\pi}{32}},$$

a form of a fourth-order DFT matrix $$M_{dft\_phase\_4\_e^{j\frac{2\pi}{32}}}$$

is:

$$M_{dft\_phase\_4\_e^{j\frac{2\pi}{32}}} = \begin{bmatrix} 1 & 1 & 1 & 1 \\ 1 & e^{j\frac{2\pi}{32}} & e^{2j\frac{2\pi}{32}} & e^{3j\frac{2\pi}{32}} \\ 1 & e^{2j\frac{2\pi}{32}} & e^{4j\frac{2\pi}{32}} & e^{6j\frac{2\pi}{32}} \\ 1 & e^{3j\frac{2\pi}{32}} & e^{6j\frac{2\pi}{32}} & e^{9j\frac{2\pi}{32}} \end{bmatrix}.$$

Correspondingly, the set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix} \right\}.$$

It should be understood that, in the present invention, the phase matrix of the DFT matrix is not necessarily a square matrix. More columns or rows may be selected according to an order. For example, the matrix may be:

$$M'_{dft\_phase\_4\_e^{j\frac{2\pi}{32}}} = \begin{bmatrix} 1 & 1 & 1 & 1 & 1 \\ 1 & e^{j\frac{2\pi}{32}} & e^{2j\frac{2\pi}{32}} & e^{3j\frac{2\pi}{32}} & e^{4j\frac{2\pi}{32}} \\ 1 & e^{2j\frac{2\pi}{32}} & e^{4j\frac{2\pi}{32}} & e^{6j\frac{2\pi}{32}} & e^{8j\frac{2\pi}{32}} \\ 1 & e^{3j\frac{2\pi}{32}} & e^{6j\frac{2\pi}{32}} & e^{9j\frac{2\pi}{32}} & e^{12j\frac{2\pi}{32}} \end{bmatrix}.$$

The set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix}, \begin{bmatrix} 1 \\ e^{4j\frac{2\pi}{32}} \\ e^{8j\frac{2\pi}{32}} \\ e^{12j\frac{2\pi}{32}} \end{bmatrix} \right\}.$$

It should be understood that, a quantity of rows or a quantity of columns selected from the DFT matrix is not limited in the present invention. It should be understood that, the quantity of rows should be at least the same as a value of $V_a$, and the quantity of columns should be at least the same as a quantity of first vectors in a codebook.

Second definition of the first condition:

A vector set formed by all second phase vectors and at least one CMP codebook in a CMP codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers, and the CMP codebook refers to a codebook in which only one layer in layers corresponding to each port is a non-zero element.

In all CMP codebooks, CMP codebooks in which column vectors are two-dimensional are:

TABLE 1

| Codebook index | Quantity of layers | |
|---|---|---|
| | $\upsilon = 1$ | $\upsilon = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

CMP codebooks in which column vectors are four-dimensional and a quantity of layers is 1 are:

TABLE 2

| Codebook index | Quantity of layers $\upsilon = 1$ | | | | | | | |
|---|---|---|---|---|---|---|---|---|
| 0-7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

CMP codebook in which vectors are four-dimensional and a quantity of layers is 2 are:

TABLE 3

| Codebook index | Quantity of layers $\upsilon = 2$ | | | |
|---|---|---|---|---|
| 0-3 | $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |

For example, when the index in Table 3 is 0, the subset of the set of corresponding column vectors in the phase matrix of the corresponding CMP codebook matrix is:

$$\left\{\begin{bmatrix} e^0 \\ e^0 \\ 0 \\ 0 \end{bmatrix}, \begin{bmatrix} 0 \\ 0 \\ e^0 \\ e^{-j\frac{\pi}{2}} \end{bmatrix}\right\}.$$

CMP codebooks in which column vectors are four-dimensional and a quantity of layers is 3 are:

TABLE 4

| Codebook index | Quantity of layers $\upsilon = 3$ | | | |
|---|---|---|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

CMP codebooks in which column vectors are four-dimensional and a quantity of layers is 4 are:

TABLE 5

| Codebook index | Quantity of layers $\upsilon = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Third definition of the first condition:

A vector set formed by all third phase vectors is a subset of a set formed by corresponding sub-vectors in a householder transform codebook, where a householder transform expression is $W_n = I - u_n u_n^H / u_n^H u_n$.

$V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

For example, the third phase vectors are a subset of a set formed by phase parts of $W_{index}^{\{\alpha_i\}}$ in a matrix corresponding to different quantities of layers and different codebook indexes in Table 6. The index corresponds to different codebook indexes. $\{\alpha_i\}$ corresponds to an integer set, and is used to indicate that different columns in $W_{index}^{\{\alpha_i\}}$ are selected as third phase vectors. In Table 6, $U_n$ is a corresponding $U_n$ in the householder transform, and I is a unit matrix.

It should be understood that, in the present invention, a value of the $V_a$ is not limited only to cases or relationships shown in the first definition of the first condition, the second definition of the first condition, and the third definition of the first condition. The codebook may further be a codebook defined for two antennas, four antennas, or eight antennas in LTE.

TABLE 6

| Codebook index | $u_n$ | Quantity of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In still another embodiment of the present invention, at least one first codebook meets a second condition. The present invention provides several definitions of the second condition that can be implemented.

First definition of the second condition:

A vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a $P^{th}$ row and a $Q^{th}$ column in the phase matrix of the DFT matrix is a phase part of an element in $P^{th}$ row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector.

Second definition of the second condition:

A vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers.

Third definition of the second condition:

A vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

It should be understood that, in the present invention, a value of the $V_b$ is not limited only to cases or relationships shown in the first definition of the second condition, the second definition of the second condition, and the third definition of the second condition. The present invention requests to protect correspondences according to the second condition: a relationship between the fourth phase vectors and different DFT matrices formed by different parameters, a relationship between the fifth phase vectors and the CMP codebook set, and a relationship between the sixth phase vectors and the householder codebook formed by different original vectors through householder transforms.

It should be understood that, due to independence, in one codebook, when the first codebook meets any definition of the first condition, a second codebook may meet any definition of the second condition. For example, in the first codebook, that the vector set formed by the first phase vectors is the subset of the set of corresponding column vectors in the phase matrix of the DFT matrix is met; in the second codebook, that the vector set formed by the fifth phase vectors is the subset of the set of corresponding column vectors in the phase matrix of the CMP codebook matrix, or any combination thereof is met.

In still another embodiment of the present invention, at least one first codebook meets a third condition.

In all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$. $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vector $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector. In this embodiment, in a sub-vector included in each first codebook, an amplitude part of each element corresponds to power of an antenna port. In this embodiment, in a sub-vector included in each first codebook, amplitude vectors of each group of antenna ports are determined independently according to tilt characteristics of this group of antenna ports (tilts may be classified into electrical tilts and mechanical tilts; an electrical tilt means that weighted vectors of multiple antenna elements corresponding to one antenna port make the multiple antenna elements form a beam pointing to a tilt). For example, all tilts of the first group of antenna ports are 12 degrees, and all tilts of the second group of antenna ports are 3 degrees; it is assumed that a horizontal plane is 0 degrees and that those downward are positive tilts. In this case, energies received from the two groups of antenna ports by the first network device in a location are different. Therefore, independent control may be performed on amplitudes of codebooks of the two groups of antenna ports, so that reception performance is optimized.

Figure 9:
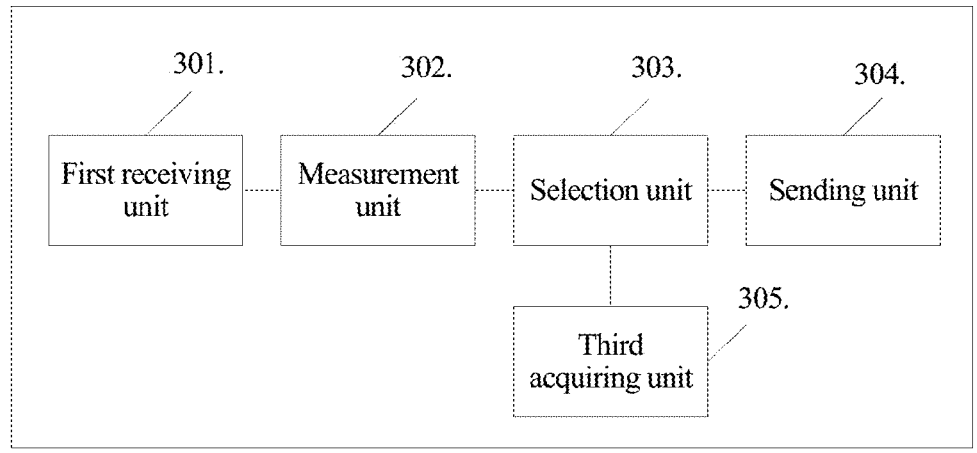
FIG. 9 is a second schematic structural diagram of a network device for implementing a method for measuring and feeding back channel information according to the present invention.
Figure 10:
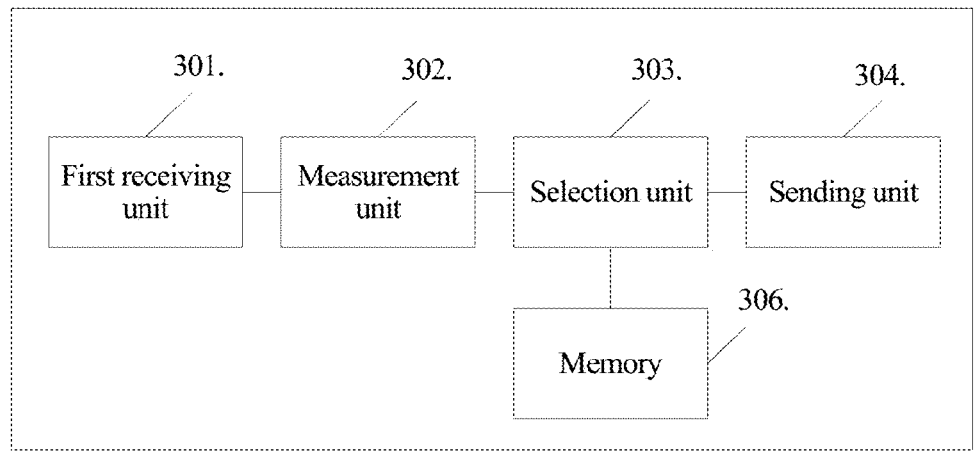
FIG. 10 is a third schematic structural diagram of a network device for implementing a method for measuring and feeding back channel information according to the present invention.

In an embodiment of the present invention, FIG. 9 further shows a third acquiring unit 305, configured to acquire the first codebook set before the first codebook is selected. In another embodiment of the present invention, FIG. to shows a memory 306, configured to prestore the first codebook set in the first network device.

Figure 11:
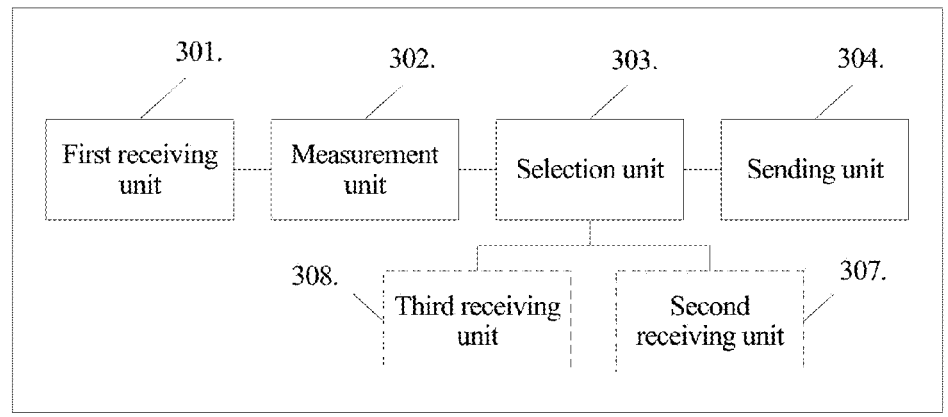
FIG. 11 is a fourth schematic structural diagram of a network device for implementing a method for measuring and feeding back channel information according to the present invention.

Optionally, FIG. 11 further shows a second receiving unit 307, configured to receive at least one first configuration message, where each first configuration message is used to determine a sub-vector set of phase parts corresponding to one group of antenna ports, and a quantity of the at least one first configuration message is equal to a quantity of groups of the antenna ports; and/or a third receiving unit 308, configured to receive at least one second configuration message, where each second configuration message is used to determine a sub-vector set of amplitude parts corresponding to one group of antenna ports, and a quantity of the at least one second configuration message is equal to a quantity of groups of the antenna ports. In an embodiment, the first configuration message is configured by the second network device by using higher layer signaling or dynamic signaling; and/or the second configuration message is configured by the second network device by using higher layer signaling or dynamic signaling. In another embodiment, the first configuration message is obtained by the first network device by measuring the reference signal; and/or the second configuration message is obtained by the first network device by measuring the reference signal.

In an embodiment, the present invention provides possible cases of a codebook set having the first structure and the second structure. It should be understood that, the first codebook that the present invention requests to protect may be but is not limited to the following structures:

1. the first codebook is one of the following matrices:

$$\begin{bmatrix} V_a(i) \\ 0 \end{bmatrix} \text{ or } \begin{bmatrix} 0 \\ V_b(i') \end{bmatrix},$$

where a value of a rank indicator is 1, a non-zero sub-vector represented by $V_a(x)$ is a sub-vector in the first vector set $\{V_m\}$ and has a sequence number x, a non-zero sub-vector represented by $V_b(y)$ is a sub-vector in the first vector set $\{V_n\}$ and has a sequence number y, $0<i\leq N_1$, and $0<i'\leq N_1$, where $N_1$ represents a quantity of sub-vectors in the $\{V_m\}$, and $N_1'$ represents a quantity of sub-vectors in the $\{V_n\}$; or 2. the first codebook is one of the following matrices:

$$\begin{bmatrix} V_a(i) & V_a(j) \\ 0 & 0 \end{bmatrix}, \begin{bmatrix} V_a(i) & 0 \\ 0 & V_b(i') \end{bmatrix}, \begin{bmatrix} 0 & V_a(i) \\ V_b(i') & 0 \end{bmatrix}, \text{ or } \begin{bmatrix} 0 & 0 \\ V_b(i') & V_b(j') \end{bmatrix},$$

where a value of a rank indicator is 2, $0<i\leq N_1$, $0<i'\leq N_1$, $0<j\leq N_1$, and $0<j'\leq N_1$; or 3. the first codebook is one of the following matrices:

$$\begin{bmatrix} V_a(i) & V_a(j) & V_a(k) \\ 0 & 0 & 0 \end{bmatrix}, \begin{bmatrix} V_a(i) & V_a(j) & 0 \\ 0 & 0 & V_b(i') \end{bmatrix}, \begin{bmatrix} V_a(i) & 0 & V_a(j) \\ 0 & V_b(i') & 0 \end{bmatrix},$$

$$\begin{bmatrix} V_a(i) & 0 & 0 \\ 0 & V_b(i') & V_b(j') \end{bmatrix}, \begin{bmatrix} 0 & V_a(i) & 0 \\ V_b(i') & 0 & V_b(j') \end{bmatrix}, \begin{bmatrix} 0 & V_a(i) & V_a(j) \\ V_b(i') & 0 & 0 \end{bmatrix},$$

$$\begin{bmatrix} 0 & 0 & V_a(i) \\ V_b(i') & V_b(j') & 0 \end{bmatrix}, \text{ or } \begin{bmatrix} 0 & 0 & 0 \\ V_b(i') & V_b(j') & V_b(k') \end{bmatrix},$$

where a value of a rank indicator is 3, $0<i\leq N_1$, $0<i'\leq N_1$, $0<j\leq N_1$, $0<j'\leq N_1$, $0<k\leq N_1$, and $0<k'\leq N$; or 4. the first codebook is one of the following matrices:

$$\begin{bmatrix} V_a(i) & V_a(j) & V_a(k) & V_a(l) \\ 0 & 0 & 0 & 0 \end{bmatrix}, \begin{bmatrix} V_a(i) & V_a(j) & V_a(k) & 0 \\ 0 & 0 & 0 & V_b(i') \end{bmatrix},$$

$$\begin{bmatrix} V_a(i) & V_a(j) & 0 & V_a(k) \\ 0 & 0 & V_b(i') & 0 \end{bmatrix}, \begin{bmatrix} V_a(i) & V_a(j) & 0 & 0 \\ 0 & 0 & V_b(i') & V_b(j') \end{bmatrix},$$

$$\begin{bmatrix} V_a(i) & 0 & V_a(j) & V_a(k) \\ 0 & V_b(i') & 0 & 0 \end{bmatrix}, \begin{bmatrix} V_a(i) & 0 & V_a(j) & 0 \\ 0 & V_b(i') & 0 & V_b(j') \end{bmatrix},$$

$$\begin{bmatrix} V_a(i) & 0 & 0 & V_a(j) \\ 0 & V_b(i') & V_b(j') & 0 \end{bmatrix}, \begin{bmatrix} V_a(i) & 0 & 0 & 0 \\ 0 & V_b(i') & V_b(j') & V_b(k') \end{bmatrix},$$

$$\begin{bmatrix} 0 & V_a(i) & V_a(j) & V_a(k) \\ V_b(i') & 0 & 0 & 0 \end{bmatrix}, \begin{bmatrix} 0 & V_a(i) & V_a(j) & 0 \\ V_b(i') & 0 & 0 & V_b(j') \end{bmatrix},$$

$$\begin{bmatrix} 0 & V_a(i) & 0 & V_a(j) \\ V_b(i') & 0 & V_b(j') & 0 \end{bmatrix}, \begin{bmatrix} 0 & V_a(i) & 0 & 0 \\ V_b(i') & 0 & V_b(j') & V_b(k') \end{bmatrix},$$

$$\begin{bmatrix} 0 & 0 & V_a(i) & V_a(j) \\ V_b(i') & V_b(j') & 0 & 0 \end{bmatrix}, \begin{bmatrix} 0 & 0 & V_a(i) & 0 \\ V_b(i') & V_b(j') & 0 & V_b(k') \end{bmatrix},$$

-continued $$\begin{bmatrix} 0 & 0 & 0 & V_a(i) \\ V_b(i') & V_b(j') & V_b(k') & 0 \end{bmatrix}, \text{ or } \begin{bmatrix} 0 & 0 & 0 & 0 \\ V_b(i') & V_b(j') & V_b(k') & V_b(l') \end{bmatrix},$$

where a value of a rank indicator is 4, $0<i\leq N_1$, $0<i'\leq N_1$, $0<j\leq N_1$, $0<j'\leq N_1$, $0<k\leq N_1$, $0<k'\leq N_1$, $0<l\leq N_1$, and $0<l'\leq N_1$; or 5. the first codebook is one of the following matrices:

$$\begin{bmatrix} V_a(i) & V_a(j) & V_a(k) & V_a(l) & V_a(m) \\ 0 & 0 & 0 & 0 & 0 \end{bmatrix},$$

$$\begin{bmatrix} V_a(i) & V_a(j) & V_a(k) & 0 & V_a(l) \\ 0 & 0 & 0 & V_b(i') & 0 \end{bmatrix},$$

$$\begin{bmatrix} V_a(i) & V_a(j) & 0 & V_a(k) & V_a(l) \\ 0 & 0 & V_b(i') & 0 & 0 \end{bmatrix},$$

$$\begin{bmatrix} V_a(i) & V_a(j) & 0 & 0 & V_a(k) \\ 0 & 0 & V_b(i') & V_b(j') & 0 \end{bmatrix},$$

$$\begin{bmatrix} V_a(i) & 0 & V_a(j) & V_a(k) & V_a(l) \\ 0 & V_b(i') & 0 & 0 & 0 \end{bmatrix},$$

$$\begin{bmatrix} V_a(i) & 0 & V_a(j) & 0 & V_a(k) \\ 0 & V_b(i') & 0 & V_b(j') & 0 \end{bmatrix},$$

$$\begin{bmatrix} V_a(i) & 0 & 0 & V_a(j) & V_a(k) \\ 0 & V_b(i') & V_b(j') & 0 & 0 \end{bmatrix},$$

$$\begin{bmatrix} V_a(i) & 0 & 0 & 0 & V_a(j) \\ 0 & V_b(i') & V_b(j') & V_b(k') & 0 \end{bmatrix},$$

$$\begin{bmatrix} 0 & V_a(i) & V_a(j) & V_a(k) & V_a(l) \\ V_b(i') & 0 & 0 & 0 & 0 \end{bmatrix},$$

$$\begin{bmatrix} 0 & V_a(i) & V_a(j) & 0 & V_a(k) \\ V_b(i') & 0 & 0 & V_b(j') & 0 \end{bmatrix},$$

$$\begin{bmatrix} 0 & V_a(i) & 0 & V_a(j) & V_a(k) \\ V_b(i') & 0 & V_b(j') & 0 & 0 \end{bmatrix},$$

$$\begin{bmatrix} 0 & V_a(i) & 0 & 0 & V_a(j) \\ V_b(i') & 0 & V_b(j') & V_b(k') & 0 \end{bmatrix},$$

$$\begin{bmatrix} 0 & 0 & V_a(i) & V_a(j) & V_a(k) \\ V_b(i') & V_b(j') & 0 & 0 & 0 \end{bmatrix},$$

$$\begin{bmatrix} 0 & 0 & V_a(i) & 0 & V_a(j) \\ V_b(i') & V_b(j') & 0 & V_b(k') & 0 \end{bmatrix},$$

$$\begin{bmatrix} 0 & 0 & 0 & V_a(1) & V_a(j) \\ V_b(i') & V_b(j') & V_b(k') & 0 & 0 \end{bmatrix},$$

$$\begin{bmatrix} 0 & 0 & 0 & 0 & V_a(1) \\ V_b(i') & V_b(j') & V_b(k') & V_b(l') & 0 \end{bmatrix},$$

$$\begin{bmatrix} V_a(i) & V_a(j) & V_a(k) & V_a(4) & 0 \\ 0 & 0 & 0 & 0 & V_b(i') \end{bmatrix},$$

$$\begin{bmatrix} V_a(i) & V_a(j) & V_a(k) & 0 & 0 \\ 0 & 0 & 0 & V_b(i') & V_b(j') \end{bmatrix},$$

$$\begin{bmatrix} V_a(i) & V_a(j) & 0 & V_a(k) & 0 \\ 0 & 0 & V_b(i') & 0 & V_b(j') \end{bmatrix},$$

$$\begin{bmatrix} V_a(i) & V_a(j) & 0 & 0 & 0 \\ 0 & 0 & V_b(i') & V_b(j') & V_b(k') \end{bmatrix},$$

$$\begin{bmatrix} V_a(i) & 0 & V_a(j) & V_a(k) & 0 \\ 0 & V_b(i') & 0 & 0 & V_b(j') \end{bmatrix},$$

$$\begin{bmatrix} V_a(i) & 0 & V_a(j) & 0 & 0 \\ 0 & V_b(i') & 0 & V_b(j') & V_b(k') \end{bmatrix},$$

$$\begin{bmatrix} V_a(i) & 0 & 0 & V_a(j) & 0 \\ 0 & V_b(i') & V_b(j') & 0 & V_b(k') \end{bmatrix},$$

$$\begin{bmatrix} V_a(i) & 0 & 0 & 0 & 0 \\ 0 & V_b(i') & V_b(j') & V_b(k') & V_b(l') \end{bmatrix},$$

$$\begin{bmatrix} 0 & V_a(i) & V_a(j) & V_a(k) & 0 \\ V_b(i') & 0 & 0 & 0 & V_b(j') \end{bmatrix},$$

$$\begin{bmatrix} 0 & V_a(i) & V_a(j) & 0 & 0 \\ V_b(i') & 0 & 0 & V_b(j') & V_b(k') \end{bmatrix},$$

$$\begin{bmatrix} 0 & V_a(i) & 0 & V_a(j) & 0 \\ V_b(i') & 0 & V_b(j') & 0 & V_b(k') \end{bmatrix},$$

$$\begin{bmatrix} 0 & V_a(i) & 0 & 0 & 0 \\ V_b(i') & 0 & V_b(j') & V_b(k') & V_b(l') \end{bmatrix},$$

$$\begin{bmatrix} 0 & 0 & V_a(i) & V_a(j) & 0 \\ V_b(i') & V_b(j') & 0 & 0 & V_b(k') \end{bmatrix},$$

$$\begin{bmatrix} 0 & 0 & V_a(i) & 0 & 0 \\ V_b(i') & V_b(j') & 0 & V_b(k') & V_b(l') \end{bmatrix},$$

$$\begin{bmatrix} 0 & 0 & 0 & V_a(1) & 0 \\ V_b(i') & V_b(j') & V_b(k') & 0 & V_b(l') \end{bmatrix},$$

$$\begin{bmatrix} 0 & 0 & 0 & 0 & 0 \\ V_b(i') & V_b(j') & V_b(k') & V_b(l') & V_b(m') \end{bmatrix},$$

where a value of a rank indicator is 5, $0<i\leq N_1$, $0<i'\leq N_1$, $0<j\leq N_1$, $0<j'\leq N_1$, $0<k\leq N_1$, $0<k'\leq N_1$, $0<l\leq N_1$, $0<l'\leq N_1$, $0<m\leq N_1$, and $0<m'\leq N_1$; or 6. the first codebook is one of the following matrices:

$$\begin{bmatrix} V_a(i) & V_a(j) & V_a(k) & V_a(l) & V_a(m) & V_a(n) \\ 0 & 0 & 0 & 0 & 0 & 0 \end{bmatrix},$$

$$\begin{bmatrix} V_a(i) & V_a(j) & V_a(k) & 0 & V_a(l) & V_a(m) \\ 0 & 0 & 0 & V_b(i') & 0 & 0 \end{bmatrix},$$

$$\begin{bmatrix} V_a(i) & V_a(j) & 0 & V_a(k) & V_a(l) & V_a(m) \\ 0 & 0 & V_b(i') & 0 & 0 & 0 \end{bmatrix},$$

$$\begin{bmatrix} V_a(i) & V_a(j) & 0 & 0 & V_a(k) & V_a(l) \\ 0 & 0 & V_b(i') & V_b(j') & 0 & 0 \end{bmatrix},$$

$$\begin{bmatrix} V_a(i) & 0 & V_a(j) & V_a(k) & V_a(l) & V_a(m) \\ 0 & V_b(i') & 0 & 0 & 0 & 0 \end{bmatrix},$$

$$\begin{bmatrix} V_a(i) & 0 & V_a(j) & 0 & V_a(k) & V_a(l) \\ 0 & V_b(i') & 0 & V_b(j') & 0 & 0 \end{bmatrix},$$

$$\begin{bmatrix} V_a(i) & 0 & 0 & V_a(j) & V_a(k) & V_a(l) \\ 0 & V_b(i') & V_b(j') & 0 & 0 & 0 \end{bmatrix},$$

$$\begin{bmatrix} V_a(i) & 0 & 0 & 0 & V_a(j) & V_a(k) \\ 0 & V_b(i') & V_b(j') & V_b(k') & 0 & 0 \end{bmatrix},$$

$$\begin{bmatrix} 0 & V_a(i) & V_a(j) & V_a(k) & V_a(l) & V_a(m) \\ V_b(i') & 0 & 0 & 0 & 0 & 0 \end{bmatrix},$$

$$\begin{bmatrix} 0 & V_a(i) & V_a(j) & 0 & V_a(k) & V_a(l) \\ V_b(i') & 0 & 0 & V_b(j') & 0 & 0 \end{bmatrix},$$

$$\begin{bmatrix} 0 & V_a(i) & 0 & V_a(j) & V_a(k) & V_a(l) \\ V_b(i') & 0 & V_b(j') & 0 & 0 & 0 \end{bmatrix},$$

$$\begin{bmatrix} 0 & V_a(i) & 0 & 0 & V_a(j) & V_a(k) \\ V_b(i') & 0 & V_b(j') & V_b(k') & 0 & 0 \end{bmatrix},$$

$$\begin{bmatrix} 0 & 0 & V_a(i) & V_a(j) & V_a(k) & V_a(l) \\ V_b(i') & V_b(j') & 0 & 0 & 0 & 0 \end{bmatrix},$$

$$\begin{bmatrix} 0 & 0 & V_a(i) & 0 & V_a(j) & V_a(k) \\ V_b(i') & V_b(j') & 0 & V_b(k') & 0 & 0 \end{bmatrix},$$

$$\begin{bmatrix} 0 & 0 & 0 & V_a(i) & V_a(j) & V_a(k) \\ V_b(i') & V_b(j') & V_b(k') & 0 & 0 & 0 \end{bmatrix},$$

$$\begin{bmatrix} 0 & 0 & 0 & 0 & V_a(i) & V_a(j) \\ V_b(i') & V_b(j') & V_b(k') & V_b(l') & 0 & 0 \end{bmatrix},$$

$$\begin{bmatrix} V_a(i) & V_a(j) & V_a(k) & V_a(l) & 0 & V_a(5) \\ 0 & 0 & 0 & 0 & V_b(i') & 0 \end{bmatrix},$$

$$\begin{bmatrix} V_a(i) & V_a(j) & V_a(k) & 0 & 0 & V_a(l) \\ 0 & 0 & 0 & V_b(i') & V_b(j') & 0 \end{bmatrix},$$

$$\begin{bmatrix} V_a(i) & V_a(j) & 0 & V_a(k) & 0 & V_a(l) \\ 0 & 0 & V_b(i') & 0 & V_b(j') & 0 \end{bmatrix},$$

$$\begin{bmatrix} V_a(i) & V_a(j) & 0 & 0 & 0 & V_a(k) \\ 0 & 0 & V_b(i') & V_b(j') & V_b(k') & 0 \end{bmatrix},$$

$$\begin{bmatrix} V_a(i) & 0 & V_a(j) & V_a(k) & 0 & V_a(l) \\ 0 & V_b(i') & 0 & 0 & V_b(j') & 0 \end{bmatrix},$$

$$\begin{bmatrix} V_a(i) & 0 & V_a(j) & 0 & 0 & V_a(k) \\ 0 & V_b(i') & 0 & V_b(j') & V_b(k') & 0 \end{bmatrix},$$

$$\begin{bmatrix} V_a(i) & 0 & 0 & V_a(j) & 0 & V_a(k) \\ 0 & V_b(i') & V_b(j') & 0 & V_b(k') & 0 \end{bmatrix},$$

$$\begin{bmatrix} V_a(i) & 0 & 0 & 0 & 0 & V_a(j) \\ 0 & V_b(i') & V_b(j') & V_b(k') & V_b(l') & 0 \end{bmatrix},$$

$$\begin{bmatrix} 0 & V_a(i) & V_a(j) & V_a(k) & 0 & V_a(l) \\ V_b(i') & 0 & 0 & 0 & V_b(j') & 0 \end{bmatrix},$$

$$\begin{bmatrix} 0 & V_a(i) & V_a(j) & 0 & 0 & V_a(k) \\ V_b(i') & 0 & 0 & V_b(j') & V_b(k') & 0 \end{bmatrix},$$

$$\begin{bmatrix} 0 & V_a(i) & 0 & V_a(j) & 0 & V_a(k) \\ V_b(i') & 0 & V_b(j') & 0 & V_b(k') & 0 \end{bmatrix},$$

$$\begin{bmatrix} 0 & V_a(i) & 0 & 0 & 0 & V_a(j) \\ V_b(i') & 0 & V_b(j') & V_b(k') & V_b(l') & 0 \end{bmatrix},$$

$$\begin{bmatrix} 0 & 0 & V_a(i) & V_a(j) & 0 & V_a(k) \\ V_b(i') & V_b(j') & 0 & 0 & V_b(k') & 0 \end{bmatrix},$$

$$\begin{bmatrix} 0 & 0 & V_a(i) & 0 & 0 & V_a(j) \\ V_b(i') & V_b(j') & 0 & V_b(k') & V_b(l') & 0 \end{bmatrix},$$

$$\begin{bmatrix} 0 & 0 & 0 & V_a(1) & 0 & V_a(j) \\ V_b(i') & V_b(j') & V_b(k') & 0 & V_b(l') & 0 \end{bmatrix},$$

$$\begin{bmatrix} 0 & 0 & 0 & 0 & 0 & V_a(i) \\ V_b(i') & V_b(j') & V_b(k') & V_b(l') & V_b(m') & 0 \end{bmatrix},$$

$$\begin{bmatrix} V_a(i) & V_a(j) & V_a(k) & V_a(l) & V_a(m) & 0 \\ 0 & 0 & 0 & 0 & 0 & V_b(i') \end{bmatrix},$$

$$\begin{bmatrix} V_a(i) & V_a(j) & V_a(k) & 0 & V_a(l) & 0 \\ 0 & 0 & 0 & V_b(i') & 0 & V_b(j') \end{bmatrix},$$

$$\begin{bmatrix} V_a(i) & V_a(j) & 0 & V_a(k) & V_a(l) & 0 \\ 0 & 0 & V_b(i') & 0 & 0 & V_b(j') \end{bmatrix},$$

$$\begin{bmatrix} V_a(i) & V_a(j) & 0 & 0 & V_a(k) & 0 \\ 0 & 0 & V_b(i') & V_b(j) & 0 & V_b(k) \end{bmatrix},$$

$$\begin{bmatrix} V_a(i) & 0 & V_a(j) & V_a(k) & V_a(l) & 0 \\ 0 & V_b(i') & 0 & 0 & 0 & V_b(j') \end{bmatrix},$$

$$\begin{bmatrix} V_a(i) & 0 & V_a(j) & 0 & V_a(k) & 0 \\ 0 & V_b(i') & 0 & V_b(j') & 0 & V_b(k') \end{bmatrix},$$

$$\begin{bmatrix} V_a(i) & 0 & 0 & V_a(j) & V_a(k) & 0 \\ 0 & V_b(i') & V_b(j') & 0 & 0 & V_b(k') \end{bmatrix},$$

$$\begin{bmatrix} V_a(i) & 0 & 0 & 0 & V_a(j) & 0 \\ 0 & V_b(i') & V_b(j') & V_b(k') & 0 & V_b(l') \end{bmatrix},$$

$$\begin{bmatrix} 0 & V_a(i) & V_a(j) & V_a(k) & V_a(l) & 0 \\ V_b(i') & 0 & 0 & 0 & 0 & V_b(j') \end{bmatrix},$$

$$\begin{bmatrix} 0 & V_a(i) & V_a(j) & 0 & V_a(k) & 0 \\ V_b(i') & 0 & 0 & V_b(j') & 0 & V_b(l') \end{bmatrix},$$

$$\begin{bmatrix} 0 & V_a(i) & 0 & V_a(j) & V_a(k) & 0 \\ V_b(i') & 0 & V_b(j') & 0 & 0 & V_b(k') \end{bmatrix},$$

$$\begin{bmatrix} 0 & V_a(i) & 0 & 0 & V_a(j) & 0 \\ V_b(i') & 0 & V_b(j') & V_b(k') & 0 & V_b(l') \end{bmatrix},$$

$$\begin{bmatrix} 0 & 0 & V_a(i) & V_a(j) & V_a(k) & 0 \\ V_b(i') & V_b(j') & 0 & 0 & 0 & V_b(k') \end{bmatrix},$$

$$\begin{bmatrix} 0 & 0 & V_a(i) & 0 & V_a(j) & 0 \\ V_b(i') & V_b(j') & 0 & V_b(k') & 0 & V_b(l') \end{bmatrix},$$

$$\begin{bmatrix} 0 & 0 & 0 & V_a(i) & V_a(j) & 0 \\ V_b(i') & V_b(j') & V_b(k') & 0 & 0 & V_b(l') \end{bmatrix},$$

$$\begin{bmatrix} 0 & 0 & 0 & 0 & V_a(i) & 0 \\ V_b(i') & V_b(j') & V_b(k') & V_b(l') & 0 & V_b(m') \end{bmatrix},$$

$$\begin{bmatrix} V_a(i) & V_a(j) & V_a(k) & V_a(l) & 0 & 0 \\ 0 & 0 & 0 & 0 & V_b(i') & V_b(j') \end{bmatrix},$$

$$\begin{bmatrix} V_a(i) & V_a(j) & V_a(k) & 0 & 0 & 0 \\ 0 & 0 & 0 & V_b(i') & V_b(j') & V_b(k') \end{bmatrix},$$

$$\begin{bmatrix} V_a(i) & V_a(j) & 0 & V_a(k) & 0 & 0 \\ 0 & 0 & V_b(i') & 0 & V_b(j') & V_b(k') \end{bmatrix},$$

$$\begin{bmatrix} V_a(i) & V_a(j) & 0 & 0 & 0 & 0 \\ 0 & 0 & V_b(i') & V_b(j') & V_b(k') & V_b(l') \end{bmatrix},$$

$$\begin{bmatrix} V_a(i) & 0 & V_a(j) & V_a(k) & 0 & 0 \\ 0 & V_b(i') & 0 & 0 & V_b(j') & V_b(k') \end{bmatrix},$$

$$\begin{bmatrix} V_a(i) & 0 & V_a(j) & 0 & 0 & 0 \\ 0 & V_b(i') & 0 & V_b(j') & V_b(k') & V_b(l') \end{bmatrix},$$

$$\begin{bmatrix} V_a(i) & 0 & 0 & V_a(j) & 0 & 0 \\ 0 & V_b(i') & V_b(j') & 0 & V_b(k') & V_b(l') \end{bmatrix},$$

$$\begin{bmatrix} V_a(i) & 0 & 0 & 0 & 0 & 0 \\ 0 & V_b(i') & V_b(j') & V_b(k') & V_b(l') & V_b(m') \end{bmatrix},$$

-continued $$\begin{bmatrix} 0 & V_a(i) & V_a(j) & V_a(k) & 0 & 0 \\ V_b(i') & 0 & 0 & 0 & V_b(j) & V_b(k') \end{bmatrix},$$

$$\begin{bmatrix} 0 & V_a(i) & V_a(j) & 0 & 0 & 0 \\ V_b(i') & 0 & 0 & V_b(j) & V_b(k') & V_b(l') \end{bmatrix},$$

$$\begin{bmatrix} 0 & V_a(i) & 0 & V_a(j) & 0 & 0 \\ V_b(i') & 0 & V_b(j) & 0 & V_b(k') & V_b(l') \end{bmatrix},$$

$$\begin{bmatrix} 0 & V_a(i) & 0 & 0 & 0 & 0 \\ V_b(i') & 0 & V_b(j) & V_b(k') & V_b(l') & V_b(m') \end{bmatrix},$$

$$\begin{bmatrix} 0 & 0 & V_a(i) & V_a(j) & 0 & 0 \\ V_b(i') & V_b(j') & 0 & 0 & V_b(k') & V_b(k') \end{bmatrix},$$

$$\begin{bmatrix} 0 & 0 & V_a(i) & 0 & 0 & 0 \\ V_b(i') & V_b(j') & 0 & V_b(k') & V_b(l') & V_b(m') \end{bmatrix},$$

$$\begin{bmatrix} 0 & 0 & 0 & V_a(i) & 0 & 0 \\ V_b(i') & V_b(j') & V_b(k') & 0 & V_b(l') & V_b(m') \end{bmatrix}, \text{ or}$$

$$\begin{bmatrix} 0 & 0 & 0 & 0 & 0 & 0 \\ V_b(i') & V_b(j') & V_b(k') & V_b(l') & V_b(m') & V_b(n') \end{bmatrix},$$

where a value of a rank indicator is 6, $0 < i \leq N_1$, $0 < i' \leq N_1$, $0 < j \leq N_1$, $0 < j' \leq N_1$, $0 < k \leq N_1$, $0 < k' \leq N_1$, $0 < l \leq N_1$, $0 < l' \leq N_1$, $0 < m \leq N_1$, $0 < m' \leq N_1$, $0 < n \leq N_1$, and $0 < n' \leq N_1$; or 7. the first codebook is one of the following matrices:

$$\begin{bmatrix} V_a(i) & V_a(j) & V_a(k) & V_a(l) & V_a(m) & V_a(n) & V_a(p) \\ 0 & 0 & 0 & 0 & 0 & 0 & 0 \end{bmatrix} \begin{bmatrix} V_a(i) & V_a(j) & V_a(k) & 0 & V_a(l) & V_a(m) & V_a(n) \\ 0 & 0 & 0 & V_b(i') & 0 & 0 & 0 \end{bmatrix}$$

$$\begin{bmatrix} V_a(i) & V_a(j) & 0 & V_a(k) & V_a(l) & V_a(m) & V_a(n) \\ 0 & 0 & V_b(i') & 0 & 0 & 0 & 0 \end{bmatrix} \begin{bmatrix} V_a(i) & V_a(j) & 0 & 0 & V_a(k) & V_a(l) & V_a(m) \\ 0 & 0 & V_b(i') & V_b(j') & 0 & 0 & 0 \end{bmatrix}$$

$$\begin{bmatrix} V_a(i) & 0 & V_a(j) & V_a(k) & V_a(l) & V_a(m) & V_a(n) \\ 0 & V_b(i') & 0 & 0 & 0 & 0 & 0 \end{bmatrix} \begin{bmatrix} V_a(i) & 0 & V_a(j) & 0 & V_a(k) & V_a(l) & V_a(m) \\ 0 & V_b(i') & 0 & V_b(j') & 0 & 0 & 0 \end{bmatrix}$$

$$\begin{bmatrix} V_a(i) & 0 & 0 & V_a(j) & V_a(k) & V_a(l) & V_a(m) \\ 0 & V_b(i') & V_b(j') & 0 & 0 & 0 & 0 \end{bmatrix} \begin{bmatrix} V_a(i) & 0 & 0 & 0 & V_a(j) & V_a(k) & V_a(l) \\ 0 & V_b(i') & V_b(j') & V_b(k') & 0 & 0 & 0 \end{bmatrix}$$

$$\begin{bmatrix} 0 & V_a(i) & V_a(j) & V_a(k) & V_a(l) & V_a(m) & V_a(n) \\ V_b(i') & 0 & 0 & 0 & 0 & 0 & 0 \end{bmatrix} \begin{bmatrix} 0 & V_a(i) & V_a(j) & 0 & V_a(k) & V_a(l) & V_a(m) \\ V_b(i') & 0 & 0 & V_b(j') & 0 & 0 & 0 \end{bmatrix}$$

$$\begin{bmatrix} 0 & V_a(i) & 0 & V_a(j) & V_a(k) & V_a(l) & V_a(m) \\ V_b(i') & 0 & V_b(j') & 0 & 0 & 0 & 0 \end{bmatrix} \begin{bmatrix} 0 & V_a(i) & 0 & 0 & V_a(j) & V_a(k) & V_a(l) \\ V_b(i') & 0 & V_b(j') & V_b(k') & 0 & 0 & 0 \end{bmatrix}$$

$$\begin{bmatrix} 0 & 0 & V_a(i) & V_a(j) & V_a(k) & V_a(l) & V_a(m) \\ V_b(i') & V_b(j') & 0 & 0 & 0 & 0 & 0 \end{bmatrix} \begin{bmatrix} 0 & 0 & V_a(i) & 0 & V_a(j) & V_a(k) & V_a(l) \\ V_b(i') & V_b(j') & 0 & V_b(k') & 0 & 0 & 0 \end{bmatrix}$$

$$\begin{bmatrix} 0 & 0 & 0 & V_a(i) & V_a(j) & V_a(k) & V_a(l) \\ V_b(i') & V_b(j') & V_b(k') & 0 & 0 & 0 & 0 \end{bmatrix} \begin{bmatrix} 0 & 0 & 0 & 0 & V_a(i) & V_a(j) & V_a(k) \\ V_b(i') & V_b(j') & V_b(k') & V_b(l') & 0 & 0 & 0 \end{bmatrix}$$

$$\begin{bmatrix} V_a(i) & V_a(j) & V_a(k) & V_a(l) & 0 & V_a(m) & V_a(n) \\ 0 & 0 & 0 & 0 & V_b(i') & 0 & 0 \end{bmatrix} \begin{bmatrix} V_a(i) & V_a(j) & V_a(k) & 0 & 0 & V_a(l) & V_a(m) \\ 0 & 0 & 0 & V_b(i') & V_b(j') & 0 & 0 \end{bmatrix}$$

$$\begin{bmatrix} V_a(i) & V_a(j) & 0 & V_a(k) & 0 & V_a(l) & V_a(m) \\ 0 & 0 & V_b(i') & 0 & V_b(j') & 0 & 0 \end{bmatrix} \begin{bmatrix} V_a(i) & V_a(j) & 0 & 0 & 0 & V_a(k) & V_a(l) \\ 0 & 0 & V_b(i') & V_b(j') & V_b(k') & 0 & 0 \end{bmatrix}$$

$$\begin{bmatrix} V_a(i) & 0 & V_a(j) & V_a(k) & 0 & V_a(l) & V_a(m) \\ 0 & V_b(i') & 0 & 0 & V_b(j') & 0 & 0 \end{bmatrix} \begin{bmatrix} V_a(i) & 0 & V_a(j) & 0 & 0 & V_a(k) & V_a(l) \\ 0 & V_b(i') & 0 & V_b(j') & V_b(k') & 0 & 0 \end{bmatrix}$$

$$\begin{bmatrix} V_a(i) & 0 & 0 & V_a(j) & 0 & V_a(k) & V_a(l) \\ 0 & V_b(i') & V_b(j') & 0 & V_b(k') & 0 & 0 \end{bmatrix} \begin{bmatrix} V_a(i) & 0 & 0 & 0 & 0 & V_a(j) & V_a(k) \\ 0 & V_b(i') & V_b(j') & V_b(k') & V_b(l') & 0 & 0 \end{bmatrix}$$

$$\begin{bmatrix} 0 & V_a(i) & V_a(j) & V_a(k) & 0 & V_a(l) & V_a(m) \\ V_b(i') & 0 & 0 & 0 & V_b(j') & 0 & 0 \end{bmatrix} \begin{bmatrix} 0 & V_a(i) & V_a(j) & 0 & 0 & V_a(k) & V_a(l) \\ V_b(i') & 0 & 0 & V_b(j') & V_b(k') & 0 & 0 \end{bmatrix}$$

$$\begin{bmatrix} 0 & V_a(i) & 0 & V_a(j) & 0 & V_a(k) & V_a(l) \\ V_b(i') & 0 & V_b(j') & 0 & V_b(k') & 0 & 0 \end{bmatrix} \begin{bmatrix} 0 & V_a(i) & 0 & 0 & 0 & V_a(j) & V_a(k) \\ V_b(i') & 0 & V_b(j') & V_b(k') & V_b(l') & 0 & 0 \end{bmatrix}$$

$$\begin{bmatrix} 0 & 0 & V_a(i) & V_a(j) & 0 & V_a(k) & V_a(l) \\ V_b(i') & V_b(j') & 0 & 0 & V_b(k') & 0 & 0 \end{bmatrix} \begin{bmatrix} 0 & 0 & V_a(i) & 0 & 0 & V_a(j) & V_a(k) \\ V_b(i') & V_b(j') & 0 & V_b(k') & V_b(l') & 0 & 0 \end{bmatrix}$$

$$\begin{bmatrix} 0 & 0 & 0 & V_a(i) & 0 & V_a(j) & V_a(k) \\ V_b(i') & V_b(j') & V_b(k') & 0 & V_b(l') & 0 & 0 \end{bmatrix} \begin{bmatrix} 0 & 0 & 0 & 0 & 0 & V_a(i) & V_a(j) \\ V_b(i') & V_b(j') & V_b(k') & V_b(l') & V_b(m') & 0 & 0 \end{bmatrix}$$

$$\begin{bmatrix} V_a(i) & V_a(j) & V_a(k) & V_a(l) & V_a(m) & 0 & V_a(n) \\ 0 & 0 & 0 & 0 & 0 & V_b(i') & 0 \end{bmatrix} \begin{bmatrix} V_a(i) & V_a(j) & V_a(k) & 0 & V_a(l) & 0 & V_a(m) \\ 0 & 0 & 0 & V_b(i') & 0 & V_b(j') & 0 \end{bmatrix}$$

$$\begin{bmatrix} V_a(i) & V_a(j) & 0 & V_a(k) & V_a(l) & 0 & V_a(m) \\ 0 & 0 & V_b(i') & 0 & 0 & V_b(j') & 0 \end{bmatrix}$$

$$\begin{bmatrix} V_a(i) & V_a(j) & 0 & 0 & V_a(k) & 0 & V_a(l) \\ 0 & 0 & V_b(i') & V_b(j') & 0 & V_b(k') & 0 \end{bmatrix} \begin{bmatrix} V_a(i) & 0 & V_a(j) & V_a(k) & V_a(l) & 0 & V_a(m) \\ 0 & V_b(i') & 0 & 0 & 0 & V_b(j') & 0 \end{bmatrix}$$

$$\begin{bmatrix} V_a(i) & 0 & V_a(j) & 0 & V_a(k) & 0 & V_a(l) \\ 0 & V_b(i') & 0 & V_b(j') & 0 & V_b(k') & 0 \end{bmatrix} \begin{bmatrix} V_a(i) & 0 & 0 & V_a(j) & V_a(k) & 0 & V_a(l) \\ 0 & V_b(i') & V_b(j') & 0 & 0 & V_b(k') & 0 \end{bmatrix}$$

$$\begin{bmatrix} V_a(i) & 0 & 0 & 0 & V_a(j) & 0 & V_a(k) \\ 0 & V_b(i') & V_b(j') & V_b(k') & 0 & V_b(l') & 0 \end{bmatrix} \begin{bmatrix} 0 & V_a(i) & V_a(j) & V_a(k) & V_a(l) & 0 & V_a(m) \\ V_b(i') & 0 & 0 & 0 & 0 & V_b(j') & 0 \end{bmatrix}$$

$$\begin{bmatrix} 0 & V_a(i) & V_a(j) & 0 & V_a(k) & 0 & V_a(l) \\ V_b(i') & 0 & 0 & V_b(j') & 0 & V_b(k') & 0 \end{bmatrix} \begin{bmatrix} 0 & V_a(i) & 0 & V_a(j) & V_a(k) & 0 & V_a(l) \\ V_b(i') & 0 & V_b(j') & 0 & 0 & V_b(k') & 0 \end{bmatrix}$$

$$\begin{bmatrix} 0 & V_a(i) & 0 & 0 & V_a(j) & 0 & V_a(k) \\ V_b(i') & 0 & V_b(j') & V_b(k') & 0 & V_b(l') & 0 \end{bmatrix} \begin{bmatrix} 0 & 0 & V_a(i) & V_a(j) & V_a(k) & 0 & V_a(l) \\ V_b(i') & V_b(j') & 0 & 0 & 0 & V_b(k') & 0 \end{bmatrix}$$

$$\begin{bmatrix} 0 & 0 & V_a(i) & 0 & V_a(j) & 0 & V_a(k) \\ V_b(i') & V_b(j') & 0 & V_b(k') & 0 & V_b(l') & 0 \end{bmatrix} \begin{bmatrix} 0 & 0 & 0 & V_a(i) & V_a(j) & 0 & V_a(k) \\ V_b(i') & V_b(j') & V_b(k') & 0 & 0 & V_b(l') & 0 \end{bmatrix}$$

$$\begin{bmatrix} 0 & 0 & 0 & 0 & V_a(i) & 0 & V_a(j) \\ V_b(i') & V_b(j') & V_b(k') & V_b(l') & 0 & V_b(m') & 0 \end{bmatrix} \begin{bmatrix} V_a(i) & V_a(j) & V_a(k) & V_a(4) & 0 & 0 & V_a(m) \\ 0 & 0 & 0 & 0 & V_b(i') & V_b(j') & 0 \end{bmatrix}$$

$$\begin{bmatrix} V_a(i) & V_a(j) & V_a(k) & 0 & 0 & 0 & V_a(l) \\ 0 & 0 & 0 & V_b(i') & V_b(j') & V_b(k') & 0 \end{bmatrix} \begin{bmatrix} V_a(i) & V_a(j) & 0 & V_a(k) & 0 & 0 & V_a(l) \\ 0 & 0 & V_b(i') & 0 & V_b(j') & V_b(k') & 0 \end{bmatrix}$$

$$\begin{bmatrix} V_a(i) & V_a(j) & 0 & 0 & 0 & 0 & V_a(k) \\ 0 & 0 & V_b(i') & V_b(j') & V_b(k') & V_b(l') & 0 \end{bmatrix}$$

$$\begin{bmatrix} V_a(i) & 0 & V_a(j) & V_a(k) & 0 & 0 & V_a(l) \\ 0 & V_b(i') & 0 & 0 & V_b(j') & V_b(k') & 0 \end{bmatrix} \begin{bmatrix} V_a(i) & 0 & V_a(j) & 0 & 0 & 0 & V_a(k) \\ 0 & V_b(i') & 0 & V_b(j') & V_b(k') & V_b(l') & 0 \end{bmatrix}$$

$$\begin{bmatrix} V_a(i) & 0 & 0 & V_a(j) & 0 & 0 & V_a(k) \\ 0 & V_b(i') & V_b(j') & 0 & V_b(k') & V_b(l') & 0 \end{bmatrix}$$

$$\begin{bmatrix} V_a(i) & 0 & 0 & 0 & 0 & 0 & V_a(j) \\ 0 & V_b(i') & V_b(j') & V_b(k') & V_b(l') & V_b(m') & 0 \end{bmatrix}$$

$$\begin{bmatrix} 0 & V_a(i) & V_a(j) & V_a(k) & 0 & 0 & V_a(l) \\ V_b(i') & 0 & 0 & 0 & V_b(j') & V_b(k') & 0 \end{bmatrix}$$

$$\begin{bmatrix} 0 & V_a(i) & V_a(j) & 0 & 0 & 0 & V_a(k) \\ V_b(i') & 0 & 0 & V_b(j') & V_b(k') & V_b(l') & 0 \end{bmatrix}$$

$$\begin{bmatrix} 0 & V_a(i) & 0 & V_a(j) & 0 & 0 & V_a(k) \\ V_b(i') & 0 & V_b(j') & 0 & V_b(k') & V_b(l') & 0 \end{bmatrix}$$

$$\begin{bmatrix} 0 & V_a(i) & 0 & 0 & 0 & 0 & V_a(j) \\ V_b(i') & 0 & V_b(j') & V_b(k') & V_b(l') & V_b(m') & 0 \end{bmatrix}$$

$$\begin{bmatrix} 0 & 0 & V_a(i) & V_a(j) & 0 & 0 & V_a(k) \\ V_b(i') & V_b(j') & 0 & 0 & V_b(k') & V_b(l') & 0 \end{bmatrix}$$

$$\begin{bmatrix} 0 & 0 & V_a(i) & 0 & 0 & 0 & V_a(j) \\ V_b(i') & V_b(j') & 0 & V_b(k') & V_b(l') & V_b(m') & 0 \end{bmatrix}$$

$$\begin{bmatrix} 0 & 0 & 0 & V_a(i) & 0 & 0 & V_a(j) \\ V_b(i') & V_b(j') & V_b(k') & 0 & V_b(l') & V_b(m') & 0 \end{bmatrix}$$

$$\begin{bmatrix} 0 & 0 & 0 & 0 & 0 & 0 & V_a(j) \\ V_b(i') & V_b(j') & V_b(k') & V_b(l') & V_b(m') & V_b(n') & 0 \end{bmatrix}$$

$$\begin{bmatrix} V_a(i) & V_a(j) & V_a(k) & V_a(l) & V_a(m) & V_a(n) & 0 \\ 0 & 0 & 0 & 0 & 0 & 0 & V_b(i') \end{bmatrix} \begin{bmatrix} V_a(i) & V_a(j) & V_a(k) & 0 & V_a(l) & V_a(m) & 0 \\ 0 & 0 & 0 & V_b(i') & 0 & 0 & V_b(j') \end{bmatrix}$$

$$\begin{bmatrix} V_a(i) & V_a(j) & 0 & V_a(k) & V_a(l) & V_a(m) & 0 \\ 0 & 0 & V_b(i') & 0 & 0 & 0 & V_b(j') \end{bmatrix} \begin{bmatrix} V_a(i) & V_a(j) & 0 & 0 & V_a(k) & V_a(l) & 0 \\ 0 & 0 & V_b(i') & V_b(j') & 0 & 0 & V_b(k') \end{bmatrix}$$

$$\begin{bmatrix} V_a(i) & 0 & V_a(j) & V_a(k) & V_a(l) & V_a(m) & 0 \\ 0 & V_b(i') & 0 & 0 & 0 & 0 & V_b(j') \end{bmatrix} \begin{bmatrix} V_a(i) & 0 & V_a(j) & 0 & V_a(k) & V_a(l) & 0 \\ 0 & V_b(i') & 0 & V_b(j') & 0 & 0 & V_b(k') \end{bmatrix}$$

$$\begin{bmatrix} V_a(i) & 0 & 0 & V_a(j) & V_a(k) & V_a(l) & 0 \\ 0 & V_b(i') & V_b(j') & 0 & 0 & 0 & V_b(k') \end{bmatrix} \begin{bmatrix} V_a(i) & 0 & 0 & 0 & V_a(j) & V_a(k) & 0 \\ 0 & V_b(i') & V_b(j') & V_b(k') & 0 & 0 & V_b(l') \end{bmatrix}$$

$$\begin{bmatrix} 0 & V_a(i) & V_a(j) & V_a(k) & V_a(l) & V_a(m) & 0 \\ V_b(i') & 0 & 0 & 0 & 0 & 0 & V_b(j') \end{bmatrix} \begin{bmatrix} 0 & V_a(i) & V_a(j) & 0 & V_a(k) & V_a(l) & 0 \\ V_b(i') & 0 & 0 & V_b(j') & 0 & 0 & V_b(k') \end{bmatrix}$$

$$\begin{bmatrix} 0 & V_a(i) & 0 & V_a(j) & V_a(k) & V_a(l) & 0 \\ V_b(i') & 0 & V_b(j') & 0 & 0 & 0 & V_b(k') \end{bmatrix} \begin{bmatrix} 0 & V_a(i) & 0 & 0 & V_a(j) & V_a(k) & 0 \\ V_b(i') & 0 & V_b(j') & V_b(k') & 0 & 0 & V_b(l') \end{bmatrix}$$

$$\begin{bmatrix} 0 & 0 & V_a(i) & V_a(j) & V_a(k) & V_a(l) & 0 \\ V_b(i') & V_b(j') & 0 & 0 & 0 & 0 & V_b(k') \end{bmatrix} \begin{bmatrix} 0 & 0 & V_a(i) & 0 & V_a(j) & V_a(k) & 0 \\ V_b(i') & V_b(j') & 0 & V_b(k') & 0 & 0 & V_b(l') \end{bmatrix}$$

$$\begin{bmatrix} 0 & 0 & 0 & V_a(i) & V_a(j) & V_a(k) & 0 \\ V_b(i') & V_b(j') & V_b(k') & 0 & 0 & 0 & V_b(l') \end{bmatrix} \begin{bmatrix} 0 & 0 & 0 & 0 & V_a(i) & V_a(j) & 0 \\ V_b(i') & V_b(j') & V_b(k') & V_b(l') & 0 & 0 & V_b(m') \end{bmatrix}$$

$$\begin{bmatrix} V_a(i) & V_a(j) & V_a(k) & V_a(l) & 0 & V_a(m) & 0 \\ 0 & 0 & 0 & 0 & V_b(i') & 0 & V_b(j') \end{bmatrix} \begin{bmatrix} V_a(i) & V_a(j) & V_a(k) & 0 & 0 & V_a(l) & 0 \\ 0 & 0 & 0 & V_b(i') & V_b(j') & 0 & V_b(k') \end{bmatrix}$$

$$\begin{bmatrix} V_a(i) & V_a(j) & 0 & V_a(k) & 0 & V_a(l) & 0 \\ 0 & 0 & V_b(i') & 0 & V_b(j') & 0 & V_b(k') \end{bmatrix} \begin{bmatrix} V_a(i) & V_a(j) & 0 & 0 & 0 & V_a(k) & 0 \\ 0 & 0 & V_b(i') & V_b(j') & V_b(k') & 0 & V_b(l') \end{bmatrix}$$

$$\begin{bmatrix} V_a(i) & 0 & V_a(j) & V_a(k) & 0 & V_a(l) & 0 \\ 0 & V_b(i') & 0 & 0 & V_b(j') & 0 & V_b(k') \end{bmatrix} \begin{bmatrix} V_a(i) & 0 & V_a(j) & 0 & 0 & V_a(k) & 0 \\ 0 & V_b(i') & 0 & V_b(j') & V_b(k') & 0 & V_b(l') \end{bmatrix}$$

$$\begin{bmatrix} V_a(i) & 0 & 0 & V_a(j) & 0 & V_a(k) & 0 \\ 0 & V_b(i') & V_b(j') & 0 & V_b(k') & 0 & V_b(l') \end{bmatrix}$$

$$\begin{bmatrix} V_a(i) & 0 & 0 & 0 & 0 & V_a(j) & 0 \\ 0 & V_b(i') & V_b(j') & V_b(k') & V_b(l') & 0 & V_b(m') \end{bmatrix} \begin{bmatrix} 0 & V_a(i) & V_a(j) & V_a(k) & 0 & V_a(l) & 0 \\ V_b(i') & 0 & 0 & 0 & V_b(j') & 0 & V_b(k') \end{bmatrix}$$

$$\begin{bmatrix} 0 & V_a(i) & V_a(j) & 0 & 0 & V_a(k) & 0 \\ V_b(i') & 0 & 0 & V_b(j') & V_b(k') & 0 & V_b(l') \end{bmatrix} \begin{bmatrix} 0 & V_a(i) & 0 & V_a(j) & 0 & V_a(k) & 0 \\ V_b(i') & 0 & V_b(j') & 0 & V_b(k') & 0 & V_b(l') \end{bmatrix}$$

$$\begin{bmatrix} 0 & V_a(i) & 0 & 0 & 0 & V_a(j) & 0 \\ V_b(i') & 0 & V_b(j') & V_b(k') & V_b(l') & 0 & V_b(m') \end{bmatrix} \begin{bmatrix} 0 & 0 & V_a(i) & V_a(j) & 0 & V_a(k) & 0 \\ V_b(i') & V_b(j') & 0 & 0 & V_b(k') & 0 & V_b(l') \end{bmatrix}$$

$$\begin{bmatrix} 0 & 0 & V_a^{(i)} & 0 & 0 & V_a(j) & 0 \\ V_b(i') & V_b(j') & 0 & V_b(k') & V_b(l') & 0 & V_b(m') \end{bmatrix} \begin{bmatrix} 0 & 0 & 0 & V_a(i) & 0 & V_a(j) & 0 \\ V_b(i') & V_b(j') & V_b(k') & 0 & V_b(l') & 0 & V_b(m') \end{bmatrix}$$

$$\begin{bmatrix} 0 & 0 & 0 & 0 & 0 & V_a(i) & 0 \\ V_b(i') & V_b(j') & V_b(k') & V_b(l') & V_b(m') & 0 & V_b(n') \end{bmatrix}$$

-continued $$\begin{bmatrix} V_a(i) & V_a(j) & V_a(k) & V_a(l) & V_a(m) & 0 & 0 \\ 0 & 0 & 0 & 0 & 0 & V_b(i') & V_b(j') \end{bmatrix}$$

$$\begin{bmatrix} V_a(i) & 0 & 0 & V_a(j) & V_a(k) & 0 & 0 \\ 0 & V_b(i') & V_b(j') & 0 & 0 & V_b(k') & V_b(l') \end{bmatrix}$$

$$\begin{bmatrix} V_a(i) & V_a(j) & V_a(k) & 0 & V_a(l) & 0 & 0 \\ 0 & 0 & 0 & V_b(i') & 0 & V_b(j') & V_b(k') \end{bmatrix}$$

$$\begin{bmatrix} V_a(i) & 0 & 0 & 0 & V_a(j) & 0 & 0 \\ 0 & V_b(i') & V_b(j') & V_b(k') & 0 & V_b(l') & V_b(m') \end{bmatrix}$$

$$\begin{bmatrix} V_a(i) & V_a(j) & 0 & V_a(k) & V_a(l) & 0 & 0 \\ 0 & 0 & V_b(i') & 0 & 0 & V_b(j') & V_b(k') \end{bmatrix}$$

$$\begin{bmatrix} 0 & V_a(i) & V_a(j) & V_a(k) & V_a(l) & 0 & 0 \\ V_b(i') & 0 & 0 & 0 & 0 & V_b(j') & V_b(k') \end{bmatrix}$$

$$\begin{bmatrix} V_a(i) & V_a(j) & 0 & 0 & V_a(k) & 0 & 0 \\ 0 & 0 & V_b(i') & V_b(j') & 0 & V_b(k') & V_b(l') \end{bmatrix}$$

$$\begin{bmatrix} 0 & V_a(i) & V_a(j) & 0 & V_a(k) & 0 & 0 \\ V_b(i') & 0 & 0 & V_b(j') & 0 & V_b(k') & V_b(l') \end{bmatrix}$$

$$\begin{bmatrix} V_a(i) & 0 & V_a(j) & V_a(k) & V_a(l) & 0 & 0 \\ 0 & V_b(i') & 0 & 0 & 0 & V_b(j') & V_b(k') \end{bmatrix}$$

$$\begin{bmatrix} 0 & V_a(i) & 0 & V_a(j) & V_a(k) & 0 & 0 \\ V_b(i') & 0 & V_b(j') & 0 & 0 & V_b(k') & V_b(l') \end{bmatrix}$$

$$\begin{bmatrix} V_a(i) & 0 & V_a(j) & 0 & V_a(k) & 0 & 0 \\ 0 & V_b(i') & 0 & V_b(j') & 0 & V_b(k') & V_b(l') \end{bmatrix} \begin{bmatrix} 0 & V_a(i) & 0 & 0 & V_a(j) & 0 & 0 \\ V_b(i') & 0 & V_b(j') & V_b(k') & 0 & V_b(l') & V_b(m') \end{bmatrix}$$

-continued $$\begin{bmatrix} 0 & 0 & V_a(i) & V_a(j) & V_a(k) & 0 & 0 \\ V_b(i') & V_b(j') & 0 & 0 & 0 & V_b(k') & V_b(l') \end{bmatrix}$$

$$\begin{bmatrix} 0 & 0 & V_a(i) & 0 & V_a(j) & 0 & 0 \\ V_b(i') & V_b(j') & 0 & V_b(k') & 0 & V_b(l') & V_b(m') \end{bmatrix}$$

$$\begin{bmatrix} 0 & 0 & 0 & V_a(i) & V_a(j) & 0 & 0 \\ V_b(i') & V_b(j') & V_b(k') & 0 & 0 & V_b(l') & V_b(m') \end{bmatrix}$$

$$\begin{bmatrix} 0 & 0 & 0 & 0 & V_a(i) & 0 & 0 \\ V_b(i') & V_b(j') & V_b(k') & V_b(l') & 0 & V_b(m') & V_b(n') \end{bmatrix}$$

$$\begin{bmatrix} V_a(i) & V_a(j) & V_a(k) & V_a(l) & 0 & 0 & 0 \\ 0 & 0 & 0 & 0 & V_b(i') & V_b(j') & V_b(k') \end{bmatrix}$$

$$\begin{bmatrix} V_a(i) & V_a(j) & V_a(k) & 0 & 0 & 0 & 0 \\ 0 & 0 & 0 & V_b(i') & V_b(j') & V_b(k') & V_b(l') \end{bmatrix}$$

$$\begin{bmatrix} V_a(i) & V_a(j) & 0 & V_a(k) & 0 & 0 & 0 \\ 0 & 0 & V_b(i') & 0 & V_b(j') & V_b(k') & V_b(l') \end{bmatrix}$$

$$\begin{bmatrix} V_a(i) & V_a(j) & 0 & 0 & 0 & 0 & 0 \\ 0 & 0 & V_b(i') & V_b(j') & V_b(k') & V_b(l') & V_b(m') \end{bmatrix}$$

$$\begin{bmatrix} V_a(i) & 0 & V_a(j) & V_a(k) & 0 & 0 & 0 \\ 0 & V_b(i') & 0 & 0 & V_b(j') & V_b(k') & V_b(l') \end{bmatrix}$$

$$\begin{bmatrix} V_a(i) & 0 & V_a(j) & 0 & 0 & 0 & 0 \\ 0 & V_b(i') & 0 & V_b(j') & V_b(k') & V_b(l') & V_b(m') \end{bmatrix}$$

$$\begin{bmatrix} V_a(i) & 0 & 0 & V_a(j) & 0 & 0 & 0 \\ 0 & V_b(i') & V_b(j') & 0 & V_b(k') & V_b(l') & V_b(m') \end{bmatrix}$$

$$\begin{bmatrix} V_a(i) & 0 & 0 & 0 & 0 & 0 & 0 \\ 0 & V_b(i') & V_b(j') & V_b(k') & V_b(l') & V_b(m') & V_b(n') \end{bmatrix}$$

$$\begin{bmatrix} 0 & V_a(i) & V_a(j) & V_a(k) & 0 & 0 & 0 \\ V_b(i') & 0 & 0 & 0 & V_b(j') & V_b(k') & V_b(l') \end{bmatrix}$$

$$\begin{bmatrix} 0 & V_a(i) & V_a(j) & 0 & 0 & 0 & 0 \\ V_b(i') & 0 & 0 & V_b(j') & V_b(k') & V_b(l') & V_b(m') \end{bmatrix}$$

$$\begin{bmatrix} 0 & V_a(i) & 0 & V_a(j) & 0 & 0 & 0 \\ V_b(i') & 0 & V_b(j') & 0 & V_b(k') & V_b(l') & V_b(m') \end{bmatrix}$$

$$\begin{bmatrix} 0 & V_a(i) & 0 & 0 & 0 & 0 & 0 \\ V_b(i') & 0 & V_b(j') & V_b(k') & V_b(l') & V_b(m') & V_b(n') \end{bmatrix}$$

$$\begin{bmatrix} 0 & 0 & V_a(i) & V_a(j) & 0 & 0 & 0 \\ V_b(i') & V_b(j') & 0 & 0 & V_b(k') & V_b(l') & V_b(m') \end{bmatrix}$$

$$\begin{bmatrix} 0 & 0 & V_a(i) & 0 & 0 & 0 & 0 \\ V_b(i') & V_b(j') & 0 & V_b(k') & V_b(l') & V_b(m') & V_b(n') \end{bmatrix}$$

$$\begin{bmatrix} 0 & 0 & 0 & V_a(i) & 0 & 0 & 0 \\ V_b(i') & V_b(j') & V_b(k') & 0 & V_b(l') & V_b(m') & V_b(n') \end{bmatrix}$$

$$\begin{bmatrix} 0 & 0 & 0 & 0 & 0 & 0 & 0 \\ V_b(i') & V_b(j') & V_b(k') & V_b(l') & V_b(m') & V_b(n') & V_b(p') \end{bmatrix},$$

where a value of a rank indicator is 7, $0<i\leq N_1$, $0<i'\leq N_1$, $0<j\leq N_1$, $0<j'\leq N_1$, $0<k\leq N_1$, $0<k'\leq N_1$, $0<l\leq N_1$, $0<l'\leq N_1$, $0<m\leq N_1$, $0<m'\leq N_1$, $0<n\leq N_1$, $0<n'\leq N_1$, $0<p\leq N_1$, and $0<p'\leq N_1$; or 8. the first codebook is one of the following matrices:

$$\begin{bmatrix} V_a(i) & V_a(j) & V_a(k) & V_a(l) & V_a(m) & V_a(n) & V_a(p) & V_a(q) \\ 0 & 0 & 0 & 0 & 0 & 0 & 0 & 0 \end{bmatrix}$$

$$\begin{bmatrix} V_a(i) & V_a(j) & V_a(k) & 0 & V_a(l) & V_a(m) & V_a(n) & V_a(p) \\ 0 & 0 & 0 & V_b(i') & 0 & 0 & 0 & 0 \end{bmatrix}$$

$$\begin{bmatrix} V_a(i) & V_a(j) & 0 & V_a(k) & V_a(l) & V_a(m) & V_a(n) & V_a(p) \\ 0 & 0 & V_b(i') & 0 & 0 & 0 & 0 & 0 \end{bmatrix}$$

$$\begin{bmatrix} V_a(i) & V_a(j) & 0 & 0 & V_a(k) & V_a(l) & V_a(m) & V_a(n) \\ 0 & 0 & V_b(i') & V_b(j') & 0 & 0 & 0 & 0 \end{bmatrix}$$

$$\begin{bmatrix} V_a(i) & 0 & V_a(j) & V_a(k) & V_a(l) & V_a(m) & V_a(n) & V_a(p) \\ 0 & V_b(i') & 0 & 0 & 0 & 0 & 0 & 0 \end{bmatrix}$$

$$\begin{bmatrix} V_a(i) & 0 & V_a(j) & 0 & V_a(k) & V_a(l) & V_a(m) & V_a(n) \\ 0 & V_b(j') & 0 & V_b(i') & 0 & 0 & 0 & 0 \end{bmatrix}$$

$$\begin{bmatrix} V_a(i) & 0 & 0 & V_a(j) & V_a(k) & V_a(l) & V_a(m) & V_a(n) \\ 0 & V_b(i') & V_b(2) & 0 & 0 & 0 & 0 & 0 \end{bmatrix}$$

$$\begin{bmatrix} V_a(i) & 0 & 0 & 0 & V_a(j) & V_a(k) & V_a(l) & V_a(m) \\ 0 & V_b(i') & V_b(j') & V_b(k') & 0 & 0 & 0 & 0 \end{bmatrix}$$

$$\begin{bmatrix} 0 & V_a(i) & V_a(j) & V_a(k) & V_a(l) & V_a(m) & V_a(n) & V_a(p) \\ V_b(i') & 0 & 0 & 0 & 0 & 0 & 0 & 0 \end{bmatrix}$$

$$\begin{bmatrix} 0 & V_a(i) & V_a(j) & 0 & V_a(k) & V_a(l) & V_a(m) & V_a(n) \\ V_b(i') & 0 & 0 & V_b(j') & 0 & 0 & 0 & 0 \end{bmatrix}$$

$$\begin{bmatrix} 0 & V_a(j) & 0 & V_a(j) & V_a(k) & V_a(l) & V_a(m) & V_a(n) \\ V_b(i') & 0 & V_b(2) & 0 & 0 & 0 & 0 & 0 \end{bmatrix}$$

$$\begin{bmatrix} 0 & V_a(i) & 0 & 0 & V_a(j) & V_a(k) & V_a(l) & V_a(m) \\ V_b(i') & 0 & V_b(j') & V_b(k') & 0 & 0 & 0 & 0 \end{bmatrix}$$

$$\begin{bmatrix} 0 & 0 & V_a(i) & V_a(j) & V_a(k) & V_a(l) & V_a(m) & V_a(n) \\ V_b(i') & V_b(j') & 0 & 0 & 0 & 0 & 0 & 0 \end{bmatrix}$$

$$\begin{bmatrix} 0 & 0 & V_a(i) & 0 & V_a(j) & V_a(k) & V_a(l) & V_a(m) \\ V_b(i') & V_b(j') & 0 & V_b(k') & 0 & 0 & 0 & 0 \end{bmatrix}$$

$$\begin{bmatrix} 0 & 0 & 0 & V_a(i) & V_a(j) & V_a(k) & V_a(l) & V_a(m) \\ V_b(i') & V_b(j') & V_b(k') & 0 & 0 & 0 & 0 & 0 \end{bmatrix}$$

$$\begin{bmatrix} 0 & 0 & 0 & 0 & V_a(i) & V_a(j) & V_a(k) & V_a(l) \\ V_b(i') & V_b(j') & V_b(k') & V_b(l') & 0 & 0 & 0 & 0 \end{bmatrix}$$

$$\begin{bmatrix} V_a(i) & V_a(j) & V_a(k) & V_a(l) & 0 & V_a(m) & V_a(n) & V_a(p) \\ 0 & 0 & 0 & 0 & V_b(i') & 0 & 0 & 0 \end{bmatrix}$$

$$\begin{bmatrix} V_a(i) & V_a(j) & V_a(k) & 0 & 0 & V_a(l) & V_a(m) & V_a(n) \\ 0 & 0 & 0 & V_b(i') & V_b(j') & 0 & 0 & 0 \end{bmatrix}$$

$$\begin{bmatrix} V_a(i) & V_a(j) & 0 & V_a(k) & 0 & V_a(l) & V_a(m) & V_a(n) \\ 0 & 0 & V_b(i') & 0 & V_b(j') & 0 & 0 & 0 \end{bmatrix}$$

$$\begin{bmatrix} V_a(i) & V_a(j) & 0 & 0 & 0 & V_a(k) & V_a(l) & V_a(m) \\ 0 & 0 & V_b(i') & V_b(j') & V_b(k') & 0 & 0 & 0 \end{bmatrix}$$

$$\begin{bmatrix} V_a(i) & 0 & V_a(j) & V_a(k) & 0 & V_a(l) & V_a(m) & V_a(n) \\ 0 & V_b(j') & 0 & 0 & V_b(j') & 0 & 0 & 0 \end{bmatrix}$$

$$\begin{bmatrix} V_a(i) & 0 & V_a(j) & 0 & 0 & V_a(k) & V_a(l) & V_a(m) \\ 0 & V_b(i') & 0 & V_b(j') & V_b(j') & 0 & 0 & 0 \end{bmatrix}$$

$$\begin{bmatrix} V_a(i) & 0 & 0 & V_a(j) & 0 & V_a(k) & V_a(l) & V_a(m) \\ 0 & V_b(i') & V_b(j') & 0 & V_b(k') & 0 & 0 & 0 \end{bmatrix}$$

$$\begin{bmatrix} V_a(i) & 0 & 0 & 0 & 0 & V_a(j) & V_a(k) & V_a(l) \\ 0 & V_b(i') & V_b(j') & V_b(k') & V_b(l') & 0 & 0 & 0 \end{bmatrix}$$

$$\begin{bmatrix} 0 & V_a(i) & V_a(j) & V_a(k) & 0 & V_a(l) & V_a(m) & V_a(n) \\ V_b(i') & 0 & 0 & 0 & V_b(j') & 0 & 0 & 0 \end{bmatrix}$$

$$\begin{bmatrix} 0 & V_a(i) & V_a(j) & 0 & 0 & V_a(k) & V_a(l) & V_a(m) \\ V_b(i') & 0 & 0 & V_b(j') & V_b(k') & 0 & 0 & 0 \end{bmatrix}$$

$$\begin{bmatrix} 0 & V_a(i) & 0 & V_a(j) & 0 & V_a(k) & V_a(l) & V_a(m) \\ V_b(i') & 0 & V_b(j') & 0 & V_b(k') & 0 & 0 & 0 \end{bmatrix}$$

$$\begin{bmatrix} 0 & V_a(i) & 0 & 0 & 0 & V_a(j) & V_a(k) & V_a(l) \\ V_b(i') & 0 & V_b(j') & V_b(k') & V_b(l') & 0 & 0 & 0 \end{bmatrix}$$

$$\begin{bmatrix} 0 & 0 & V_a(i) & V_a(j) & 0 & V_a(k) & V_a(l) & V_a(m) \\ V_b(i') & V_b(j') & 0 & 0 & V_b(k') & 0 & 0 & 0 \end{bmatrix}$$

$$\begin{bmatrix} 0 & 0 & V_a^{(i)} & 0 & 0 & V_a(j) & V_a(k) & V_a(l) \\ V_b(i') & V_b(j') & 0 & V_b(k') & V_b(l') & 0 & 0 & 0 \end{bmatrix}$$

$$\begin{bmatrix} 0 & 0 & 0 & V_a(i) & 0 & V_a(j) & V_a(k) & V_a(l) \\ V_b(i') & V_b(j') & V_b(k') & 0 & V_b(l') & 0 & 0 & 0 \end{bmatrix}$$

$$\begin{bmatrix} 0 & 0 & 0 & 0 & 0 & V_a(i) & V_a(j) & V_a(k) \\ V_b(i') & V_b(j') & V_b(k') & V_b(l') & V_b(m') & 0 & 0 & 0 \end{bmatrix}$$

$$\begin{bmatrix} V_a(i) & V_a(j) & V_a(k) & V_a(l) & V_a(m) & 0 & V_a(n) & V_a(p) \\ 0 & 0 & 0 & 0 & 0 & V_b(i') & 0 & 0 \end{bmatrix}$$

$$\begin{bmatrix} V_a(i) & V_a(j) & V_a(k) & 0 & V_a(l) & 0 & V_a(m) & V_a(n) \\ 0 & 0 & 0 & V_b(i') & 0 & V_b(j') & 0 & 0 \end{bmatrix}$$

$$\begin{bmatrix} V_a(i) & V_a(j) & 0 & V_a(k) & V_a(l) & 0 & V_a(m) & V_a(n) \\ 0 & 0 & V_b(i') & 0 & 0 & V_b(j') & 0 & 0 \end{bmatrix}$$

$$\begin{bmatrix} V_a(i) & V_a(j) & 0 & 0 & V_a(k) & 0 & V_a(l) & V_a(m) \\ 0 & 0 & V_b(i') & V_b(j') & 0 & V_b(k') & 0 & 0 \end{bmatrix}$$

$$\begin{bmatrix} V_a(i) & 0 & V_a(j) & V_a(k) & V_a(l) & 0 & V_a(m) & V_a(n) \\ 0 & V_b(i') & 0 & 0 & 0 & V_b(j') & 0 & 0 \end{bmatrix}$$

$$\begin{bmatrix} V_a(i) & 0 & V_a(j) & 0 & V_a(k) & 0 & V_a(l) & V_a(m) \\ 0 & V_b(i') & 0 & V_b(j') & 0 & V_b(k') & 0 & 0 \end{bmatrix}$$

$$\begin{bmatrix} V_a(i) & 0 & 0 & V_a(j) & 0 & V_a(k) & V_a(l) & V_a(m) \\ 0 & V_b(i') & V_b(j') & 0 & 0 & V_b(k') & 0 & 0 \end{bmatrix}$$

$$\begin{bmatrix} V_a(i) & V_a(j) & V_a(k) & V_a(l) & V_a(m) & V_a(n) & V_a(p) & 0 \\ 0 & 0 & 0 & 0 & 0 & 0 & 0 & V_b(i') \end{bmatrix} \begin{bmatrix} V_a(i) & V_a(j) & V_a(k) & 0 & V_a(l) & V_a(m) & V_a(n) & 0 \\ 0 & 0 & 0 & V_b(i') & 0 & 0 & 0 & V_b(i') \end{bmatrix}$$

$$\begin{bmatrix} V_a(i) & V_a(j) & 0 & V_a(k) & V_a(l) & V_a(m) & V_a(n) & 0 \\ 0 & 0 & V_b(i') & 0 & 0 & 0 & 0 & V_b(j') \end{bmatrix} \begin{bmatrix} V_a(i) & V_a(j) & 0 & 0 & V_a(k) & V_a(l) & V_a(m) & 0 \\ 0 & 0 & V_b(i') & V_b(j') & 0 & 0 & 0 & V_b(k') \end{bmatrix}$$

$$\begin{bmatrix} V_a(i) & 0 & V_a(j) & V_a(k) & V_a(l) & V_a(m) & V_a(n) & 0 \\ 0 & V_b(i') & 0 & 0 & 0 & 0 & 0 & V_b(j') \end{bmatrix} \begin{bmatrix} V_a(i) & 0 & V_a(j) & 0 & V_a(k) & V_a(l) & V_a(m) & 0 \\ 0 & V_b(i') & 0 & V_b(j') & 0 & 0 & 0 & V_b(k') \end{bmatrix}$$

$$\begin{bmatrix} V_a(i) & 0 & 0 & V_a(j) & V_a(k) & V_a(l) & V_a(m) & 0 \\ 0 & V_b(i') & V_b(j') & 0 & 0 & 0 & 0 & V_b(k') \end{bmatrix} \begin{bmatrix} V_a(i) & 0 & 0 & 0 & V_a(j) & V_a(k) & V_a(l) & 0 \\ 0 & V_b(i') & V_b(j') & V_b(k') & 0 & 0 & 0 & V_b(l') \end{bmatrix}$$

$$\begin{bmatrix} 0 & V_a(i) & V_a(j) & V_a(k) & V_a(l) & V_a(m) & V_a(n) & 0 \\ V_b(i') & 0 & 0 & 0 & 0 & 0 & 0 & V_b(j') \end{bmatrix} \begin{bmatrix} 0 & V_a(i) & V_a(j) & 0 & V_a(k) & V_a(l) & V_a(m) & 0 \\ V_b(i') & 0 & 0 & V_b(j') & 0 & 0 & 0 & V_b(k') \end{bmatrix}$$

$$\begin{bmatrix} 0 & V_a(i) & 0 & V_a(j) & V_a(k) & V_a(l) & V_a(m) & 0 \\ V_b(i') & 0 & V_b(j') & 0 & 0 & 0 & 0 & V_b(k') \end{bmatrix} \begin{bmatrix} 0 & V_a(i) & 0 & 0 & V_a(j) & V_a(k) & V_a(l) & 0 \\ V_b(i') & 0 & V_b(j') & V_b(k') & 0 & 0 & 0 & V_b(l') \end{bmatrix}$$

$$\begin{bmatrix} 0 & 0 & V_a(i) & V_a(j) & V_a(k) & V_a(l) & V_a(m) & 0 \\ V_b(i') & V_b(j') & 0 & 0 & 0 & 0 & 0 & V_b(k') \end{bmatrix} \begin{bmatrix} 0 & 0 & V_a(i) & V_a(j) & V_a(k) & V_a(l) & 0 \\ V_b(i') & V_b(j') & 0 & 0 & 0 & 0 & V_b(l') \end{bmatrix}$$

$$\begin{bmatrix} 0 & 0 & 0 & V_a(i) & V_a(j) & V_a(k) & V_a(l) & 0 \\ V_b(i') & V_b(j') & V_b(k') & 0 & 0 & 0 & 0 & V_b(l') \end{bmatrix} \begin{bmatrix} 0 & 0 & 0 & 0 & V_a(i) & V_a(j) & V_a(k) & 0 \\ V_b(i') & V_b(j') & V_b(k') & V_b(l') & 0 & 0 & 0 & V_b(m') \end{bmatrix}$$

$$\begin{bmatrix} V_a(i) & V_a(j) & V_a(k) & V_a(l) & 0 & V_a(m) & V_a(n) & 0 \\ 0 & 0 & 0 & 0 & V_b(i') & 0 & 0 & V_b(j') \end{bmatrix} \begin{bmatrix} V_a(i) & V_a(j) & V_a(k) & 0 & 0 & V_a(l) & V_a(m) & 0 \\ 0 & 0 & 0 & V_b(i') & V_b(j') & 0 & 0 & V \end{bmatrix}$$

$$\begin{bmatrix} V_a(i) & V_a(j) & 0 & V_a(k) & 0 & V_a(l) & V_a(m) & 0 \\ 0 & 0 & V_b(i') & 0 & V_b(j') & 0 & 0 & V_b(k') \end{bmatrix} \begin{bmatrix} V_a(i) & V_a(j) & 0 & 0 & 0 & V_a(k) & V_a(l) & 0 \\ 0 & 0 & V_b(i') & V_b(j') & V_b(k') & 0 & 0 & V_b(l') \end{bmatrix}$$

$$\begin{bmatrix} V_a(i) & 0 & V_a(j) & V_a(k) & 0 & V_a(l) & V_a(m) & 0 \\ 0 & V_b(i') & 0 & 0 & V_b(j') & 0 & 0 & V_b(k') \end{bmatrix} \begin{bmatrix} V_a(i) & 0 & V_a(j) & 0 & 0 & V_a(k) & V_a(l) & 0 \\ 0 & V_b(i') & 0 & V_b(j') & V_b(k') & 0 & 0 & V_b(l') \end{bmatrix}$$

$$\begin{bmatrix} V_a(i) & 0 & 0 & V_a(j) & 0 & V_a(k) & V_a(l) & 0 \\ 0 & V_b(i') & V_b(j') & 0 & V_b(k') & 0 & 0 & V_b(l') \end{bmatrix} \begin{bmatrix} V_a(i) & 0 & 0 & 0 & 0 & V_a(j) & V_a(k) & 0 \\ 0 & V_b(i') & V_b(j') & V_b(k') & V_b(l') & 0 & 0 & V_b(m') \end{bmatrix}$$

$$\begin{bmatrix} 0 & V_a(i) & V_a(j) & V_a(k) & 0 & V_a(l) & V_a(m) & 0 \\ V_b(i') & 0 & 0 & 0 & V_b(j') & 0 & 0 & V_b(k') \end{bmatrix} \begin{bmatrix} 0 & V_a(i) & V_a(j) & 0 & 0 & V_a(k) & V_a(l) & 0 \\ V_b(i') & 0 & 0 & V_b(j') & V_b(k') & 0 & 0 & V_b(l') \end{bmatrix}$$

$$\begin{bmatrix} 0 & V_a(i) & 0 & V_a(j) & 0 & V_a(k) & V_a(l) & 0 \\ V_b(i') & 0 & V_b(j') & 0 & V_b(k') & 0 & 0 & V_b(l') \end{bmatrix} \begin{bmatrix} 0 & V_a(i) & 0 & 0 & 0 & V_a(j) & V_a(k) & 0 \\ V_b(i') & 0 & V_b(j') & V_b(k') & V_b(l') & 0 & 0 & V_b(m') \end{bmatrix}$$

$$\begin{bmatrix} 0 & 0 & V_a(i) & V_a(j) & 0 & V_a(k) & V_a(l) & 0 \\ V_b(i') & V_b(j') & 0 & 0 & V_b(k') & 0 & 0 & V_b(l') \end{bmatrix} \begin{bmatrix} 0 & 0 & V_a^{(i)} & 0 & 0 & V_a(j) & V_a(k) & 0 \\ V_b(i') & V_b(j') & 0 & V_b(k') & V_b(l') & 0 & 0 & V_b(m') \end{bmatrix}$$

$$\begin{bmatrix} 0 & 0 & 0 & V_a(i) & 0 & V_a(j) & V_a(k) & 0 \\ V_b(i') & V_b(j') & V_b(k') & 0 & V_b(l') & 0 & 0 & V_b(m') \end{bmatrix} \begin{bmatrix} 0 & 0 & 0 & 0 & 0 & V_a(i) & V_a(j) & 0 \\ V_b(i') & V_b(j') & V_b(k') & V_b(l') & V_b(m') & 0 & 0 & V_b(n') \end{bmatrix}$$

-continued $$\begin{bmatrix} V_a(i) & 0 & 0 & 0 & V_a(j) & 0 & V_a(k) & V_a(l) \\ 0 & V_b(i') & V_b(j') & V_b(k') & 0 & V_b(l') & 0 & 0 \end{bmatrix}$$

$$\begin{bmatrix} 0 & V_a(i) & V_a(j) & V_a(k) & V_a(l) & 0 & V_a(m) & V_a(n) \\ V_b(i') & 0 & 0 & 0 & 0 & V_b(j') & 0 & 0 \end{bmatrix}$$

$$\begin{bmatrix} 0 & V_a(i) & V_a(j) & 0 & V_a(k) & 0 & V_a(l) & V_a(m) \\ V_b(i') & 0 & 0 & V_b(j') & 0 & V_b(k') & 0 & 0 \end{bmatrix}$$

$$\begin{bmatrix} 0 & V_a(i) & 0 & V_a(j) & V_a(k) & 0 & V_a(l) & V_a(m) \\ V_b(i') & 0 & V_b(j') & 0 & 0 & V_b(k') & 0 & 0 \end{bmatrix}$$

$$\begin{bmatrix} 0 & V_a(i) & 0 & 0 & V_a(j) & V_a(k) & V_a(l) \\ V_b(i') & 0 & V_b(j') & V_b(k') & 0 & V_b(l') & 0 & 0 \end{bmatrix}$$

$$\begin{bmatrix} 0 & 0 & V_a(i) & V_a(j) & V_a(k) & 0 & V_a(l) & V_a(m) \\ V_b(i') & V_b(j') & 0 & 0 & 0 & V_b(k') & 0 & 0 \end{bmatrix}$$

$$\begin{bmatrix} 0 & 0 & V_a(i) & 0 & V_a(j) & 0 & V_a(k) & V_a(l) \\ V_b(i') & V_b(j') & 0 & V_b(k') & 0 & V_b(l') & 0 & 0 \end{bmatrix}$$

$$\begin{bmatrix} 0 & 0 & 0 & V_a(i) & V_a(j) & 0 & V_a(k) & V_a(l) \\ V_b(i') & V_b(j') & V_b(k') & 0 & 0 & V_b(l') & 0 & 0 \end{bmatrix}$$

$$\begin{bmatrix} 0 & 0 & 0 & 0 & V_a(i) & 0 & V_a(j) & V_a(k) \\ V_b(i') & V_b(j') & V_b(k') & V_b(l') & 0 & V_b(m') & 0 & 0 \end{bmatrix}$$

$$\begin{bmatrix} V_a(i) & V_a(j) & V_a(k) & V_a(l) & 0 & 0 & V_a(m) & V_a(n) \\ 0 & 0 & 0 & 0 & V_b(i') & V_b(j') & 0 & 0 \end{bmatrix}$$

$$\begin{bmatrix} V_a(i) & V_a(j) & V_a(k) & 0 & 0 & 0 & V_a(l) & V_a(m) \\ 0 & 0 & 0 & V_b(i') & V_b(j') & V_b(k') & 0 & 0 \end{bmatrix}$$

$$\begin{bmatrix} V_a(i) & V_a(j) & 0 & V_a(k) & 0 & 0 & V_a(l) & V_a(m) \\ 0 & 0 & V_b(i') & 0 & V_b(j') & V_b(k') & 0 & 0 \end{bmatrix}$$

$$\begin{bmatrix} V_a(i) & V_a(j) & 0 & 0 & 0 & 0 & V_a(k) & V_a(l) \\ 0 & 0 & V_b(i') & V_b(j') & V_b(k') & V_b(l') & 0 & 0 \end{bmatrix}$$

$$\begin{bmatrix} V_a(i) & 0 & V_a(j) & V_a(k) & 0 & 0 & V_a(l) & V_a(m) \\ 0 & V_b(i') & 0 & 0 & V_b(j') & V_b(k') & 0 & 0 \end{bmatrix}$$

$$\begin{bmatrix} V_a(i) & 0 & V_a(j) & 0 & 0 & 0 & V_a(k) & V_a(l) \\ 0 & V_b(i') & 0 & V_b(j') & V_b(k') & V_b(l') & 0 & 0 \end{bmatrix}$$

$$\begin{bmatrix} V_a(i) & 0 & 0 & V_a(j) & 0 & 0 & V_a(k) & V_a(l) \\ 0 & V_b(i') & V_b(j') & 0 & V_b(k') & V_b(l') & 0 & 0 \end{bmatrix}$$

$$\begin{bmatrix} V_a(i) & 0 & 0 & 0 & 0 & 0 & V_a(j) & V_a(k) \\ 0 & V_b(i') & V_b(j') & V_b(k') & V_b(l') & V_b(m') & 0 & 0 \end{bmatrix}$$

$$\begin{bmatrix} 0 & V_a(i) & V_a(j) & V_a(k) & 0 & 0 & V_a(l) & V_a(m) \\ V_b(i') & 0 & 0 & 0 & V_b(j') & V_b(k') & 0 & 0 \end{bmatrix}$$

$$\begin{bmatrix} 0 & V_a(i) & V_a(j) & 0 & 0 & 0 & V_a(k) & V_a(l) \\ V_b(i') & 0 & 0 & V_b(j') & V_b(k') & V_b(l') & 0 & 0 \end{bmatrix}$$

$$\begin{bmatrix} 0 & V_a(i) & 0 & V_a(j) & 0 & 0 & V_a(k) & V_a(l) \\ V_b(i') & 0 & V_b(j') & 0 & V_b(k') & V_b(l') & 0 & 0 \end{bmatrix}$$

$$\begin{bmatrix} 0 & V_a(i) & 0 & 0 & 0 & 0 & V_a(j) & V_a(k) \\ V_b(i') & 0 & V_b(j') & V_b(k') & V_b(l') & V_b(m') & 0 & 0 \end{bmatrix}$$

$$\begin{bmatrix} 0 & 0 & V_a(i) & V_a(j) & 0 & 0 & V_a(k) & V_a(l) \\ V_b(i') & V_b(j') & 0 & 0 & V_b(k') & V_b(l') & 0 & 0 \end{bmatrix}$$

$$\begin{bmatrix} 0 & 0 & V_a(i) & 0 & 0 & 0 & V_a(j) & V_a(k) \\ V_b(i') & V_b(j') & 0 & V_b(k') & V_b(l') & V_b(m') & 0 & 0 \end{bmatrix}$$

$$\begin{bmatrix} 0 & 0 & 0 & V_a(i) & 0 & 0 & V_a(j) & V_a(k) \\ V_b(i') & V_b(j') & V_b(k') & 0 & V_b(l') & V_b(m') & 0 & 0 \end{bmatrix}$$

-continued $$\begin{bmatrix} 0 & 0 & 0 & 0 & 0 & 0 & V_a(i) & V_a(j) \\ V_b(i') & V_b(j') & V_b(k') & V_b(l') & V_b(m') & V_b(k') & 0 & 0 \end{bmatrix}$$

$$\begin{bmatrix} V_a(i) & V_a(j) & V_a(k) & V_a(l) & V_a(m) & 0 & V_a(n) & 0 \\ 0 & 0 & 0 & 0 & 0 & V_b(i) & 0 & V_b(j) \end{bmatrix}$$

$$\begin{bmatrix} V_a(i) & V_a(j) & V_a(k) & 0 & V_a(l) & 0 & V_a(m) & 0 \\ 0 & 0 & 0 & V_b(i') & 0 & V_b(j') & 0 & V_b(k') \end{bmatrix}$$

$$\begin{bmatrix} V_a(i) & V_a(j) & 0 & V_a(k) & V_a(l) & 0 & V_a(m) & 0 \\ 0 & 0 & V_b(i') & 0 & 0 & V_b(j') & 0 & V_b(k') \end{bmatrix}$$

$$\begin{bmatrix} V_a(i) & V_a(j) & 0 & 0 & V_a(k) & V_a(l) & 0 \\ 0 & 0 & V_b(i') & V_b(j') & 0 & V_b(k') & 0 & V_b(l') \end{bmatrix}$$

$$\begin{bmatrix} V_a(i) & 0 & V_a(j) & V_a(k) & V_a(l) & 0 & V_a(m) & 0 \\ 0 & V_b(i') & 0 & 0 & 0 & V_b(j') & 0 & V_b(k') \end{bmatrix}$$

$$\begin{bmatrix} V_a(i) & 0 & V_a(j) & 0 & V_a(k) & V_a(l) & 0 \\ 0 & V_b(i') & 0 & V_b(j') & 0 & V_b(k') & 0 & V_b(l') \end{bmatrix}$$

$$\begin{bmatrix} V_a(i) & 0 & 0 & V_a(j) & V_a(k) & V_a(l) & 0 \\ 0 & V_b(i') & V_b(j') & 0 & 0 & V_b(k') & 0 & V_b(l') \end{bmatrix}$$

$$\begin{bmatrix} 0 & V_a(i) & V_a(j) & V_a(k) & V_a(l) & 0 & V_a(m) & 0 \\ V_b(i') & 0 & 0 & 0 & 0 & V_b(j') & 0 & V_b(k') \end{bmatrix}$$

$$\begin{bmatrix} 0 & V_a(i) & V_a(j) & 0 & V_a(k) & V_a(l) & 0 \\ V_b(i') & 0 & 0 & V_b(j') & 0 & V_b(k') & 0 & V_b(l') \end{bmatrix}$$

$$\begin{bmatrix} 0 & V_a(i) & 0 & V_a(j) & V_a(k) & V_a(l) & 0 \\ V_b(i') & 0 & V_b(j') & 0 & 0 & V_b(k') & 0 & V_b(l') \end{bmatrix}$$

$$\begin{bmatrix} 0 & V_a(i) & 0 & 0 & V_a(j) & V_a(k) & 0 \\ V_b(i') & 0 & V_b(j') & V_a(k') & V_b(l') & 0 & V_b(m') \end{bmatrix}$$

$$\begin{bmatrix} 0 & 0 & V_a(i) & V_a(j) & V_a(k) & 0 & V_a(l) & 0 \\ V_b(i') & V_b(j') & 0 & 0 & V_b(k') & 0 & V_b(l') \end{bmatrix}$$

$$\begin{bmatrix} 0 & 0 & V_a(i) & V_a(j) & V_a(k) & 0 & 0 \\ V_b(i') & V_b(j') & 0 & V_b(k') & 0 & V_b(l') & 0 & V_b(m') \end{bmatrix}$$

$$\begin{bmatrix} 0 & 0 & 0 & V_a(i) & V_a(j) & 0 & V_a(k) & 0 \\ V_b(i') & V_b(j') & V_b(k') & 0 & V_b(l') & 0 & V_b(m') \end{bmatrix}$$

$$\begin{bmatrix} 0 & 0 & 0 & 0 & V_a(i) & 0 & V_a(j) & 0 \\ V_b(i') & V_b(j') & V_b(k') & V_b(l') & 0 & V_b(m') & 0 & V_b(n') \end{bmatrix}$$

$$\begin{bmatrix} V_a(i) & V_a(j) & V_a(k) & V_a(l) & 0 & 0 & V_a(m) & 0 \\ 0 & 0 & 0 & 0 & V_b(i') & V_b(j') & 0 & V_b(k') \end{bmatrix}$$

$$\begin{bmatrix} V_a(i) & V_a(j) & V_a(k) & 0 & 0 & 0 & V_a(l) & 0 \\ 0 & 0 & 0 & V_b(i') & V_b(j') & V_b(k') & 0 & V_b(m') \end{bmatrix}$$

$$\begin{bmatrix} V_a(i) & V_a(j) & 0 & V_a(k) & 0 & 0 & V_a(l) & 0 \\ 0 & 0 & V_b(i') & 0 & V_b(j') & V_b(k') & 0 & V_b(l') \end{bmatrix}$$

$$\begin{bmatrix} V_a(i) & V_a(j) & 0 & 0 & 0 & 0 & V_a(k) & 0 \\ 0 & 0 & V_b(i') & V_b(j') & V_b(k) & V_b(l') & 0 & V_b(m') \end{bmatrix}$$

$$\begin{bmatrix} V_a(i) & 0 & V_a(j) & V_a(k) & 0 & 0 & V_a(l) & 0 \\ 0 & V_b(i') & 0 & 0 & V_b(j') & V_b(k') & 0 & V_b(l') \end{bmatrix}$$

$$\begin{bmatrix} V_a(i) & 0 & V_a(j) & 0 & 0 & 0 & V_a(k) & 0 \\ 0 & V_b(i') & 0 & V_b(j') & V_b(k') & V_b(l') & 0 & V_b(l') \end{bmatrix}$$

$$\begin{bmatrix} V_a(i) & 0 & 0 & V_a(j) & 0 & 0 & V_a(k) & 0 \\ 0 & V_b(i') & V_b(j') & 0 & V_b(k') & V_b(l') & 0 & V_b(m') \end{bmatrix}$$

-continued $$\begin{bmatrix} V_a(i) & 0 & 0 & 0 & 0 & 0 & V_a(j) & 0 \\ 0 & V_b(i') & V_b(j') & V_b(k') & V_b(l') & V_b(m') & 0 & V_b(n') \end{bmatrix}$$

$$\begin{bmatrix} 0 & V_a(i) & V_a(j) & V_a(k) & 0 & 0 & V_a(l) & 0 \\ V_b(i') & 0 & 0 & 0 & V_b(j') & V_b(k') & 0 & V_b(l') \end{bmatrix}$$

$$\begin{bmatrix} 0 & V_a(i) & V_a(j) & 0 & 0 & 0 & V_a(k) & 0 \\ V_b(i') & 0 & 0 & V_b(j') & V_b(k') & V_b(l') & 0 & V_b(m') \end{bmatrix}$$

$$\begin{bmatrix} 0 & V_a(i) & 0 & V_a(j) & 0 & 0 & V_a(k) & 0 \\ V_b(i') & 0 & V_b(j') & 0 & V_b(k') & V_b(l') & 0 & V_b(m') \end{bmatrix}$$

$$\begin{bmatrix} 0 & V_a(i) & 0 & 0 & 0 & 0 & V_a(j) & 0 \\ V_b(i') & 0 & V_b(j') & V_b(k') & V_b(l') & V_b(m') & 0 & V_b(n') \end{bmatrix}$$

$$\begin{bmatrix} 0 & 0 & V_a(i) & V_a(j) & 0 & 0 & V_a(k) & 0 \\ V_b(i') & V_b(j') & 0 & 0 & V_b(k') & V_b(l') & 0 & V_b(m') \end{bmatrix}$$

$$\begin{bmatrix} 0 & 0 & V_a(i) & 0 & 0 & 0 & V_a(j) & 0 \\ V_b(i') & V_b(j') & 0 & V_b(k') & V_b(l') & V_b(m') & 0 & V_b(n') \end{bmatrix}$$

$$\begin{bmatrix} 0 & 0 & 0 & V_a(i) & 0 & 0 & V_a(j) & 0 \\ V_b(i') & V_b(j') & V_b(k') & 0 & V_b(l') & V_b(m') & 0 & V_b(n') \end{bmatrix}$$

$$\begin{bmatrix} 0 & 0 & 0 & 0 & 0 & 0 & V_a(i) & 0 \\ V_b(i') & V_b(j') & V_b(k') & V_b(l') & V_b(m') & V_b(n') & 0 & V_b(p') \end{bmatrix}$$

$$\begin{bmatrix} V_a(i) & V_a(j) & V_a(k) & V_a(l) & V_a(m) & V_a(n) & 0 & V_a(p) \\ 0 & 0 & 0 & 0 & 0 & 0 & V_b(i') & 0 \end{bmatrix}$$

$$\begin{bmatrix} V_a(i) & V_a(j) & V_a(k) & 0 & V_a(l) & V_a(m) & 0 & V_a(n) \\ 0 & 0 & 0 & V_b(i') & 0 & 0 & V_b(j') & 0 \end{bmatrix}$$

$$\begin{bmatrix} V_a(i) & V_a(j) & 0 & V_a(k) & V_a(l) & V_a(m) & 0 & V_a(n) \\ 0 & 0 & V_b(i') & 0 & 0 & 0 & V_b(j') & 0 \end{bmatrix}$$

$$\begin{bmatrix} V_a(i) & V_a(j) & 0 & 0 & V_a(k) & V_a(l) & 0 & V_a(m) \\ 0 & 0 & V_b(i') & V_b(j') & 0 & 0 & V_b(k') & 0 \end{bmatrix}$$

$$\begin{bmatrix} V_a(i) & 0 & V_a(j) & V_a(k) & V_a(l) & V_a(m) & 0 & V_a(n) \\ 0 & V_b(i') & 0 & 0 & 0 & 0 & V_b(j') & 0 \end{bmatrix}$$

$$\begin{bmatrix} V_a(i) & 0 & V_a(j) & 0 & V_a(k) & V_a(l) & 0 & V_a(m) \\ 0 & V_b(i') & 0 & V_b(j') & 0 & 0 & V_b(k') & 0 \end{bmatrix}$$

$$\begin{bmatrix} V_a(i) & 0 & 0 & V_a(j) & V_a(k) & V_a(l) & 0 & V_a(m) \\ 0 & V_b(i') & V_b(j') & 0 & 0 & 0 & V_b(k') & 0 \end{bmatrix}$$

$$\begin{bmatrix} V_a(i) & 0 & 0 & 0 & V_a(j) & V_a(k) & 0 & V_a(l) \\ 0 & V_b(i') & V_b(j') & V_b(k') & 0 & 0 & V_b(l') & 0 \end{bmatrix}$$

$$\begin{bmatrix} 0 & V_a(i) & V_a(j) & V_a(k) & V_a(l) & V_a(m) & 0 & V_a(n) \\ V_b(i') & 0 & 0 & 0 & 0 & 0 & V_b(j') & 0 \end{bmatrix}$$

$$\begin{bmatrix} 0 & V_a(i) & V_a(j) & 0 & V_a(k) & V_a(l) & 0 & V_a(m) \\ V_b(i') & 0 & 0 & V_b(j') & 0 & 0 & V_b(k') & 0 \end{bmatrix}$$

$$\begin{bmatrix} 0 & V_a(i) & 0 & V_a(j) & V_a(k) & V_a(l) & 0 & V_a(m) \\ V_b(i') & 0 & V_b(j') & 0 & 0 & 0 & V_b(k') & 0 \end{bmatrix}$$

$$\begin{bmatrix} 0 & V_a(i) & 0 & 0 & V_a(j) & V_a(k) & 0 & V_a(l) \\ V_b(i') & 0 & V_b(j') & V_b(k') & 0 & 0 & V_b(l') & 0 \end{bmatrix}$$

$$\begin{bmatrix} 0 & 0 & V_a(i) & V_a(j) & V_a(k) & V_a(l) & 0 & V_a(m) \\ V_b(i') & V_b(j') & 0 & 0 & 0 & 0 & V_b(k') & 0 \end{bmatrix}$$

$$\begin{bmatrix} 0 & 0 & V_a(i) & 0 & V_a(j) & V_a(k) & 0 & V_a(l) \\ V_b(i') & V_b(j') & 0 & V_b(k') & 0 & 0 & V_b(l') & 0 \end{bmatrix}$$

$$\begin{bmatrix} 0 & 0 & 0 & V_a(i) & V_a(j) & V_a(k) & 0 & V_a(l) \\ V_b(i') & V_b(j') & V_b(k') & 0 & 0 & 0 & V_b(l') & 0 \end{bmatrix}$$

-continued $$\begin{bmatrix} 0 & 0 & 0 & V_a(i) & V_a(j) & V_a(k) & 0 & V_a(l) \\ V_b(i') & V_b(j') & V_b(k') & 0 & 0 & 0 & V_b(l') & 0 \end{bmatrix}$$

$$\begin{bmatrix} 0 & 0 & 0 & 0 & V_a(i) & V_a(j) & 0 & V_a(k) \\ V_b(i') & V_b(j') & V_b(k') & V_b(l') & 0 & 0 & V_b(m') & 0 \end{bmatrix}$$

$$\begin{bmatrix} V_a(i) & V_a(j) & V_a(k) & V_a(l) & 0 & V_a(m) & 0 & V_a(n) \\ 0 & 0 & 0 & 0 & V_b(i') & 0 & V_b(j') & 0 \end{bmatrix}$$

$$\begin{bmatrix} V_a(i) & V_a(j) & 0 & V_a(k) & V_a(l) & 0 & V_a(m) \\ 0 & 0 & V_b(i') & 0 & V_b(j') & 0 & V_b(k') & 0 \end{bmatrix}$$

$$\begin{bmatrix} V_a(i) & V_a(j) & 0 & V_a(k) & V_a(l) & 0 & V_a(m) \\ 0 & 0 & V_b(i') & 0 & V_b(j') & 0 & V_b(k') & 0 \end{bmatrix}$$

$$\begin{bmatrix} V_a(i) & 0 & V_a(j) & 0 & V_a(k) & 0 & V_a(l) \\ 0 & V_b(i') & 0 & V_b(j') & V_b(k') & 0 & V_b(l') & 0 \end{bmatrix}$$

$$\begin{bmatrix} V_a(i) & 0 & V_a(j) & V_a(k) & 0 & V_a(l) & 0 & V_a(m) \\ 0 & V_b(i') & 0 & 0 & V_b(j') & 0 & V_b(k') & 0 \end{bmatrix}$$

$$\begin{bmatrix} V_a(i) & 0 & 0 & V_a(j) & V_a(k) & 0 & V_a(l) \\ 0 & V_b(i') & V_b(j') & V_b(k') & 0 & 0 & V_b(l') & 0 \end{bmatrix}$$

$$\begin{bmatrix} V_a(i) & 0 & V_a(j) & 0 & V_a(k) & 0 & V_a(l) \\ 0 & V_b(i') & 0 & V_b(j') & V_b(k') & 0 & V_b(l') & 0 \end{bmatrix}$$

$$\begin{bmatrix} V_a(i) & 0 & 0 & V_a(j) & 0 & V_a(k) & 0 & V_a(l) \\ 0 & V_b(i') & V_b(j') & 0 & V_b(k') & 0 & V_b(l') & 0 \end{bmatrix}$$

$$\begin{bmatrix} V_a(i) & 0 & 0 & 0 & 0 & V_a(j) & 0 & V_a(k) \\ 0 & V_b(i') & V_b(j') & V_b(k') & V_b(l') & 0 & V_b(m') & 0 \end{bmatrix}$$

$$\begin{bmatrix} 0 & V_a(i) & V_a(j) & V_a(k) & 0 & V_a(l) & 0 & V_a(m) \\ V_b(i') & 0 & 0 & 0 & V_b(j') & 0 & V_b(k') & 0 \end{bmatrix}$$

$$\begin{bmatrix} 0 & V_a(i) & 0 & V_a(j) & 0 & V_a(k) & 0 & V_a(l) \\ V_b(i') & 0 & V_b(j') & 0 & V_b(k') & 0 & V_b(l') & 0 \end{bmatrix}$$

$$\begin{bmatrix} 0 & V_a(i) & 0 & 0 & V_a(j) & 0 & V_a(k) \\ V_b(i') & 0 & V_b(j') & V_b(k') & 0 & V_b(l') & V_b(m') & 0 \end{bmatrix}$$

$$\begin{bmatrix} 0 & 0 & V_a(i) & V_a(j) & 0 & V_a(k) & 0 & V_a(l) \\ V_b(i') & V_b(j') & 0 & 0 & V_b(k') & 0 & V_b(l') & 0 \end{bmatrix}$$

$$\begin{bmatrix} 0 & 0 & V_a(i) & 0 & V_a(j) & 0 & V_a(k) \\ V_b(i') & V_b(j') & 0 & V_b(k') & 0 & V_b(l') & V_b(m') & 0 \end{bmatrix}$$

$$\begin{bmatrix} 0 & 0 & 0 & V_a(i) & 0 & V_a(j) & 0 & V_a(k) \\ V_b(i') & V_b(j') & V_b(k') & 0 & V_b(l') & 0 & V_b(m') & 0 \end{bmatrix}$$

$$\begin{bmatrix} 0 & 0 & 0 & 0 & 0 & V_a(i) & 0 & V_a(j) \\ V_b(i') & V_b(j') & V_b(k') & V_b(l') & V_b(m') & 0 & V_b(n') & 0 \end{bmatrix}$$

$$\begin{bmatrix} V_a(i) & V_a(j) & V_a(k) & V_a(l) & V_a(m) & V_a(n) & 0 & 0 \\ 0 & 0 & 0 & 0 & 0 & 0 & V_b(i') & V_b(j') \end{bmatrix}$$

$$\begin{bmatrix} V_a(i) & V_a(j) & V_a(k) & 0 & V_a(l) & V_a(m) & 0 & 0 \\ 0 & 0 & 0 & V_b(i') & 0 & 0 & V_b(j') & V_b(k') \end{bmatrix}$$

$$\begin{bmatrix} V_a(i) & V_a(j) & 0 & V_a(k) & V_a(l) & V_a(m) & 0 & 0 \\ 0 & 0 & V_b(i') & 0 & 0 & 0 & V_b(j') & V_b(k') \end{bmatrix}$$

$$\begin{bmatrix} V_a(i) & V_a(j) & 0 & 0 & V_a(k) & V_a(l) & 0 & 0 \\ 0 & 0 & V_b(i') & V_b(j') & 0 & 0 & V_b(k') & V_b(l') \end{bmatrix}$$

$$\begin{bmatrix} V_a(i) & 0 & V_a(j) & V_a(k) & V_a(l) & V_a(m) & 0 & 0 \\ 0 & V_b(i') & 0 & 0 & 0 & 0 & V_b(j') & V_b(k') \end{bmatrix}$$

-continued $$\begin{bmatrix} V_a(i) & 0 & V_a(j) & 0 & V_a(k) & V_a(l) & 0 & 0 \\ 0 & V_b(i') & 0 & V_b(j') & 0 & 0 & V_b(k') & V_b(l') \end{bmatrix}$$

$$\begin{bmatrix} V_a(i) & 0 & 0 & V_a(j) & V_a(k) & V_a(l) & 0 & 0 \\ 0 & V_b(i') & V_b(j') & 0 & 0 & 0 & V_b(k') & V_b(l') \end{bmatrix}$$

$$\begin{bmatrix} V_a(i) & 0 & 0 & 0 & V_a(j) & V_a(k) & 0 & 0 \\ 0 & V_b(i') & V_b(j') & V_b(k') & 0 & 0 & V_b(l') & V_b(m') \end{bmatrix}$$

$$\begin{bmatrix} 0 & V_a(i) & V_a(j) & V_a(k) & V_a(l) & V_a(m) & 0 & 0 \\ V_b(i') & 0 & 0 & 0 & 0 & 0 & V_b(j') & V_b(k') \end{bmatrix}$$

$$\begin{bmatrix} 0 & V_a(i) & V_a(j) & 0 & V_a(k) & V_a(l) & 0 & 0 \\ V_b(i') & 0 & 0 & V_b(j') & 0 & 0 & V_b(k') & V_b(l') \end{bmatrix}$$

$$\begin{bmatrix} 0 & V_a(i) & 0 & V_a(j) & V_a(k) & V_a(l) & 0 & 0 \\ V_b(i') & 0 & V_b(j') & 0 & 0 & 0 & V_b(k') & V_b(l') \end{bmatrix}$$

$$\begin{bmatrix} 0 & V_a(i) & 0 & 0 & V_a(j) & V_a(k) & 0 & 0 \\ V_b(i') & 0 & V_b(j') & V_b(k') & 0 & 0 & V_b(l') & V_b(m') \end{bmatrix}$$

$$\begin{bmatrix} 0 & 0 & V_a(i) & V_a(j) & V_a(k) & V_a(l) & 0 & 0 \\ V_b(i') & V_b(j') & 0 & 0 & 0 & 0 & V_b(k') & V_b(l') \end{bmatrix}$$

$$\begin{bmatrix} 0 & 0 & V_a(i) & 0 & V_a(j) & V_a(k) & 0 & 0 \\ V_b(i') & V_b(j') & 0 & V_b(k') & 0 & 0 & V_b(l') & V_b(m') \end{bmatrix}$$

$$\begin{bmatrix} 0 & 0 & 0 & V_a(i) & V_a(j) & V_a(k) & 0 & 0 \\ V_b(i') & V_b(j') & V_b(k') & 0 & 0 & 0 & V_b(l') & V_b(m') \end{bmatrix}$$

$$\begin{bmatrix} 0 & 0 & 0 & 0 & V_a(i) & V_a(j) & 0 & 0 \\ V_b(i') & V_b(j') & V_b(k') & V_b(l') & 0 & 0 & V_b(m') & V_b(n') \end{bmatrix}$$

$$\begin{bmatrix} V_a(i) & V_a(j) & V_a(k) & V_a(l) & 0 & V_a(m) & 0 & 0 \\ 0 & 0 & 0 & 0 & V_b(i') & 0 & V_b(j') & V_b(k') \end{bmatrix}$$

$$\begin{bmatrix} V_a(i) & V_a(j) & V_a(k) & 0 & 0 & V_a(l) & 0 & 0 \\ 0 & 0 & 0 & V_b(i') & V_b(j') & 0 & V_b(k') & V_b(l') \end{bmatrix}$$

$$\begin{bmatrix} V_a(i) & V_a(j) & 0 & V_a(k) & 0 & V_a(l) & 0 & 0 \\ 0 & 0 & V_b(i') & 0 & V_b(j') & 0 & V_b(k') & V_b(l') \end{bmatrix}$$

$$\begin{bmatrix} V_a(i) & V_a(j) & 0 & 0 & 0 & V_a(k) & 0 & 0 \\ 0 & 0 & V_b(i') & V_b(j') & V_b(k') & 0 & V_b(l') & V_b(m') \end{bmatrix}$$

$$\begin{bmatrix} V_a(i) & 0 & V_a(j) & V_a(k) & 0 & V_a(l) & 0 & 0 \\ 0 & V_b(i') & 0 & 0 & V_b(j') & 0 & V_b(k') & V_b(l') \end{bmatrix}$$

$$\begin{bmatrix} V_a(i) & 0 & V_a(j) & 0 & 0 & V_a(k) & 0 & 0 \\ 0 & V_b(i') & 0 & V_b(j') & V_b(k') & 0 & V_b(l') & V_b(m') \end{bmatrix}$$

$$\begin{bmatrix} V_a(i) & 0 & 0 & V_a(j) & V_a(k) & 0 & 0 \\ 0 & V_b(i') & V_b(j') & 0 & V_b(k') & 0 & V_b(l') & V_b(m') \end{bmatrix}$$

$$\begin{bmatrix} V_a(i) & 0 & 0 & 0 & 0 & V_a(j) & 0 & 0 \\ 0 & V_b(i') & V_b(j') & V_b(k') & V_b(l') & 0 & V_b(m') & V_b(n') \end{bmatrix}$$

$$\begin{bmatrix} 0 & V_a(i) & V_a(j) & V_a(k) & 0 & V_a(l) & 0 & 0 \\ V_b(i') & 0 & 0 & 0 & V_b(j') & 0 & V_b(k') & V_b(l') \end{bmatrix}$$

$$\begin{bmatrix} 0 & V_a(i) & V_a(j) & 0 & 0 & V_a(k) & 0 & 0 \\ V_b(i') & 0 & 0 & V_b(j') & V_b(k') & 0 & V_b(l') & V_b(m') \end{bmatrix}$$

$$\begin{bmatrix} 0 & V_a(i) & 0 & V_a(j) & 0 & V_a(k) & 0 & 0 \\ V_b(i') & 0 & V_b(j') & 0 & V_b(k') & 0 & V_b(l') & V_b(m') \end{bmatrix}$$

$$\begin{bmatrix} 0 & V_a(i) & 0 & 0 & 0 & V_a(j) & 0 & 0 \\ V_b(i') & 0 & V_b(j') & V_b(k') & V_b(l') & 0 & V_b(m') & V_b(n') \end{bmatrix}$$

$$\begin{bmatrix} 0 & 0 & V_a(i) & V_a(j) & 0 & V_a(k) & 0 & 0 \\ V_b(i') & V_b(j') & 0 & 0 & V_b(l') & 0 & V_b(l') & V_b(m') \end{bmatrix}$$

$$\begin{bmatrix} 0 & 0 & V_a(i) & 0 & 0 & V_a(j) & 0 & 0 \\ V_b(i') & V_b(j') & 0 & V_b(k') & V_b(l') & 0 & V_b(m') & V_b(n') \end{bmatrix}$$

$$\begin{bmatrix} 0 & 0 & V_a(i) & 0 & 0 & V_a(j) & 0 & 0 \\ V_b(i') & V_b(j') & V_b(k') & 0 & V_b(l') & 0 & V_b(m') & V_b(n') \end{bmatrix}$$

$$\begin{bmatrix} 0 & 0 & 0 & 0 & 0 & V_a(i) & 0 & 0 \\ V_b(i') & V_b(j') & V_b(k') & V_b(l') & V_b(m') & 0 & V_b(n') & V_b(p') \end{bmatrix}$$

$$\begin{bmatrix} V_a(i) & V_a(j) & V_a(k) & V_a(l) & V_a(m) & 0 & 0 & V_a(n) \\ 0 & 0 & 0 & 0 & 0 & V_b(i') & V_b(j') & 0 \end{bmatrix}$$

$$\begin{bmatrix} V_a(i) & V_a(j) & V_a(k) & 0 & V_a(l) & 0 & 0 & V_a(m) \\ 0 & 0 & 0 & V_b(i') & 0 & V_b(j') & V_b(k') & 0 \end{bmatrix}$$

$$\begin{bmatrix} V_a(i) & V_a(j) & 0 & V_a(k) & V_a(l) & 0 & 0 & V_a(m) \\ 0 & 0 & V_b(i') & 0 & 0 & V_b(j') & V_b(k') & 0 \end{bmatrix}$$

$$\begin{bmatrix} V_a(i) & V_a(j) & 0 & 0 & V_a(k) & 0 & 0 & V_a(l) \\ 0 & 0 & V_b(i') & V_b(j') & 0 & V_b(k') & V_b(l') & 0 \end{bmatrix}$$

$$\begin{bmatrix} V_a(i) & V_a(j) & V_a(k) & V_a(l) & 0 & 0 & V_a(m) \\ 0 & V_b(i') & 0 & 0 & 0 & V_b(j') & V_b(k') & 0 \end{bmatrix}$$

$$\begin{bmatrix} V_a(i) & 0 & V_a(j) & V_a(k) & V_a(l) & 0 & 0 & V_a(m) \\ 0 & V_b(i') & 0 & V_b(j') & 0 & V_b(k') & V_b(l') & 0 \end{bmatrix}$$

$$\begin{bmatrix} V_a(i) & 0 & V_a(j) & 0 & V_a(k) & 0 & 0 & V_a(l) \\ 0 & V_b(i') & 0 & V_b(j') & 0 & V_b(k') & V_b(l') & 0 \end{bmatrix}$$

$$\begin{bmatrix} V_a(i) & 0 & 0 & V_a(j) & 0 & 0 & V_a(k) \\ 0 & V_b(i') & V_b(j') & V_b(k') & 0 & V_b(l') & V_b(m') & 0 \end{bmatrix}$$

$$\begin{bmatrix} 0 & V_a(i) & V_a(j) & V_a(k) & V_a(l) & 0 & 0 & V_a(m) \\ V_b(i') & 0 & 0 & 0 & 0 & V_b(j') & V_b(k') & 0 \end{bmatrix}$$

$$\begin{bmatrix} 0 & V_a(i) & V_a(j) & V_a(k) & 0 & 0 & V_a(l) \\ V_b(i') & 0 & 0 & V_b(j') & 0 & V_b(k') & V_b(l') & 0 \end{bmatrix}$$

$$\begin{bmatrix} 0 & V_a(i) & 0 & V_a(j) & V_a(k) & 0 & 0 & V_a(l) \\ V_b(i') & 0 & V_b(j') & 0 & 0 & V_b(k') & V_b(l') & 0 \end{bmatrix}$$

$$\begin{bmatrix} 0 & V_a(i) & 0 & 0 & V_a(j) & 0 & 0 & V_a(k) \\ V_b(i') & 0 & V_b(j') & V_b(k') & 0 & V_b(l') & V_b(m') & 0 \end{bmatrix}$$

$$\begin{bmatrix} 0 & 0 & V_a(i) & V_a(j) & V_a(k) & 0 & 0 & V_a(l) \\ V_b(i') & V_b(j') & 0 & 0 & 0 & V_b(k') & V_b(l') & 0 \end{bmatrix}$$

$$\begin{bmatrix} 0 & 0 & V_a(i) & V_a(j) & 0 & 0 & V_a(k) \\ V_b(i') & V_b(j') & 0 & V_b(k') & 0 & V_b(l') & V_b(m') & 0 \end{bmatrix}$$

$$\begin{bmatrix} 0 & 0 & V_a(i) & 0 & V_a(j) & 0 & 0 & V_a(k) \\ V_b(i') & V_b(j') & V_b(k') & 0 & 0 & V_b(l') & V_b(m') & 0 \end{bmatrix}$$

$$\begin{bmatrix} 0 & 0 & 0 & V_a(i) & V_a(j) & 0 & 0 & V_a(k) \\ V_b(i') & V_b(j') & V_b(k') & 0 & 0 & V_b(l') & V_b(m') & 0 \end{bmatrix}$$

$$\begin{bmatrix} 0 & 0 & 0 & 0 & V_a(i) & 0 & 0 & V_a(j) \\ V_b(i') & V_b(j') & V_b(k') & V_b(l') & 0 & V_b(m') & V_b(n') & 0 \end{bmatrix}$$

$$\begin{bmatrix} V_a(i) & V_a(j) & V_a(k) & V_a(l) & 0 & 0 & 0 & V_a(m) \\ 0 & 0 & 0 & 0 & V_b(i') & V_b(j') & V_b(k') & 0 \end{bmatrix}$$

$$\begin{bmatrix} V_a(i) & V_a(j) & V_a(k) & 0 & 0 & 0 & V_a(l) \\ 0 & 0 & 0 & V_b(i') & V_b(j') & V_b(k') & V_b(l') & 0 \end{bmatrix}$$

$$\begin{bmatrix} V_a(i) & V_a(j) & 0 & V_a(k) & 0 & 0 & 0 & V_a(l) \\ 0 & 0 & V_b(i') & 0 & V_b(j') & V_b(k') & V_b(l') & 0 \end{bmatrix}$$

$$\begin{bmatrix} V_a(i) & V_a(j) & 0 & 0 & 0 & 0 & V_a(k) \\ 0 & 0 & V_b(i') & V_b(j') & V_b(k') & V_b(l') & V_b(m') & 0 \end{bmatrix}$$

-continued $$\begin{bmatrix} V_a(i) & 0 & V_a(j) & V_a(k) & 0 & 0 & 0 & V_a(l) \\ 0 & V_b(i') & 0 & 0 & V_b(j') & V_b(k') & V_b(l') & 0 \end{bmatrix}$$

$$\begin{bmatrix} V_a(i) & 0 & V_a(j) & 0 & 0 & 0 & 0 & V_a(k) \\ 0 & V_b(i') & 0 & V_b(j') & V_b(k') & V_b(l') & V_b(m') & 0 \end{bmatrix}$$

$$\begin{bmatrix} V_a(i) & 0 & 0 & V_a(j) & 0 & 0 & 0 & V_a(k) \\ 0 & V_b(i') & V_b(j') & 0 & V_b(k') & V_b(l') & V_b(m') & 0 \end{bmatrix}$$

$$\begin{bmatrix} V_a(i) & 0 & 0 & 0 & 0 & 0 & 0 & V_a(j) \\ 0 & V_b(i') & V_b(j') & V_b(k') & V_b(l') & V_b(m') & V_b(n') & 0 \end{bmatrix}$$

$$\begin{bmatrix} 0 & V_a(i) & V_a(j) & V_a(k) & 0 & 0 & 0 & V_a(l) \\ V_b(i') & 0 & 0 & 0 & V_b(j') & V_b(k') & V_b(l') & 0 \end{bmatrix}$$

$$\begin{bmatrix} 0 & V_a(i) & V_a(j) & 0 & 0 & 0 & 0 & V_a(k) \\ V_b(i') & 0 & 0 & V_b(j') & V_b(k') & V_b(l') & V_b(m') & 0 \end{bmatrix}$$

$$\begin{bmatrix} 0 & V_a(i) & 0 & V_a(j) & 0 & 0 & 0 & V_a(k) \\ V_b(i') & 0 & V_b(j') & 0 & V_b(k') & V_b(l') & V_b(m') & 0 \end{bmatrix}$$

$$\begin{bmatrix} 0 & V_a(i) & 0 & 0 & 0 & 0 & 0 & V_a(j) \\ V_b(i') & 0 & V_b(j') & V_b(k') & V_b(l') & V_b(m') & V_b(n') & 0 \end{bmatrix}$$

$$\begin{bmatrix} 0 & 0 & V_a(i) & V_a(j) & 0 & 0 & 0 & V_a(k) \\ V_b(i') & V_b(j') & 0 & 0 & V_b(k') & V_b(l') & V_b(m') & 0 \end{bmatrix}$$

$$\begin{bmatrix} 0 & 0 & V_a(i) & 0 & 0 & 0 & 0 & V_a(j) \\ V_b(i') & V_b(j') & 0 & V_b(k') & V_b(l') & V_b(m') & V_b(n') & 0 \end{bmatrix}$$

$$\begin{bmatrix} 0 & 0 & 0 & V_a(i) & 0 & 0 & 0 & V_a(j) \\ V_b(i') & V_b(j') & V_b(k') & 0 & V_b(l') & V_b(m') & V_b(n') & 0 \end{bmatrix}$$

$$\begin{bmatrix} 0 & 0 & 0 & 0 & 0 & 0 & 0 & V_a(i) \\ V_b(i') & V_b(j') & V_b(k') & V_b(l') & V_b(m') & V_b(n') & V_b(p') & 0 \end{bmatrix}$$

$$\begin{bmatrix} V_a(i) & V_a(j) & V_a(k) & V_a(l) & V_a(m) & 0 & 0 & 0 \\ 0 & 0 & 0 & 0 & 0 & V_b(i') & V_b(j') & V_b(k') \end{bmatrix}$$

$$\begin{bmatrix} V_a(i) & V_a(j) & V_a(k) & 0 & V_a(l) & 0 & 0 & 0 \\ 0 & 0 & 0 & V_b(i') & 0 & V_b(j') & V_b(k') & V_b(l') \end{bmatrix}$$

$$\begin{bmatrix} V_a(i) & V_a(j) & 0 & V_a(k) & V_a(l) & 0 & 0 & 0 \\ 0 & 0 & V_b(i') & 0 & 0 & V_b(j') & V_b(k') & V_b(l') \end{bmatrix}$$

$$\begin{bmatrix} V_a(i) & V_a(j) & 0 & 0 & V_a(k) & 0 & 0 & 0 \\ 0 & 0 & V_b(i') & V_b(j') & 0 & V_b(k') & V_b(l') & V_b(m') \end{bmatrix}$$

$$\begin{bmatrix} V_a(i) & 0 & V_a(j) & V_a(k) & V_a(l) & 0 & 0 & 0 \\ 0 & V_b(i') & 0 & 0 & 0 & V_b(j') & V_b(k') & V_b(l') \end{bmatrix}$$

$$\begin{bmatrix} V_a(i) & 0 & V_a(j) & 0 & V_a(k) & 0 & 0 & 0 \\ 0 & V_b(i') & 0 & V_b(j') & 0 & V_b(k') & V_b(l') & V_b(m') \end{bmatrix}$$

$$\begin{bmatrix} V_a(i) & 0 & 0 & V_a(j) & V_a(k) & 0 & 0 & 0 \\ 0 & V_b(i') & V_b(j') & 0 & 0 & V_b(k') & V_b(l') & V_b(m') \end{bmatrix}$$

$$\begin{bmatrix} V_a(i) & 0 & 0 & 0 & V_a(j) & 0 & 0 & 0 \\ 0 & V_b(i') & V_b(j') & V_b(k') & 0 & V_b(l') & V_b(m') & V_b(n') \end{bmatrix}$$

$$\begin{bmatrix} 0 & V_a(i) & V_a(j) & V_a(k) & V_a(l) & 0 & 0 & 0 \\ V_b(i') & 0 & 0 & 0 & 0 & V_b(j') & V_b(k') & V_b(l') \end{bmatrix}$$

$$\begin{bmatrix} 0 & V_a(i) & 0 & V_a(j) & V_a(k) & 0 & 0 & 0 \\ V_b(i') & 0 & V_b(j') & 0 & 0 & V_b(k') & V_b(l') & V_b(m') \end{bmatrix}$$

$$\begin{bmatrix} 0 & V_a(i) & V_a(j) & 0 & 0 & 0 & 0 & 0 \\ V_b(i') & 0 & 0 & V_b(j') & V_b(k') & V_b(l') & V_b(m') & V_b(n') \end{bmatrix}$$

$$\begin{bmatrix} 0 & 0 & V_a(i) & 0 & V_a(j) & 0 & 0 & 0 \\ V_b(i') & V_b(j') & 0 & V_b(k') & 0 & V_b(l') & V_b(m') & V_b(n') \end{bmatrix}$$

$$\begin{bmatrix} 0 & V_a(i) & 0 & V_a(j) & V_a(k) & 0 & 0 & 0 \\ V_b(i') & 0 & V_b(j') & 0 & 0 & V_b(k') & V_b(l') & V_b(m') \end{bmatrix}$$

$$\begin{bmatrix} 0 & 0 & V_a(i) & V_a(j) & V_a(k) & 0 & 0 & 0 \\ V_b(i') & V_b(j') & 0 & 0 & 0 & V_b(l') & V_b(m') & V_b(n') \end{bmatrix}$$

$$\begin{bmatrix} 0 & V_a(i) & 0 & 0 & V_a(j) & 0 & 0 & 0 \\ V_b(i') & V_b(j') & V_b(k') & V_b(l') & 0 & V_b(m') & V_b(n') & V_b(p') \end{bmatrix}$$

$$\begin{bmatrix} V_a(i) & V_a(j) & V_a(k) & V_a(l) & 0 & 0 & 0 & 0 \\ 0 & 0 & 0 & 0 & V_b(i') & V_b(j') & V_b(k') & V_b(l') \end{bmatrix}$$

$$\begin{bmatrix} V_a(i) & V_a(j) & V_a(k) & 0 & 0 & 0 & 0 & 0 \\ 0 & 0 & 0 & V_b(i') & V_b(j') & V_b(k') & V_b(l') & V_b(m') \end{bmatrix}$$

$$\begin{bmatrix} V_a(i) & V_a(j) & 0 & V_a(k) & 0 & 0 & 0 & 0 \\ 0 & 0 & V_b(i') & 0 & V_b(j') & V_b(k') & V_b(l') & V_b(m') \end{bmatrix}$$

$$\begin{bmatrix} V_a(i) & V_a(j) & 0 & 0 & 0 & 0 & 0 & 0 \\ 0 & 0 & V_b(i') & V_b(j') & V_b(k') & V_b(l') & V_b(m') & V_b(n') \end{bmatrix}$$

$$\begin{bmatrix} V_a(i) & 0 & V_a(j) & V_a(k) & 0 & 0 & 0 & 0 \\ 0 & V_b(i') & 0 & 0 & V_b(j') & V_b(k') & V_b(l') & V_b(m') \end{bmatrix}$$

$$\begin{bmatrix} V_a(i) & 0 & V_a(j) & 0 & 0 & 0 & 0 & 0 \\ 0 & V_b(i') & 0 & V_b(j') & V_b(k') & V_b(l') & V_b(m') & V_b(n') \end{bmatrix}$$

$$\begin{bmatrix} V_a(i) & 0 & 0 & V_a(j) & 0 & 0 & 0 & 0 \\ 0 & V_b(i') & V_b(j') & 0 & V_b(k') & V_b(l') & V_b(m') & V_b(n') \end{bmatrix}$$

$$\begin{bmatrix} V_a(i) & 0 & 0 & 0 & 0 & 0 & 0 & 0 \\ 0 & V_b(i') & V_b(j') & V_b(k') & V_b(l') & V_b(m') & V_b(n') & V_b(p') \end{bmatrix}$$

$$\begin{bmatrix} 0 & V_a(i) & V_a(j) & V_a(k) & 0 & 0 & 0 & 0 \\ V_b(i') & 0 & 0 & 0 & V_b(j') & V_b(k') & V_b(l') & V_b(m') \end{bmatrix}$$

$$\begin{bmatrix} 0 & V_a(i) & V_a(j) & 0 & 0 & 0 & 0 & 0 \\ V_b(i') & 0 & 0 & V_b(j') & V_b(k') & V_b(l') & V_b(m') & V_b(n') \end{bmatrix}$$

$$\begin{bmatrix} 0 & V_a(i) & 0 & V_a(j) & 0 & 0 & 0 & 0 \\ V_b(i') & 0 & V_b(j') & 0 & V_b(k') & V_b(l') & V_b(m') & V_b(n') \end{bmatrix}$$

$$\begin{bmatrix} 0 & V_a(i) & 0 & 0 & 0 & 0 & 0 & 0 \\ V_b(i') & 0 & V_b(j') & V_b(k') & V_b(l') & V_b(m') & V_b(n') & V_b(p') \end{bmatrix}$$

$$\begin{bmatrix} 0 & 0 & V_a(i) & V_a(j) & 0 & 0 & 0 & 0 \\ V_b(i') & V_b(j') & 0 & 0 & V_b(k') & V_b(l') & V_b(m') & V_b(n') \end{bmatrix}$$

$$\begin{bmatrix} 0 & 0 & V_a(i) & 0 & 0 & 0 & 0 & 0 \\ V_b(i') & V_b(j') & 0 & V_b(k') & V_b(l') & V_b(m') & V_b(n') & V_b(p') \end{bmatrix}$$

$$\begin{bmatrix} 0 & 0 & 0 & V_a(i) & 0 & 0 & 0 & 0 \\ V_b(i') & V_b(j') & V_b(k') & 0 & V_b(l') & V_b(m') & V_b(n') & V_b(p') \end{bmatrix}$$

$$\begin{bmatrix} 0 & 0 & 0 & 0 & 0 & 0 & 0 & 0 \\ V_b(i') & V_b(j') & V_b(k') & V_b(l') & V_b(m') & V_b(n') & V_b(p') & V_b(q') \end{bmatrix},$$

where a value of a rank indicator is 8, $0 < i \leq N_1$, $0 < i' \leq N_1$, $0 < j \leq N_1$, $0 < j' \leq N_1$, $0 < k \leq N_1$, $0 < k' \leq N_1$, $0 < l \leq N_1$, $0 < l' \leq N_1$, $0 < m \leq N_1$, $0 < m' \leq N_1$, $0 < n \leq N_1$, $0 < n' \leq N_1$, $0 < p \leq N_1$, $0 < p' \leq N_1$, $0 < q \leq N_1$, and $0 < q' \leq N_1$, where: for parameters of i, j, k, l, m, n, p, q, and the like, every two of the sub-vectors corresponding to the $V_a$ parts are unequal, and for parameters of i', j', k', l', m', n', p', q', and the like, every two of the sub-vectors corresponding to the $V_b$ parts are unequal.

It should be understood that, in the illustrated possible forms of the first codebook included in the first codebook set, i, j, k, l, m, n, p, and q are only for distinguishing locations of different codebook vectors.

Further, in an embodiment of the present invention, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vectors $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_k\}$ form a vector $V_k'$, vectors $V_k'$ corresponding to all sub-vectors $V_k$ in the $\{V_k\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\}\neq\{V_L'\}$ holds true. According to concepts of sets, when a quantity of dimensions of the $\{V_k'\}$ and a quantity of dimensions of the $\{V_L'\}$ are unequal, $\{V_k'\}\neq\{V_L'\}$ holds true; when a quantity of dimensions of the $\{V_k'\}$ and a quantity of dimensions of the $\{V_L'\}$ are equal, but a quantity of sub-vectors included in the $\{V_k'\}$ and a quantity of sub-vectors included in the $\{V_L'\}$ are unequal, $\{V_k'\}\neq\{V_L'\}$ holds true; or when a quantity of dimensions of the $\{V_k'\}$ and a quantity of dimensions of the $\{V_L'\}$ are equal, and a quantity of sub-vectors included in the $\{V_k'\}$ and a quantity of sub-vectors included in the $\{V_L'\}$ are equal, but the sub-vectors included in the $\{V_k'\}$ are different from the sub-vectors included in the $\{V_L'\}$, $\{V_k'\}\{V_L'\}$ also holds true.

In another embodiment of the present invention, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\}\neq\{V_N'\}$ holds true. According to concepts of sets, when a quantity of dimensions of the $\{V_M'\}$ and a quantity of dimensions of the $\{V_N'\}$ are unequal, $\{V_M'\}\neq\{V_N'\}$ holds true; when a quantity of dimensions of the $\{V_M'\}$ and a quantity of dimensions of the $\{V_N'\}$ are equal, but a quantity of sub-vectors included in the $\{V_M'\}$ and a quantity of sub-vectors included in the $\{V_N'\}$ are unequal, $\{V_M'\}\neq\{V_N'\}$ holds true; or when a quantity of dimensions of the $\{V_M'\}$ and a quantity of dimensions of the $\{V_N'\}$ are equal, and a quantity of sub-vectors included in the $\{V_M'\}$ and a quantity of sub-vectors included in the $\{V_N'\}$ are equal, but the sub-vectors included in the $\{V_M'\}$ are different from the sub-vectors included in the $\{V_N'\}$, $\{V_M'\}\neq\{V_N'\}$ also holds true.

In the foregoing embodiment, with the first codebook that makes the $\{V_k'\}\neq\{V_L'\}$ and/or $\{V_M'\}\neq\{V_N'\}$ relation hold true, flexible configurations of the first structure and the second structure are implemented, and a codebook is better matched with a channel.

The following provides relationships of amplitude vectors respectively corresponding to $$\begin{bmatrix} V_a \\ 0 \end{bmatrix} \text{ and } \begin{bmatrix} 0 \\ V_b \end{bmatrix}.$$

A first relationship of amplitude vectors, a second relationship of amplitude vectors, and a third relationship of amplitude vectors each provide a configuration mode of a relationship between elements included in each sub-vector. The third relationship of amplitude vectors and a fourth relationship of amplitude vectors provide relationships between different codebook vectors in a codebook. The second network device may configure different amplitude vectors according to channel conditions, so that transmission efficiency is higher. The definitions of amplitude vectors are already described, and are not further described herein.

For example, a codebook $M_2$ in a codebook set is:

$$\begin{bmatrix} a_1 e^{jw_1} & 0 & b_1 e^{j\beta_1} & c_1 e^{j\gamma_1} & 0 \\ a_2 e^{jw_2} & 0 & b_2 e^{j\beta_2} & c_2 e^{j\gamma_2} & 0 \\ a_3 e^{jw_3} & 0 & b_3 e^{j\beta_3} & c_3 e^{j\gamma_3} & 0 \\ a_4 e^{jw_4} & 0 & b_4 e^{j\beta_4} & c_4 e^{j\gamma_4} & 0 \\ 0 & d_1 e^{j\alpha_1} & 0 & 0 & g_1 e^{j\beta_1} \\ 0 & d_2 e^{j\alpha_2} & 0 & 0 & g_2 e^{j\beta_2} \end{bmatrix}.$$

If $M_2$ meets the first relationship of amplitude vectors: at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_b$ of each second sub-vector $$\begin{bmatrix} 0 \\ V_b \end{bmatrix}$$

in the first codebook are unequal; at least two values in $a_1$, $a_2$, $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_2$.

If $M_2$ meets the second relationship of amplitude vectors: at least two elements in an amplitude vector in $V_a$ of each first sub-vector $$\begin{bmatrix} V_a \\ 0 \end{bmatrix}$$

in the first codebook are unequal, and all elements in an amplitude vector in $V_b$ of each second sub-vector $$\begin{bmatrix} 0 \\ V_b \end{bmatrix}$$

in the first codebook are equal, at least two values in $a_1$, $a_2$, $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_4$.

If $M_2$ meets the third relationship of amplitude vectors: all elements in an amplitude vector in $V_a$ of each first sub-vector $$\begin{bmatrix} V_a \\ 0 \end{bmatrix}$$

in the first codebook are equal, and at least two elements in an amplitude vector in $V_b$ of each second sub-vector $$\begin{bmatrix} 0 \\ V_b \end{bmatrix}$$

in the first codebook are unequal, $a_1=a_2=a_3=a_4$; $b_1=b_2=b_3=b_4$; $c_1=c_2=c_3=c_4$; $d_1 \neq d_2$; and $g_1 \neq g_2$.

If $M_2$ meets the fourth relationship of amplitude vectors: at least two amplitude vectors in a vector set formed by amplitude vectors in $V_a$ of all first sub-vectors $$\begin{bmatrix} V_a \\ 0 \end{bmatrix}$$

in the first codebook are different, amplitude vectors in $V_a$ of all corresponding first sub-vectors $$\begin{bmatrix} V_a \\ 0 \end{bmatrix}$$

in $M_2$ area $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{ and } \begin{bmatrix} c_1 \\ c_2 \\ c_3 \\ c_4 \end{bmatrix},$$

where at least two vectors of $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{ and } \begin{bmatrix} c_1 \\ c_2 \\ c_3 \\ c_4 \end{bmatrix}$$

are different.

A fifth relationship of amplitude vectors is: at least two amplitude vectors in a vector set formed by amplitude vectors in $V_b$ of all second sub-vectors $$\begin{bmatrix} 0 \\ V_b \end{bmatrix}$$

in the first codebook are different.

In this case, amplitude vectors in $V_b$ of all corresponding second sub-vectors $$\begin{bmatrix} 0 \\ V_b \end{bmatrix}$$

in $M_2$ are $$\begin{bmatrix} d_1 \\ d_2 \end{bmatrix} \text{ and } \begin{bmatrix} g_1 \\ g_2 \end{bmatrix},$$

where $$\begin{bmatrix} d_1 \\ d_2 \end{bmatrix} \text{ and } \begin{bmatrix} g_1 \\ g_2 \end{bmatrix}$$

are unequal.

Figure 12:
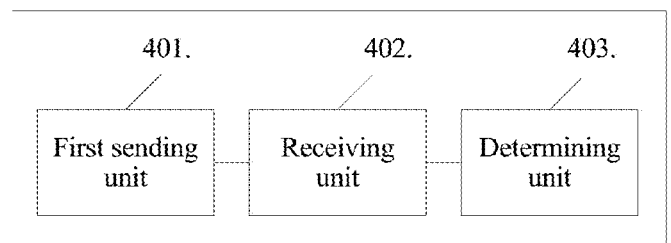
FIG. 12 is a fifth schematic structural diagram of a network device for implementing a method for measuring and feeding back channel information according to the present invention.

FIG. 12 shows an embodiment of a second network-side device according to the present invention, where the second network-side device includes: a first sending unit 401, configured to send a reference signal to a first network device, where the reference signal is used to notify the first network device to perform a measurement to obtain a measurement result; a receiving unit 402, configured to receive a codebook index sent by the first network device, where the codebook index corresponds to a first codebook determined in the first codebook set by the first network device, and the codebook index is determined by the first network device according to the measurement result; and a determining unit 403, configured to determine, according to the codebook index, the first codebook in the first codebook set; where the first codebook set includes at least two first codebooks, a sub-vector $W_x$ of each first codebook is formed by a zero vector and a non-zero vector, and the vectors forming the $W_x$ correspond to different groups of antenna ports; in each first codebook, different sub-vectors $W_x$ are formed according to a same structure or different structures; formation according to the same structure is: for different sub-vectors $W_x(1)$ and $W_x(2)$, a location of a non-zero vector in the $W_x(1)$ is the same as a location of a non-zero vector in the $W_x(2)$; and formation according to different structures is: for different sub-vectors $W_x(1)$ and $W_x(2)$, a location of a non-zero vector in the $W_x(1)$ is different from a location of a non-zero vector in the $W_x(2)$.

It should be understood that, in the present invention, a zero vector may be a zero element with a length of 1, and a non-zero vector may be a non-zero element with a length of 1. Generally, for a passive antenna, a downtilt in a vertical direction is fixed. Therefore, for multiple spatially multiplexed data streams, adjustments can be made to multiple horizontal beams only in a plane with a fixed downtilt in the vertical direction, and the multiple data streams cannot be multiplexed more freely in planes with multiple downtilts. In addition, if antenna ports are grouped according to different downtilts, a codebook structure provided by the present invention may be configured independently according to transmit power of different groups of antenna ports, so that flexibility and MIMO performance are improved.

In an embodiment of the present invention, when antenna ports are grouped according to tilts in the vertical direction, parameters of codebook vectors in a codebook may be configured independently according to different tilts, so that an objective of flexibly adapting to data transmission efficiency is achieved. In this embodiment, two tilts in the vertical direction are used as an example (this method is also applicable to more than two tilts). In each column in the first codebook, one group of antenna ports corresponds to a non-zero vector, and another group of antenna ports corresponds to a zero vector; or one group of antenna ports corresponds to a zero vector, and another group of antenna ports corresponds to a non-zero vector, where the non-zero vector refers to a vector in which at least one element is a non-zero element, and the zero vector refers to a vector in which all elements are zero elements. In the present invention, when first n1 elements in a vector included in a codebook correspond to one group of antenna ports, and last n2 elements correspond to another group of antenna ports, a structure of this vector is $$\begin{bmatrix} V_1 \\ V_2 \end{bmatrix},$$

here $V_1$ is n1-dimensional, and $V_2$ is n2-dimensional. In this case, each first codebook includes at least one first sub-vector $$\begin{bmatrix} V_a \\ 0 \end{bmatrix}$$

having a first structure and/or at least one second sub-vector $$\begin{bmatrix} 0 \\ V_b \end{bmatrix}$$

having a second structure; where $V_a$ in $$\begin{bmatrix} V_a \\ 0 \end{bmatrix}$$

is an n1-dimensional non-zero vector and corresponds to a first group of antenna ports; 0 in $$\begin{bmatrix} V_a \\ 0 \end{bmatrix}$$

represents an n2-dimensional zero vector and corresponds to a second group of antenna ports; $V_b$ in $$\begin{bmatrix} 0 \\ V_b \end{bmatrix}$$

is an n2-dimensional non-zero vector and corresponds to the second group of antenna ports; and 0 in $$\begin{bmatrix} 0 \\ V_b \end{bmatrix}$$

represents an n1-dimensional zero vector and corresponds to the first group of antenna ports. It should be understood that, the present invention is not limited to the case of grouping into only two groups. In an actual application, antenna ports are grouped into more groups according to other factors such as different downtilts or signal quality or the like. In a specific measurement process, codebooks in the first codebook set are traversed, so that a first codebook that best matches a transmission characteristic is determined and used for channel transmission.

It should be understood that, the structure of the sub-vector in the first codebook may be but is not limited to the foregoing first structure or the second structure. Optionally, locations of sub-vectors of the zero vector and the non-zero vector in the first codebook may be different. In an embodiment of the present invention, in a case of four antenna ports, elements in vectors in the first sub-vector $$\begin{bmatrix} V_a \\ 0 \end{bmatrix}$$

having the first structure are represented as $$\begin{bmatrix} V_a^0 \\ V_a^1 \\ 0 \\ 0 \end{bmatrix},$$

and elements in vectors in the second sub-vector $$\begin{bmatrix} 0 \\ V_b \end{bmatrix}$$

having the second structure are represented as $$\begin{bmatrix} 0 \\ 0 \\ V_b^0 \\ V_b^1 \end{bmatrix},$$

where $V_a^0$ and $V_a^1$ are elements in the vector $V_a$, and $V_b^0$ and $V_b^1$ are elements in the vector $V^b$. In another embodiment of the present invention, when the antenna ports are grouped into two groups, the first structure may be $$\begin{bmatrix} V_a^0 \\ 0 \\ V_a^1 \\ 0 \end{bmatrix},$$

and the second structure may be $$\begin{bmatrix} 0 \\ V_b^0 \\ 0 \\ V_b^1 \end{bmatrix}.$$

Likewise, when the antenna groups are grouped into two groups, in another embodiment of the present invention, the first structure may be $$\begin{bmatrix} V_a^0 \\ 0 \\ 0 \\ V_a^1 \end{bmatrix},$$

and the second structure may be $$\begin{bmatrix} 0 \\ V_b^0 \\ V_b^1 \\ 0 \end{bmatrix}.$$

Alternatively, the first codebook set includes at least one of the following four structures: a first structure $$\begin{bmatrix} V_a^0 \\ 0 \\ V_a^1 \\ 0 \end{bmatrix},$$

a second structure $$\begin{bmatrix} 0 \\ V_b^0 \\ 0 \\ V_b^1 \end{bmatrix},$$

a third structure $$\begin{bmatrix} V_a^0 \\ 0 \\ 0 \\ V_a^1 \end{bmatrix},$$

or a fourth structure $$\begin{bmatrix} 0 \\ V_b^0 \\ V_b^1 \\ 0 \end{bmatrix}.$$

$V_a^0$ and $V_a^1$ are elements in the vector $V_a$ and Va corresponds to one group of antenna ports. A correspondence is as follows: In the first structure, $V_a^0$ corresponds to a first antenna port, and $V_a^1$ corresponds to a third antenna port; in the second structure, $V_b^0$ corresponds to a second antenna port, and $V_b^1$ corresponds to a fourth antenna port; in the third structure, $V_a^0$ corresponds to the first antenna port, and $V_a^1$ corresponds to the fourth antenna port; in the fourth structure, $V_b^0$ corresponds to the second antenna port, and $V_b^1$ corresponds to the third antenna port, where $V_a^0$ and $V_a^1$ are elements in the vector $V^a$, and $V_b^0$ and $V_b^1$ are elements in the vector $V_b$.

When the antenna ports are grouped into three groups, the first codebook set includes at least one of a first structure $$\begin{bmatrix} V_a \\ 0 \\ 0 \end{bmatrix},$$

a second structure $$\begin{bmatrix} 0 \\ V_b \\ 0 \end{bmatrix},$$

a third structure $$\begin{bmatrix} 0 \\ 0 \\ V_c \end{bmatrix},$$

a fourth structure $$\begin{bmatrix} V_a \\ 0 \\ V_c \end{bmatrix},$$

a fifth structure $$\begin{bmatrix} V_a \\ V_b \\ 0 \end{bmatrix},$$

or a sixth structure $$\begin{bmatrix} 0 \\ V_b \\ V_c \end{bmatrix}.$$

Vectors $V_a$, $V_b$, and $V_c$ each correspond to one group of antenna ports.

In an embodiment of the present invention, the present invention provides a combination of the first structure and the second structure corresponding to a value of the rank indicator.

Generally, an element in a non-zero vector included in the first codebook is in a form of a complex number. For a complex number $\alpha \cdot e^\beta$, $\alpha$ is referred to as an amplitude part, and is a real number, and $e^\beta$ is referred to as a phase part. In still another embodiment of the present invention, at least one first codebook meets a first condition. The present invention provides several definitions of the first condition that can be implemented. In the present invention, unless otherwise limited, P, Q, and K are any positive integers.

First definition of the first condition:

A vector set formed by all first phase vectors and a discrete Fourier transform matrix DFT matrix meet a first correspondence that the vector set formed by the first phase vectors is a subset of a set of corresponding column vectors in a phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the first phase vector, and a phase part of a $K^{th}$ element in each sub-vector of the $\{V_m\}$ is a $K^{th}$ element of each corresponding first phase vector, where P, Q, and K are any positive integers.

A general expression of the discrete Fourier transform matrix DFT matrix is:

$$M_{dft} = \frac{1}{\sqrt{N}} \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & \vdots & \vdots \\ 1 & \omega^{N-1} & \omega^{2(N-1)} & \omega^{3(N-1)} & \ldots & \omega^{(N-1)(N-1)} \end{bmatrix}.$$

The phase matrix of the DFT matrix is:

$$M_{dft\_phase} = \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{2(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix}.$$

A value of N is an order in a case in which the DFT matrix is a square matrix. For example, in $$\begin{bmatrix} V_a \\ 0 \end{bmatrix},$$

if $V_a$ is four-dimensional, the order of the phase matrix of the DFT matrix is 4. In an embodiment, a value of $\omega$ may be $$\omega = e^{j\frac{2\pi}{N}}:$$

$$M_{dft\_phase\_4} = \begin{bmatrix} 1 & 1 & 1 & 1 \\ 1 & \omega & \omega^2 & \omega^3 \\ 1 & \omega^2 & \omega^4 & \omega^6 \\ 1 & \omega^3 & \omega^6 & \omega^9 \end{bmatrix}.$$

For example, when the value of $\omega$ is $$e^{j\frac{2\pi}{32}},$$

a form of a fourth-order DFT matrix $$M_{dft\_phase\_4\_e^{j\frac{2\pi}{32}}}$$

is:

$$M_{dft\_phase\_4\_e^{j\frac{2\pi}{32}}} = \begin{bmatrix} 1 & 1 & 1 & 1 \\ 1 & e^{j\frac{2\pi}{32}} & e^{2j\frac{2\pi}{32}} & e^{3j\frac{2\pi}{32}} \\ 1 & e^{2j\frac{2\pi}{32}} & e^{4j\frac{2\pi}{32}} & e^{6j\frac{2\pi}{32}} \\ 1 & e^{3j\frac{2\pi}{32}} & e^{6j\frac{2\pi}{32}} & e^{9j\frac{2\pi}{32}} \end{bmatrix}.$$

Correspondingly, the set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix} \right\}.$$

It should be understood that, in the present invention, the phase matrix of the DFT matrix is not necessarily a square matrix. More columns or rows may be selected according to an order. For example, the matrix may be:

$$M'_{dft\_phase\_4\_e^{j\frac{2\pi}{32}}} = \begin{bmatrix} 1 & 1 & 1 & 1 & 1 \\ 1 & e^{j\frac{2\pi}{32}} & e^{2j\frac{2\pi}{32}} & e^{3j\frac{2\pi}{32}} & e^{4j\frac{2\pi}{32}} \\ 1 & e^{2j\frac{2\pi}{32}} & e^{4j\frac{2\pi}{32}} & e^{6j\frac{2\pi}{32}} & e^{8j\frac{2\pi}{32}} \\ 1 & e^{3j\frac{2\pi}{32}} & e^{6j\frac{2\pi}{32}} & e^{9j\frac{2\pi}{32}} & e^{12j\frac{2\pi}{32}} \end{bmatrix}.$$

The set of corresponding columns in the phase matrix of the DFT matrix is:

$$\{V'_m\} = \left\{ \begin{bmatrix} 1 \\ 1 \\ 1 \\ 1 \end{bmatrix}, \begin{bmatrix} 1 \\ e^{j\frac{2\pi}{32}} \\ e^{2j\frac{2\pi}{32}} \\ e^{3j\frac{2\pi}{32}} \end{bmatrix}, \begin{bmatrix} 1 \\ e^{2j\frac{2\pi}{32}} \\ e^{4j\frac{2\pi}{32}} \\ e^{6j\frac{2\pi}{32}} \end{bmatrix}, \begin{bmatrix} 1 \\ e^{3j\frac{2\pi}{32}} \\ e^{6j\frac{2\pi}{32}} \\ e^{9j\frac{2\pi}{32}} \end{bmatrix}, \begin{bmatrix} 1 \\ e^{4j\frac{2\pi}{32}} \\ e^{8j\frac{2\pi}{32}} \\ e^{12j\frac{2\pi}{32}} \end{bmatrix} \right\}.$$

It should be understood that, a quantity of rows or a quantity of columns selected from the DFT matrix is not limited in the present invention. It should be understood that, the quantity of rows should be at least the same as a value of $V_a$, and the quantity of columns should be at least the same as a quantity of first vectors in a codebook.

Second definition of the first condition:

A vector set formed by all second phase vectors and at least one CMP codebook in a CMP codebook set meet a second correspondence that the vector set formed by the second phase vectors is a subset of a set of corresponding column vectors in a phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the second phase vector, and a phase part of a $K^{th}$ element in each sub-vector of the $\{V_m\}$ is a $K^{th}$ element of each corresponding second phase vector, where P, Q, and K are any positive integers, and the CMP codebook refers to a codebook in which only one layer in layers corresponding to each port is a non-zero element.

In all CMP codebooks, CMP codebooks in which column vectors are two-dimensional are:

TABLE 1

| Codebook index | Quantity of layers $\upsilon = 1$ | Quantity of layers $\upsilon = 2$ |
|---|---|---|
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

CMP code books in which column vectors are four-dimensional and a quantity of layers is 1 are:

TABLE 2

| Codebook index | Quantity of layers $\upsilon = 1$ |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |

TABLE 2-continued

| Codebook index | Quantity of layers $\upsilon = 1$ | | | | | | | |
|---|---|---|---|---|---|---|---|---|
| 8-15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

CMP codebooks in which column vectors are four-dimensional and a quantity of layers is 2 are:

TABLE 3

| Codebook index | Quantity of layers $\upsilon = 2$ | | | |
|---|---|---|---|---|
| 0-3 | $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ |
| 4-7 | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ |
| 8-11 | $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ |
| 12-15 | $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ |

For example, when the index in Table 3 is 0, the subset of the set of corresponding column vectors in the phase matrix of the corresponding CMP codebook matrix is:

$$\left\{\begin{bmatrix}e^0\\e^0\\0\\0\end{bmatrix},\begin{bmatrix}0\\0\\e^0\\e^{-j\frac{\pi}{2}}\end{bmatrix}\right\}.$$

CMP codebooks in which column vectors are four-dimensional and a quantity of layers is 3 are:

TABLE 4

| Codebook index | Quantity of layers $\upsilon = 3$ | | | |
|---|---|---|---|---|
| 0-3 | $\frac{1}{2}\begin{bmatrix}1&0&0\\1&0&0\\0&1&0\\0&0&1\end{bmatrix}$ | $\frac{1}{2}\begin{bmatrix}1&0&0\\-1&0&0\\0&1&0\\0&0&1\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ |
| 4-7 | $\frac{1}{2}\begin{bmatrix}1&0&0\\0&1&0\\0&0&1\\1&0&0\end{bmatrix}$ | $\frac{1}{2}\begin{bmatrix}1&0&0\\0&1&0\\0&0&1\\-1&0&0\end{bmatrix}$ | $\frac{1}{2}\begin{bmatrix}0&1&0\\1&0&0\\1&0&0\\0&0&1\end{bmatrix}$ | $\frac{1}{2}\begin{bmatrix}0&1&0\\1&0&0\\-1&0&0\\0&0&1\end{bmatrix}$ |
| 8-11 | $\frac{1}{2}\begin{bmatrix}0&1&0\\1&0&0\\0&0&1\\1&0&0\end{bmatrix}$ | $\frac{1}{2}\begin{bmatrix}0&1&0\\1&0&0\\0&0&1\\-1&0&0\end{bmatrix}$ | $\frac{1}{2}\begin{bmatrix}0&1&0\\0&0&1\\1&0&0\\1&0&0\end{bmatrix}$ | $\frac{1}{2}\begin{bmatrix}0&1&0\\0&0&1\\1&0&0\\-1&0&0\end{bmatrix}$ |

CMP codebooks in which column vectors are four-dimensional and a quantity of layers is 4 are:

TABLE 5

| Codebook index | Quantity of layers $\upsilon = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Third definition of the first condition:

A vector set formed by all third phase vectors is a subset of a set formed by corresponding sub-vectors in a householder transform codebook, where a householder transform expression is $W_n = I - u_n u_n^H / u_n^H u_n$.

$V_a$ parts of all first sub-vectors $$\begin{bmatrix} V_a \\ 0 \end{bmatrix}$$

in the first codebook form a set $\{V_m\}$, phase parts of all elements in each sub-vector of the $\{V_m\}$ form the third phase vector, and a phase part of a $K^{th}$ element in each sub-vector of the $\{V_m\}$ is a $K^{th}$ element of each corresponding third phase vector.

For example, the third phase vectors are a subset of a set formed by phase parts of $W_{index}^{\{\alpha_i\}}$ in a matrix corresponding to different quantities of layers and different codebook indexes in Table 6. The index corresponds to different codebook indexes. $\{\alpha_i\}$ corresponds to an integer set, and is used to indicate that different columns in $W_{index}^{\{\alpha_i\}}$ are selected as third phase vectors. In Table 6, $U_n$ is a corresponding $U_n$ in the householder transform, and I is a unit matrix.

It should be understood that, in the present invention, a value of the $V_a$ is not limited only to cases or relationships shown in the first definition of the first condition, the second definition of the first condition, and the third definition of the first condition. The codebook may further be a codebook defined for two antennas, four antennas, or eight antennas in LTE.

In still another embodiment of the present invention, at least one first codebook meets a second condition. The present invention provides several definitions of the second condition that can be implemented.

First definition of the second condition:

A vector set formed by all fourth phase vectors and a discrete Fourier transform matrix DFT matrix meet a third correspondence that the vector set formed by the fourth phase vectors is a subset of a set of corresponding column vectors in a phase matrix of the DFT matrix, where an element in a Pt row and a $Q^{th}$ column in the phase matrix of the DFT matrix is a phase part of an element in a Pa row and a $Q^{th}$ column in the DFT matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fourth phase vector, and a phase part of a $K^{th}$ element in each sub-vector of the $\{V_n\}$ is a $K^{th}$ element of each corresponding fourth phase vector.

Second definition of the second condition:

A vector set formed by all fifth phase vectors and at least one CMP codebook in a CMP codebook set meet a fourth correspondence that the vector set formed by the fifth phase vectors is a subset of a set of corresponding column vectors in a phase matrix of the CMP codebook matrix, where an element in a $P^{th}$ row and a $Q^{th}$ column in the phase matrix of the CMP is a phase part of an element in a $P^{th}$ row and a $Q^{th}$ column in the CMP codebook matrix, $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the fifth phase vector, and a phase part of a $K^{th}$ element in each sub-vector of the $\{V_n\}$ is a $K^{th}$ element of each corresponding fifth phase vector, where P, Q, and K are any positive integers.

TABLE 6

| Codebook index | $u_n$ | Quantity of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{1234\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1234\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Third definition of the second condition:

A vector set formed by all sixth phase vectors is a set formed by corresponding sub-vectors in a householder transform codebook, where $V_b$ parts of all second sub-vectors $$\begin{bmatrix} 0 \\ V_b \end{bmatrix}$$

in the first codebook form a set $\{V_n\}$, phase parts of all elements in each sub-vector of the $\{V_n\}$ form the sixth phase vector, and a phase part of a $K^{th}$ element in each sub-vector of the $\{V_n\}$ is a $K^{th}$ element of each corresponding sixth phase vector.

It should be understood that, in the present invention, a value of the $V_b$ is not limited only to cases or relationships shown in the first definition of the second condition, the second definition of the second condition, and the third definition of the second condition. The present invention requests to protect correspondences according to the second condition: a relationship between the fourth phase vectors and different DFT matrices formed by different parameters, a relationship between the fifth phase vectors and the CMP codebook set, and a relationship between the sixth phase vectors and the householder codebook formed by different original vectors through householder transforms.

It should be understood that, due to independence, in one codebook, when the first codebook meets any definition of the first condition, a second codebook may meet any definition of the second condition. For example, in the first codebook, that the vector set formed by the first phase vectors is the subset of the set of corresponding column vectors in the phase matrix of the DFT matrix is met; in the second codebook, that the vector set formed by the fifth phase vectors is the subset of the set of corresponding column vectors in the phase matrix of the CMP codebook matrix, or any combination thereof is met.

In still another embodiment of the present invention, at least one first codebook meets a third condition.

In all first amplitude vectors corresponding to $\{V_m\}$, at least one first amplitude vector is different from all second amplitude vectors corresponding to the $\{V_n\}$; and/or in all second amplitude vectors corresponding to the $\{V_n\}$, at least one second amplitude vector is different from all first amplitude vectors corresponding to the $\{V_m\}$. $V_a$ parts of all first sub-vectors $$\begin{bmatrix} V_a \\ 0 \end{bmatrix}$$

in the first codebook form the set $\{V_m\}$, amplitude parts of all elements in each sub-vector of the $\{V_m\}$ form the first amplitude vector, and a phase part of a $K^{th}$ element in each sub-vector of the $\{V_m\}$ is a $K^{th}$ element of each corresponding first amplitude vector; and $V_b$ parts of all second sub-vectors $$\begin{bmatrix} 0 \\ V_b \end{bmatrix}$$

in the first codebook form the set $\{V_n\}$, amplitude parts of all elements in each sub-vector of the $\{V_n\}$ form the second amplitude vector, and an amplitude part of a $K^{th}$ element in each sub-vector of the $\{V_n\}$ is a $K^{th}$ element of each corresponding second amplitude vector. In this embodiment, in a sub-vector included in each first codebook, an amplitude part of each element corresponds to power of an antenna port. In this embodiment, in a sub-vector included in each first codebook, amplitude vectors of each group of antenna ports are determined independently according to tilt characteristics of this group of antenna ports (tilts may be classified into electrical tilts and mechanical tilts; an electrical tilt means that weighted vectors of multiple antenna elements corresponding to one antenna port make the multiple antenna elements form a beam pointing to a tilt). For example, all tilts of the first group of antenna ports are 12 degrees, and all tilts of the second group of antenna ports are 3 degrees; it is assumed that a horizontal plane is 0 degrees and that those downward are positive tilts. In this case, energies received from the two groups of antenna ports by the first network device in a location are different. Therefore, independent control may be performed on amplitudes of codebooks of the two groups of antenna ports, so that reception performance is optimized.

Figure 13:
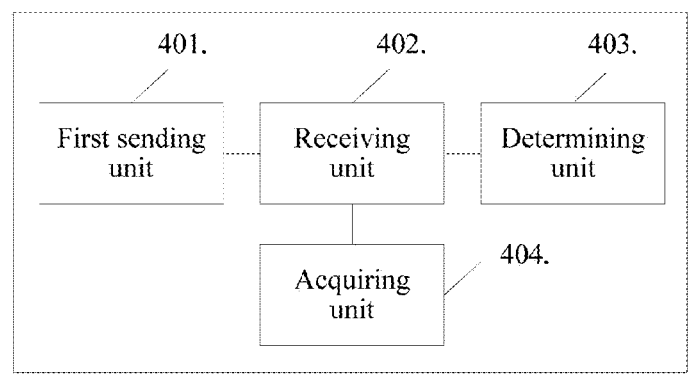
FIG. 13 is a sixth schematic structural diagram of a network device for implementing a method for measuring and feeding back channel information according to the present invention.
Figure 14:
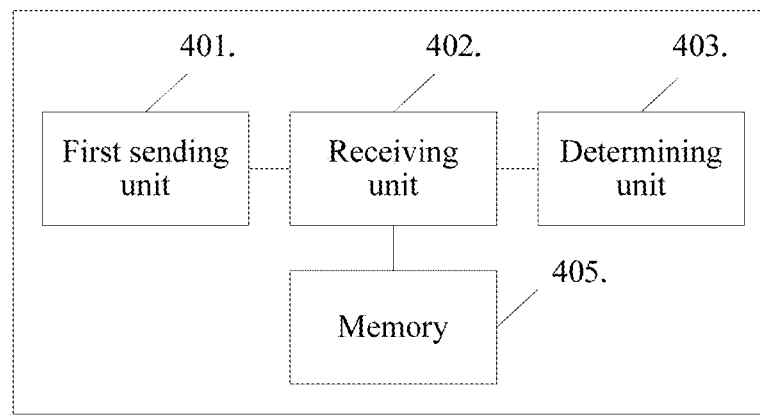
FIG. 14 is a seventh schematic structural diagram of a network device for implementing a method for measuring and feeding back channel information according to the present invention.

Optionally, FIG. 13 further shows an acquiring unit 404, configured to acquire the first codebook set before the first codebook is selected. In an embodiment of the present invention, FIG. 14 further shows that the first codebook set may be prestored in a memory 405, or delivered to the first network device by the second network device or another apparatus.

Figure 15:
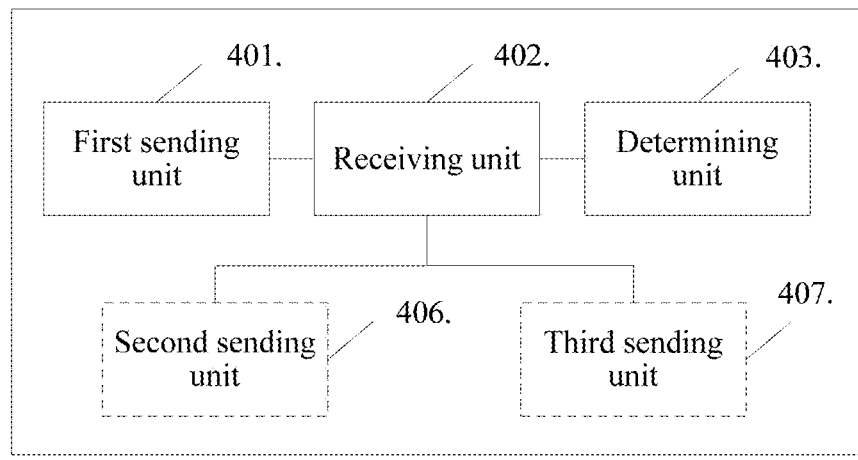
FIG. 15 is an eighth schematic structural diagram of a network device for implementing a method for measuring and feeding back channel information according to the present invention.

Optionally, FIG. 15 further shows a second sending unit 406, configured to send at least one first configuration message to the first network device, where each first configuration message is used to determine a sub-vector set of phase parts corresponding to one group of antenna ports, and a quantity of the at least one first configuration message is equal to a quantity of groups of the antenna ports; and/or a third sending unit 407, configured to send at least one second configuration message to the first network device, where each second configuration message is used to determine a sub-vector set of amplitude parts corresponding to one group of antenna ports, and a quantity of the at least one second configuration message is equal to a quantity of groups of the antenna ports.

The reference signal is further used to indicate the at least one first configuration message, where each first configuration message is used to determine a sub-vector set of phase parts corresponding to one group of antenna ports, and a quantity of the at least one first configuration message is equal to a quantity of groups of the antenna ports; and/or the reference signal is further used to indicate the at least one second configuration message, where each second configuration message is used to determine a sub-vector set of amplitude parts corresponding to one group of antenna ports, and a quantity of the at least one second configuration message is equal to a quantity of groups of the antenna ports.

In an embodiment, the first configuration message is configured by the second network device by using higher layer signaling or dynamic signaling; and/or the second configuration message is configured by the second network device by using higher layer signaling or dynamic signaling.

In an embodiment, the present invention provides possible cases of a codebook set having the first structure and the second structure. It should be understood that, the first codebook that the present invention requests to protect may be but is not limited to the following structures:

1. the first codebook is one of the following matrices:

$$\begin{bmatrix} V_a(i) \\ 0 \end{bmatrix} \text{ or } \begin{bmatrix} 0 \\ V_b(i') \end{bmatrix},$$

where a value of a rank indicator is 1, a non-zero sub-vector represented by $V_a(x)$ is a sub-vector in the first vector set $\{V_m\}$ and has a sequence number x, a non-zero sub-vector represented by $V_b(y)$ is a sub-vector in the first vector set $\{V_n\}$ and has a sequence number y, $0<i\leq N_1$, and $0<i'\leq N_1'$, where $N_1$ represents a quantity of sub-vectors in the $\{V_m\}$, and $N_1'$ represents a quantity of sub-vectors in the $\{V_n\}$; or 2. the first codebook is one of the following matrices:

$$\begin{bmatrix} V_a(i) & V_a(j) \\ 0 & 0 \end{bmatrix}, \begin{bmatrix} V_a(i) & 0 \\ 0 & V_b(i') \end{bmatrix}, \begin{bmatrix} 0 & V_a(i) \\ V_b(i') & 0 \end{bmatrix}, \text{ or } \begin{bmatrix} 0 & 0 \\ V_b(i') & V_b(j') \end{bmatrix},$$

where a value of a rank indicator is 2, $0<i\leq N_1$, $0<i'\leq N_1'$, $0<j\leq N_1$, and $0<j'\leq N_1'$; or 3. the first codebook is one of the following matrices:

$$\begin{bmatrix} V_a(i) & V_a(j) & V_a(k) \\ 0 & 0 & 0 \end{bmatrix}, \begin{bmatrix} V_a(i) & V_a(j) & 0 \\ 0 & 0 & V_b(i') \end{bmatrix}, \begin{bmatrix} V_a(i) & 0 & V_a(j) \\ 0 & V_b(i') & 0 \end{bmatrix},$$

$$\begin{bmatrix} V_a(i) & 0 & 0 \\ 0 & V_b(i') & V_b(j') \end{bmatrix}, \begin{bmatrix} 0 & V_a(i) & 0 \\ V_b(i') & 0 & V_b(j') \end{bmatrix}, \begin{bmatrix} 0 & V_a(i) & V_a(j) \\ V_b(i') & 0 & 0 \end{bmatrix},$$

$$\begin{bmatrix} 0 & 0 & V_a(i) \\ V_b(i') & V_b(j') & 0 \end{bmatrix}, \text{ or } \begin{bmatrix} 0 & 0 & 0 \\ V_b(i') & V_b(j') & V_b(k') \end{bmatrix},$$

where a value of a rank indicator is 3, $0<i\leq N_1$, $0<i'\leq N_1'$, $0<j\leq N_1$, $0<j'\leq N_1'$, $0<k\leq N_1$, and $0<k'\leq N$; or 4. the first codebook is one of the following matrices:

$$\begin{bmatrix} V_a(i) & V_a(j) & V_a(k) & V_a(l) \\ 0 & 0 & 0 & 0 \end{bmatrix}, \begin{bmatrix} V_a(i) & V_a(j) & V_a(k) & 0 \\ 0 & 0 & 0 & V_b(i') \end{bmatrix},$$

$$\begin{bmatrix} V_a(i) & V_a(j) & 0 & V_a(k) \\ 0 & 0 & V_b(i') & 0 \end{bmatrix}, \begin{bmatrix} V_a(i) & V_a(j) & 0 & 0 \\ 0 & 0 & V_b(i') & V_b(j') \end{bmatrix},$$

$$\begin{bmatrix} V_a(i) & 0 & V_a(j) & V_a(k) \\ 0 & V_b(i') & 0 & 0 \end{bmatrix}, \begin{bmatrix} V_a(i) & 0 & V_a(j) & 0 \\ 0 & V_b(i') & 0 & V_b(j') \end{bmatrix},$$

$$\begin{bmatrix} V_a(i) & 0 & 0 & V_a(j) \\ 0 & V_b(i') & V_b(j') & 0 \end{bmatrix}, \begin{bmatrix} V_a(i) & 0 & 0 & 0 \\ 0 & V_b(i') & V_b(j') & V_b(k') \end{bmatrix},$$

$$\begin{bmatrix} 0 & V_a(i) & V_a(j) & V_a(k) \\ V_b(i') & 0 & 0 & 0 \end{bmatrix}, \begin{bmatrix} 0 & V_a(i) & V_a(j) & 0 \\ V_b(i') & 0 & 0 & V_b(j') \end{bmatrix},$$

$$\begin{bmatrix} 0 & V_a(i) & 0 & V_a(j) \\ V_b(i') & 0 & V_b(j') & 0 \end{bmatrix}, \begin{bmatrix} 0 & V_a(i) & 0 & 0 \\ V_b(i') & 0 & V_b(j') & V_b(k') \end{bmatrix},$$

$$\begin{bmatrix} 0 & 0 & V_a(i) & V_a(j) \\ V_b(i') & V_b(j') & 0 & 0 \end{bmatrix}, \begin{bmatrix} 0 & 0 & V_a(i) & 0 \\ V_b(i') & V_b(j') & 0 & V_b(k') \end{bmatrix},$$

$$\begin{bmatrix} 0 & 0 & 0 & V_a(i) \\ V_b(i') & V_b(j') & V_b(k') & 0 \end{bmatrix}, \text{ or } \begin{bmatrix} 0 & 0 & 0 & 0 \\ V_b(i') & V_b(j') & V_b(k') & V_b(l') \end{bmatrix},$$

where a value of a rank indicator is 4, $0<i\leq N_1$, $0<i'\leq N_1'$, $0<j\leq N_1$, $0<j'\leq N_1'$, $0<k\leq N_1$, $0<k'\leq N_1'$, $0<l\leq N_1$, and $0<l'\leq N_1'$; or 5. the first codebook is one of the following matrices:

$$\begin{bmatrix} V_a(i) & V_a(j) & V_a(k) & V_a(l) & V_a(m) \\ 0 & 0 & 0 & 0 & 0 \end{bmatrix},$$

$$\begin{bmatrix} V_a(i) & V_a(j) & V_a(k) & 0 & V_a(l) \\ 0 & 0 & 0 & V_b(i') & 0 \end{bmatrix},$$

$$\begin{bmatrix} V_a(i) & V_a(j) & 0 & V_a(k) & V_a(l) \\ 0 & 0 & V_b(i') & 0 & 0 \end{bmatrix},$$

$$\begin{bmatrix} V_a(i) & V_a(j) & 0 & 0 & V_a(k) \\ 0 & 0 & V_b(i') & V_b(j') & 0 \end{bmatrix},$$

$$\begin{bmatrix} V_a(i) & 0 & V_a(j) & V_a(k) & V_a(l) \\ 0 & V_b(i') & 0 & 0 & 0 \end{bmatrix},$$

$$\begin{bmatrix} V_a(i) & 0 & V_a(j) & 0 & V_a(k) \\ 0 & V_b(i') & 0 & V_b(j') & 0 \end{bmatrix},$$

$$\begin{bmatrix} V_a(i) & 0 & 0 & V_a(j) & V_a(k) \\ 0 & V_b(i') & V_b(j') & 0 & 0 \end{bmatrix},$$

$$\begin{bmatrix} V_a(i) & 0 & 0 & 0 & V_a(j) \\ 0 & V_b(i') & V_b(j') & V_b(k') & 0 \end{bmatrix},$$

$$\begin{bmatrix} 0 & V_a(i) & V_a(j) & V_a(k) & V_a(l) \\ V_b(i') & 0 & 0 & 0 & 0 \end{bmatrix},$$

$$\begin{bmatrix} 0 & V_a(i) & V_a(j) & 0 & V_a(k) \\ V_b(i') & 0 & 0 & V_b(j') & 0 \end{bmatrix},$$

$$\begin{bmatrix} 0 & V_a(i) & 0 & V_a(j) & V_a(k) \\ V_b(i') & 0 & V_b(j') & 0 & 0 \end{bmatrix},$$

$$\begin{bmatrix} 0 & V_a(i) & 0 & 0 & V_a(j) \\ V_b(i') & 0 & V_b(j') & V_b(k') & 0 \end{bmatrix},$$

$$\begin{bmatrix} 0 & 0 & V_a(i) & V_a(j) & V_a(k) \\ V_b(i') & V_b(j') & 0 & 0 & 0 \end{bmatrix},$$

$$\begin{bmatrix} 0 & 0 & V_a(i) & 0 & V_a(j) \\ V_b(i') & V_b(j') & 0 & V_b(k') & 0 \end{bmatrix},$$

$$\begin{bmatrix} 0 & 0 & 0 & V_a(i) & V_a(j) \\ V_b(i') & V_b(j') & V_b(k') & 0 & 0 \end{bmatrix},$$

$$\begin{bmatrix} 0 & 0 & 0 & 0 & V_a(i) \\ V_b(i') & V_b(j') & V_b(k') & V_b(l') & 0 \end{bmatrix},$$

$$\begin{bmatrix} V_a(i) & V_a(j) & V_a(k) & V_a(4) & 0 \\ 0 & 0 & 0 & 0 & V_b(i') \end{bmatrix},$$

$$\begin{bmatrix} V_a(i) & V_a(j) & V_a(k) & 0 & 0 \\ 0 & 0 & 0 & V_b(i') & V_b(j') \end{bmatrix},$$

$$\begin{bmatrix} V_a(i) & V_a(j) & 0 & V_a(k) & 0 \\ 0 & 0 & V_b(i') & 0 & V_b(j') \end{bmatrix},$$

$$\begin{bmatrix} V_a(i) & V_a(j) & 0 & 0 & 0 \\ 0 & 0 & V_b(i') & V_b(j') & V_b(k') \end{bmatrix},$$

$$\begin{bmatrix} V_a(i) & 0 & V_a(j) & V_a(k) & 0 \\ 0 & V_b(i') & 0 & 0 & V_b(j') \end{bmatrix},$$

$$\begin{bmatrix} V_a(i) & 0 & V_a(j) & 0 & 0 \\ 0 & V_b(i') & 0 & V_b(j') & V_b(k') \end{bmatrix},$$

$$\begin{bmatrix} V_a(i) & 0 & 0 & V_a(j) & 0 \\ 0 & V_b(i') & V_b(j') & 0 & V_b(k') \end{bmatrix},$$

$$\begin{bmatrix} V_a(i) & 0 & 0 & 0 & 0 \\ 0 & V_b(i') & V_b(j') & V_b(k') & V_b(l') \end{bmatrix},$$

-continued $$\begin{bmatrix} 0 & V_a(i) & V_a(j) & V_a(k) & 0 \\ V_b(i') & 0 & 0 & 0 & V_b(j') \end{bmatrix},$$

$$\begin{bmatrix} 0 & V_a(i) & V_a(j) & 0 & 0 \\ V_b(i') & 0 & 0 & V_b(j') & V_b(k') \end{bmatrix},$$

$$\begin{bmatrix} 0 & V_a(i) & V_a(j) & 0 & 0 \\ V_b(i') & 0 & 0 & V_b(j') & V_b(k') \end{bmatrix},$$

$$\begin{bmatrix} 0 & V_a(i) & 0 & 0 & 0 \\ V_b(i') & 0 & V_b(j') & V_b(k') & V_b(l') \end{bmatrix},$$

$$\begin{bmatrix} 0 & 0 & V_a(i) & V_a(j) & 0 \\ V_b(i') & V_b(j') & 0 & 0 & V_b(k') \end{bmatrix},$$

$$\begin{bmatrix} 0 & 0 & V_a(i) & 0 & 0 \\ V_b(i') & V_b(j') & 0 & V_b(k') & V_b(l') \end{bmatrix},$$

$$\begin{bmatrix} 0 & 0 & 0 & V_a(1) & 0 \\ V_b(i') & V_b(j') & V_b(k') & 0 & V_b(l') \end{bmatrix}, \text{ or }$$

$$\begin{bmatrix} 0 & 0 & 0 & 0 & 0 \\ V_b(i') & V_b(j') & V_b(k') & V_b(l') & V_b(m') \end{bmatrix},$$

where a value of a rank indicator is 5, $0<i\leq N_1$, $0<i'\leq N_1$, $0<j\leq N_1$, $0<j'\leq N_1$, $0<k\leq N_1$, $0<k'\leq N_1$, $0<l\leq N_1$, $0<l'\leq N_1$, $0<m\leq N_1$, and $0<m'\leq N_1$; or 6. the first codebook is one of the following matrices:

$$\begin{bmatrix} V_a(i) & V_a(j) & V_a(k) & V_a(l) & V_a(m) & V_a(n) \\ 0 & 0 & 0 & 0 & 0 & 0 \end{bmatrix},$$

$$\begin{bmatrix} V_a(i) & V_a(j) & V_a(k) & 0 & V_a(l) & V_a(m) \\ 0 & 0 & 0 & V_b(i') & 0 & 0 \end{bmatrix},$$

$$\begin{bmatrix} V_a(i) & V_a(j) & 0 & V_a(k) & V_a(l) & V_a(m) \\ 0 & 0 & V_b(i') & 0 & 0 & 0 \end{bmatrix},$$

$$\begin{bmatrix} V_a(i) & V_a(j) & 0 & 0 & V_a(k) & V_a(l) \\ 0 & 0 & V_b(i') & V_b(j') & 0 & 0 \end{bmatrix},$$

$$\begin{bmatrix} V_a(i) & 0 & V_a(j) & V_a(k) & V_a(l) & V_a(m) \\ 0 & V_b(i') & 0 & 0 & 0 & 0 \end{bmatrix},$$

$$\begin{bmatrix} V_a(i) & 0 & V_a(j) & 0 & V_a(k) & V_a(l) \\ 0 & V_b(i') & 0 & V_b(j') & 0 & 0 \end{bmatrix},$$

$$\begin{bmatrix} V_a(i) & 0 & 0 & V_a(j) & V_a(k) & V_a(l) \\ 0 & V_b(i') & V_b(j') & 0 & 0 & 0 \end{bmatrix},$$

$$\begin{bmatrix} V_a(i) & 0 & 0 & 0 & V_a(j) & V_a(k) \\ 0 & V_b(i') & V_b(j') & V_b(k') & 0 & 0 \end{bmatrix},$$

$$\begin{bmatrix} 0 & V_a(i) & V_a(j) & V_a(k) & V_a(l) & V_a(m) \\ V_b(i') & 0 & 0 & 0 & 0 & 0 \end{bmatrix},$$

$$\begin{bmatrix} 0 & V_a(i) & V_a(j) & 0 & V_a(k) & V_a(l) \\ V_b(i') & 0 & 0 & V_b(j') & 0 & 0 \end{bmatrix},$$

$$\begin{bmatrix} 0 & V_a(i) & 0 & V_a(j) & V_a(k) & V_a(l) \\ V_b(i') & 0 & V_b(j') & 0 & 0 & 0 \end{bmatrix},$$

$$\begin{bmatrix} 0 & V_a(i) & 0 & 0 & V_a(j) & V_a(k) \\ V_b(i') & 0 & V_b(j') & V_b(k') & 0 & 0 \end{bmatrix},$$

$$\begin{bmatrix} 0 & 0 & V_a(i) & V_a(j) & V_a(k) & V_a(l) \\ V_b(i') & V_b(j') & 0 & 0 & 0 & 0 \end{bmatrix},$$

$$\begin{bmatrix} 0 & 0 & V_a(i) & 0 & V_a(j) & V_a(k) \\ V_b(i') & V_b(j') & 0 & V_b(k') & 0 & 0 \end{bmatrix},$$

-continued $$\begin{bmatrix} 0 & 0 & 0 & V_a(i) & V_a(j) & V_a(k) \\ V_b(i') & V_b(j') & V_b(k') & 0 & 0 & 0 \end{bmatrix},$$

$$\begin{bmatrix} 0 & 0 & 0 & 0 & V_a(i) & V_a(j) \\ V_b(i') & V_b(j') & V_b(k') & V_b(l') & 0 & 0 \end{bmatrix},$$

$$\begin{bmatrix} V_a(i) & V_a(j) & V_a(k) & V_a(l) & 0 & V_a(5) \\ 0 & 0 & 0 & 0 & V_b(i') & 0 \end{bmatrix},$$

$$\begin{bmatrix} V_a(i) & V_a(j) & V_a(k) & 0 & 0 & V_a(l) \\ 0 & 0 & 0 & V_b(i') & V_b(j') & 0 \end{bmatrix},$$

$$\begin{bmatrix} V_a(i) & V_a(j) & 0 & V_a(k) & 0 & V_a(l) \\ 0 & 0 & V_b(i') & 0 & V_b(j') & 0 \end{bmatrix},$$

$$\begin{bmatrix} V_a(i) & V_a(j) & 0 & 0 & 0 & V_a(k) \\ 0 & 0 & V_b(i') & V_b(j') & V_b(k') & 0 \end{bmatrix},$$

$$\begin{bmatrix} V_a(i) & 0 & V_a(j) & V_a(k) & 0 & V_a(l) \\ 0 & V_b(i') & 0 & 0 & V_b(j') & 0 \end{bmatrix},$$

$$\begin{bmatrix} V_a(i) & 0 & V_a(j) & 0 & 0 & V_a(k) \\ 0 & V_b(i') & 0 & V_b(j') & V_b(k') & 0 \end{bmatrix},$$

$$\begin{bmatrix} V_a(i) & 0 & 0 & V_a(j) & 0 & V_a(k) \\ 0 & V_b(i') & V_b(j') & 0 & V_b(k') & 0 \end{bmatrix},$$

$$\begin{bmatrix} V_a(i) & 0 & 0 & 0 & 0 & V_a(j) \\ 0 & V_b(i') & V_b(j') & V_b(k') & V_b(l') & 0 \end{bmatrix},$$

$$\begin{bmatrix} 0 & V_a(i) & V_a(j) & V_a(k) & 0 & V_a(l) \\ V_b(i') & 0 & 0 & 0 & V_b(j') & 0 \end{bmatrix},$$

$$\begin{bmatrix} 0 & V_a(i) & V_a(j) & 0 & 0 & V_a(k) \\ V_b(i') & 0 & 0 & V_b(j') & V_b(k') & 0 \end{bmatrix},$$

$$\begin{bmatrix} 0 & V_a(i) & 0 & V_a(j) & 0 & V_a(k) \\ V_b(i') & 0 & V_b(j') & 0 & V_b(k') & 0 \end{bmatrix},$$

$$\begin{bmatrix} 0 & V_a(i) & 0 & 0 & 0 & V_a(j) \\ V_b(i') & 0 & V_b(j') & V_b(k') & V_b(l') & 0 \end{bmatrix},$$

$$\begin{bmatrix} 0 & 0 & V_a(i) & V_a(j) & 0 & V_a(k) \\ V_b(i') & V_b(j') & 0 & 0 & V_b(k') & 0 \end{bmatrix},$$

$$\begin{bmatrix} 0 & 0 & V_a(i) & 0 & 0 & V_a(j) \\ V_b(i') & V_b(j') & 0 & V_b(k') & V_b(l') & 0 \end{bmatrix},$$

$$\begin{bmatrix} 0 & 0 & 0 & V_a(1) & 0 & V_a(j) \\ V_b(i') & V_b(j') & V_b(k') & 0 & V_b(l') & 0 \end{bmatrix},$$

$$\begin{bmatrix} 0 & 0 & 0 & 0 & 0 & V_a(i) \\ V_b(i') & V_b(j') & V_b(k') & V_b(l') & V_b(m') & 0 \end{bmatrix},$$

$$\begin{bmatrix} V_a(i) & V_a(j) & V_a(k) & V_a(l) & V_a(m) & 0 \\ 0 & 0 & 0 & 0 & 0 & V_b(i') \end{bmatrix},$$

$$\begin{bmatrix} V_a(i) & V_a(j) & V_a(k) & 0 & V_a(l) & 0 \\ 0 & 0 & 0 & V_b(i') & 0 & V_b(j') \end{bmatrix},$$

$$\begin{bmatrix} V_a(i) & V_a(j) & 0 & V_a(k) & V_a(l) & 0 \\ 0 & 0 & V_b(i') & 0 & 0 & V_b(j) \end{bmatrix},$$

$$\begin{bmatrix} V_a(i) & V_a(j) & 0 & 0 & V_a(k) & 0 \\ 0 & 0 & V_b(i) & V_b(j) & 0 & V_b(k) \end{bmatrix},$$

$$\begin{bmatrix} V_a(i) & 0 & V_a(j) & V_a(k) & V_a(l) & 0 \\ 0 & V_b(i') & 0 & 0 & 0 & V_b(j') \end{bmatrix},$$

-continued $$\begin{bmatrix} V_a(i) & 0 & V_a(j) & 0 & V_a(k) & 0 \\ 0 & V_b(i') & 0 & V_b(j') & 0 & V_b(k') \end{bmatrix},$$

$$\begin{bmatrix} V_a(i) & 0 & 0 & V_a(j) & V_a(k) & 0 \\ 0 & V_b(i') & V_b(j') & 0 & 0 & V_b(k') \end{bmatrix},$$

$$\begin{bmatrix} V_a(i) & 0 & 0 & 0 & V_a(j) & 0 \\ 0 & V_b(i') & V_b(j') & V_b(k') & 0 & V_b(l') \end{bmatrix},$$

$$\begin{bmatrix} 0 & V_a(i) & V_a(j) & V_a(k) & V_a(l) & 0 \\ V_b(i') & 0 & 0 & 0 & 0 & V_b(j') \end{bmatrix},$$

$$\begin{bmatrix} 0 & V_a(i) & V_a(j) & 0 & V_a(k) & 0 \\ V_b(i') & 0 & 0 & V_b(j') & 0 & V_b(k') \end{bmatrix},$$

$$\begin{bmatrix} 0 & V_a(i) & 0 & V_a(j) & V_a(k) & 0 \\ V_b(i') & 0 & V_b(j') & 0 & 0 & V_b(k') \end{bmatrix},$$

$$\begin{bmatrix} 0 & V_a(i) & 0 & 0 & V_a(j) & 0 \\ V_b(i') & 0 & V_b(j') & V_b(k') & 0 & V_b(l') \end{bmatrix},$$

$$\begin{bmatrix} 0 & 0 & V_a(i) & V_a(j) & V_a(k) & 0 \\ V_b(i') & V_b(j') & 0 & 0 & 0 & V_b(k') \end{bmatrix},$$

$$\begin{bmatrix} 0 & 0 & V_a(i) & 0 & V_a(j) & 0 \\ V_b(i') & V_b(j') & 0 & V_b(k') & 0 & V_b(l') \end{bmatrix},$$

$$\begin{bmatrix} 0 & 0 & 0 & V_a(i) & V_a(j) & 0 \\ V_b(i') & V_b(j') & V_b(k') & 0 & 0 & V_a(l') \end{bmatrix},$$

$$\begin{bmatrix} 0 & 0 & 0 & 0 & V_a(i) & 0 \\ V_b(i') & V_b(j') & V_b(k') & V_a(l') & 0 & V_b(m') \end{bmatrix},$$

$$\begin{bmatrix} V_a(i) & V_a(j) & V_a(k) & V_a(l) & 0 & 0 \\ 0 & 0 & 0 & 0 & V_b(i') & V_b(j') \end{bmatrix},$$

$$\begin{bmatrix} V_a(i) & V_a(j) & V_a(k) & 0 & 0 & 0 \\ 0 & 0 & 0 & V_b(i') & V_b(j') & V_b(k') \end{bmatrix},$$

$$\begin{bmatrix} V_a(i) & V_a(j) & 0 & V_a(k) & 0 & 0 \\ 0 & 0 & V_b(i') & 0 & V_b(j') & V_b(k') \end{bmatrix},$$

$$\begin{bmatrix} V_a(i) & V_a(j) & 0 & 0 & 0 & 0 \\ 0 & 0 & V_b(i') & V_b(j') & V_b(k') & V_b(l') \end{bmatrix},$$

$$\begin{bmatrix} V_a(i) & 0 & V_a(j) & V_a(k) & 0 & 0 \\ 0 & V_b(i') & 0 & 0 & V_b(j') & V_b(k') \end{bmatrix},$$

$$\begin{bmatrix} V_a(i) & 0 & V_a(j) & 0 & 0 & 0 \\ 0 & V_b(i') & 0 & V_b(j') & V_b(k') & V_b(l') \end{bmatrix},$$

$$\begin{bmatrix} V_a(i) & 0 & 0 & V_a(j) & 0 & 0 \\ 0 & V_b(i') & V_b(j') & 0 & V_b(k') & V_b(l') \end{bmatrix},$$

$$\begin{bmatrix} V_a(i) & 0 & 0 & 0 & 0 & 0 \\ 0 & V_b(i') & V_b(j') & V_b(k') & V_b(l') & V_b(m') \end{bmatrix},$$

$$\begin{bmatrix} 0 & V_a(i) & V_a(j) & V_a(k) & 0 & 0 \\ V_b(i') & 0 & 0 & 0 & V_b(j') & V_b(k') \end{bmatrix},$$

$$\begin{bmatrix} 0 & V_a(i) & V_a(j) & 0 & 0 & 0 \\ V_b(i') & 0 & 0 & V_b(j') & V_b(k') & V_b(l') \end{bmatrix},$$

$$\begin{bmatrix} 0 & V_a(i) & 0 & V_a(j) & 0 & 0 \\ V_b(i') & 0 & V_b(j') & 0 & V_b(k') & V_b(l') \end{bmatrix},$$

$$\begin{bmatrix} 0 & V_a(i) & 0 & 0 & 0 & 0 \\ V_b(i') & 0 & V_b(j') & V_b(k') & V_b(l') & V_b(m') \end{bmatrix},$$

$$\begin{bmatrix} 0 & 0 & V_a(i) & V_a(j) & 0 & 0 \\ V_b(i') & V_b(j') & 0 & 0 & V_b(k') & V_b(k') \end{bmatrix},$$

$$\begin{bmatrix} 0 & 0 & V_a(i) & 0 & 0 & 0 \\ V_b(i') & V_b(j') & 0 & V_b(k') & V_b(l') & V_b(m') \end{bmatrix},$$

$$\begin{bmatrix} 0 & 0 & 0 & V_a(i) & 0 & 0 \\ V_b(i') & V_b(j') & V_b(k') & 0 & V_b(l') & V_b(m') \end{bmatrix}, \text{ or}$$

$$\begin{bmatrix} 0 & 0 & 0 & 0 & 0 & 0 \\ V_b(i') & V_b(j') & V_b(k') & V_b(l') & V_b(m') & V_b(n') \end{bmatrix},$$

where a value of a rank indicator is 6, $0 < i \le N_1$, $0 < i' \le N_1$, $0 < j \le N_1$, $0 < j' \le N_1$, $0 < k \le N_1$, $0 < k' \le N_1$, $0 < l \le N_1$, $0 < l' \le N_1$, $0 < m \le N_1$, $0 < m' \le N_1$, $0 < n \le N_1$, and $0 < n' \le N_1$; or 7. the first codebook is one of the following matrices:

$$\begin{bmatrix} V_a(i) & V_a(j) & V_a(k) & V_a(l) & V_a(m) & V_a(n) & V_a(p) \\ 0 & 0 & 0 & 0 & 0 & 0 & 0 \end{bmatrix}$$

$$\begin{bmatrix} V_a(i) & V_a(j) & V_a(k) & 0 & V_a(l) & V_a(m) & V_a(n) \\ 0 & 0 & 0 & V_b(i') & 0 & 0 & 0 \end{bmatrix}$$

$$\begin{bmatrix} V_a(i) & V_a(j) & 0 & V_a(k) & V_a(l) & V_a(m) & V_a(n) \\ 0 & 0 & V_b(i') & 0 & 0 & 0 & 0 \end{bmatrix}$$

$$\begin{bmatrix} V_a(i) & V_a(j) & 0 & 0 & V_a(k) & V_a(l) & V_a(m) \\ 0 & 0 & V_b(i') & V_b(j') & 0 & 0 & 0 \end{bmatrix}$$

$$\begin{bmatrix} V_a(i) & 0 & V_a(j) & V_a(k) & V_a(l) & V_a(m) & V_a(n) \\ 0 & V_b(i') & 0 & 0 & 0 & 0 & 0 \end{bmatrix}$$

$$\begin{bmatrix} V_a(i) & 0 & V_a(j) & 0 & V_a(k) & V_a(l) & V_a(m) \\ 0 & V_b(i') & 0 & V_b(j') & 0 & 0 & 0 \end{bmatrix}$$

$$\begin{bmatrix} V_a(i) & 0 & 0 & V_a(j) & V_a(k) & V_a(l) & V_a(m) \\ 0 & V_b(i') & V_b(j') & 0 & 0 & 0 & 0 \end{bmatrix}$$

$$\begin{bmatrix} V_a(i) & 0 & 0 & 0 & V_a(j) & V_a(k) & V_a(l) \\ 0 & V_b(i') & V_b(j') & V_b(k') & 0 & 0 & 0 \end{bmatrix}$$

$$\begin{bmatrix} 0 & V_a(i) & V_a(j) & V_a(k) & V_a(l) & V_a(m) & V_a(n) \\ V_b(i') & 0 & 0 & 0 & 0 & 0 & 0 \end{bmatrix}$$

$$\begin{bmatrix} 0 & V_a(i) & V_a(j) & 0 & V_a(k) & V_a(l) & V_a(m) \\ V_b(i') & 0 & 0 & V_b(j') & 0 & 0 & 0 \end{bmatrix}$$

$$\begin{bmatrix} 0 & V_a(i) & 0 & V_a(j) & V_a(k) & V_a(l) & V_a(m) \\ V_b(i') & 0 & V_b(j') & 0 & 0 & 0 & 0 \end{bmatrix}$$

$$\begin{bmatrix} 0 & V_a(i) & 0 & 0 & V_a(j) & V_a(k) & V_a(l) \\ V_b(i') & 0 & V_b(j') & V_b(k') & 0 & 0 & 0 \end{bmatrix}$$

$$\begin{bmatrix} 0 & 0 & V_a(i) & V_a(j) & V_a(k) & V_a(l) & V_a(m) \\ V_b(i') & V_b(j') & 0 & 0 & 0 & 0 & 0 \end{bmatrix}$$

$$\begin{bmatrix} 0 & 0 & V_a(i) & 0 & V_a(j) & V_a(k) & V_a(l) \\ V_b(i') & V_b(j') & 0 & V_b(k') & 0 & 0 & 0 \end{bmatrix}$$

$$\begin{bmatrix} 0 & 0 & 0 & V_a(i) & V_a(j) & V_a(k) & V_a(l) \\ V_b(i') & V_b(j') & V_b(k') & 0 & 0 & 0 & 0 \end{bmatrix}$$

$$\begin{bmatrix} 0 & 0 & 0 & 0 & V_a(i) & V_a(j) & V_a(k) \\ V_b(i') & V_b(j') & V_b(k') & V_b(l') & 0 & 0 & 0 \end{bmatrix}$$

$$\begin{bmatrix} V_a(i) & V_a(j) & V_a(k) & V_a(l) & 0 & V_a(m) & V_a(n) \\ 0 & 0 & 0 & 0 & V_b(i') & 0 & 0 \end{bmatrix}$$

$$\begin{bmatrix} V_a(i) & V_a(j) & V_a(k) & 0 & 0 & V_a(l) & V_a(m) \\ 0 & 0 & 0 & V_b(i') & V_b(j') & 0 & 0 \end{bmatrix}$$

-continued $$\begin{bmatrix} V_a(i) & V_a(j) & 0 & V_a(k) & 0 & V_a(l) & V_a(m) \\ 0 & 0 & V_b(i') & 0 & V_b(j') & 0 & 0 \end{bmatrix}$$

$$\begin{bmatrix} V_a(i) & V_a(j) & 0 & 0 & 0 & V_a(k) & V_a(l) \\ 0 & 0 & V_b(i') & V_b(j') & V_b(k') & 0 & 0 \end{bmatrix}$$

$$\begin{bmatrix} V_a(i) & 0 & V_a(j) & V_a(k) & 0 & V_a(l) & V_a(m) \\ 0 & V_b(i') & 0 & 0 & V_b(j') & 0 & 0 \end{bmatrix}$$

$$\begin{bmatrix} V_a(i) & 0 & V_a(j) & 0 & 0 & V_a(k) & V_a(l) \\ 0 & V_b(i') & 0 & V_b(j') & V_b(k') & 0 & 0 \end{bmatrix}$$

$$\begin{bmatrix} V_a(i) & 0 & 0 & V_a(j) & 0 & V_a(k) & V_a(l) \\ 0 & V_b(i') & V_b(j') & 0 & V_b(k') & 0 & 0 \end{bmatrix}$$

$$\begin{bmatrix} V_a(i) & 0 & 0 & 0 & 0 & V_a(j) & V_a(k) \\ 0 & V_b(i') & V_b(j') & V_b(k') & V_b(l') & 0 & 0 \end{bmatrix}$$

$$\begin{bmatrix} 0 & V_a(i) & V_a(j) & V_a(k) & 0 & V_a(l) & V_a(m) \\ V_b(i') & 0 & 0 & 0 & V_b(j') & 0 & 0 \end{bmatrix}$$

$$\begin{bmatrix} 0 & V_a(i) & V_a(j) & 0 & 0 & V_a(k) & V_a(l) \\ V_b(i') & 0 & 0 & V_b(j') & V_b(k') & 0 & 0 \end{bmatrix}$$

$$\begin{bmatrix} 0 & V_a(i) & 0 & V_a(j) & 0 & V_a(k) & V_a(l) \\ V_b(i') & 0 & V_b(j') & 0 & V_b(k') & 0 & 0 \end{bmatrix}$$

$$\begin{bmatrix} 0 & V_a(i) & 0 & 0 & 0 & V_a(j) & V_a(k) \\ V_b(i') & 0 & V_b(j') & V_b(k') & V_b(l') & 0 & 0 \end{bmatrix}$$

$$\begin{bmatrix} 0 & 0 & V_a(i) & V_a(j) & 0 & V_a(k) & V_a(l) \\ V_b(i') & V_b(j') & 0 & 0 & V_b(k') & 0 & 0 \end{bmatrix}$$

$$\begin{bmatrix} 0 & 0 & V_a(i) & 0 & 0 & V_a(j) & V_a(k) \\ V_b(i') & V_b(j') & 0 & V_b(k') & V_b(l') & 0 & 0 \end{bmatrix}$$

$$\begin{bmatrix} 0 & 0 & 0 & V_a(i) & 0 & V_a(j) & V_a(k) \\ V_b(i') & V_b(j') & V_b(k') & 0 & V_b(l') & 0 & 0 \end{bmatrix}$$

$$\begin{bmatrix} 0 & 0 & 0 & 0 & 0 & V_a(i) & V_a(j) \\ V_b(i') & V_b(j') & V_b(k') & V_b(l') & V_b(m') & 0 & 0 \end{bmatrix}$$

$$\begin{bmatrix} V_a(i) & V_a(j) & V_a(k) & V_a(l) & V_a(m) & 0 & V_a(n) \\ 0 & 0 & 0 & 0 & 0 & V_b(i') & 0 \end{bmatrix}$$

$$\begin{bmatrix} V_a(i) & V_a(j) & V_a(k) & 0 & V_a(l) & 0 & V_a(m) \\ 0 & 0 & 0 & V_b(i') & 0 & V_b(j') & 0 \end{bmatrix}$$

$$\begin{bmatrix} V_a(i) & V_a(j) & 0 & V_a(k) & V_a(l) & 0 & V_a(m) \\ 0 & 0 & V_b(i') & 0 & 0 & V_b(j') & 0 \end{bmatrix}$$

$$\begin{bmatrix} V_a(i) & V_a(j) & 0 & 0 & V_a(k) & 0 & V_a(l) \\ 0 & 0 & V_b(i') & V_b(j') & 0 & V_b(k') & 0 \end{bmatrix}$$

$$\begin{bmatrix} V_a(i) & 0 & V_a(j) & V_a(k) & V_a(l) & 0 & V_a(m) \\ 0 & V_b(i') & 0 & 0 & 0 & V_b(j') & 0 \end{bmatrix}$$

$$\begin{bmatrix} V_a(i) & 0 & V_a(j) & V_a(k) & V_a(l) & 0 & V_a(m) \\ 0 & V_b(i') & 0 & V_b(j') & 0 & V_b(k') & 0 \end{bmatrix}$$

$$\begin{bmatrix} V_a(i) & 0 & 0 & V_a(j) & V_a(k) & 0 & V_a(l) \\ 0 & V_b(i') & V_b(j') & 0 & 0 & V_b(k') & 0 \end{bmatrix}$$

$$\begin{bmatrix} V_a(i) & 0 & 0 & 0 & V_a(j) & V_a(k) \\ 0 & V_b(i') & V_b(j') & V_b(k') & 0 & 0 \end{bmatrix}$$

$$\begin{bmatrix} 0 & V_a(i) & V_a(j) & V_a(k) & V_a(l) & 0 & V_a(m) \\ V_b(i') & 0 & 0 & 0 & 0 & V_b(j') & 0 \end{bmatrix}$$

$$\begin{bmatrix} 0 & V_a(i) & V_a(j) & 0 & V_a(k) & 0 & V_a(l) \\ V_b(i') & 0 & 0 & V_b(j') & 0 & V_b(k') & 0 \end{bmatrix}$$

$$\begin{bmatrix} 0 & V_a(i) & V_a(j) & 0 & 0 & V_a(k) & V_a(l) \\ V_b(i') & 0 & 0 & V_b(j') & V_b(k') & 0 & 0 \end{bmatrix}$$

$$\begin{bmatrix} 0 & V_a(i) & 0 & 0 & V_a(j) & V_a(k) & V_a(l) \\ V_b(i') & 0 & V_b(j') & V_b(k') & V_b(l') & 0 & 0 \end{bmatrix}$$

$$\begin{bmatrix} 0 & V_a(i) & 0 & V_a(j) & V_a(k) & 0 & V_a(l) \\ V_b(i') & 0 & V_b(j') & 0 & 0 & V_b(k') & 0 \end{bmatrix}$$

$$\begin{bmatrix} 0 & V_a(i) & 0 & V_a(j) & 0 & V_a(k) & V_a(l) \\ V_b(i) & V_b(j') & 0 & V_b(k') & 0 & V_b(l') & 0 \end{bmatrix}$$

$$\begin{bmatrix} 0 & 0 & 0 & V_a(i) & V_a(j) & 0 & V_a(k) \\ V_b(i') & V_b(j') & V_b(k') & 0 & 0 & V_b(l') & 0 \end{bmatrix}$$

$$\begin{bmatrix} 0 & 0 & 0 & 0 & V_a(i) & 0 & V_a(j) \\ V_b(i') & V_b(j') & V_b(k') & V_b(l') & 0 & V_b(m') & 0 \end{bmatrix}$$

$$\begin{bmatrix} V_a(i) & V_a(j) & V_a(k) & V_a(4) & 0 & 0 & V_a(m) \\ 0 & 0 & 0 & 0 & V_b(i') & V_b(j') & 0 \end{bmatrix}$$

$$\begin{bmatrix} V_a(i) & V_a(j) & V_a(k) & 0 & 0 & 0 & V_a(l) \\ 0 & 0 & 0 & V_b(i') & V_b(j') & V_b(k') & 0 \end{bmatrix}$$

$$\begin{bmatrix} V_a(i) & V_a(j) & 0 & V_a(k) & 0 & 0 & V_a(l) \\ 0 & 0 & V_b(i') & 0 & V_b(j') & V_b(k') & 0 \end{bmatrix}$$

$$\begin{bmatrix} V_a(i) & V_a(j) & 0 & 0 & 0 & 0 & V_a(k) \\ 0 & 0 & V_b(i') & V_b(j') & V_b(k') & V_b(l') & 0 \end{bmatrix}$$

$$\begin{bmatrix} V_a(i) & 0 & V_a(j) & V_a(k) & 0 & 0 & V_a(l) \\ 0 & V_b(i') & 0 & 0 & V_b(j') & V_b(k') & 0 \end{bmatrix}$$

$$\begin{bmatrix} V_a(i) & 0 & V_a(j) & 0 & 0 & 0 & V_a(k) \\ 0 & V_b(i') & 0 & V_b(j') & V_b(k') & V_b(l') & 0 \end{bmatrix}$$

$$\begin{bmatrix} V_a(i) & 0 & 0 & V_a(j) & 0 & 0 & V_a(k) \\ 0 & V_b(i') & V_b(j') & 0 & V_b(k') & V_b(l') & 0 \end{bmatrix}$$

$$\begin{bmatrix} V_a(i) & 0 & 0 & 0 & 0 & 0 & V_a(j) \\ 0 & V_b(i') & V_b(j') & V_b(k') & V_b(l') & V_b(m') & 0 \end{bmatrix}$$

$$\begin{bmatrix} 0 & V_a(i) & V_a(j) & V_a(k) & 0 & 0 & V_a(l) \\ V_b(i') & 0 & 0 & 0 & V_b(j') & V_b(k') & 0 \end{bmatrix}$$

$$\begin{bmatrix} 0 & V_a(i) & V_a(j) & 0 & 0 & 0 & V_a(k) \\ V_b(i') & 0 & 0 & V_b(j') & V_b(k') & V_b(l') & 0 \end{bmatrix}$$

$$\begin{bmatrix} 0 & V_a(i) & 0 & V_a(j) & 0 & 0 & V_a(k) \\ V_b(i') & 0 & V_b(j') & 0 & V_b(k') & V_b(l') & 0 \end{bmatrix}$$

$$\begin{bmatrix} 0 & V_a(i) & 0 & 0 & 0 & 0 & V_a(j) \\ V_b(i') & 0 & V_b(j') & V_b(k') & V_b(l') & V_b(m') & 0 \end{bmatrix}$$

$$\begin{bmatrix} 0 & 0 & V_a(i) & V_a(j) & 0 & 0 & V_a(k) \\ V_b(i') & V_b(j') & 0 & 0 & V_b(k') & V_b(l') & 0 \end{bmatrix}$$

$$\begin{bmatrix} 0 & 0 & V_a(i) & 0 & 0 & 0 & V_a(k) \\ V_b(i') & V_b(j') & 0 & V_b(k') & V_b(l') & V_b(m') & 0 \end{bmatrix}$$

$$\begin{bmatrix} 0 & 0 & 0 & V_a(i) & 0 & 0 & V_a(j) \\ V_b(i') & V_b(j') & V_b(k') & 0 & V_b(l') & V_b(m') & 0 \end{bmatrix}$$

$$\begin{bmatrix} 0 & 0 & 0 & 0 & 0 & 0 & V_a(j) \\ V_b(i') & V_b(j') & V_b(k') & V_b(l') & V_b(m') & V_b(n') & 0 \end{bmatrix}$$

$$\begin{bmatrix} V_a(i) & V_a(j) & V_a(k) & V_a(l) & V_a(m) & V_a(n) & 0 \\ 0 & 0 & 0 & 0 & 0 & 0 & V_b(i') \end{bmatrix}$$

$$\begin{bmatrix} V_a(i) & V_a(j) & V_a(k) & 0 & V_a(l) & V_a(m) & 0 \\ 0 & 0 & 0 & V_b(i') & 0 & 0 & V_b(j') \end{bmatrix}$$

$$\begin{bmatrix} V_a(i) & V_a(j) & 0 & V_a(k) & V_a(l) & V_a(m) & 0 \\ 0 & 0 & V_b(i') & 0 & 0 & 0 & V_b(j') \end{bmatrix}$$

$$\begin{bmatrix} V_a(i) & V_a(j) & 0 & 0 & V_a(k) & V_a(l) & 0 \\ 0 & 0 & V_b(i') & V_b(j') & 0 & 0 & V_b(k') \end{bmatrix}$$

$$\begin{bmatrix} V_a(i) & 0 & V_a(j) & V_a(k) & V_a(l) & V_a(m) & 0 \\ 0 & V_b(i') & 0 & 0 & 0 & 0 & V_b(j') \end{bmatrix}$$

$$\begin{bmatrix} V_a(i) & 0 & V_a(j) & 0 & V_a(k) & V_a(l) & 0 \\ 0 & V_b(i') & 0 & V_b(j') & 0 & 0 & V_b(k') \end{bmatrix}$$

$$\begin{bmatrix} V_a(i) & 0 & 0 & V_a(j) & V_a(k) & V_a(l) & 0 \\ 0 & V_b(i') & V_b(j') & 0 & 0 & 0 & V_b(k') \end{bmatrix}$$

$$\begin{bmatrix} V_a(i) & 0 & 0 & 0 & V_a(j) & V_a(k) & 0 \\ 0 & V_b(i') & V_b(j') & V_b(k') & 0 & 0 & V_b(l') \end{bmatrix}$$

$$\begin{bmatrix} 0 & V_a(i) & V_a(j) & V_a(k) & V_a(l) & V_a(m) & 0 \\ V_b(i') & 0 & 0 & 0 & 0 & 0 & V_b(j') \end{bmatrix}$$

$$\begin{bmatrix} 0 & V_a(i) & V_a(j) & 0 & V_a(k) & V_a(l) & 0 \\ V_b(i') & 0 & 0 & V_b(j') & 0 & 0 & V_b(k') \end{bmatrix}$$

$$\begin{bmatrix} 0 & V_a(i) & 0 & V_a(j) & V_a(k) & V_a(l) & 0 \\ V_b(i') & 0 & V_b(j') & 0 & 0 & 0 & V_b(k') \end{bmatrix}$$

$$\begin{bmatrix} 0 & V_a(i) & 0 & 0 & V_a(j) & V_a(k) & 0 \\ V_b(i') & 0 & V_b(j') & V_b(k') & 0 & 0 & V_b(l') \end{bmatrix}$$

$$\begin{bmatrix} 0 & 0 & V_a(i) & V_a(j) & V_a(k) & V_a(l) & 0 \\ V_b(i') & V_b(j') & 0 & 0 & 0 & 0 & V_b(k') \end{bmatrix}$$

$$\begin{bmatrix} 0 & 0 & V_a(i) & 0 & V_a(j) & V_a(k) & 0 \\ V_b(i') & V_b(j') & 0 & V_b(k') & 0 & 0 & V_b(l') \end{bmatrix}$$

$$\begin{bmatrix} 0 & 0 & 0 & V_a(i) & V_a(j) & V_a(k) & 0 \\ V_b(i') & V_b(j') & V_b(k') & 0 & 0 & 0 & V_b(l') \end{bmatrix}$$

$$\begin{bmatrix} 0 & 0 & 0 & 0 & V_a(i) & V_a(j) & 0 \\ V_b(i') & V_b(j') & V_b(k') & V_b(l') & 0 & 0 & V_b(m') \end{bmatrix}$$

$$\begin{bmatrix} V_a(i) & V_a(j) & V_a(k) & V_a(l) & 0 & V_a(m) & 0 \\ 0 & 0 & 0 & 0 & V_b(i') & 0 & V_b(j') \end{bmatrix}$$

$$\begin{bmatrix} V_a(i) & V_a(j) & V_a(k) & 0 & 0 & V_a(l) & 0 \\ 0 & 0 & 0 & V_b(i') & V_b(j') & 0 & V_b(k') \end{bmatrix}$$

$$\begin{bmatrix} V_a(i) & V_a(j) & 0 & V_a(k) & 0 & V_a(l) & 0 \\ 0 & 0 & V_b(i') & 0 & V_b(j') & 0 & V_b(k') \end{bmatrix}$$

$$\begin{bmatrix} V_a(i) & V_a(j) & 0 & 0 & 0 & V_a(k) & 0 \\ 0 & 0 & V_b(i') & V_b(j') & V_b(k') & 0 & V_b(l') \end{bmatrix}$$

$$\begin{bmatrix} V_a(i) & 0 & V_a(j) & V_a(k) & 0 & V_a(l) & 0 \\ 0 & V_b(i') & 0 & 0 & V_b(j') & 0 & V_b(k') \end{bmatrix}$$

$$\begin{bmatrix} V_a(i) & 0 & V_a(j) & 0 & 0 & V_a(k) & 0 \\ 0 & V_b(i') & 0 & V_b(j') & V_b(k') & 0 & V_b(l') \end{bmatrix}$$

$$\begin{bmatrix} V_a(i) & 0 & 0 & V_a(j) & 0 & V_a(k) & 0 \\ 0 & V_b(i') & V_b(j') & 0 & V_b(k') & 0 & V_b(l') \end{bmatrix}$$

$$\begin{bmatrix} V_a(i) & 0 & 0 & 0 & 0 & V_a(j) & 0 \\ 0 & V_b(i') & V_b(j') & V_b(k') & V_b(l') & 0 & V_b(m') \end{bmatrix}$$

$$\begin{bmatrix} 0 & V_a(i) & V_a(j) & V_a(k) & 0 & V_a(l) & 0 \\ V_b(i') & 0 & 0 & 0 & V_b(j') & 0 & V_b(k') \end{bmatrix}$$

-continued $$\begin{bmatrix} 0 & V_a(i) & V_a(j) & 0 & 0 & V_a(k) & 0 \\ V_b(i') & 0 & 0 & V_b(j') & V_b(k') & 0 & V_b(l') \end{bmatrix}$$

$$\begin{bmatrix} 0 & V_a(i) & 0 & V_a(j) & 0 & V_a(k) & 0 \\ V_b(i') & 0 & V_b(j') & 0 & V_b(k') & 0 & V_b(l') \end{bmatrix}$$

$$\begin{bmatrix} 0 & V_a(i) & 0 & 0 & 0 & V_a(j) & 0 \\ V_b(i') & 0 & V_b(j') & V_b(k') & V_b(l') & 0 & V_b(m') \end{bmatrix}$$

$$\begin{bmatrix} 0 & 0 & V_a(i) & V_a(j) & 0 & V_a(k) & 0 \\ V_b(i') & V_b(j') & 0 & 0 & V_b(k') & 0 & V_b(l') \end{bmatrix}$$

$$\begin{bmatrix} 0 & 0 & V_a(i) & 0 & 0 & V_a(j) & 0 \\ V_b(i') & V_b(j') & 0 & V_b(k') & V_b(l') & 0 & V_b(m') \end{bmatrix}$$

$$\begin{bmatrix} 0 & 0 & 0 & V_a(i) & 0 & V_a(j) & 0 \\ V_b(i') & V_b(j') & V_b(k') & 0 & V_b(l') & 0 & V_b(m') \end{bmatrix}$$

$$\begin{bmatrix} 0 & 0 & 0 & 0 & 0 & V_a(i) & 0 \\ V_b(i') & V_b(j') & V_b(k') & V_b(l') & V_b(m') & 0 & V_b(n') \end{bmatrix}$$

$$\begin{bmatrix} V_a(i) & V_a(j) & V_a(k) & V_a(l) & V_a(m) & 0 & 0 \\ 0 & 0 & 0 & 0 & 0 & V_b(i') & V_b(j') \end{bmatrix}$$

$$\begin{bmatrix} V_a(i) & V_a(j) & V_a(k) & 0 & V_a(l) & 0 & 0 \\ 0 & 0 & 0 & V_b(i') & 0 & V_b(j') & V_b(k') \end{bmatrix}$$

$$\begin{bmatrix} V_a(i) & V_a(j) & 0 & V_a(k) & V_a(l) & 0 & 0 \\ 0 & 0 & V_b(i') & 0 & 0 & V_b(j') & V_b(k') \end{bmatrix}$$

$$\begin{bmatrix} V_a(i) & V_a(j) & 0 & 0 & V_a(k) & 0 & 0 \\ 0 & 0 & V_b(i') & V_b(j') & 0 & V_b(k') & V_b(l') \end{bmatrix}$$

$$\begin{bmatrix} V_a(i) & 0 & V_a(j) & V_a(k) & V_a(l) & 0 & 0 \\ 0 & V_b(i') & 0 & 0 & 0 & V_b(j') & V_b(k') \end{bmatrix}$$

$$\begin{bmatrix} V_a(i) & 0 & V_a(j) & V_a(k) & 0 & 0 & 0 \\ 0 & V_b(i') & 0 & 0 & V_b(j') & V_b(k') & V_b(l') \end{bmatrix}$$

$$\begin{bmatrix} V_a(i) & 0 & 0 & V_a(j) & V_a(k) & 0 & 0 \\ 0 & V_b(i') & V_b(j') & 0 & 0 & V_b(k') & V_b(l') \end{bmatrix}$$

$$\begin{bmatrix} V_a(i) & 0 & 0 & 0 & V_a(j) & 0 & 0 \\ 0 & V_b(i') & V_b(j') & V_b(k') & 0 & V_b(l') & V_b(m') \end{bmatrix}$$

$$\begin{bmatrix} 0 & V_a(i) & V_a(j) & V_a(k) & V_a(l) & 0 & 0 \\ V_b(i') & 0 & 0 & 0 & 0 & V_b(j') & V_b(k') \end{bmatrix}$$

$$\begin{bmatrix} 0 & V_a(i) & V_a(j) & 0 & V_a(k) & 0 & 0 \\ V_b(i') & 0 & 0 & V_b(j') & 0 & V_b(k') & V_b(l') \end{bmatrix}$$

$$\begin{bmatrix} 0 & V_a(i) & 0 & V_a(j) & V_a(k) & 0 & 0 \\ V_b(i') & 0 & V_b(j') & 0 & 0 & V_b(k') & V_b(l') \end{bmatrix}$$

$$\begin{bmatrix} 0 & V_a(i) & 0 & 0 & V_a(j) & 0 & 0 \\ V_b(i') & 0 & V_b(j') & V_b(k') & 0 & V_b(l') & V_b(m') \end{bmatrix}$$

$$\begin{bmatrix} 0 & 0 & V_a(i) & V_a(j) & V_a(k) & 0 & 0 \\ V_b(i') & V_b(j') & 0 & 0 & 0 & V_b(k') & V_b(l') \end{bmatrix}$$

$$\begin{bmatrix} 0 & 0 & V_a(i) & 0 & V_a(j) & 0 & 0 \\ V_b(i') & V_b(j') & 0 & V_b(k') & 0 & V_b(l') & V_b(m') \end{bmatrix}$$

$$\begin{bmatrix} 0 & 0 & 0 & V_a(i) & V_a(j) & 0 & 0 \\ V_b(i') & V_b(j') & V_b(k') & 0 & 0 & V_b(l') & V_b(m') \end{bmatrix}$$

$$\begin{bmatrix} 0 & 0 & 0 & 0 & V_a(i) & 0 & 0 \\ V_b(i') & V_b(j') & V_b(k') & V_b(l') & 0 & V_b(m') & V_b(n') \end{bmatrix}$$

-continued $$\begin{bmatrix} V_a(i) & V_a(j) & V_a(k) & V_a(l) & 0 & 0 & 0 \\ 0 & 0 & 0 & 0 & V_b(i') & V_b(j') & V_b(k') \end{bmatrix}$$

$$\begin{bmatrix} V_a(i) & V_a(j) & V_a(k) & 0 & 0 & 0 & 0 \\ 0 & 0 & 0 & V_b(i') & V_b(j') & V_b(k') & V_b(l') \end{bmatrix}$$

$$\begin{bmatrix} V_a(i) & V_a(j) & 0 & V_a(k) & 0 & 0 & 0 \\ 0 & 0 & V_b(i') & 0 & V_b(j') & V_b(k') & V_b(l') \end{bmatrix}$$

$$\begin{bmatrix} V_a(i) & V_a(j) & 0 & 0 & 0 & 0 & 0 \\ 0 & 0 & V_b(i') & V_b(j') & V_b(k') & V_b(l') & V_b(m') \end{bmatrix}$$

$$\begin{bmatrix} V_a(i) & 0 & V_a(j) & V_a(k) & 0 & 0 & 0 \\ 0 & V_b(i') & 0 & 0 & V_b(j') & V_b(k') & V_b(l') \end{bmatrix}$$

$$\begin{bmatrix} V_a(i) & 0 & V_a(j) & 0 & 0 & 0 & 0 \\ 0 & V_b(i') & 0 & V_b(j') & V_b(k') & V_b(l') & V_b(m') \end{bmatrix}$$

$$\begin{bmatrix} V_a(i) & 0 & 0 & V_a(j) & 0 & 0 & 0 \\ 0 & V_b(i') & V_b(j') & 0 & V_b(k') & V_b(l') & V_b(m') \end{bmatrix}$$

$$\begin{bmatrix} V_a(i) & 0 & 0 & 0 & 0 & 0 & 0 \\ 0 & V_b(i') & V_b(j') & V_b(k') & V_b(l') & V_b(m') & V_b(n') \end{bmatrix}$$

$$\begin{bmatrix} 0 & V_a(i) & V_a(j) & V_a(k) & 0 & 0 & 0 \\ V_b(i') & 0 & 0 & 0 & V_b(j') & V_b(k') & V_b(l') \end{bmatrix}$$

$$\begin{bmatrix} 0 & V_a(i) & V_a(j) & 0 & 0 & 0 & 0 \\ V_b(i') & 0 & 0 & V_b(j') & V_b(k') & V_b(l') & V_b(m') \end{bmatrix}$$

$$\begin{bmatrix} 0 & V_a(i) & 0 & V_a(j) & 0 & 0 & 0 \\ V_b(i') & 0 & V_b(j') & 0 & V_b(k') & V_b(l') & V_b(m') \end{bmatrix}$$

$$\begin{bmatrix} 0 & V_a(i) & 0 & 0 & 0 & 0 & 0 \\ V_b(i') & 0 & V_b(j') & V_b(k') & V_b(l') & V_b(m') & V_b(n') \end{bmatrix}$$

$$\begin{bmatrix} 0 & 0 & V_a(i) & V_a(j) & 0 & 0 & 0 \\ V_b(i') & V_b(j') & 0 & 0 & V_b(k') & V_b(l') & V_b(m') \end{bmatrix}$$

$$\begin{bmatrix} 0 & 0 & V_a(i) & 0 & 0 & 0 & 0 \\ V_b(i') & V_b(j') & 0 & V_b(k') & V_b(l') & V_b(m') & V_b(n') \end{bmatrix}$$

$$\begin{bmatrix} 0 & 0 & 0 & V_a(i) & 0 & 0 & 0 \\ V_b(i') & V_b(j') & V_b(k') & 0 & V_b(l') & V_b(m') & V_b(n') \end{bmatrix}$$

$$\begin{bmatrix} 0 & 0 & 0 & 0 & 0 & 0 & 0 \\ V_b(i') & V_b(j') & V_b(k') & V_b(l') & V_b(m') & V_b(n') & V_b(p') \end{bmatrix},$$

where a value of a rank indicator is 7, $0<i\leq N_1$, $0<i'\leq N_1$, $0<j\leq N_1$, $0<j'\leq N_1$, $0<k\leq N_1$, $0<k'\leq N_1$, $0<l\leq N_1$, $0<l'\leq N_1$, $0<m\leq N_1$, $0<m'\leq N_1$, $0<n\leq N_1$, $0<n'\leq N_1$, $0<p\leq N_1$, and $0<p'\leq N_1$; or 8. the first codebook is one of the following matrices:

$$\begin{bmatrix} V_a(i) & V_a(j) & V_a(k) & V_a(l) & V_a(m) & V_a(n) & V_a(p) & V_a(q) \\ 0 & 0 & 0 & 0 & 0 & 0 & 0 & 0 \end{bmatrix}$$

$$\begin{bmatrix} V_a(i) & V_a(j) & V_a(k) & 0 & V_a(l) & V_a(m) & V_a(n) & V_a(p) \\ 0 & 0 & 0 & V_b(i') & 0 & 0 & 0 & 0 \end{bmatrix}$$

$$\begin{bmatrix} V_a(i) & V_a(j) & 0 & V_a(k) & V_a(l) & V_a(m) & V_a(n) & V_a(p) \\ 0 & 0 & V_b(i') & 0 & 0 & 0 & 0 & 0 \end{bmatrix}$$

$$\begin{bmatrix} V_a(i) & V_a(j) & 0 & 0 & V_a(k) & V_a(l) & V_a(m) & V_a(n) \\ 0 & 0 & V_b(i') & V_b(j') & 0 & 0 & 0 & 0 \end{bmatrix}$$

$$\begin{bmatrix} V_a(i) & 0 & V_a(j) & V_a(k) & V_a(l) & V_a(m) & V_a(n) & V_a(p) \\ 0 & V_b(i') & 0 & 0 & 0 & 0 & 0 & 0 \end{bmatrix}$$

-continued $$\begin{bmatrix} V_a(i) & 0 & V_a(j) & 0 & V_a(k) & V_a(l) & V_a(m) & V_a(n) \\ 0 & V_b(i') & 0 & V_b(j') & 0 & 0 & 0 & 0 \end{bmatrix}$$

$$\begin{bmatrix} V_a(i) & 0 & 0 & V_a(j) & V_a(k) & V_a(l) & V_a(m) & V_a(n) \\ 0 & V_b(i') & V_b(2) & 0 & 0 & 0 & 0 & 0 \end{bmatrix}$$

$$\begin{bmatrix} V_a(i) & 0 & 0 & 0 & V_a(j) & V_a(k) & V_a(l) & V_a(m) \\ 0 & V_b(i') & V_b(j') & V_b(k') & 0 & 0 & 0 & 0 \end{bmatrix}$$

$$\begin{bmatrix} 0 & V_a(i) & V_a(j) & V_a(k) & V_a(l) & V_a(m) & V_a(n) & V_a(p) \\ V_b(i') & 0 & 0 & 0 & 0 & 0 & 0 & 0 \end{bmatrix}$$

$$\begin{bmatrix} 0 & V_a(i) & V_a(j) & 0 & V_a(k) & V_a(l) & V_a(m) & V_a(n) \\ V_b(i') & 0 & 0 & V_b(j') & 0 & 0 & 0 & 0 \end{bmatrix}$$

$$\begin{bmatrix} 0 & V_a(i) & 0 & V_a(j) & V_a(k) & V_a(l) & V_a(m) & V_a(n) \\ V_b(i') & 0 & V_b(2) & 0 & 0 & 0 & 0 & 0 \end{bmatrix}$$

$$\begin{bmatrix} 0 & V_a(i) & 0 & 0 & V_a(j) & V_a(k) & V_a(l) & V_a(m) \\ V_b(i') & 0 & V_b(j') & V_b(k') & 0 & 0 & 0 & 0 \end{bmatrix}$$

$$\begin{bmatrix} 0 & 0 & V_a(i) & V_a(j) & V_a(k) & V_a(l) & V_a(m) & V_a(n) \\ V_b(i') & V_b(j') & 0 & 0 & 0 & 0 & 0 & 0 \end{bmatrix}$$

$$\begin{bmatrix} 0 & 0 & V_a(i) & 0 & V_a(j) & V_a(k) & V_a(l) & V_a(m) \\ V_b(i') & V_b(j') & 0 & V_b(k') & 0 & 0 & 0 & 0 \end{bmatrix}$$

$$\begin{bmatrix} 0 & 0 & 0 & V_a(i) & V_a(j) & V_a(k) & V_a(l) & V_a(m) \\ V_b(i') & V_b(j') & V_b(k') & 0 & 0 & 0 & 0 & 0 \end{bmatrix}$$

$$\begin{bmatrix} 0 & 0 & 0 & 0 & V_a(i) & V_a(j) & V_a(k) & V_a(l) \\ V_b(i') & V_b(j') & V_b(k') & V_b(l') & 0 & 0 & 0 & 0 \end{bmatrix}$$

$$\begin{bmatrix} V_a(i) & V_a(j) & V_a(k) & V_a(l) & 0 & V_a(m) & V_a(n) & V_a(p) \\ 0 & 0 & 0 & 0 & V_b(i') & 0 & 0 & 0 \end{bmatrix}$$

$$\begin{bmatrix} V_a(i) & V_a(j) & V_a(k) & 0 & 0 & V_a(l) & V_a(m) & V_a(n) \\ 0 & 0 & 0 & V_b(i') & V_b(j') & 0 & 0 & 0 \end{bmatrix}$$

$$\begin{bmatrix} V_a(i) & V_a(j) & 0 & V_a(k) & 0 & V_a(l) & V_a(m) & V_a(n) \\ 0 & 0 & V_b(i') & 0 & V_b(j') & 0 & 0 & 0 \end{bmatrix}$$

$$\begin{bmatrix} V_a(i) & 0 & V_a(j) & V_a(k) & 0 & V_a(l) & V_a(m) & V_a(n) \\ 0 & V_b(i') & 0 & 0 & V_b(j') & 0 & 0 & 0 \end{bmatrix}$$

$$\begin{bmatrix} V_a(i) & 0 & V_a(j) & V_a(k) & 0 & V_a(l) & V_a(m) & V_a(n) \\ 0 & V_b(i') & 0 & V_b(j') & 0 & 0 & 0 & 0 \end{bmatrix}$$

$$\begin{bmatrix} V_a(i) & 0 & 0 & V_a(j) & V_a(k) & V_a(l) & V_a(m) & V_a(n) \\ 0 & V_b(i') & V_b(j') & 0 & 0 & 0 & 0 & 0 \end{bmatrix}$$

$$\begin{bmatrix} V_a(i) & 0 & 0 & V_a(j) & V_a(k) & V_a(l) & V_a(m) & V_a(n) \\ 0 & V_b(i') & V_b(j') & 0 & V_b(k') & 0 & 0 & 0 \end{bmatrix}$$

$$\begin{bmatrix} V_a(i) & 0 & 0 & 0 & 0 & V_a(j) & V_a(k) & V_a(l) \\ 0 & V_b(i') & V_b(j') & V_b(k') & V_b(l') & 0 & 0 & 0 \end{bmatrix}$$

$$\begin{bmatrix} 0 & V_a(i) & V_a(j) & V_a(k) & 0 & V_a(l) & V_a(m) & V_a(n) \\ V_b(i') & 0 & 0 & 0 & V_b(j') & 0 & 0 & 0 \end{bmatrix}$$

$$\begin{bmatrix} 0 & V_a(i) & V_a(j) & 0 & 0 & V_a(k) & V_a(l) & V_a(m) \\ V_b(i') & 0 & 0 & V_b(j') & V_b(k') & 0 & 0 & 0 \end{bmatrix}$$

$$\begin{bmatrix} 0 & V_a(i) & 0 & V_a(j) & 0 & V_a(k) & V_a(l) & V_a(m) \\ V_b(i') & 0 & V_b(j') & 0 & V_b(k') & 0 & 0 & 0 \end{bmatrix}$$

$$\begin{bmatrix} 0 & V_a(i) & 0 & 0 & 0 & V_a(j) & V_a(k) & V_a(l) \\ V_b(i') & 0 & V_b(j') & V_b(k') & V_b(l') & 0 & 0 & 0 \end{bmatrix}$$

$$\begin{bmatrix} 0 & 0 & V_a(i) & V_a(j) & 0 & V_a(k) & V_a(l) & V_a(m) \\ V_b(i') & V_b(j') & 0 & 0 & V_b(k') & 0 & 0 & 0 \end{bmatrix}$$

-continued $$\begin{bmatrix} 0 & 0 & V_a(i) & 0 & 0 & V_a(j) & V_a(k) & V_a(l) \\ V_b(i') & V_b(j') & 0 & V_b(k') & V_b(l') & 0 & 0 & 0 \end{bmatrix}$$

$$\begin{bmatrix} 0 & 0 & 0 & V_a(i) & 0 & V_a(j) & V_a(k) & V_a(l) \\ V_b(i') & V_b(j') & V_b(k') & 0 & V_b(l') & 0 & 0 & 0 \end{bmatrix}$$

$$\begin{bmatrix} 0 & 0 & 0 & 0 & 0 & V_a(i) & V_a(j) & V_a(k) \\ V_b(i') & V_b(j') & V_b(k') & V_b(l') & V_b(m') & 0 & 0 & 0 \end{bmatrix}$$

$$\begin{bmatrix} V_a(i) & V_a(j) & V_a(k) & V_a(l) & V_a(m) & V_a(n) & V_a(p) & 0 \\ 0 & 0 & 0 & 0 & 0 & 0 & 0 & V_b(i') \end{bmatrix}$$

$$\begin{bmatrix} V_a(i) & V_a(j) & V_a(k) & 0 & V_a(l) & V_a(m) & V_a(n) & 0 \\ 0 & 0 & 0 & V_b(i') & 0 & 0 & 0 & V_b(j') \end{bmatrix}$$

$$\begin{bmatrix} V_a(i) & V_a(j) & 0 & V_a(k) & V_a(l) & V_a(m) & V_a(n) & 0 \\ 0 & 0 & V_b(i') & 0 & 0 & 0 & 0 & V_b(j') \end{bmatrix}$$

$$\begin{bmatrix} V_a(i) & V_a(j) & 0 & 0 & V_a(k) & V_a(l) & V_a(m) & 0 \\ 0 & 0 & V_b(i') & V_b(j') & 0 & 0 & 0 & V_b(k') \end{bmatrix}$$

$$\begin{bmatrix} V_a(i) & 0 & V_a(j) & V_a(k) & V_a(l) & V_a(m) & V_a(n) & 0 \\ 0 & V_b(i') & 0 & 0 & 0 & 0 & 0 & V_b(j') \end{bmatrix}$$

$$\begin{bmatrix} V_a(i) & 0 & V_a(j) & 0 & V_a(k) & V_a(l) & V_a(m) & 0 \\ 0 & V_b(i') & 0 & V_b(j') & 0 & 0 & 0 & V_b(k') \end{bmatrix}$$

$$\begin{bmatrix} V_a(i) & 0 & 0 & V_a(j) & V_a(k) & V_a(l) & V_a(m) & 0 \\ 0 & V_b(i') & V_b(j') & 0 & 0 & 0 & 0 & V_b(k') \end{bmatrix}$$

$$\begin{bmatrix} V_a(i) & 0 & 0 & 0 & V_a(j) & V_a(k) & V_a(l) & 0 \\ 0 & V_b(i') & V_b(j') & V_b(k') & 0 & 0 & 0 & V_b(l') \end{bmatrix}$$

$$\begin{bmatrix} 0 & V_a(i) & V_a(j) & V_a(k) & V_a(l) & V_a(m) & V_a(n) & 0 \\ V_b(i') & 0 & 0 & 0 & 0 & 0 & 0 & V_b(j') \end{bmatrix}$$

$$\begin{bmatrix} 0 & V_a(i) & V_a(j) & 0 & V_a(k) & V_a(l) & V_a(m) & 0 \\ V_b(i') & 0 & 0 & V_b(j') & 0 & 0 & 0 & V_b(k') \end{bmatrix}$$

$$\begin{bmatrix} 0 & V_a(i) & 0 & V_a(j) & V_a(k) & V_a(l) & V_a(m) & 0 \\ V_b(i') & 0 & V_b(j') & 0 & 0 & 0 & 0 & V_b(k') \end{bmatrix}$$

$$\begin{bmatrix} 0 & V_a(i) & 0 & 0 & V_a(j) & V_a(k) & V_a(l) & 0 \\ V_b(i') & 0 & V_b(j') & V_b(k') & 0 & 0 & 0 & V_b(l') \end{bmatrix}$$

$$\begin{bmatrix} 0 & 0 & V_a(i) & 0 & V_a(j) & V_a(k) & V_a(l) & 0 \\ V_b(i') & V_b(j') & 0 & 0 & 0 & 0 & 0 & V_b(k') \end{bmatrix}$$

$$\begin{bmatrix} 0 & 0 & V_a(i) & 0 & V_a(j) & V_a(k) & V_a(l) & 0 \\ V_b(i') & V_b(j') & 0 & V_b(k') & 0 & 0 & 0 & V_b(l') \end{bmatrix}$$

$$\begin{bmatrix} 0 & 0 & 0 & V_a(i) & V_a(j) & V_a(k) & V_a(l) & 0 \\ V_b(i') & V_b(j') & V_b(k') & 0 & 0 & 0 & 0 & V_b(l') \end{bmatrix}$$

$$\begin{bmatrix} 0 & 0 & 0 & 0 & V_a(i) & V_a(j) & V_a(k) & 0 \\ V_b(i') & V_b(j') & V_b(k') & V_b(l') & 0 & 0 & 0 & V_b(m') \end{bmatrix}$$

$$\begin{bmatrix} V_a(i) & V_a(j) & V_a(k) & V_a(l) & 0 & V_a(m) & V_a(n) & 0 \\ 0 & 0 & 0 & 0 & V_b(i') & 0 & 0 & V_b(j') \end{bmatrix}$$

$$\begin{bmatrix} V_a(i) & V_a(j) & V_a(k) & 0 & 0 & V_a(l) & V_a(m) & 0 \\ 0 & 0 & 0 & V_b(i') & V_b(j') & 0 & 0 & V_b(k') \end{bmatrix}$$

$$\begin{bmatrix} V_a(i) & V_a(j) & 0 & V_a(k) & 0 & V_a(l) & V_a(m) & 0 \\ 0 & 0 & V_b(i') & 0 & V_b(j') & 0 & 0 & V_b(k') \end{bmatrix}$$

$$\begin{bmatrix} V_a(i) & V_a(j) & 0 & 0 & 0 & V_a(k) & V_a(l) & 0 \\ 0 & 0 & V_b(i') & V_b(j') & V_b(k') & 0 & 0 & V_b(l') \end{bmatrix}$$

-continued $$\begin{bmatrix} V_a(i) & 0 & V_a(j) & V_a(k) & 0 & V_a(l) & V_a(m) & 0 \\ 0 & V_b(i') & 0 & 0 & V_b(j') & 0 & 0 & V_b(k') \end{bmatrix}$$

$$\begin{bmatrix} V_a(i) & 0 & V_a(j) & 0 & V_a(k) & 0 & V_a(l) & 0 \\ 0 & V_b(i') & 0 & V_b(j') & 0 & V_b(k') & 0 & V_b(l') \end{bmatrix}$$

$$\begin{bmatrix} V_a(i) & 0 & 0 & V_a(j) & 0 & V_a(k) & V_a(l) & 0 \\ 0 & V_b(i') & V_b(j') & 0 & V_b(k') & 0 & 0 & V_b(l') \end{bmatrix}$$

$$\begin{bmatrix} V_a(i) & 0 & 0 & 0 & 0 & V_a(j) & V_a(k) & 0 \\ 0 & V_b(i') & V_b(j') & V_b(k') & V_b(l') & 0 & 0 & V_b(m') \end{bmatrix}$$

$$\begin{bmatrix} 0 & V_a(i) & V_a(j) & V_a(k) & 0 & V_a(l) & V_a(m) & 0 \\ V_b(i') & 0 & 0 & 0 & V_b(j') & 0 & 0 & V_b(k') \end{bmatrix}$$

$$\begin{bmatrix} 0 & V_a(i) & V_a(j) & 0 & 0 & V_a(k) & V_a(l) & 0 \\ V_b(i') & 0 & 0 & V_b(j') & 0 & 0 & 0 & V_b(l') \end{bmatrix}$$

$$\begin{bmatrix} 0 & V_a(i) & 0 & V_a(j) & 0 & V_a(k) & V_a(l) & 0 \\ V_b(i') & 0 & V_b(j') & 0 & V_b(k') & 0 & 0 & V_b(l') \end{bmatrix}$$

$$\begin{bmatrix} 0 & V_a(i) & 0 & 0 & 0 & V_a(j) & V_a(k) & 0 \\ V_b(i') & 0 & V_b(j') & V_b(k') & V_b(l') & 0 & 0 & V_b(m') \end{bmatrix}$$

$$\begin{bmatrix} 0 & 0 & V_a(i) & V_a(j) & 0 & V_a(k) & V_a(l) & 0 \\ V_b(i') & V_b(j') & 0 & 0 & V_b(k') & 0 & 0 & V_b(l') \end{bmatrix}$$

$$\begin{bmatrix} 0 & 0 & V_a(i) & 0 & 0 & V_a(j) & V_a(k) & 0 \\ V_b(i') & V_b(j') & 0 & V_b(k') & V_b(l') & 0 & 0 & V_b(m') \end{bmatrix}$$

$$\begin{bmatrix} 0 & 0 & 0 & V_a(i) & 0 & V_a(j) & V_a(k) & 0 \\ V_b(i') & V_b(j') & V_b(k') & 0 & V_b(l') & 0 & 0 & V_b(m') \end{bmatrix}$$

$$\begin{bmatrix} 0 & 0 & 0 & 0 & 0 & V_a(i) & V_a(j) & 0 \\ V_b(i') & V_b(j') & V_b(k') & V_b(l') & V_b(m') & 0 & 0 & V_b(n') \end{bmatrix}$$

$$\begin{bmatrix} V_a(i) & V_a(j) & V_a(k) & V_a(l) & V_a(m) & 0 & V_a(n) & V_a(p) \\ 0 & 0 & 0 & 0 & 0 & V_b(i') & 0 & 0 \end{bmatrix}$$

$$\begin{bmatrix} V_a(i) & V_a(j) & V_a(k) & 0 & V_a(l) & 0 & V_a(m) & V_a(n) \\ 0 & 0 & 0 & V_b(i') & 0 & V_b(j') & 0 & 0 \end{bmatrix}$$

$$\begin{bmatrix} V_a(i) & V_a(j) & 0 & V_a(k) & V_a(l) & 0 & V_a(m) & V_a(n) \\ 0 & 0 & V_b(i') & 0 & 0 & V_b(j') & 0 & 0 \end{bmatrix}$$

$$\begin{bmatrix} V_a(i) & V_a(j) & 0 & 0 & V_a(k) & 0 & V_a(l) & V_a(m) \\ 0 & 0 & V_b(i') & V_b(j') & 0 & V_b(k') & 0 & 0 \end{bmatrix}$$

$$\begin{bmatrix} V_a(i) & 0 & V_a(j) & V_a(k) & V_a(l) & 0 & V_a(m) & V_a(n) \\ 0 & V_b(i') & 0 & 0 & 0 & V_b(j') & 0 & 0 \end{bmatrix}$$

$$\begin{bmatrix} V_a(i) & 0 & V_a(j) & 0 & V_a(k) & 0 & V_a(l) & V_a(m) \\ 0 & V_b(i') & 0 & V_b(j') & 0 & V_b(k') & 0 & 0 \end{bmatrix}$$

$$\begin{bmatrix} V_a(i) & 0 & 0 & V_a(j) & V_a(k) & 0 & V_a(l) & V_a(m) \\ 0 & V_b(i') & V_b(j') & 0 & 0 & V_b(k') & 0 & 0 \end{bmatrix}$$

$$\begin{bmatrix} V_a(i) & 0 & 0 & 0 & V_a(j) & 0 & V_a(k) & V_a(l) \\ 0 & V_b(i') & V_b(j') & V_b(k') & 0 & V_b(l') & 0 & 0 \end{bmatrix}$$

$$\begin{bmatrix} 0 & V_a(i) & V_a(j) & V_a(k) & V_a(l) & 0 & V_a(m) & V_a(n) \\ V_b(i') & 0 & 0 & 0 & 0 & V_b(j') & 0 & 0 \end{bmatrix}$$

$$\begin{bmatrix} 0 & V_a(i) & 0 & V_a(j) & V_a(k) & 0 & V_a(l) & V_a(m) \\ V_b(i') & 0 & 0 & V_b(j') & 0 & V_b(k') & 0 & 0 \end{bmatrix}$$

-continued $$\begin{bmatrix} 0 & V_a(i) & 0 & V_a(j) & V_a(k) & 0 & V_a(l) & V_a(m) \\ V_b(i') & 0 & V_b(j') & 0 & 0 & V_b(k') & 0 & 0 \end{bmatrix}$$

$$\begin{bmatrix} 0 & V_a(i) & 0 & 0 & V_a(j) & 0 & V_a(k) & V_a(l) \\ V_b(i') & 0 & V_b(j') & V_b(k') & 0 & V_b(l') & 0 & 0 \end{bmatrix}$$

$$\begin{bmatrix} 0 & 0 & V_a(i) & V_a(j) & V_a(k) & 0 & V_a(l) & V_a(m) \\ V_b(i') & V_b(j') & 0 & 0 & 0 & V_b(k') & 0 & 0 \end{bmatrix}$$

$$\begin{bmatrix} 0 & 0 & V_a(i) & 0 & V_a(j) & 0 & V_a(k) & V_a(l) \\ V_b(i') & V_b(j') & 0 & V_b(k') & 0 & V_b(l') & 0 & 0 \end{bmatrix}$$

$$\begin{bmatrix} 0 & 0 & 0 & V_a(i) & V_a(j) & 0 & V_a(k) & V_a(l) \\ V_b(i') & V_b(j') & V_b(k') & 0 & 0 & V_b(l') & 0 & 0 \end{bmatrix}$$

$$\begin{bmatrix} 0 & 0 & 0 & 0 & V_a(i) & 0 & V_a(j) & V_a(k) \\ V_b(i') & V_b(j') & V_b(k') & V_b(l') & 0 & V_b(m') & 0 & 0 \end{bmatrix}$$

$$\begin{bmatrix} V_a(i) & V_a(j) & V_a(k) & V_a(l) & 0 & 0 & V_a(m) & V_a(n) \\ 0 & 0 & 0 & 0 & V_b(i') & V_b(j') & 0 & 0 \end{bmatrix}$$

$$\begin{bmatrix} V_a(i) & V_a(j) & V_a(k) & 0 & 0 & 0 & V_a(l) & V_a(m) \\ 0 & 0 & 0 & V_b(i') & V_b(j') & V_b(k') & 0 & 0 \end{bmatrix}$$

$$\begin{bmatrix} V_a(i) & V_a(j) & 0 & V_a(k) & 0 & 0 & V_a(l) & V_a(m) \\ 0 & 0 & V_b(i') & 0 & V_b(j') & V_b(k') & 0 & 0 \end{bmatrix}$$

$$\begin{bmatrix} V_a(i) & V_a(j) & 0 & 0 & 0 & 0 & V_a(k) & V_a(l) \\ 0 & 0 & V_b(i') & V_b(j') & V_b(k') & V_b(l') & 0 & 0 \end{bmatrix}$$

$$\begin{bmatrix} V_a(i) & 0 & V_a(j) & V_a(k) & 0 & 0 & V_a(l) & V_a(m) \\ 0 & V_b(i') & 0 & 0 & V_b(j') & V_b(k') & 0 & 0 \end{bmatrix}$$

$$\begin{bmatrix} V_a(i) & 0 & V_a(j) & 0 & 0 & 0 & V_a(k) & V_a(l) \\ 0 & V_b(i') & 0 & V_b(j') & V_b(k') & V_b(l') & 0 & 0 \end{bmatrix}$$

$$\begin{bmatrix} V_a(i) & 0 & 0 & V_a(j) & 0 & 0 & V_a(k) & V_a(l) \\ 0 & V_b(i') & V_b(j') & 0 & V_b(k') & V_b(l') & 0 & 0 \end{bmatrix}$$

$$\begin{bmatrix} V_a(i) & 0 & 0 & 0 & 0 & 0 & V_a(j) & V_a(k) \\ 0 & V_b(i') & V_b(j') & V_b(k') & V_b(l') & V_b(m') & 0 & 0 \end{bmatrix}$$

$$\begin{bmatrix} 0 & V_a(i) & V_a(j) & V_a(k) & 0 & 0 & V_a(l) & V_a(m) \\ V_b(i') & 0 & 0 & 0 & V_b(j') & V_b(k') & 0 & 0 \end{bmatrix}$$

$$\begin{bmatrix} 0 & V_a(i) & V_a(j) & 0 & 0 & 0 & V_a(k) & V_a(l) \\ V_b(i') & 0 & 0 & V_b(j') & V_b(k') & V_b(l') & 0 & 0 \end{bmatrix}$$

$$\begin{bmatrix} 0 & V_a(i) & 0 & V_a(j) & 0 & 0 & V_a(k) & V_a(l) \\ V_b(i') & 0 & V_b(j') & 0 & V_b(k') & V_b(l') & 0 & 0 \end{bmatrix}$$

$$\begin{bmatrix} 0 & V_a(i) & 0 & 0 & 0 & 0 & V_a(j) & V_a(k) \\ V_b(i') & 0 & V_b(j') & V_b(k') & V_b(l') & V_b(m') & 0 & 0 \end{bmatrix}$$

$$\begin{bmatrix} 0 & 0 & V_a(i) & V_a(j) & 0 & 0 & V_a(k) & V_a(l) \\ V_b(i') & V_b(j') & 0 & 0 & V_b(k') & V_b(l') & 0 & 0 \end{bmatrix}$$

$$\begin{bmatrix} 0 & 0 & V_a(i) & 0 & 0 & 0 & V_a(j) & V_a(k) \\ V_b(i') & V_b(j') & 0 & V_b(k') & V_b(l') & V_b(m') & 0 & 0 \end{bmatrix}$$

$$\begin{bmatrix} 0 & 0 & 0 & V_a(i) & 0 & 0 & V_a(j) & V_a(k) \\ V_b(i') & V_b(j') & V_b(k') & 0 & V_b(l') & V_b(m') & 0 & 0 \end{bmatrix}$$

$$\begin{bmatrix} 0 & 0 & 0 & 0 & 0 & 0 & V_a(i) & V_a(j) \\ V_b(i') & V_b(j') & V_b(k') & V_b(l') & V_b(m') & V_b(k') & 0 & 0 \end{bmatrix}$$

$$\begin{bmatrix} V_a(i) & V_a(j) & V_a(k) & V_a(l) & V_a(m) & 0 & V_a(n) & 0 \\ 0 & 0 & 0 & 0 & 0 & V_b(i) & 0 & V_b(j) \end{bmatrix}$$

$$\begin{bmatrix} V_a(i) & V_a(j) & V_a(k) & 0 & V_a(l) & 0 & V_a(m) & 0 \\ 0 & 0 & 0 & V_b(i') & 0 & V_b(j') & 0 & V_b(k') \end{bmatrix}$$

$$\begin{bmatrix} V_a(i) & V_a(j) & 0 & V_a(k) & V_a(l) & 0 & V_a(m) & 0 \\ 0 & 0 & V_b(i') & 0 & 0 & V_b(j') & 0 & V_b(k') \end{bmatrix}$$

$$\begin{bmatrix} V_a(i) & V_a(j) & 0 & 0 & V_a(k) & 0 & V_a(l) & 0 \\ 0 & 0 & V_b(i') & V_b(j') & 0 & V_b(k') & 0 & V_b(l') \end{bmatrix}$$

$$\begin{bmatrix} V_a(i) & 0 & V_a(j) & V_a(k) & V_a(l) & 0 & V_a(m) & 0 \\ 0 & V_b(i') & 0 & 0 & 0 & V_b(j') & 0 & V_b(k') \end{bmatrix}$$

$$\begin{bmatrix} V_a(i) & 0 & V_a(j) & 0 & V_a(k) & 0 & V_a(l) & 0 \\ 0 & V_b(i') & 0 & V_b(j') & 0 & V_b(k') & 0 & V_b(l') \end{bmatrix}$$

$$\begin{bmatrix} V_a(i) & 0 & 0 & 0 & V_a(j) & 0 & V_a(k) & 0 \\ 0 & V_b(i') & V_b(j') & V_b(k') & 0 & V_b(l') & 0 & V_b(m') \end{bmatrix}$$

$$\begin{bmatrix} 0 & V_a(i) & V_a(j) & V_a(k) & V_a(l) & 0 & V_a(m) & 0 \\ V_b(i') & 0 & 0 & 0 & 0 & V_b(j') & 0 & V_b(k') \end{bmatrix}$$

$$\begin{bmatrix} 0 & V_a(i) & V_a(j) & 0 & V_a(k) & 0 & V_a(l) & 0 \\ V_b(i') & 0 & 0 & V_b(j') & 0 & V_b(k') & 0 & V_b(l') \end{bmatrix}$$

$$\begin{bmatrix} 0 & V_a(i) & 0 & V_a(j) & V_a(k) & 0 & V_a(l) & 0 \\ V_b(i') & 0 & V_b(j') & 0 & 0 & V_b(k') & 0 & V_b(l') \end{bmatrix}$$

$$\begin{bmatrix} 0 & V_a(i) & 0 & 0 & V_a(j) & 0 & V_a(k) & 0 \\ V_b(i') & 0 & V_b(j') & V_b(k') & 0 & V_b(l') & 0 & V_b(m') \end{bmatrix}$$

$$\begin{bmatrix} 0 & 0 & V_a(i) & V_a(j) & V_a(k) & 0 & V_a(l) & 0 \\ V_b(i') & V_b(j') & 0 & 0 & 0 & V_b(k') & 0 & V_b(l') \end{bmatrix}$$

$$\begin{bmatrix} 0 & 0 & V_a(i) & 0 & V_a(j) & 0 & V_a(k) & 0 \\ V_b(i') & V_b(j') & 0 & V_b(k') & 0 & V_b(l') & 0 & V_b(m') \end{bmatrix}$$

$$\begin{bmatrix} 0 & 0 & 0 & V_a(i) & V_a(j) & 0 & V_a(k) & 0 \\ V_b(i') & V_b(j') & V_b(k') & 0 & 0 & V_b(l') & 0 & V_b(m') \end{bmatrix}$$

$$\begin{bmatrix} 0 & 0 & 0 & 0 & V_a(i) & 0 & V_a(j) & 0 \\ V_b(i') & V_b(j') & V_b(k') & V_b(l') & 0 & V_b(m') & 0 & V_b(n') \end{bmatrix}$$

$$\begin{bmatrix} V_a(i) & V_a(j) & V_a(k) & V_a(l) & 0 & 0 & V_a(m) & 0 \\ 0 & 0 & 0 & 0 & V_b(i') & V_b(j') & 0 & V_b(k') \end{bmatrix}$$

$$\begin{bmatrix} V_a(i) & V_a(j) & V_a(k) & 0 & 0 & 0 & V_a(l) & 0 \\ 0 & 0 & 0 & V_b(i') & V_b(j') & V_b(l') & 0 & V_b(m') \end{bmatrix}$$

$$\begin{bmatrix} V_a(i) & V_a(j) & 0 & V_a(k) & 0 & 0 & V_a(l) & 0 \\ 0 & 0 & V_b(i') & 0 & V_b(j') & V_b(k') & 0 & V_b(l') \end{bmatrix}$$

$$\begin{bmatrix} V_a(i) & V_a(j) & 0 & 0 & 0 & 0 & V_a(k) & 0 \\ 0 & 0 & V_b(i') & V_b(j') & V_b(k') & V_b(l') & 0 & V_b(m') \end{bmatrix}$$

$$\begin{bmatrix} V_a(i) & 0 & V_a(j) & V_a(k) & 0 & 0 & V_a(l) & 0 \\ 0 & V_b(i') & 0 & 0 & V_b(j') & V_b(k') & 0 & V_b(l') \end{bmatrix}$$

$$\begin{bmatrix} V_a(i) & 0 & V_a(j) & 0 & 0 & 0 & V_a(k) & 0 \\ 0 & V_b(i') & 0 & V_b(j') & V_b(k') & V_b(l') & 0 & V_b(m') \end{bmatrix}$$

$$\begin{bmatrix} V_a(i) & 0 & 0 & V_a(j) & 0 & 0 & V_a(k) & 0 \\ 0 & V_b(i') & V_b(j') & 0 & V_b(k') & V_b(l') & 0 & V_b(m') \end{bmatrix}$$

$$\begin{bmatrix} V_a(i) & 0 & 0 & 0 & 0 & 0 & V_a(j) & 0 \\ 0 & V_b(i') & V_b(j') & V_b(k') & V_b(l') & V_b(m') & 0 & V_b(n') \end{bmatrix}$$

$$\begin{bmatrix} 0 & V_a(i) & V_a(j) & V_a(k) & 0 & 0 & V_a(l) & 0 \\ V_b(i') & 0 & 0 & 0 & V_b(j') & V_b(k') & 0 & V_b(l') \end{bmatrix}$$

-continued $$\begin{bmatrix} 0 & V_a(i) & V_a(j) & 0 & 0 & 0 & V_a(k) & 0 \\ V_b(i') & 0 & 0 & V_b(j') & V_b(k') & V_b(l') & 0 & V_b(m') \end{bmatrix}$$

$$\begin{bmatrix} 0 & V_a(i) & 0 & V_a(j) & 0 & 0 & V_a(k) & 0 \\ V_b(i') & 0 & V_b(j') & 0 & V_b(k') & V_b(l') & 0 & V_b(m') \end{bmatrix}$$

$$\begin{bmatrix} 0 & V_a(i) & 0 & 0 & 0 & 0 & V_a(j) & 0 \\ V_b(i') & 0 & V_b(j') & V_b(k') & V_b(l') & V_b(m') & 0 & V_b(n') \end{bmatrix}$$

$$\begin{bmatrix} 0 & 0 & V_a(i) & V_a(j) & 0 & 0 & V_a(k) & 0 \\ V_b(i') & V_b(j') & 0 & 0 & V_b(k') & V_b(l') & 0 & V_b(m') \end{bmatrix}$$

$$\begin{bmatrix} 0 & 0 & V_a(i) & 0 & 0 & 0 & V_a(j) & 0 \\ V_b(i') & V_b(j') & 0 & V_b(k') & V_b(l') & V_b(m') & 0 & V_b(n') \end{bmatrix}$$

$$\begin{bmatrix} 0 & 0 & 0 & V_a(i) & 0 & 0 & V_a(j) & 0 \\ V_b(i') & V_b(j') & V_b(k') & 0 & V_b(l') & V_b(m') & 0 & V_b(n') \end{bmatrix}$$

$$\begin{bmatrix} 0 & 0 & 0 & 0 & 0 & 0 & V_a(i) & 0 \\ V_b(i') & V_b(j') & V_b(k') & V_b(l') & V_b(m') & V_b(n') & 0 & V_b(p') \end{bmatrix}$$

$$\begin{bmatrix} V_a(i) & V_a(j) & V_a(k) & V_a(l) & V_a(m) & V_a(n) & 0 & V_a(p) \\ 0 & 0 & 0 & 0 & 0 & 0 & V_b(i') & 0 \end{bmatrix}$$

$$\begin{bmatrix} V_a(i) & V_a(j) & V_a(k) & 0 & V_a(l) & V_a(m) & 0 & V_a(n) \\ 0 & 0 & 0 & V_b(i') & 0 & 0 & V_b(j') & 0 \end{bmatrix}$$

$$\begin{bmatrix} V_a(i) & V_a(j) & V_a(k) & 0 & V_a(l) & V_a(m) & 0 & V_a(n) \\ 0 & 0 & 0 & V_b(i') & 0 & 0 & V_b(j') & 0 \end{bmatrix}$$

$$\begin{bmatrix} V_a(i) & V_a(j) & 0 & 0 & V_a(k) & V_a(l) & 0 & V_a(m) \\ 0 & 0 & V_b(i') & V_b(j') & 0 & 0 & V_b(k') & 0 \end{bmatrix}$$

$$\begin{bmatrix} V_a(i) & 0 & V_a(j) & V_a(k) & V_a(l) & V_a(m) & 0 & V_a(n) \\ 0 & V_b(i') & 0 & 0 & 0 & 0 & V_b(j') & 0 \end{bmatrix}$$

$$\begin{bmatrix} V_a(i) & 0 & V_a(j) & 0 & V_a(k) & V_a(l) & 0 & V_a(m) \\ 0 & V_b(i') & 0 & V_b(j') & 0 & 0 & V_b(k') & 0 \end{bmatrix}$$

$$\begin{bmatrix} V_a(i) & 0 & 0 & V_a(j) & V_a(k) & V_a(l) & 0 & V_a(m) \\ 0 & V_b(i') & V_b(j') & 0 & 0 & 0 & V_b(k') & 0 \end{bmatrix}$$

$$\begin{bmatrix} V_a(i) & 0 & 0 & 0 & V_a(j) & V_a(k) & 0 & V_a(l) \\ 0 & V_b(i') & V_b(j') & V_b(k') & 0 & 0 & V_b(l') & 0 \end{bmatrix}$$

$$\begin{bmatrix} 0 & V_a(i) & V_a(j) & V_a(k) & V_a(l) & V_a(m) & 0 & V_a(n) \\ V_b(i') & 0 & 0 & 0 & 0 & 0 & V_b(j') & 0 \end{bmatrix}$$

$$\begin{bmatrix} 0 & V_a(i) & V_a(j) & 0 & V_a(k) & V_a(l) & 0 & V_a(m) \\ V_b(i') & 0 & 0 & V_b(j') & 0 & 0 & V_b(k') & 0 \end{bmatrix}$$

$$\begin{bmatrix} 0 & V_a(i) & 0 & V_a(j) & V_a(k) & V_a(l) & 0 & V_a(m) \\ V_b(i') & 0 & V_b(j') & 0 & 0 & 0 & V_b(k') & 0 \end{bmatrix}$$

$$\begin{bmatrix} 0 & V_a(i) & 0 & 0 & V_a(j) & V_a(k) & 0 & V_a(l) \\ V_b(i') & 0 & V_b(j') & V_b(k') & 0 & 0 & V_b(l') & 0 \end{bmatrix}$$

$$\begin{bmatrix} 0 & 0 & V_a(i) & 0 & V_a(j) & V_a(k) & 0 & V_a(l) \\ V_b(i') & V_b(j') & 0 & 0 & 0 & 0 & V_b(l') & 0 \end{bmatrix}$$

$$\begin{bmatrix} 0 & 0 & 0 & V_a(i) & V_a(j) & V_a(k) & 0 & V_a(l) \\ V_b(i') & V_b(j') & V_b(k') & 0 & 0 & 0 & V_b(l') & 0 \end{bmatrix}$$

-continued $$\begin{bmatrix} 0 & 0 & 0 & 0 & V_a(i) & V_a(j) & 0 & V_a(k) \\ V_b(i') & V_b(j') & V_b(k') & V_b(l') & 0 & 0 & V_b(m') & 0 \end{bmatrix}$$

$$\begin{bmatrix} V_a(i) & V_a(j) & V_a(k) & V_a(l) & V_a(m) & 0 & V_a(n) & 0 \\ 0 & 0 & 0 & 0 & 0 & V_b(j') & 0 & V_b(j') \end{bmatrix}$$

$$\begin{bmatrix} V_a(i) & V_a(j) & V_a(k) & 0 & V_a(l) & 0 & V_a(m) & 0 \\ 0 & 0 & 0 & V_b(i') & V_b(j') & 0 & V_b(k') & 0 \end{bmatrix}$$

$$\begin{bmatrix} V_a(i) & V_a(j) & 0 & V_a(k) & 0 & V_a(l) & 0 & V_a(m) \\ 0 & 0 & V_b(i') & 0 & V_b(j') & 0 & V_b(k') & 0 \end{bmatrix}$$

$$\begin{bmatrix} V_a(i) & V_a(j) & 0 & 0 & 0 & V_a(k) & 0 & V_a(l) \\ 0 & 0 & V_b(i') & V_b(j') & V_b(k') & 0 & V_b(l') & 0 \end{bmatrix}$$

$$\begin{bmatrix} V_a(i) & 0 & V_a(j) & V_a(k) & 0 & V_a(l) & 0 & V_a(m) \\ 0 & V_b(i') & 0 & 0 & V_b(j') & 0 & V_b(k') & 0 \end{bmatrix}$$

$$\begin{bmatrix} V_a(i) & 0 & V_a(j) & 0 & V_a(k) & 0 & V_a(l) & 0 \\ 0 & V_b(i') & 0 & V_b(j') & 0 & V_b(k') & 0 & V_b(l') \end{bmatrix}$$

$$\begin{bmatrix} V_a(i) & 0 & 0 & V_a(j) & 0 & V_a(k) & 0 & V_a(l) \\ 0 & V_b(i') & V_b(j') & 0 & V_b(k') & 0 & V_b(l') & 0 \end{bmatrix}$$

$$\begin{bmatrix} V_a(i) & 0 & 0 & 0 & V_a(j) & 0 & V_a(k) & 0 \\ 0 & V_b(i') & V_b(j') & V_b(k') & 0 & V_b(l') & 0 & V_b(m') \end{bmatrix}$$

$$\begin{bmatrix} V_a(i) & 0 & 0 & 0 & 0 & V_a(j) & 0 & V_a(k) \\ 0 & V_b(i') & V_b(j') & V_b(k') & V_b(l') & 0 & V_b(m') & 0 \end{bmatrix}$$

$$\begin{bmatrix} 0 & V_a(i) & 0 & V_a(j) & 0 & V_a(k) & 0 & V_a(l) \\ V_b(i') & 0 & V_b(j') & 0 & V_b(k') & 0 & V_b(l') & 0 \end{bmatrix}$$

$$\begin{bmatrix} 0 & V_a(i) & 0 & 0 & V_a(j) & 0 & V_a(k) & 0 \\ V_b(i') & 0 & V_b(j') & V_b(k') & 0 & V_b(l') & 0 & V_b(m') \end{bmatrix}$$

$$\begin{bmatrix} 0 & V_a(i) & 0 & 0 & 0 & V_a(j) & 0 & V_a(k) \\ V_b(i') & 0 & V_b(j') & V_b(k') & V_b(l') & 0 & V_b(m') & 0 \end{bmatrix}$$

$$\begin{bmatrix} 0 & 0 & V_a(i) & V_a(j) & 0 & V_a(k) & 0 & V_a(l) \\ V_b(i') & V_b(j') & 0 & 0 & V_b(k') & 0 & V_b(l') & 0 \end{bmatrix}$$

$$\begin{bmatrix} 0 & 0 & V_a(i) & 0 & V_a(j) & 0 & V_a(k) & 0 \\ V_b(i') & V_b(j') & 0 & V_b(k') & 0 & V_b(l') & 0 & V_b(m') \end{bmatrix}$$

$$\begin{bmatrix} 0 & 0 & 0 & V_a(i) & 0 & V_a(j) & 0 & V_a(k) \\ V_b(i') & V_b(j') & V_b(k') & 0 & V_b(l') & 0 & V_b(m') & 0 \end{bmatrix}$$

$$\begin{bmatrix} 0 & 0 & 0 & 0 & 0 & V_a(i) & 0 & V_a(j) \\ V_b(i') & V_b(j') & V_b(k') & V_b(l') & V_b(m') & 0 & V_b(n') & 0 \end{bmatrix}$$

$$\begin{bmatrix} V_a(i) & V_a(j) & V_a(k) & V_a(l) & V_a(m) & V_a(n) & 0 & 0 \\ 0 & 0 & 0 & 0 & 0 & 0 & V_b(i') & V_b(j') \end{bmatrix}$$

$$\begin{bmatrix} V_a(i) & V_a(j) & V_a(k) & 0 & V_a(l) & V_a(m) & 0 & 0 \\ 0 & 0 & 0 & V_b(i') & 0 & 0 & V_b(j') & V_b(k') \end{bmatrix}$$

$$\begin{bmatrix} V_a(i) & V_a(j) & 0 & V_a(k) & V_a(l) & V_a(m) & 0 & 0 \\ 0 & 0 & V_b(i') & 0 & 0 & 0 & V_b(j') & V_b(k') \end{bmatrix}$$

$$\begin{bmatrix} V_a(i) & V_a(j) & 0 & V_a(k) & V_a(l) & 0 & 0 & 0 \\ 0 & 0 & V_b(i') & V_b(j') & 0 & 0 & V_b(k') & V_b(l') \end{bmatrix}$$

$$\begin{bmatrix} V_a(i) & 0 & V_a(j) & V_a(k) & V_a(l) & V_a(m) & 0 & 0 \\ 0 & V_b(i') & 0 & 0 & 0 & 0 & V_b(j') & V_b(k') \end{bmatrix}$$

-continued $$\begin{bmatrix} V_a(i) & 0 & V_a(j) & 0 & V_a(k) & V_a(l) & 0 & 0 \\ 0 & V_b(i') & 0 & V_b(j') & 0 & 0 & V_b(k') & V_b(l') \end{bmatrix}$$

$$\begin{bmatrix} V_a(i) & 0 & 0 & V_a(j) & V_a(k) & V_a(l) & 0 & 0 \\ 0 & V_b(i') & V_b(j') & 0 & 0 & 0 & V_b(k') & V_b(l') \end{bmatrix}$$

$$\begin{bmatrix} V_a(i) & 0 & 0 & 0 & V_a(j) & V_a(k) & 0 & 0 \\ 0 & V_b(i') & V_b(j') & 0 & 0 & 0 & V_b(l') & V_b(m') \end{bmatrix}$$

$$\begin{bmatrix} 0 & V_a(i) & V_a(j) & V_a(k) & V_a(l) & V_a(m) & 0 & 0 \\ V_b(i') & 0 & 0 & 0 & 0 & 0 & V_b(j') & V_b(k') \end{bmatrix}$$

$$\begin{bmatrix} 0 & V_a(i) & V_a(j) & 0 & V_a(k) & V_a(l) & 0 & 0 \\ V_b(i') & 0 & 0 & V_b(j') & 0 & 0 & V_b(k') & V_b(l') \end{bmatrix}$$

$$\begin{bmatrix} 0 & V_a(i) & 0 & V_a(j) & V_a(k) & V_a(l) & 0 & 0 \\ V_b(i') & 0 & V_b(j') & 0 & 0 & 0 & V_b(k') & V_b(l') \end{bmatrix}$$

$$\begin{bmatrix} 0 & V_a(i) & 0 & 0 & V_a(j) & V_a(k) & 0 & 0 \\ V_b(i') & 0 & V_b(j') & V_b(k') & 0 & 0 & V_b(l') & V_b(m') \end{bmatrix}$$

$$\begin{bmatrix} 0 & 0 & V_a(i) & V_a(j) & V_a(k) & V_a(l) & 0 & 0 \\ V_b(i') & V_b(j') & 0 & 0 & 0 & 0 & V_b(k') & V_b(l') \end{bmatrix}$$

$$\begin{bmatrix} 0 & 0 & V_a(i) & 0 & V_a(j) & V_a(k) & 0 & 0 \\ V_b(i') & V_b(j') & 0 & V_b(k') & 0 & 0 & V_b(l') & V_b(m') \end{bmatrix}$$

$$\begin{bmatrix} 0 & 0 & 0 & 0 & V_a(i) & V_a(j) & 0 & 0 \\ V_b(i') & V_b(j') & V_b(k') & V_b(l') & 0 & 0 & V_b(m') & V_b(n') \end{bmatrix}$$

$$\begin{bmatrix} V_a(i) & V_a(j) & V_a(k) & V_a(l) & 0 & V_a(m) & 0 & 0 \\ 0 & 0 & 0 & 0 & V_b(i') & 0 & V_b(j') & V_b(k') \end{bmatrix}$$

$$\begin{bmatrix} V_a(i) & V_a(j) & V_a(k) & 0 & 0 & V_a(l) & 0 & 0 \\ 0 & 0 & 0 & V_b(i') & V_b(j') & 0 & V_b(k') & V_b(l') \end{bmatrix}$$

$$\begin{bmatrix} V_a(i) & V_a(j) & 0 & V_a(k) & 0 & V_a(l) & 0 & 0 \\ 0 & 0 & V_b(i') & 0 & V_b(j') & 0 & V_b(k') & V_b(l') \end{bmatrix}$$

$$\begin{bmatrix} V_a(i) & V_a(j) & 0 & 0 & 0 & V_a(k) & 0 & 0 \\ 0 & 0 & V_b(i') & V_b(j') & V_b(k') & 0 & V_b(l') & V_b(m') \end{bmatrix}$$

$$\begin{bmatrix} V_a(i) & 0 & V_a(j) & V_a(k) & 0 & V_a(l) & 0 & 0 \\ 0 & V_b(i') & 0 & 0 & V_b(j') & 0 & V_b(k') & V_b(l') \end{bmatrix}$$

$$\begin{bmatrix} V_a(i) & 0 & V_a(j) & 0 & 0 & V_a(k) & 0 & 0 \\ 0 & V_b(i') & 0 & V_b(j') & V_b(k') & 0 & V_b(l') & V_b(m') \end{bmatrix}$$

$$\begin{bmatrix} V_a(i) & 0 & 0 & V_a(j) & 0 & V_a(k) & 0 & 0 \\ 0 & V_b(i') & V_b(j') & 0 & V_b(k') & 0 & V_b(l') & V_b(m') \end{bmatrix}$$

$$\begin{bmatrix} V_a(i) & 0 & 0 & 0 & 0 & V_a(j) & 0 & 0 \\ 0 & V_b(i') & V_b(j') & V_b(k') & V_b(l') & 0 & V_b(m') & V_b(n') \end{bmatrix}$$

$$\begin{bmatrix} 0 & V_a(i) & V_a(j) & V_a(k) & 0 & V_a(l) & 0 & 0 \\ V_b(i') & 0 & 0 & 0 & V_b(j') & 0 & V_b(k') & V_b(l') \end{bmatrix}$$

$$\begin{bmatrix} 0 & V_a(i) & V_a(j) & 0 & 0 & V_a(k) & 0 & 0 \\ V_b(i') & 0 & 0 & V_b(j') & V_b(k') & 0 & V_b(l') & V_b(m') \end{bmatrix}$$

$$\begin{bmatrix} 0 & V_a(i) & 0 & V_a(j) & 0 & V_a(k) & 0 & 0 \\ V_b(i') & 0 & V_b(j') & 0 & V_b(k') & 0 & V_b(l') & V_b(m') \end{bmatrix}$$

$$\begin{bmatrix} 0 & V_a(i) & 0 & 0 & 0 & V_a(j) & 0 & 0 \\ V_b(i') & 0 & V_b(j') & V_b(k') & V_b(l') & 0 & V_b(m') & V_b(n') \end{bmatrix}$$

$$\begin{bmatrix} 0 & 0 & V_a(i) & V_a(j) & V_a(k) & 0 & 0 & 0 \\ V_b(i') & V_b(j') & 0 & 0 & 0 & V_b(k') & V_b(l') & 0 \end{bmatrix}$$

$$\begin{bmatrix} 0 & 0 & V_a(i) & 0 & V_a(j) & 0 & 0 & 0 \\ V_b(i') & V_b(j') & 0 & V_b(k') & V_b(l') & 0 & V_b(m') & V_b(n') \end{bmatrix}$$

$$\begin{bmatrix} 0 & 0 & 0 & V_a(i) & 0 & V_a(j) & 0 & 0 \\ V_b(i') & V_b(j') & V_b(k') & 0 & V_b(l') & 0 & V_b(m') & V_b(n') \end{bmatrix}$$

$$\begin{bmatrix} 0 & 0 & 0 & 0 & 0 & V_a(i) & 0 & 0 \\ V_b(i') & V_b(j') & V_b(k') & V_b(l') & V_b(m') & 0 & V_b(n') & V_b(p') \end{bmatrix}$$

$$\begin{bmatrix} V_a(i) & V_a(j) & V_a(k) & V_a(l) & V_a(m) & 0 & 0 & V_a(n) \\ 0 & 0 & 0 & 0 & 0 & V_b(i') & V_b(j') & 0 \end{bmatrix}$$

$$\begin{bmatrix} V_a(i) & V_a(j) & V_a(k) & 0 & V_a(l) & 0 & 0 & V_a(m) \\ 0 & 0 & 0 & V_b(i') & 0 & V_b(j') & V_b(k') & 0 \end{bmatrix}$$

$$\begin{bmatrix} V_a(i) & V_a(j) & 0 & V_a(k) & V_a(l) & 0 & 0 & V_a(m) \\ 0 & 0 & V_b(i') & 0 & 0 & V_b(j') & V_b(k') & 0 \end{bmatrix}$$

$$\begin{bmatrix} V_a(i) & V_a(j) & 0 & 0 & V_a(k) & 0 & 0 & V_a(l) \\ 0 & 0 & V_b(i') & V_b(j') & 0 & V_b(k') & V_b(l') & 0 \end{bmatrix}$$

$$\begin{bmatrix} V_a(i) & V_a(j) & 0 & 0 & V_a(k) & V_a(l) & 0 & V_a(m) \\ 0 & 0 & V_b(i') & 0 & 0 & 0 & V_b(j') & V_b(k') & 0 \end{bmatrix}$$

$$\begin{bmatrix} V_a(i) & 0 & V_a(j) & V_a(k) & 0 & 0 & 0 & V_a(l) \\ 0 & V_b(i') & 0 & V_b(j') & 0 & V_b(k') & V_b(l') & 0 \end{bmatrix}$$

$$\begin{bmatrix} V_a(i) & 0 & V_a(j) & 0 & V_a(k) & 0 & 0 & V_a(l) \\ 0 & V_b(i') & 0 & V_b(j') & 0 & V_b(k') & V_b(l') & 0 \end{bmatrix}$$

$$\begin{bmatrix} V_a(i) & 0 & 0 & V_a(j) & 0 & 0 & 0 & V_a(k) \\ 0 & V_b(i') & V_b(j') & 0 & V_b(k') & 0 & V_b(l') & V_b(m') & 0 \end{bmatrix}$$

$$\begin{bmatrix} 0 & V_a(i) & V_a(j) & V_a(k) & V_a(l) & 0 & 0 & V_a(m) \\ V_b(i') & 0 & 0 & 0 & 0 & V_b(j') & V_b(k') & 0 \end{bmatrix}$$

$$\begin{bmatrix} 0 & V_a(i) & V_a(j) & 0 & V_a(k) & 0 & 0 & V_a(l) \\ V_b(i') & 0 & 0 & V_b(j') & 0 & V_b(k') & V_b(l') & 0 \end{bmatrix}$$

$$\begin{bmatrix} 0 & V_a(i) & V_a(j) & 0 & V_a(k) & 0 & 0 & V_a(l) \\ V_b(i') & 0 & 0 & V_b(j') & 0 & V_b(k') & V_b(l') & 0 \end{bmatrix}$$

$$\begin{bmatrix} 0 & V_a(i) & 0 & V_a(j) & 0 & 0 & 0 & V_a(k) \\ V_b(i') & 0 & V_b(j') & 0 & V_b(k') & 0 & V_b(l') & V_b(m') & 0 \end{bmatrix}$$

$$\begin{bmatrix} 0 & 0 & V_a(i) & V_a(j) & V_a(k) & 0 & 0 & V_a(l) \\ V_b(i') & V_b(j') & 0 & 0 & 0 & V_b(k') & V_b(l') & 0 \end{bmatrix}$$

$$\begin{bmatrix} 0 & 0 & V_a(i) & 0 & V_a(j) & 0 & 0 & V_a(k) \\ V_b(i') & V_b(j') & 0 & V_b(k') & 0 & V_b(l') & V_b(m') & 0 \end{bmatrix}$$

$$\begin{bmatrix} 0 & 0 & 0 & V_a(i) & V_a(j) & 0 & 0 & V_a(k) \\ V_b(i') & V_b(j') & V_b(k') & 0 & 0 & V_b(l') & V_b(m') & 0 \end{bmatrix}$$

$$\begin{bmatrix} 0 & 0 & 0 & 0 & V_a(i) & 0 & 0 & V_a(j) \\ V_b(i') & V_b(j') & V_b(k') & V_b(l') & 0 & V_b(m') & V_b(n') & 0 \end{bmatrix}$$

$$\begin{bmatrix} V_a(i) & V_a(j) & V_a(k) & V_a(l) & 0 & 0 & 0 & V_a(m) \\ 0 & 0 & 0 & 0 & V_b(i') & V_b(j') & V_b(k') & 0 \end{bmatrix}$$

$$\begin{bmatrix} V_a(i) & V_a(j) & V_a(k) & 0 & 0 & 0 & 0 & V_a(l) \\ 0 & 0 & 0 & V_b(i') & V_b(j') & V_b(k') & V_b(l') & 0 \end{bmatrix}$$

$$\begin{bmatrix} V_a(i) & V_a(j) & 0 & V_a(k) & 0 & 0 & 0 & V_a(l) \\ 0 & 0 & V_b(i') & 0 & V_b(j') & V_b(k') & V_b(l') & 0 \end{bmatrix}$$

$$\begin{bmatrix} V_a(i) & V_a(j) & 0 & 0 & 0 & 0 & 0 & V_a(k) \\ 0 & 0 & V_b(i') & V_b(j') & V_b(k') & V_b(l') & V_b(m') & 0 \end{bmatrix}$$

$$\begin{bmatrix} V_a(i) & 0 & V_a(j) & V_a(k) & 0 & 0 & 0 & V_a(l) \\ 0 & V_b(i') & 0 & 0 & V_b(j') & V_b(k') & V_b(l') & 0 \end{bmatrix}$$

-continued $$\begin{bmatrix} V_a(i) & 0 & V_a(j) & 0 & 0 & 0 & 0 & V_a(k) \\ 0 & V_b(i') & 0 & V_b(j') & V_b(k') & V_b(l') & V_b(m') & 0 \end{bmatrix}$$

$$\begin{bmatrix} V_a(i) & 0 & 0 & V_a(j) & 0 & 0 & 0 & V_a(k) \\ 0 & V_b(i') & V_b(j') & 0 & V_b(k') & V_b(l') & V_b(m') & 0 \end{bmatrix}$$

$$\begin{bmatrix} V_a(i) & 0 & 0 & 0 & 0 & 0 & 0 & V_a(j) \\ 0 & V_b(i') & V_b(j') & V_b(k') & V_b(l') & V_b(m') & V_b(n') & 0 \end{bmatrix}$$

$$\begin{bmatrix} 0 & V_a(i) & V_a(j) & V_a(k) & 0 & 0 & 0 & V_a(l) \\ V_b(i') & 0 & 0 & 0 & V_b(j') & V_b(k') & V_b(l') & 0 \end{bmatrix}$$

$$\begin{bmatrix} 0 & V_a(i) & V_a(j) & 0 & 0 & 0 & 0 & V_a(k) \\ V_b(i') & 0 & 0 & V_b(j') & V_b(k') & V_b(l') & V_b(m') & 0 \end{bmatrix}$$

$$\begin{bmatrix} 0 & V_a(i) & 0 & V_a(j) & 0 & 0 & 0 & V_a(k) \\ V_b(i') & 0 & V_b(j') & 0 & V_b(k') & V_b(l') & V_b(m') & 0 \end{bmatrix}$$

$$\begin{bmatrix} 0 & V_a(i) & 0 & 0 & 0 & 0 & 0 & V_a(j) \\ V_b(i') & 0 & V_b(j') & V_b(k') & V_b(l') & V_b(m') & V_b(n') & 0 \end{bmatrix}$$

$$\begin{bmatrix} 0 & 0 & V_a(i) & V_a(j) & 0 & 0 & 0 & V_a(k) \\ V_b(i') & V_b(j') & 0 & 0 & V_b(k') & V_b(l') & V_b(m') & 0 \end{bmatrix}$$

$$\begin{bmatrix} 0 & 0 & V_a(i) & 0 & 0 & 0 & 0 & V_a(j) \\ V_b(i') & V_b(j') & 0 & V_b(k') & V_b(l') & V_b(m') & V_b(n') & 0 \end{bmatrix}$$

$$\begin{bmatrix} 0 & 0 & 0 & V_a(i) & 0 & 0 & 0 & V_a(j) \\ V_b(i') & V_b(j') & V_b(k') & 0 & V_b(l') & V_b(m') & V_b(n') & 0 \end{bmatrix}$$

$$\begin{bmatrix} 0 & 0 & 0 & 0 & 0 & 0 & 0 & V_a(i) \\ V_b(i') & V_b(j') & V_b(k') & V_b(l') & V_b(m') & V_b(n') & V_b(p') & 0 \end{bmatrix}$$

$$\begin{bmatrix} V_a(i) & V_a(j) & V_a(k) & V_a(l) & V_a(m) & 0 & 0 & 0 \\ 0 & 0 & 0 & 0 & 0 & V_b(i') & V_b(j') & V_b(k') \end{bmatrix}$$

$$\begin{bmatrix} V_a(i) & V_a(j) & V_a(k) & 0 & V_a(l) & 0 & 0 & 0 \\ 0 & 0 & 0 & V_b(i') & 0 & V_b(j') & V_b(k') & V_b(l') \end{bmatrix}$$

$$\begin{bmatrix} V_a(i) & V_a(j) & 0 & V_a(k) & V_a(l) & 0 & 0 & 0 \\ 0 & 0 & V_b(i') & 0 & 0 & V_b(j') & V_b(k') & V_b(l') \end{bmatrix}$$

$$\begin{bmatrix} V_a(i) & V_a(j) & 0 & 0 & V_a(k) & 0 & 0 & 0 \\ 0 & 0 & V_b(i') & V_b(j') & 0 & V_b(k') & V_b(l') & V_b(m') \end{bmatrix}$$

$$\begin{bmatrix} V_a(i) & 0 & V_a(j) & V_a(k) & V_a(l) & 0 & 0 & 0 \\ 0 & V_b(i') & 0 & 0 & 0 & V_b(j') & V_b(k') & V_b(l') \end{bmatrix}$$

$$\begin{bmatrix} V_a(i) & 0 & V_a(j) & 0 & V_a(k) & 0 & 0 & 0 \\ 0 & V_b(i') & 0 & V_b(j') & 0 & V_b(k') & V_b(l') & V_b(m') \end{bmatrix}$$

$$\begin{bmatrix} V_a(i) & 0 & 0 & V_a(j) & V_a(k) & 0 & 0 & 0 \\ 0 & V_b(i') & V_b(j') & 0 & 0 & V_b(k') & V_b(l') & V_b(m') \end{bmatrix}$$

$$\begin{bmatrix} V_a(i) & 0 & 0 & 0 & V_a(j) & 0 & 0 & 0 \\ 0 & V_b(i') & V_b(j') & V_b(k') & 0 & V_b(l') & V_b(m') & V_b(n') \end{bmatrix}$$

$$\begin{bmatrix} 0 & V_a(i) & V_a(j) & V_a(k) & V_a(l) & 0 & 0 & 0 \\ V_b(i') & 0 & 0 & 0 & 0 & V_b(j') & V_b(k') & V_b(l') \end{bmatrix}$$

$$\begin{bmatrix} 0 & V_a(i) & V_a(j) & 0 & V_a(k) & 0 & 0 & 0 \\ V_b(i') & 0 & 0 & V_b(j') & 0 & V_b(k') & V_b(l') & V_b(m') \end{bmatrix}$$

$$\begin{bmatrix} 0 & V_a(i) & 0 & V_a(j) & V_a(k) & 0 & 0 & 0 \\ V_b(i') & 0 & V_b(j') & 0 & 0 & V_b(k') & V_b(l') & V_b(m') \end{bmatrix}$$

$$\begin{bmatrix} 0 & V_a(i) & 0 & 0 & V_a(j) & 0 & 0 & 0 \\ V_b(i') & 0 & V_b(j') & V_b(k') & 0 & V_b(l') & V_b(m') & V_b(n') \end{bmatrix}$$

$$\begin{bmatrix} 0 & 0 & V_a(i) & V_a(j) & V_a(k) & 0 & 0 & 0 \\ V_b(i') & V_b(j') & 0 & 0 & 0 & V_b(k') & V_b(l') & V_b(m') \end{bmatrix}$$

$$\begin{bmatrix} 0 & 0 & V_a(i) & 0 & V_a(j) & 0 & 0 & 0 \\ V_b(i') & V_b(j') & 0 & V_b(k') & 0 & V_b(l') & V_b(m') & V_b(n') \end{bmatrix}$$

-continued $$\begin{bmatrix} 0 & 0 & V_a(i) & V_a(j) & V_a(k) & 0 & 0 & 0 \\ V_b(i') & V_b(j') & 0 & 0 & 0 & V_b(k') & V_b(l') & V_b(m') \end{bmatrix}$$

$$\begin{bmatrix} 0 & 0 & V_a(i) & 0 & V_a(j) & 0 & 0 & 0 \\ V_b(i') & V_b(j') & 0 & V_b(k') & 0 & V_b(l') & V_b(m') & V_b(n') \end{bmatrix}$$

$$\begin{bmatrix} 0 & 0 & 0 & V_a(i) & V_a(j) & 0 & 0 & 0 \\ V_b(i') & V_b(j') & V_b(k') & 0 & 0 & V_b(l') & V_b(m') & V_b(n') \end{bmatrix}$$

$$\begin{bmatrix} 0 & 0 & 0 & 0 & V_a(i) & 0 & 0 & 0 \\ V_b(i') & V_b(j') & V_b(k') & V_b(l') & 0 & V_b(m') & V_b(n') & V_b(p') \end{bmatrix}$$

$$\begin{bmatrix} V_a(i) & V_a(j) & V_a(k) & V_a(l) & 0 & 0 & 0 & 0 \\ 0 & 0 & 0 & 0 & V_b(i') & V_b(j') & V_b(k') & V_b(l') \end{bmatrix}$$

$$\begin{bmatrix} V_a(i) & V_a(j) & V_a(k) & 0 & 0 & 0 & 0 & 0 \\ 0 & 0 & 0 & V_b(i') & V_b(j') & V_b(k') & V_b(l') & V_b(m') \end{bmatrix}$$

$$\begin{bmatrix} V_a(i) & V_a(j) & 0 & V_a(k) & 0 & 0 & 0 & 0 \\ 0 & 0 & V_b(i') & 0 & V_b(j') & V_b(k') & V_b(l') & V_b(m') \end{bmatrix}$$

$$\begin{bmatrix} V_a(i) & V_a(j) & 0 & 0 & 0 & 0 & 0 & 0 \\ 0 & 0 & V_b(i') & V_b(j') & V_b(k') & V_b(l') & V_b(m') & V_b(n') \end{bmatrix}$$

$$\begin{bmatrix} V_a(i) & 0 & V_a(j) & V_a(k) & 0 & 0 & 0 & 0 \\ 0 & V_b(i') & 0 & 0 & V_b(j') & V_b(k') & V_b(l') & V_b(m') \end{bmatrix}$$

$$\begin{bmatrix} V_a(i) & 0 & V_a(j) & 0 & 0 & 0 & 0 & 0 \\ 0 & V_b(i') & 0 & V_b(j') & V_b(k') & V_b(l') & V_b(m') & V_b(n') \end{bmatrix}$$

$$\begin{bmatrix} V_a(i) & 0 & 0 & V_a(j) & 0 & 0 & 0 & 0 \\ 0 & V_b(i') & V_b(j') & 0 & V_b(k') & V_b(l') & V_b(m') & V_b(n') \end{bmatrix}$$

$$\begin{bmatrix} V_a(i) & 0 & 0 & 0 & 0 & 0 & 0 & 0 \\ 0 & V_b(i') & V_b(j') & V_b(k') & V_b(l') & V_b(m') & V_b(n') & V_b(p') \end{bmatrix}$$

$$\begin{bmatrix} 0 & V_a(i) & V_a(j) & V_a(k) & 0 & 0 & 0 & 0 \\ V_b(i') & 0 & 0 & 0 & V_b(j') & V_b(k') & V_b(l') & V_b(m') \end{bmatrix}$$

$$\begin{bmatrix} 0 & V_a(i) & V_a(j) & 0 & 0 & 0 & 0 & 0 \\ V_b(i') & 0 & 0 & V_b(j') & V_b(k') & V_b(l') & V_b(m') & V_b(n') \end{bmatrix}$$

$$\begin{bmatrix} 0 & V_a(i) & 0 & V_a(j) & 0 & 0 & 0 & 0 \\ V_b(i') & 0 & V_b(j') & 0 & V_b(k') & V_b(l') & V_b(m') & V_b(n') \end{bmatrix}$$

$$\begin{bmatrix} 0 & V_a(i) & 0 & 0 & 0 & 0 & 0 & 0 \\ V_b(i') & 0 & V_b(j') & V_b(k') & V_b(l') & V_b(m') & V_b(n') & V_b(p') \end{bmatrix}$$

$$\begin{bmatrix} 0 & 0 & V_a(i) & V_a(j) & 0 & 0 & 0 & 0 \\ V_b(i') & V_b(j') & 0 & 0 & V_b(k') & V_b(l') & V_b(m') & V_b(n') \end{bmatrix}$$

$$\begin{bmatrix} 0 & 0 & V_a(i) & 0 & 0 & 0 & 0 & 0 \\ V_b(i') & V_b(j') & 0 & V_b(k') & V_b(l') & V_b(m') & V_b(n') & V_b(p') \end{bmatrix}$$

$$\begin{bmatrix} 0 & 0 & 0 & V_a(i) & 0 & 0 & 0 & 0 \\ V_b(i') & V_b(j') & V_b(k') & 0 & V_b(l') & V_b(m') & V_b(n') & V_b(p') \end{bmatrix}$$

$$\begin{bmatrix} 0 & 0 & 0 & 0 & 0 & 0 & 0 & 0 \\ V_b(i') & V_b(j') & V_b(k') & V_b(l') & V_b(m') & V_b(n') & V_b(p') & V_b(q') \end{bmatrix},$$

where a value of a rank indicator is 8, $0<i\leq N_1$, $0<i'\leq N_1$, $0<j\leq N_1$, $0<j'\leq N_1$, $0<k\leq N_1$, $0<k'\leq N_1$, $0<l\leq N_1$, and $0<l'\leq N_1$, $0<m\leq N_1$, $0<m'\leq N_1$, $0<n\leq N_1$, $0<n'\leq N_1$, $0<p\leq N_1$, $0<p'\leq N_1$, $0<q\leq N_1$, and $0<q'\leq N_1$, where: for parameters of i, j, k, l, m, n, p, and the like, every two of the sub-vectors corresponding to the $V_a$ parts are unequal, and for parameters i', j', k', l', m', n', p', q', and the like, every two of the sub-vectors corresponding to the $V_b$ parts are unequal.

It should be understood that, in the illustrated possible forms of the first codebook included in the first codebook set, i, j, k, l, m, n, p, and q are only for distinguishing locations of different codebook vectors.

Further, in an embodiment of the present invention, $V_a$ parts of all first sub-vectors $$\begin{bmatrix} V_a \\ 0 \end{bmatrix}$$

in each first codebook form a sub-vector set $\{V_K\}$, $V_b$ parts of all second sub-vectors $$\begin{bmatrix} 0 \\ V_b \end{bmatrix}$$

in each first codebook form a sub-vector set $\{V_L\}$, and the corresponding $\{V_K\}$ and $\{V_L\}$ in the same first codebook meet a fourth condition, where the fourth condition is: phase parts of a sub-vector $V_k$ in the $\{V_k\}$ form a vector $V_k'$, vectors $V_k'$ corresponding to all sub-vectors $V_k$ in the $\{V_k\}$ form a set $\{V_k'\}$, phase parts of a sub-vector $V_L$ in the $\{V_L\}$ form a vector $V_L'$, vectors $V_L'$ corresponding to all sub-vectors $V_L$ in the $\{V_L\}$ form a set $\{V_L'\}$, and $\{V_k'\}\neq\{V_L'\}$ holds true. According to concepts of sets, when a quantity of dimensions of the $\{V_k'\}$ and a quantity of dimensions of the $\{V_L'\}$ are unequal, $\{V_k'\}\neq\{V_L'\}$ holds true; when a quantity of dimensions of the $\{V_k'\}$ and a quantity of dimensions of the $\{V_L'\}$ are equal, but a quantity of sub-vectors included in the $\{V_k'\}$ and a quantity of sub-vectors included in the $\{V_L'\}$ are unequal, $\{V_k'\}\neq\{V_L'\}$ holds true; or when a quantity of dimensions of the $\{V_k'\}$ and a quantity of dimensions of the $\{V_L'\}$ are equal, and a quantity of sub-vectors included in the $\{V_k'\}$ and a quantity of sub-vectors included in the $\{V_L'\}$ are equal, but the sub-vectors included in the $\{V_k'\}$ are different from the sub-vectors included in the $\{V_L'\}$, $\{V_k'\}\{V_L'\}$ also holds true.

In another embodiment of the present invention, when the value of the RI is greater than 1, $V_a$ parts of all first sub-vectors $$\begin{bmatrix} V_a \\ 0 \end{bmatrix}$$

in each first codebook form a sub-vector set $\{V_M\}$, $V_b$ parts of all second sub-vectors $$\begin{bmatrix} 0 \\ V_b \end{bmatrix}$$

in each first codebook form a sub-vector set $\{V_N\}$, and the corresponding $\{V_M\}$ and $\{V_N\}$ in the same first codebook meet a fifth condition, where the fifth condition is: amplitude parts of a sub-vector $V_M$ in the $\{V_M\}$ form a vector $V_M'$, vectors $V_M'$ corresponding to all sub-vectors $V_M$ in the $\{V_M\}$ form a set $\{V_M'\}$, amplitude parts of a sub-vector $V_N$ in the $\{V_N\}$ form a vector $V_N'$, vectors $V_N'$ corresponding to all sub-vectors $V_N$ in the $\{V_N\}$ form a set $\{V_N'\}$, and $\{V_M'\}\neq\{V_N'\}$ holds true. According to concepts of sets, when a quantity of dimensions of the $\{V_M'\}$ and a quantity of dimensions of the $\{V_N'\}$ are unequal, $\{V_M'\}\neq\{V_N'\}$ holds true; when a quantity of dimensions of the $\{V_M'\}$ and a quantity of dimensions of the $\{V_N'\}$ are equal, but a quantity of sub-vectors included in the $\{V_M'\}$ and a quantity of sub-vectors included in the $\{V_N'\}$ are unequal, $\{V_M'\}\neq\{V_N'\}$ holds true; or when a quantity of dimensions of the $\{V_M'\}$ and a quantity of dimensions of the $\{V_N'\}$ are equal, and a quantity of sub-vectors included in the $\{V_M'\}$ and a quantity of sub-vectors included in the $\{V_N'\}$ are equal, but the sub-vectors included in the $\{V_M'\}$ are different from the sub-vectors included in the $\{V_N'\}$, $\{V_M'\}\neq\{V_N'\}$ also holds true.

In the foregoing embodiment, with the first codebook that makes the $\{V_k'\}\neq\{V_L'\}$ and/or $\{V_M'\}\neq\{V_N'\}$ relation hold true, flexible configurations of the first structure and the second structure are implemented, and a codebook is better matched with a channel.

The following provides relationships of amplitude vectors respectively corresponding to $$\begin{bmatrix} V_a \\ 0 \end{bmatrix} \text{ and } \begin{bmatrix} 0 \\ V_b \end{bmatrix}.$$

A first relationship of amplitude vectors, a second relationship of amplitude vectors, and a third relationship of amplitude vectors each provide a configuration mode of a relationship between elements included in each sub-vector. The third relationship of amplitude vectors and a fourth relationship of amplitude vectors provide relationships between different codebook vectors in a codebook. The second network device may configure different amplitude vectors according to channel conditions, so that transmission efficiency is higher. The definitions of amplitude vectors are already described, and are not further described herein.

For example, a codebook $M_2$ in a codebook set is:

$$\begin{bmatrix} a_1 e^{jw_1} & 0 & b_1 e^{j\theta_1} & c_1 e^{j\gamma_1} & 0 \\ a_2 e^{jw_2} & 0 & b_2 e^{j\theta_2} & c_2 e^{j\gamma_2} & 0 \\ a_3 e^{jw_3} & 0 & b_3 e^{j\theta_3} & c_3 e^{j\gamma_3} & 0 \\ a_4 e^{jw_4} & 0 & b_4 e^{j\theta_4} & c_4 e^{j\gamma_4} & 0 \\ 0 & d_1 e^{j\alpha_1} & 0 & 0 & g_1 e^{j\beta_1} \\ 0 & d_2 e^{j\alpha_2} & 0 & 0 & g_2 e^{j\beta_2} \end{bmatrix}.$$

If $M_2$ meets the first relationship of amplitude vectors: at least two elements in an amplitude vector in $V_a$ of each first sub-vector $$\begin{bmatrix} V_a \\ 0 \end{bmatrix}$$

in the first codebook are unequal, and at least two elements in an amplitude vector in $V_b$ of each second sub-vector $$\begin{bmatrix} 0 \\ V_b \end{bmatrix}$$

in the first codebook are unequal, at least two values in $a_1$, $a_2$, $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_2$.

If $M_2$ meets the second relationship of amplitude vectors: at least two elements in an amplitude vector in $V_a$ of each first sub-vector in the first codebook are unequal, and all elements in an amplitude vector in $V_b$ of each second sub-vector $$\begin{bmatrix} 0 \\ V_b \end{bmatrix}$$

in the first codebook are equal, at least two values in $a_1$, $a_2$, $a_3$, and $a_4$ are unequal; at least two values in $b_1$, $b_2$, $b_3$, and $b_4$ are unequal; at least two values in $c_1$, $c_2$, $c_3$, and $c_4$ are unequal; $d_1 \neq d_2$; and $g_1 \neq g_4$.

If $M_2$ meets the third relationship of amplitude vectors: all elements in an amplitude vector in $V_a$ of each first sub-vector $$\begin{bmatrix} V_a \\ 0 \end{bmatrix}$$

in the first codebook are equal, and at least two elements in an amplitude vector in $V_b$ of each second sub-vector $$\begin{bmatrix} 0 \\ V_b \end{bmatrix}$$

in the first codebook are unequal, $a_1=a_2=a_3=a_4$; $b_1=b_2=b_3=b_4$; $c_1=c_2=c_3=c_4$; $d_1 \neq d_2$; and $g_1=g_2$.

If $M_2$ meets the fourth relationship of amplitude vectors: at least two amplitude vectors in a vector set formed by amplitude vectors in $V_a$ of all first sub-vectors $$\begin{bmatrix} V_a \\ 0 \end{bmatrix}$$

in the first codebook are different, amplitude vectors in $V^a$ of all corresponding first sub-vectors $$\begin{bmatrix} V_a \\ 0 \end{bmatrix}$$

in $M_2$ are $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{ and } \begin{bmatrix} c_1 \\ c_2 \\ c_3 \\ c_4 \end{bmatrix},$$

where at least two vectors of $$\begin{bmatrix} a_1 \\ a_2 \\ a_3 \\ a_4 \end{bmatrix}, \begin{bmatrix} b_1 \\ b_2 \\ b_3 \\ b_4 \end{bmatrix}, \text{ and } \begin{bmatrix} c_1 \\ c_2 \\ c_3 \\ c_4 \end{bmatrix}$$

are different.

A fifth relationship of amplitude vectors is: at least two amplitude vectors in a vector set formed by amplitude vectors in $V_b$ of all second sub-vectors $$\begin{bmatrix} 0 \\ V_b \end{bmatrix}$$

in the first codebook are different.

In this case, amplitude vectors in $V_b$ of all corresponding second sub-vectors $$\begin{bmatrix} 0 \\ V_b \end{bmatrix}$$

in $M_2$ are $$\begin{bmatrix} d_1 \\ d_2 \end{bmatrix} \text{ and } \begin{bmatrix} g_1 \\ g_2 \end{bmatrix},$$

where $$\begin{bmatrix} d_1 \\ d_2 \end{bmatrix} \text{ and } \begin{bmatrix} g_1 \\ g_2 \end{bmatrix}$$

are unequal.

Optionally, in all the embodiments shown above, the first network device is a terminal device UE, and the second network device is a base station eNB.

Figure 16:
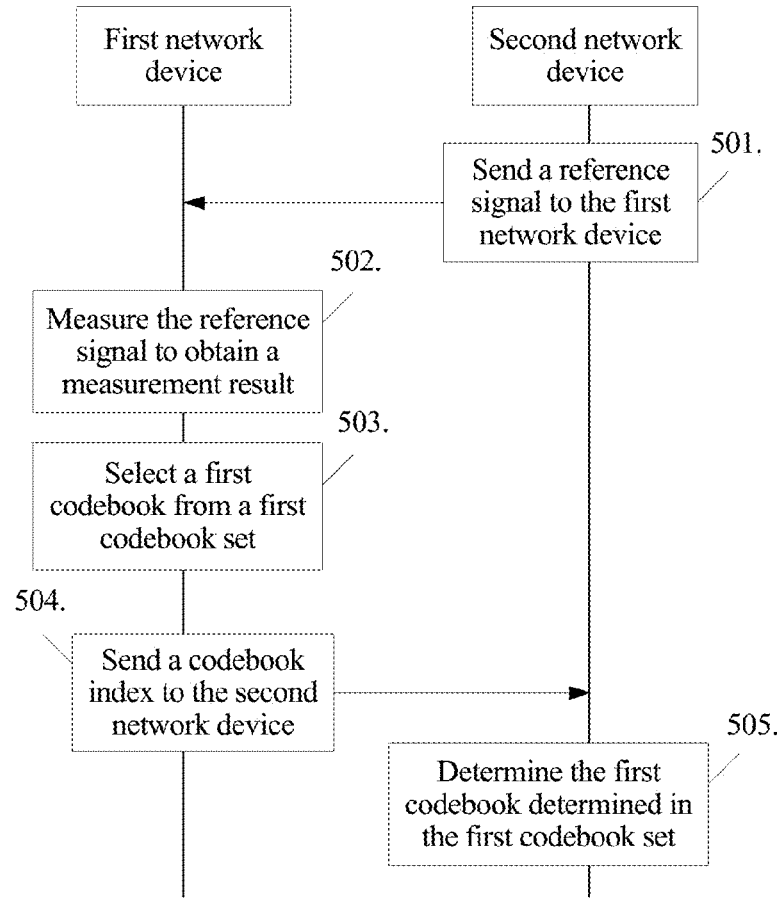
FIG. 16 is a flowchart in a network system for implementing a method for measuring and feeding back channel information according to the present invention.

FIG. 16 is a flowchart of a system according to the present invention.

501. A second network-side device sends a reference signal to a first network device, where the reference signal is used to notify the first network device to perform a measurement to obtain a measurement result.

502. The first network device receives the reference signal, measures the reference signal to obtain a measurement result, and selects a first codebook from a first codebook set according to the measurement result.

In an embodiment, if a rank is r, the first codebook set C includes n first codebooks C(1), C(2), . . . , C(n). A channel matrix $H_{Rx \times Tx}$ is obtained by measuring the reference signal, and the rank r is obtained according to the channel matrix $H_{Rx \times Tx}$. All the first codebooks C(1) to C(n) whose ranks are r in the first codebook set are traversed. A row quantity value of the first codebook is Tx, and a column quantity value of the first codebook is r. Channel quality corresponding to each of C(1) to C(n) that are included in the first codebook set is calculated. Optionally, the channel quality corresponding to each of C(1) to C(n) may be a channel throughput in each first codebook, or may be a signal to noise ratio of a channel in each first codebook. C(i) is determined, so that the transmission efficiency is highest or optimal. For example, a first codebook corresponding to a maximum channel throughput is selected from all the first codebooks; or a first codebook corresponding to a maximum signal to noise ratio is selected from all the first codebooks.

503. The first network-side device sends a codebook index to the second network device, where the codebook index corresponds to the first codebook selected from the first codebook set.

504. The second network-side device receives the codebook index sent by the first network device, where the codebook index corresponds to the first codebook determined in the first codebook set by the first network device.

505. The second network-side device determines, according to the codebook index, the first codebook determined in the first codebook set by the first network device.

Characteristics of the codebook are already described in the foregoing embodiment, and are not further described herein.

In the following, the present invention provides an embodiment of a sub-vector characteristic in the first codebook. Conditions in this embodiment correspond to the foregoing embodiments.

In an example $V_1$ of a first codebook:

$$W_x(0) = \begin{bmatrix} \frac{1}{\sqrt{20}} \\ \frac{1}{\sqrt{20}} \\ \frac{1}{\sqrt{20}} \\ \frac{1}{\sqrt{20}} \\ 0 \\ 0 \\ 0 \\ 0 \end{bmatrix}, W_x(1) = \begin{bmatrix} \frac{1}{\sqrt{20}} \\ \frac{1}{\sqrt{20}} e^{j\frac{2\pi}{32}} \\ \frac{1}{\sqrt{20}} e^{2j\frac{2\pi}{32}} \\ \frac{1}{\sqrt{20}} e^{3j\frac{2\pi}{32}} \\ 0 \\ 0 \\ 0 \\ 0 \end{bmatrix}, W_x(2) = \begin{bmatrix} \frac{1}{\sqrt{20}} \\ \frac{1}{\sqrt{20}} e^{2j\frac{2\pi}{32}} \\ \frac{1}{\sqrt{20}} e^{4j\frac{2\pi}{32}} \\ \frac{1}{\sqrt{20}} e^{6j\frac{2\pi}{32}} \\ 0 \\ 0 \\ 0 \\ 0 \end{bmatrix},$$

$$W_x(3) = \begin{bmatrix} \frac{1}{\sqrt{20}} \\ \frac{1}{\sqrt{20}} e^{3j\frac{2\pi}{32}} \\ \frac{1}{\sqrt{20}} e^{6j\frac{2\pi}{32}} \\ \frac{1}{\sqrt{20}} e^{9j\frac{2\pi}{32}} \\ 0 \\ 0 \\ 0 \\ 0 \end{bmatrix}, \text{ and } W_x(4) = \begin{bmatrix} \frac{1}{\sqrt{20}} \\ \frac{1}{\sqrt{20}} e^{4j\frac{2\pi}{32}} \\ \frac{1}{\sqrt{20}} e^{8j\frac{2\pi}{32}} \\ \frac{1}{\sqrt{20}} e^{12j\frac{2\pi}{32}} \\ 0 \\ 0 \\ 0 \\ 0 \end{bmatrix}.$$

$$V_1 = \begin{bmatrix} 0 & \frac{1}{\sqrt{20}} & \frac{1}{\sqrt{20}} & 0 & 0 & \frac{1}{\sqrt{20}} & \frac{1}{\sqrt{20}} & \frac{1}{\sqrt{20}} \\ 0 & \frac{1}{\sqrt{20}} & \frac{1}{\sqrt{20}} e^{j\frac{2\pi}{32}} & 0 & 0 & \frac{1}{\sqrt{20}} e^{2j\frac{2\pi}{32}} & \frac{1}{\sqrt{20}} e^{3j\frac{2\pi}{32}} & \frac{1}{\sqrt{20}} e^{4j\frac{2\pi}{32}} \\ 0 & \frac{1}{\sqrt{20}} & \frac{1}{\sqrt{20}} e^{2j\frac{2\pi}{32}} & 0 & 0 & \frac{1}{\sqrt{20}} e^{4j\frac{2\pi}{32}} & \frac{1}{\sqrt{20}} e^{6j\frac{2\pi}{32}} & \frac{1}{\sqrt{20}} e^{8j\frac{2\pi}{32}} \\ 0 & \frac{1}{\sqrt{20}} & \frac{1}{\sqrt{20}} e^{3j\frac{2\pi}{32}} & 0 & 0 & \frac{1}{\sqrt{20}} e^{6j\frac{2\pi}{32}} & \frac{1}{\sqrt{20}} e^{9j\frac{2\pi}{32}} & \frac{1}{\sqrt{20}} e^{12j\frac{2\pi}{32}} \\ \frac{1}{\sqrt{2}} & 0 & 0 & 0 & 0 & 0 & 0 & 0 \\ \frac{1}{\sqrt{2}} & 0 & 0 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \end{bmatrix},$$

a met structure is:

$$\begin{bmatrix} 0 & V_a(i) & V_a(j) & 0 & 0 & V_a(k) & V_a(l) & V_a(m) \\ V_b(i') & 0 & 0 & V_b(j') & V_b(k') & 0 & 0 & 0 \end{bmatrix}.$$

A $V_a$ part is four-dimensional, and a $V_b$ part is also four-dimensional. That is, when a quantity of antenna ports in a first group is 4, correspondingly, in a rank 8, there are five corresponding column vectors of $W_x$ that meet a first structure. In this case, in the first codebook, all the sub-vectors $W_x$ with $V_a$ meeting the first structure form a vector set of the first structure, where elements included in the vector set of the first structure are respectively:

$V_a$ parts of all the sub-vectors $W_x$ in the vector set of the first structure form a first vector set $\{V_m\}$. In this embodiment, the corresponding $\{V_m\}$ is:

$$\{V_m\} = \left\{ \begin{bmatrix} \frac{1}{\sqrt{20}} \\ \frac{1}{\sqrt{20}} \\ \frac{1}{\sqrt{20}} \\ \frac{1}{\sqrt{20}} \end{bmatrix}, \right.$$

-continued $$\left\{\begin{bmatrix}\frac{1}{\sqrt{20}}\\\frac{1}{\sqrt{20}}e^{j\frac{2\pi}{32}}\\\frac{1}{\sqrt{20}}e^{3j\frac{2\pi}{32}}\\\frac{1}{\sqrt{20}}e^{4j\frac{2\pi}{32}}\end{bmatrix},\begin{bmatrix}\frac{1}{\sqrt{20}}\\\frac{1}{\sqrt{20}}e^{2j\frac{2\pi}{32}}\\\frac{1}{\sqrt{20}}e^{4j\frac{2\pi}{32}}\\\frac{1}{\sqrt{20}}e^{8j\frac{2\pi}{32}}\end{bmatrix},\begin{bmatrix}\frac{1}{\sqrt{20}}\\\frac{1}{\sqrt{20}}e^{3j\frac{2\pi}{32}}\\\frac{1}{\sqrt{20}}e^{6j\frac{2\pi}{32}}\\\frac{1}{\sqrt{20}}e^{9j\frac{2\pi}{32}}\end{bmatrix},\begin{bmatrix}\frac{1}{\sqrt{20}}\\\frac{1}{\sqrt{20}}e^{4j\frac{2\pi}{32}}\\\frac{1}{\sqrt{20}}e^{8j\frac{2\pi}{32}}\\\frac{1}{\sqrt{20}}e^{12j\frac{2\pi}{32}}\end{bmatrix}\right\}.$$

Phase parts of all elements in each sub-vector of the $\{V_m\}$ form a corresponding first phase vector, and a phase part of a $K^{th}$ element in each sub-vector of the $\{V_m\}$ is a $K^{th}$ element of each corresponding first phase vector. A vector set formed by the first phase vectors is $$\{V'_m\}=$$

$$\left\{\begin{bmatrix}1\\1\\1\\1\end{bmatrix},\begin{bmatrix}\frac{1}{\sqrt{20}}\\\frac{1}{\sqrt{20}}e^{j\frac{2\pi}{32}}\\\frac{1}{\sqrt{20}}e^{3j\frac{2\pi}{32}}\\\frac{1}{\sqrt{20}}e^{4j\frac{2\pi}{32}}\end{bmatrix},\begin{bmatrix}\frac{1}{\sqrt{20}}\\\frac{1}{\sqrt{20}}e^{2j\frac{2\pi}{32}}\\\frac{1}{\sqrt{20}}e^{4j\frac{2\pi}{32}}\\\frac{1}{\sqrt{20}}e^{8j\frac{2\pi}{32}}\end{bmatrix},\begin{bmatrix}\frac{1}{\sqrt{20}}\\\frac{1}{\sqrt{20}}e^{3j\frac{2\pi}{32}}\\\frac{1}{\sqrt{20}}e^{6j\frac{2\pi}{32}}\\\frac{1}{\sqrt{20}}e^{9j\frac{2\pi}{32}}\end{bmatrix},\begin{bmatrix}\frac{1}{\sqrt{20}}\\\frac{1}{\sqrt{20}}e^{4j\frac{2\pi}{32}}\\\frac{1}{\sqrt{20}}e^{8j\frac{2\pi}{32}}\\\frac{1}{\sqrt{20}}e^{12j\frac{2\pi}{32}}\end{bmatrix}\right\}$$

which is a subset of a set of corresponding column vectors in a phase matrix of a DFT matrix. A phase of a $K^{th}$ element in an $M^{th}$ column in the $\{V_m\}$ is equal to a $K^{th}$ element in an $M^{th}$ column in the $\{V_m'\}$. For example, a phase of a fourth element $$\frac{1}{\sqrt{20}}e^{8j\frac{2\pi}{32}}$$

in a third column in the $\{V_m\}$ is equal to a fourth element $$e^{8j\frac{2\pi}{32}}$$

in a third column in the $\{V_m'\}$, that is, the matrix $V_1$ meets: the vector set formed by all the first phase vectors and the discrete Fourier transform matrix DFT matrix meet a first correspondence that the vector set formed by the first phase vectors is the subset of the set of corresponding column vectors in the phase matrix of the DFT matrix, where an element in a $P^{th}$ row and a $Q^{th}$ column in the phase matrix of the DFT matrix is a phase part of an element in a $P^{th}$ row and a $Q^{th}$ column in the DFT matrix, $V_a$ parts of all first sub-vectors $$\begin{bmatrix}V_a\\0\end{bmatrix}$$

in the first codebook form the set $\{V_m\}$, the phase parts of all the elements in each sub-vector of the $\{V_m\}$ form the first phase vector, and the phase part of the $K^{th}$ element in each sub-vector of the $\{V_m\}$ is the $K^{th}$ element of each corresponding first phase vector, where P, Q, and K are any positive integers.

In a second embodiment $V_2$ of a first codebook:

$$V_2=\begin{bmatrix}0 & 0 & \frac{1}{2} & 0 & 0\\0 & 0 & -\frac{1}{2} & 0 & 0\\0 & 0 & 0 & 0 & \frac{1}{2}\\0 & 0 & 0 & 0 & \frac{1}{2}e^{j\frac{\pi}{2}}\\0 & \frac{1}{2} & 0 & 0 & 0\\\frac{1}{2} & 0 & 0 & 0 & 0\\\frac{1}{2} & 0 & 0 & 0 & 0\\0 & 0 & 0 & \frac{1}{2} & 0\end{bmatrix},$$

a met structure is:

$$\begin{bmatrix}0 & V_a(i) & V_a(j) & 0 & V_a(k)\\V_b(i') & 0 & 0 & V_b(j') & 0\end{bmatrix}.$$

A $V_a$ part is four-dimensional, and a $V_b$ part is also four-dimensional. That is, when a quantity of antenna ports in a first group is 4, correspondingly, in a rank 5, there are two corresponding column vectors of the $W_x$ that meet a first codebook structure. In this case, in the first codebook, all the sub-vectors $W_x$ with $V_a$ meeting the first structure form a vector set of the first structure, where elements included in the vector set of the first structure are respectively:

$$W_x(5)=\begin{bmatrix}\frac{1}{2}\\-\frac{1}{2}\\0\\0\\0\\0\\0\end{bmatrix}\text{ and }W_x(6)=\begin{bmatrix}0\\0\\\frac{1}{2}\\\frac{1}{2}e^{j\frac{\pi}{2}}\\0\\0\\0\\0\end{bmatrix}.$$

$V_a$ parts of all the sub-vectors $W_x$ in the vector set of the first structure form a first vector set $\{V_m\}$. In this embodiment, the corresponding $\{V_m\}$ is $$\{V_m\}=\left\{\begin{bmatrix}\frac{1}{2}\\-\frac{1}{2}\\0\\0\end{bmatrix},\begin{bmatrix}0\\0\\\frac{1}{2}\\\frac{1}{2}e^{j\frac{\pi}{2}}\end{bmatrix}\right\}.$$

Phase parts of all elements in each sub-vector of the $\{V_m\}$ form a corresponding first phase vector, and a phase part of a $K^{th}$ element in each sub-vector of the $\{V_m\}$ is a $K^{th}$ element of each corresponding first phase vector. A vector set formed by all the first phase is $$\{V'_m\}=\left\{\begin{bmatrix}e^{j0}\\e^{j\pi}\\0\\0\end{bmatrix},\begin{bmatrix}0\\0\\e^{j0}\\e^{j\frac{\pi}{2}}\end{bmatrix}\right\},$$

or expressed as:

$$\{V'_m\} = \left\{ \begin{bmatrix} 1 \\ -1 \\ 0 \\ 0 \end{bmatrix}, \begin{bmatrix} 0 \\ 0 \\ 1 \\ j \end{bmatrix} \right\}.$$

In all CMP codebooks, CMP codebooks in which column vectors are two-dimensional are:

TABLE 1

| Codebook index | Quantity of layers $\upsilon = 1$ | $\upsilon = 2$ |
|---|---|---|
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | — |
| 2 | $\frac{1}{\sqrt{2}}\begin{bmatrix} 1 \\ j \end{bmatrix}$ | — |
| 3 | $\frac{1}{\sqrt{2}}\begin{bmatrix} 1 \\ -j \end{bmatrix}$ | — |
| 4 | $\frac{1}{\sqrt{2}}\begin{bmatrix} 1 \\ 0 \end{bmatrix}$ | — |
| 5 | $\frac{1}{\sqrt{2}}\begin{bmatrix} 0 \\ 1 \end{bmatrix}$ | — |

CMP codebooks in which column vectors are four-dimensional and a quantity of layers is 1 are:

TABLE 2

| Codebook index | Quantity of layers $\upsilon = 1$ |
|---|---|
| 0-7 | $\frac{1}{2}\begin{bmatrix} 1 \\ 1 \\ 1 \\ -1 \end{bmatrix}$ $\frac{1}{2}\begin{bmatrix} 1 \\ 1 \\ j \\ j \end{bmatrix}$ $\frac{1}{2}\begin{bmatrix} 1 \\ 1 \\ -1 \\ 1 \end{bmatrix}$ $\frac{1}{2}\begin{bmatrix} 1 \\ 1 \\ -j \\ -j \end{bmatrix}$ $\frac{1}{2}\begin{bmatrix} 1 \\ j \\ 1 \\ j \end{bmatrix}$ $\frac{1}{2}\begin{bmatrix} 1 \\ j \\ j \\ 1 \end{bmatrix}$ $\frac{1}{2}\begin{bmatrix} 1 \\ j \\ -1 \\ -j \end{bmatrix}$ $\frac{1}{2}\begin{bmatrix} 1 \\ j \\ -j \\ -1 \end{bmatrix}$ |
| 8-15 | $\frac{1}{2}\begin{bmatrix} 1 \\ -1 \\ 1 \\ 1 \end{bmatrix}$ $\frac{1}{2}\begin{bmatrix} 1 \\ -1 \\ j \\ -j \end{bmatrix}$ $\frac{1}{2}\begin{bmatrix} 1 \\ -1 \\ -1 \\ -1 \end{bmatrix}$ $\frac{1}{2}\begin{bmatrix} 1 \\ -1 \\ -j \\ j \end{bmatrix}$ $\frac{1}{2}\begin{bmatrix} 1 \\ -j \\ 1 \\ -j \end{bmatrix}$ $\frac{1}{2}\begin{bmatrix} 1 \\ -j \\ j \\ -1 \end{bmatrix}$ $\frac{1}{2}\begin{bmatrix} 1 \\ -j \\ -1 \\ j \end{bmatrix}$ $\frac{1}{2}\begin{bmatrix} 1 \\ -j \\ -j \\ 1 \end{bmatrix}$ |
| 16-23 | $\frac{1}{2}\begin{bmatrix} 1 \\ 0 \\ 1 \\ 0 \end{bmatrix}$ $\frac{1}{2}\begin{bmatrix} 1 \\ 0 \\ -1 \\ 0 \end{bmatrix}$ $\frac{1}{2}\begin{bmatrix} 1 \\ 0 \\ j \\ 0 \end{bmatrix}$ $\frac{1}{2}\begin{bmatrix} 1 \\ 0 \\ -j \\ 0 \end{bmatrix}$ $\frac{1}{2}\begin{bmatrix} 0 \\ 1 \\ 0 \\ 1 \end{bmatrix}$ $\frac{1}{2}\begin{bmatrix} 0 \\ 1 \\ 0 \\ -1 \end{bmatrix}$ $\frac{1}{2}\begin{bmatrix} 0 \\ 1 \\ 0 \\ j \end{bmatrix}$ $\frac{1}{2}\begin{bmatrix} 0 \\ 1 \\ 0 \\ -j \end{bmatrix}$ |

CMP codebook in which column vectors are four-dimensional and a quantity of layers is 2 are:

TABLE 3

| Codebook index | Quantity of layers $\upsilon = 2$ |
|---|---|
| 0-3 | $\frac{1}{2}\begin{bmatrix} 1 & 0 \\ 1 & 0 \\ 0 & 1 \\ 0 & -j \end{bmatrix}$ $\frac{1}{2}\begin{bmatrix} 1 & 0 \\ 1 & 0 \\ 0 & 1 \\ 0 & j \end{bmatrix}$ $\frac{1}{2}\begin{bmatrix} 1 & 0 \\ -j & 0 \\ 0 & 1 \\ 0 & 1 \end{bmatrix}$ $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ $\frac{1}{2}\begin{bmatrix} 1 & 0 \\ -1 & 0 \\ 0 & 1 \\ 0 & j \end{bmatrix}$ $\frac{1}{2}\begin{bmatrix} 1 & 0 \\ j & 0 \\ 0 & 1 \\ 0 & 1 \end{bmatrix}$ $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ $\frac{1}{2}\begin{bmatrix} 1 & 0 \\ 0 & 1 \\ 1 & 0 \\ 0 & -1 \end{bmatrix}$ $\frac{1}{2}\begin{bmatrix} 1 & 0 \\ 0 & 1 \\ -1 & 0 \\ 0 & 1 \end{bmatrix}$ $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ $\frac{1}{2}\begin{bmatrix} 1 & 0 \\ 0 & 1 \\ 0 & -1 \\ 1 & 0 \end{bmatrix}$ $\frac{1}{2}\begin{bmatrix} 1 & 0 \\ 0 & 1 \\ 0 & 1 \\ -1 & 0 \end{bmatrix}$ $\frac{1}{2}\begin{bmatrix} 1 & 0 \\ 0 & 1 \\ 0 & -1 \\ -1 & 0 \end{bmatrix}$ |

CMP codebooks in which column vectors are four-dimensional and a quantity of layers is 3 are:

TABLE 4

| Codebook index | Quantity of layers $\upsilon = 3$ | | | |
|---|---|---|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

CMP codebooks in which column vectors are four-dimensional and a quantity of layers is 4 are:

TABLE 5

| Codebook index | Quantity of layers $\upsilon = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

In this embodiment, in the $\{V_m'\}$, column vectors are four-dimensional, and there are two elements in total. In Table 3 in which the column vectors are four-dimensional and the quantity of layers is 2, a CMP codebook $C_m$ with a codebook index 5 is:

$$\frac{1}{2}\begin{bmatrix} 1 & 0 \\ -1 & 0 \\ 0 & 1 \\ 0 & j \end{bmatrix},$$

and a corresponding phase matrix of the $C_m$ is:

$$\begin{bmatrix} 1 & 0 \\ -1 & 0 \\ 0 & 1 \\ 0 & j \end{bmatrix}.$$

The $\{V_m'\}$ and the $C_m$ meet a first correspondence: a quantity 2 of column vectors of $\{V_m'\}$ is equal to a quantity 2 of columns in the CMP codebook; the $\{V_m'\}$ and the $C_m$ meet: a vector set $$\begin{bmatrix} 1 \\ -1 \\ 0 \\ 0 \end{bmatrix}, \begin{bmatrix} 0 \\ 0 \\ 1 \\ j \end{bmatrix}$$

formed by the second phase vectors is a subset of a set of corresponding column vectors in a phase matrix of CMP codebook matrix. Evidently, $$\begin{bmatrix} 1 \\ -1 \\ 0 \\ 0 \end{bmatrix}$$

corresponds to a first column in the phase matrix of the $C_m$, and $$\begin{bmatrix} 0 \\ 0 \\ 1 \\ j \end{bmatrix}$$

corresponds to a second column in the phase matrix of the $C_m$.

That is, the vector set formed by all the second phase vectors and at least one CMP codebook in a CMP codebook set meet a second correspondence that the vector set formed by the second phase vectors is the subset of the set of corresponding column vectors in the phase matrix of the CMP codebook matrix, where an element in a $P^{th}$ row and a $Q^{th}$ column in the phase matrix of the CMP codebook matrix is a phase part of an element in a $P^{th}$ row and a $Q^{th}$ column in the CMP codebook matrix, $V_a$ parts of all first sub-vectors $$\begin{bmatrix} V_a \\ 0 \end{bmatrix}$$

in the first codebook form the set $\{V_m\}$, the phase parts of all the elements in each sub-vector of the $\{V_m\}$ form the second phase vector, and the phase part of the $K^{th}$ element in each sub-vector of the $\{V_m\}$ is a $K^{th}$ element of each corresponding second phase vector, where P, Q, and K are any positive integers, and the CMP codebook refers to a codebook in which only one layer in layers corresponding to each port is a non-zero element.

Figure 17:
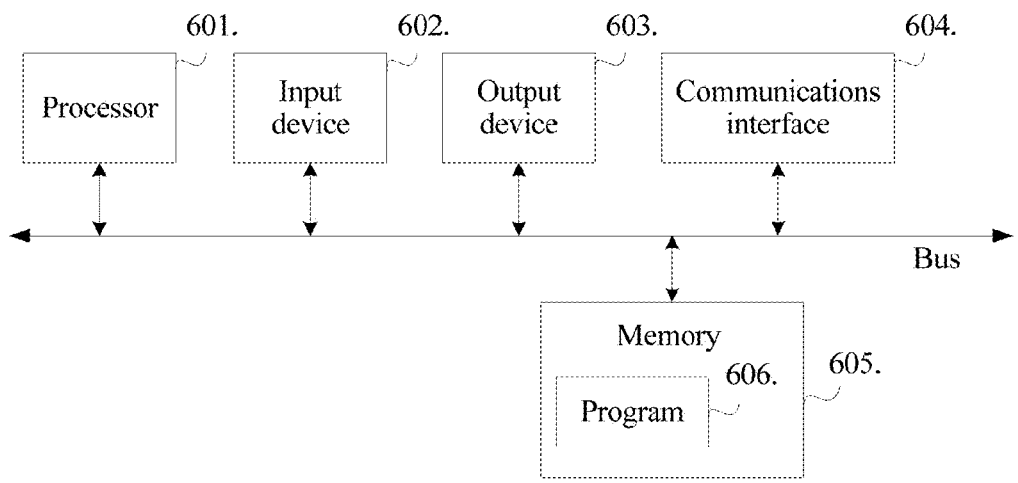
FIG. 17 is a structural diagram of a network device for implementing a method for measuring and feeding back channel information according to the present invention.

FIG. 17 shows a structure of a general-purpose computer system of the foregoing apparatus.

The computer system may be specifically a processor-based computer, for example, a general-purpose personal computer (PC), a portable device such as a tablet, or a smartphone.

More specifically, the computer system may include a bus, a processor 601, an input device 602, an output device 603, a communications interface 604, and a memory 605. The processor 601, the input device 602, the output device 603, the communications interface 604, and the memory 605 are mutually connected by using the bus.

The bus may include a channel, and transfer information between components of the computer system.

The processor 601 may be a general-purpose processor, for example, a general-purpose central processing unit (CPU), a network processor (Network Processor, NP for short), or a microprocessor, or may be an application-specific integrated circuit (application-specific integrated circuit, ASIC), or one or more integrated circuits used for controlling execution of a program in the solution of the present invention, or may be a digital signal processor (DSP), an application-specific integrated circuit (ASIC), a field programmable gate array (FPGA) or any other programmable logic device, a discrete gate or a transistor logic device, or a discrete hardware component.

The memory 605 stores the program for executing the technical solution of the present invention, and may further store an operating system and other application programs. Specifically, the program may include program code, where the program code includes a computer operation instruction. More specifically, the memory 605 may be a read-only memory (read-only memory, ROM), another type of static storage device that may store static information and instructions, a random access memory (random access memory, RAM), another type of dynamic storage device that may store information and instructions, a magnetic disk storage, or the like.

The input device 602 may include an apparatus for receiving data and information input by a user, for example, a keyboard, a mouse, a camera, a scanner, a light pen, a voice input apparatus, or a touchscreen.

The output device 603 may include an apparatus that may allow outputting information to the user, for example, a display, a printer, or a speaker.

The communications interface 604 may include an apparatus that uses any transceiver, so as to communicate with another device or a communications network, for example, an Ethernet, a radio access network (RAN), or a wireless local area network (WLAN).

The processor 601 executes the program stored in the memory 605, and is configured to implement a method for measuring and feeding back channel information according to any embodiment of the present invention and any apparatus in the embodiment. With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method for measuring and feeding back channel information, the method comprising:

receiving, by a first network device, a reference signal;

measuring the reference signal to obtain a measurement result;

selecting a first codebook from a first codebook set according to the measurement result, wherein the first codebook set comprises at least two first codebooks, a sub-vector $W_x$ of each first codebook is formed by a zero vector and a non-zero vector, wherein the zero and non-zero vectors forming the sub-vector $W_x$ correspond to different groups of antenna ports, wherein each first codebook comprises at least one first sub-vector $$\begin{bmatrix} V_a^0 \\ 0 \\ V_a^1 \\ 0 \end{bmatrix}$$

or at least one second sub-vector $$\begin{bmatrix} 0 \\ V_b^0 \\ 0 \\ V_b^1 \end{bmatrix},$$

and wherein $V_a^0$ and $V_a^1$ are elements in a vector $V_a$, and $V_b^0$ and $V_b^1$ are elements in a vector $V_b$; and sending a codebook index to a second network device, wherein the codebook index corresponds to the first codebook selected from the first codebook set.

2. The method according to claim 1, wherein the vector $V_a$ is one column of a Discrete Fourier Transform matrix or the vector $V_b$ one column of the Discrete Fourier Transform matrix.

3. A method for measuring and feeding back channel information, the method comprising:

sending a reference signal to a first network device;

receiving a codebook index sent by the first network device, wherein the codebook index corresponds to a first codebook determined in a first codebook set by the first network device, and the codebook index is determined by the first network device according to a measurement result, wherein the first codebook set comprises at least two first codebooks, a sub-vector $W_x$ of each first codebook is formed by a zero vector and a non-zero vector, wherein the zero and non-zero vectors forming the sub-vector $W_x$ correspond to different groups of antenna ports, wherein each first codebook comprises at least one first sub-vector $$\begin{bmatrix} V_a^0 \\ 0 \\ V_a^1 \\ 0 \end{bmatrix}$$

or at least one second sub-vector $$\begin{bmatrix} 0 \\ V_b^0 \\ 0 \\ V_b^1 \end{bmatrix},$$

and wherein $V_a^0$ and $V_a^1$ are elements in a vector $V_a$, and $V_b^0$ and $V_b^1$ are elements in a vector $V_b$; and determining, according to the codebook index, the first codebook determined in the first codebook set by the first network device.

4. The method according to claim 3, wherein the vector $V_a$ is one column of a Discrete Fourier Transform matrix or the vector $V_b$ is one column of the Discrete Fourier Transform matrix.

5. A terminal apparatus comprising:

a receiver configured to receive a reference signal;

a processor configured to measure the reference signal to obtain a measurement result, wherein the processor is further configured to select a first codebook from a first codebook set according to the measurement result, wherein the first codebook set comprises at least two first codebooks, a sub-vector $W_x$ of each first codebook is formed by a zero vector and a non-zero vector, wherein the vectors forming the sub-vector $W_x$ correspond to different groups of antenna ports, wherein each first codebook comprises at least one first sub-vector $$\begin{bmatrix} V_a^0 \\ 0 \\ V_a^1 \\ 0 \end{bmatrix}$$

or at least one second sub-vector $$\begin{bmatrix} 0 \\ V_b^0 \\ 0 \\ V_b^1 \end{bmatrix},$$

and wherein $V_a^0$ and $V_a^1$ are elements in a vector $V_a$, and $V_b^0$ and $V_b^1$ are elements in a vector $V_b$; and a transmitter configured to send a codebook index to a second network device, wherein the codebook index corresponds to the first codebook selected from the first codebook set.

6. The apparatus according to claim 5, wherein the vector $V_a$ is one column of a Discrete Fourier Transform matrix or the vector $V_b$ is one column of the Discrete Fourier Transform matrix.

7. A communications apparatus comprising:

a transmitter configured to send a reference signal to a first network device;

a receiver configured to receive a codebook index sent by the first network device, wherein the codebook index corresponds to a first codebook determined in the first codebook set by the first network device, and wherein the codebook index is determined by the first network device according to a measurement result; and a processor configured to determine, according to the codebook index, the first codebook in the first codebook set, wherein the first codebook set comprises at least two first codebooks, a sub-vector $W_x$ of each first codebook is formed by a zero vector and a non-zero vector, wherein the zero and non-zero vectors forming the sub-vector $W_x$ correspond to different groups of antenna ports, wherein each first codebook comprises at least one first sub-vector $$\begin{bmatrix} V_a^0 \\ 0 \\ V_a^1 \\ 0 \end{bmatrix}$$

or at least one second sub-vector $$\begin{bmatrix} 0 \\ V_b^0 \\ 0 \\ V_b^1 \end{bmatrix},$$

and wherein $V_a^0$ and $V_a^1$ are elements in a vector $V_a$, and $V_b^0$ and $V_b^1$ are elements in a vector $V_b$.

8. The apparatus according to claim 7, wherein the vector $V_a$ is one column of a Discrete Fourier Transform matrix or the vector $V_b$ is one column of the Discrete Fourier Transform matrix.

* * * * *